US012232559B2

United States Patent
Bartel et al.

(10) Patent No.: US 12,232,559 B2
(45) Date of Patent: Feb. 25, 2025

(54) FOOTWEAR PLATE

(71) Applicant: NIKE, Inc., Beaverton, OR (US)

(72) Inventors: Aaron Bartel, Beaverton, OR (US);
Risha Dupre, Tigard, OR (US); Emily
Farina, Beaverton, OR (US); Lysandre
Follet, Portland, OR (US); Stefan E.
Guest, Portland, OR (US); Helene
Hutchinson, Portland, OR (US); Sam
Lacey, Portland, OR (US); Geng Luo,
Portland, OR (US); Rachel M. Savage,
Beaverton, OR (US); Christian
Alexander Steinbeck, Portland, OR
(US); Adam Thuss, Portland, OR (US);
Kristin Yetman, Portland, OR (US)

(73) Assignee: NIKE, Inc., Beaverton, OR (US)

( * ) Notice: Subject to any disclaimer, the term of this
patent is extended or adjusted under 35
U.S.C. 154(b) by 0 days.

(21) Appl. No.: 18/311,785

(22) Filed: May 3, 2023

(65) Prior Publication Data
US 2023/0270203 A1 Aug. 31, 2023

Related U.S. Application Data

(63) Continuation of application No. 16/992,063, filed on
Aug. 12, 2020, now Pat. No. 11,678,717, which is a
(Continued)

(51) Int. Cl.
A43B 13/02 (2022.01)
A43B 5/00 (2022.01)
(Continued)

(52) U.S. Cl.
CPC ............ A43B 13/026 (2013.01); A43B 5/00
(2013.01); A43B 5/02 (2013.01); A43B 5/06
(2013.01);
(Continued)

(58) Field of Classification Search
CPC ... A43B 13/125; A43B 13/127; A43B 13/141;
A43B 13/181; A43B 13/186;
(Continued)

(56) References Cited

U.S. PATENT DOCUMENTS 859,382 A 7/1907 Hansen
897,920 A * 9/1908 McIntyre ............ A43B 13/181
36/43
(Continued)

FOREIGN PATENT DOCUMENTS

CN 2633059 Y 8/2004
CN 101090649 A 12/2007
(Continued)

OTHER PUBLICATIONS

European Patent Office as the International Searching Authority,
International Search Report and Written Opinion for Application
No. PCT/US2016/030759, mailed Jul. 12, 2016.
(Continued)

Primary Examiner — Heather Mangine
(74) Attorney, Agent, or Firm — Honigman LLP;
Matthew H. Szalach; Jonathan P. O'Brien

(57) ABSTRACT

A plate for an article of footwear includes a substrate, a first
strand portion attached to the substrate via first stitching, and
a second strand portion disposed on the first layer. The first
strand portion includes first segments that each extend
between two different locations along the substrate to form
a first layer on the substrate. The second strand portion
includes second segments that each extend between two
different locations along the substrate to form a second layer
on the first layer.

7 Claims, 44 Drawing Sheets

Related U.S. Application Data continuation of application No. 15/904,568, filed on Feb. 26, 2018, now Pat. No. 10,743,606, which is a continuation of application No. 15/574,889, filed as application No. PCT/US2017/043170 on Jul. 20, 2017, now Pat. No. 10,441,027, which is a continuation of application No. 15/248,051, filed on Aug. 26, 2016, now Pat. No. 10,842,224, and a continuation of application No. 15/248,059, filed on Aug. 26, 2016, now Pat. No. 10,448,704.

(60) Provisional application No. 62/474,030, filed on Mar. 20, 2017, provisional application No. 62/364,594, filed on Jul. 20, 2016, provisional application No. 62/364,585, filed on Jul. 20, 2016.

(51) Int. Cl.

| | |
|---|---|
| *A43B 5/02* | (2006.01) |
| *A43B 5/06* | (2022.01) |
| *A43B 7/1445* | (2022.01) |
| *A43B 7/145* | (2022.01) |
| *A43B 7/148* | (2022.01) |
| *A43B 7/18* | (2006.01) |
| *A43B 9/02* | (2006.01) |
| *A43B 13/04* | (2006.01) |
| *A43B 13/12* | (2006.01) |
| *A43B 13/14* | (2006.01) |
| *A43B 13/16* | (2006.01) |
| *A43B 13/18* | (2006.01) |
| *A43B 13/20* | (2006.01) |
| *A43B 13/22* | (2006.01) |
| *A43B 13/26* | (2006.01) |
| *A43B 13/32* | (2006.01) |
| *A43B 13/37* | (2006.01) |
| *A43B 13/42* | (2006.01) |
| *A43B 21/24* | (2006.01) |
| *A43B 23/02* | (2006.01) |
| *A43C 15/02* | (2006.01) |
| *A43C 15/16* | (2006.01) |
| *A43D 25/20* | (2006.01) |
| *B29D 35/00* | (2010.01) |
| *B29D 35/12* | (2010.01) |
| *B32B 5/06* | (2006.01) |
| *B32B 5/12* | (2006.01) |
| *B32B 5/26* | (2006.01) |
| *B32B 27/12* | (2006.01) |
| *D05C 17/00* | (2006.01) |
| *A42B 3/08* | (2006.01) |
| *A63B 71/12* | (2006.01) |
| *B29K 105/08* | (2006.01) |

(52) U.S. Cl.
CPC ............ *A43B 7/1445* (2013.01); *A43B 7/145* (2013.01); *A43B 7/148* (2013.01); *A43B 7/18* (2013.01); *A43B 9/02* (2013.01); *A43B 13/04* (2013.01); *A43B 13/125* (2013.01); *A43B 13/127* (2013.01); *A43B 13/143* (2013.01); *A43B 13/146* (2013.01); *A43B 13/16* (2013.01); *A43B 13/181* (2013.01); *A43B 13/186* (2013.01); *A43B 13/188* (2013.01); *A43B 13/189* (2013.01); *A43B 13/20* (2013.01); *A43B 13/22* (2013.01); *A43B 13/223* (2013.01); *A43B 13/26* (2013.01); *A43B 13/32* (2013.01); *A43B 13/37* (2013.01); *A43B 13/42* (2013.01); *A43B 21/24* (2013.01); *A43B 23/0225* (2013.01); *A43C 15/02* (2013.01); *A43C 15/161* (2013.01); *A43D 25/20* (2013.01); *B29D 35/0054* (2013.01); *B29D 35/122* (2013.01); *B29D 35/124* (2013.01); *B29D 35/126* (2013.01); *B32B 5/06* (2013.01); *B32B 5/12* (2013.01); *B32B 5/26* (2013.01); *B32B 27/12* (2013.01); *D05C 17/00* (2013.01); *A42B 3/08* (2013.01); *A63B 2071/1241* (2013.01); *A63B 2071/125* (2013.01); *A63B 2071/1258* (2013.01); *B29K 2105/08* (2013.01); *B32B 2260/023* (2013.01); *B32B 2260/046* (2013.01); *B32B 2262/02* (2013.01); *B32B 2262/106* (2013.01); *B32B 2262/14* (2013.01); *B32B 2307/56* (2013.01); *B32B 2437/02* (2013.01)

(58) Field of Classification Search
CPC ..... A43B 13/189; A43B 13/41; A43B 13/142; A43B 13/20
See application file for complete search history.

(56) References Cited

U.S. PATENT DOCUMENTS

| | | | |
|---|---|---|---|
| 1,548,806 A | 8/1925 | Perry | |
| 1,995,506 A * | 3/1935 | Guy | A43B 23/14 |
| | | | 36/43 |
| 2,124,819 A | 7/1938 | Halloran | |
| 2,203,929 A | 6/1940 | Shapiro | |
| 2,333,303 A | 11/1943 | Enos | |
| 2,391,564 A | 12/1945 | Gregg | |
| 2,408,736 A | 10/1946 | Codish | |
| 2,412,808 A | 12/1946 | David. | |
| 2,421,932 A | 6/1947 | Goldstein | |
| 2,430,497 A | 11/1947 | Enright | |
| 2,730,819 A | 1/1956 | Foust | |
| 2,808,663 A | 10/1957 | Frieder | |
| 2,926,435 A * | 3/1960 | Maling | A43B 13/141 |
| | | | 12/146 B |
| 3,328,901 A | 7/1967 | Strickland | |
| 3,442,032 A | 5/1969 | Jonas | |
| 3,561,141 A * | 2/1971 | Brown | A43B 13/41 |
| | | | 36/44 |
| 3,601,908 A * | 8/1971 | Gilkerson | A43B 7/141 |
| | | | 36/43 |
| 3,738,026 A | 6/1973 | Granger | |
| 3,913,160 A * | 10/1975 | Funck | B29D 35/061 |
| | | | 12/142 R |
| 4,079,568 A | 3/1978 | Wortman | |
| 4,271,608 A | 6/1981 | Tomuro | |
| 4,318,231 A | 3/1982 | Simoneau | |
| 4,439,934 A | 4/1984 | Brown | |
| 4,439,937 A | 4/1984 | Daswick | |
| 4,454,664 A | 6/1984 | MacNeil | |
| 4,472,890 A * | 9/1984 | Gilbert | A43B 13/20 |
| | | | 36/35 B |
| 4,561,195 A | 12/1985 | Onoda | |
| 4,612,713 A | 9/1986 | Brown | |
| 4,651,445 A | 3/1987 | Hannibal | |
| 4,651,448 A | 3/1987 | Chen | |
| 4,654,984 A | 4/1987 | Brown | |
| 4,689,899 A | 9/1987 | Larson et al. | |
| 4,729,179 A | 3/1988 | Quist, Jr. | |
| 4,768,295 A * | 9/1988 | Ito | A43B 13/18 |
| | | | 36/28 |
| 4,774,954 A | 10/1988 | Ibrahim | |
| 4,813,090 A | 3/1989 | Ibrahim | |
| 4,815,221 A | 3/1989 | Diaz | |
| 4,821,430 A | 4/1989 | Flemming et al. | |
| 4,908,961 A | 3/1990 | Purslow et al. | |
| 4,922,636 A | 5/1990 | Chen | |
| 4,955,148 A | 9/1990 | Padilla | |
| 5,022,168 A | 6/1991 | Jeppson, III | |
| 5,025,573 A * | 6/1991 | Giese | A43B 13/148 |
| | | | 36/31 |

(56) References Cited

U.S. PATENT DOCUMENTS

| | | | |
|---|---|---|---|
| 5,052,130 A | 10/1991 | Barry et al. | |
| 5,123,180 A | 6/1992 | Nannig et al. | |
| 5,142,797 A | 9/1992 | Cole, III | |
| 5,311,674 A * | 5/1994 | Santiyanont | A43B 13/181 36/35 R |
| 5,345,638 A | 9/1994 | Nishida | |
| 5,401,564 A | 3/1995 | Lee et al. | |
| 5,406,723 A | 4/1995 | Okajima | |
| 5,529,826 A | 6/1996 | Tailor et al. | |
| 5,543,194 A | 8/1996 | Rudy | |
| 5,572,805 A * | 11/1996 | Giese | A43B 13/188 36/31 |
| 5,634,283 A | 6/1997 | Kastner | |
| 5,706,590 A | 1/1998 | Candela et al. | |
| 5,718,063 A * | 2/1998 | Yamashita | A43B 1/0072 36/35 B |
| 5,720,118 A | 2/1998 | Mayer | |
| 5,733,647 A | 3/1998 | Moore, III et al. | |
| 5,761,831 A * | 6/1998 | Cho | A43B 13/181 36/35 B |
| 5,918,338 A | 7/1999 | Wong | |
| 5,932,336 A | 8/1999 | Allen et al. | |
| 6,038,790 A * | 3/2000 | Pyle | A43B 7/144 36/28 |
| 6,176,025 B1 * | 1/2001 | Patterson | A43B 7/1445 36/35 B |
| 6,199,303 B1 | 3/2001 | Luthi et al. | |
| 6,231,946 B1 | 5/2001 | Brown, Jr. et al. | |
| 6,318,002 B1 | 11/2001 | Ou | |
| 6,389,713 B1 | 5/2002 | Kita | |
| 6,421,933 B1 * | 7/2002 | Zamprogno | A43B 13/10 36/43 |
| 6,502,331 B2 | 1/2003 | Hines | |
| 6,508,017 B1 * | 1/2003 | DeBarro | A43B 7/1425 36/31 |
| 6,594,922 B1 * | 7/2003 | Mansfield | A43B 23/081 36/173 |
| 6,675,500 B1 | 1/2004 | Cadamuro et al. | |
| 6,684,532 B2 | 2/2004 | Greene et al. | |
| 6,782,642 B2 | 8/2004 | Knoche et al. | |
| 7,013,581 B2 * | 3/2006 | Greene | A43B 13/38 36/31 |
| 7,013,583 B2 | 3/2006 | Greene et al. | |
| 7,062,865 B1 * | 6/2006 | Nordt, III | A43B 13/12 36/179 |
| 7,107,703 B1 | 9/2006 | Wang | |
| 7,213,354 B1 * | 5/2007 | Byrd | A43B 7/144 36/25 R |
| 7,401,422 B1 * | 7/2008 | Scholz | A43B 13/12 36/102 |
| 7,421,808 B2 | 9/2008 | Baier et al. | |
| 7,437,838 B2 * | 10/2008 | Nau | A43B 3/128 36/94 |
| 7,832,117 B2 | 11/2010 | Auger et al. | |
| 7,886,460 B2 | 2/2011 | Teteriatnikov et al. | |
| 7,934,327 B2 | 5/2011 | Gebhard | |
| 7,941,940 B2 | 5/2011 | Teteriatnikov et al. | |
| 8,256,145 B2 | 9/2012 | Baucom et al. | |
| 8,312,827 B1 | 11/2012 | Free | |
| 8,381,416 B2 * | 2/2013 | Geer | A43B 13/14 36/76 R |
| 8,850,718 B2 * | 10/2014 | Lubart | A43B 13/026 36/31 |
| 9,326,563 B2 | 5/2016 | Svensson | |
| 9,610,746 B2 | 4/2017 | Wardlaw et al. | |
| 9,622,542 B2 | 4/2017 | Greene | |
| 9,655,407 B2 | 5/2017 | Reinhardt et al. | |
| 9,930,934 B2 | 4/2018 | Cook et al. | |
| 10,743,606 B2 | 8/2020 | Bartel et al. | |
| 10,758,005 B2 | 9/2020 | Bartel et al. | |
| 10,952,498 B2 * | 3/2021 | Bruce | A43B 3/0068 |
| 11,089,834 B2 | 8/2021 | Chambers et al. | |
| 2001/0052194 A1 * | 12/2001 | Nishiwaki | A43B 7/144 36/35 R |
| 2002/0011146 A1 | 1/2002 | Vaz | |
| 2002/0050079 A1 * | 5/2002 | Yoshiaki | A43B 19/005 36/132 |
| 2002/0064640 A1 | 5/2002 | Renard et al. | |
| 2002/0066209 A1 | 6/2002 | Steed et al. | |
| 2002/0152642 A1 | 10/2002 | Chu | |
| 2002/0178615 A1 | 12/2002 | Saillet et al. | |
| 2003/0051372 A1 | 3/2003 | Lyden | |
| 2003/0069807 A1 | 4/2003 | Lyden | |
| 2003/0084591 A1 * | 5/2003 | Vello | A43B 17/08 36/3 R |
| 2003/0101620 A1 * | 6/2003 | Reed | A43B 13/42 36/43 |
| 2003/0121179 A1 | 7/2003 | Chen | |
| 2003/0200678 A1 * | 10/2003 | Nishiwaki | A43B 7/1425 36/28 |
| 2003/0208930 A1 * | 11/2003 | Swigart | A43B 7/144 36/29 |
| 2003/0221337 A1 | 12/2003 | Farys et al. | |
| 2004/0123495 A1 * | 7/2004 | Greene | A43B 13/188 36/31 |
| 2004/0163280 A1 * | 8/2004 | Morris | A43B 9/00 36/28 |
| 2004/0168355 A1 | 9/2004 | Biwand et al. | |
| 2004/0197529 A1 | 10/2004 | Cadamuro et al. | |
| 2004/0205983 A1 | 10/2004 | Talbott | |
| 2004/0226191 A1 | 11/2004 | Hsieh | |
| 2005/0022425 A1 | 2/2005 | Brown | |
| 2005/0108897 A1 | 5/2005 | Aveni | |
| 2005/0132614 A1 | 6/2005 | Brennan | |
| 2005/0167029 A1 * | 8/2005 | Rapaport | B29D 35/14 156/308.4 |
| 2005/0193595 A1 * | 9/2005 | Jennings | A43B 5/02 36/134 |
| 2005/0248749 A1 | 11/2005 | Kiehn et al. | |
| 2005/0262728 A1 * | 12/2005 | Robbins | A43B 13/12 36/19 R |
| 2005/0262737 A1 | 12/2005 | Vattes | |
| 2005/0268490 A1 * | 12/2005 | Foxen | A43B 7/1445 36/28 |
| 2006/0010717 A1 * | 1/2006 | Finkelstein | A43B 13/187 36/43 |
| 2006/0021251 A1 * | 2/2006 | Swigart | A43B 13/189 36/28 |
| 2006/0021257 A1 | 2/2006 | Hung | |
| 2006/0156581 A1 * | 7/2006 | Holden | A43B 21/265 36/28 |
| 2006/0211318 A1 | 9/2006 | Fenzi et al. | |
| 2006/0248750 A1 * | 11/2006 | Rosenberg | A43B 1/0054 36/29 |
| 2007/0017124 A1 | 1/2007 | Koo et al. | |
| 2007/0043630 A1 * | 2/2007 | Lyden | A43D 11/006 705/26.5 |
| 2007/0101613 A1 * | 5/2007 | Rosendahl | A43B 7/144 36/29 |
| 2007/0105471 A1 | 5/2007 | Wang et al. | |
| 2007/0119077 A1 | 5/2007 | Yoo | |
| 2007/0277401 A1 * | 12/2007 | Young-Chul | A43B 13/186 36/28 |
| 2008/0086916 A1 * | 4/2008 | Ellis | A42B 3/12 36/103 |
| 2008/0134546 A1 | 6/2008 | Righetto et al. | |
| 2008/0184595 A1 * | 8/2008 | Schindler | A43B 3/0036 36/35 B |
| 2009/0090031 A1 | 4/2009 | Jung | |
| 2009/0094858 A1 | 4/2009 | Ungari et al. | |
| 2009/0133287 A1 | 5/2009 | Meschter | |
| 2009/0188131 A1 * | 7/2009 | Doerer | A43B 7/1435 36/35 R |
| 2009/0288312 A1 | 11/2009 | Dua | |
| 2010/0071228 A1 * | 3/2010 | Crowley, II | A43B 13/181 36/28 |
| 2010/0126044 A1 * | 5/2010 | Davis | A43B 7/144 36/43 |
| 2010/0205828 A1 | 8/2010 | DiGangi | |

(56) References Cited

U.S. PATENT DOCUMENTS

| | | |
|---|---|---|
| 2010/0251564 A1 | 10/2010 | Meschter |
| 2010/0263234 A1 | 10/2010 | Teteriatnikov et al. |
| 2010/0263239 A1 | 10/2010 | Biancucci et al. |
| 2010/0275471 A1 | 11/2010 | Teteriatnikov et al. |
| 2010/0281712 A1* | 11/2010 | Campbell ............... B29D 35/12 36/35 R |
| 2010/0281716 A1 | 11/2010 | Luthi et al. |
| 2010/0307028 A1* | 12/2010 | Teteriatnikov ....... A43B 13/145 36/108 |
| 2010/0325914 A1* | 12/2010 | Peyton ................... A43B 13/20 36/29 |
| 2011/0000101 A1* | 1/2011 | Nakano ................. B29D 35/10 12/146 B |
| 2011/0038904 A1 | 2/2011 | Matteliano et al. |
| 2011/0041359 A1 | 2/2011 | Dojan et al. |
| 2011/0078923 A1 | 4/2011 | Bartholet et al. |
| 2011/0099845 A1* | 5/2011 | Miller .................... A43B 13/18 36/91 |
| 2011/0113649 A1 | 5/2011 | Merritt et al. |
| 2011/0119959 A1 | 5/2011 | Bodner |
| 2011/0131831 A1* | 6/2011 | Peyton ...................... B32B 3/28 36/47 |
| 2011/0146108 A1* | 6/2011 | Grott ....................... A43B 5/001 12/142 P |
| 2011/0179672 A1* | 7/2011 | Cheng .................... A43B 17/08 36/71 |
| 2011/0252670 A1* | 10/2011 | Smith .................... A43B 13/023 12/146 B |
| 2011/0271552 A1* | 11/2011 | Peyton ................... A43B 13/141 36/29 |
| 2011/0277346 A1* | 11/2011 | Peyton ................... A43B 13/122 36/29 |
| 2011/0302809 A1* | 12/2011 | Kim ....................... A43B 13/187 36/103 |
| 2012/0011748 A1 | 1/2012 | Frey |
| 2012/0055047 A1* | 3/2012 | Youngs ................. A43B 13/141 36/25 R |
| 2012/0102782 A1* | 5/2012 | Swigart .................. A43B 13/18 12/146 B |
| 2012/0137544 A1 | 6/2012 | Rosa et al. |
| 2012/0159814 A1* | 6/2012 | Smith ....................... A43B 7/14 36/76 R |
| 2012/0174432 A1* | 7/2012 | Peyton ................... A43B 13/188 36/31 |
| 2012/0198723 A1 | 8/2012 | Borisov |
| 2012/0233879 A1* | 9/2012 | Dojan ................... B29D 35/128 428/156 |
| 2012/0255101 A1 | 10/2012 | Pizzo |
| 2012/0266492 A1* | 10/2012 | Youngs ................. A43B 13/12 428/116 |
| 2012/0266500 A1* | 10/2012 | Cobb .................... A43B 13/145 36/25 R |
| 2012/0297641 A1* | 11/2012 | Pfister .................. B29D 35/142 36/43 |
| 2013/0031805 A1* | 2/2013 | Crowley, II ........... A43B 7/144 36/103 |
| 2013/0061494 A1* | 3/2013 | Linth .................... A43B 13/148 36/102 |
| 2013/0074364 A1* | 3/2013 | Lim ...................... A43B 13/181 36/28 |
| 2013/0074369 A1 | 3/2013 | Thomson |
| 2013/0125421 A1 | 5/2013 | Stegmaier et al. |
| 2013/0160329 A1* | 6/2013 | Peyton .................. A43B 13/28 36/105 |
| 2013/0180128 A1* | 7/2013 | Yang ..................... A43B 7/144 36/29 |
| 2013/0185955 A1* | 7/2013 | Cheng ................... A43B 7/145 36/28 |
| 2013/0227858 A1* | 9/2013 | James ................... A43B 13/186 36/88 |
| 2013/0247425 A1* | 9/2013 | Davis ................... A43B 13/026 36/30 R |
| 2013/0276329 A1* | 10/2013 | James ................... A43B 17/026 36/83 |
| 2013/0291409 A1* | 11/2013 | Reinhardt ............ B29D 35/142 36/43 |
| 2014/0026443 A1* | 1/2014 | Derrier ................. A43B 13/026 36/107 |
| 2014/0026444 A1 | 1/2014 | Howley et al. |
| 2014/0053427 A1* | 2/2014 | Patton .................. B29D 35/122 12/146 B |
| 2014/0059895 A1 | 3/2014 | Arciuolo |
| 2014/0075779 A1* | 3/2014 | Bruce ................... A43B 7/148 36/29 |
| 2014/0109440 A1* | 4/2014 | McDowell ............ A43B 13/16 36/103 |
| 2014/0134378 A1 | 5/2014 | Downs et al. |
| 2014/0173937 A1* | 6/2014 | Smith ................... B29D 35/128 36/102 |
| 2014/0223673 A1 | 8/2014 | Wardlaw et al. |
| 2014/0245546 A1 | 9/2014 | Huffa |
| 2014/0250720 A1* | 9/2014 | Miner .................. A43B 1/0027 36/29 |
| 2014/0259462 A1 | 9/2014 | Taylor et al. |
| 2014/0259749 A1* | 9/2014 | Taylor ................... A43B 21/32 12/146 B |
| 2014/0325876 A1* | 11/2014 | Dodge .................. A43B 13/141 36/103 |
| 2015/0013190 A1* | 1/2015 | Davison ................ A43B 13/189 36/102 |
| 2015/0040428 A1 | 2/2015 | Davis et al. |
| 2015/0059203 A1* | 3/2015 | Xu ........................ A43B 13/04 36/44 |
| 2015/0107133 A1 | 4/2015 | Ganuza et al. |
| 2015/0113829 A1 | 4/2015 | Kodad |
| 2015/0173456 A1* | 6/2015 | Rushbrook .......... A43B 13/181 36/25 R |
| 2015/0196082 A1 | 7/2015 | Van Atta |
| 2015/0196087 A1 | 7/2015 | Meschter et al. |
| 2015/0196091 A1* | 7/2015 | Khaitan ............... A43B 17/026 36/102 |
| 2015/0257483 A1* | 9/2015 | Meschter ............. A43B 21/28 36/29 |
| 2015/0327624 A1* | 11/2015 | Grott ................... A43B 13/184 36/91 |
| 2015/0359290 A1 | 12/2015 | Podhajny et al. |
| 2015/0359295 A1 | 12/2015 | Wildeman |
| 2016/0007678 A1 | 1/2016 | Silverman |
| 2016/0029741 A1 | 2/2016 | Foxen |
| 2016/0031164 A1 | 2/2016 | Downs et al. |
| 2016/0037858 A1* | 2/2016 | Foxen ................... A43B 7/144 36/103 |
| 2016/0051012 A1* | 2/2016 | Avar .................... A43B 13/127 36/103 |
| 2016/0058100 A1 | 3/2016 | Dealey et al. |
| 2016/0058107 A1 | 3/2016 | Walker et al. |
| 2016/0073732 A1* | 3/2016 | Ernst .................. B29D 35/122 36/28 |
| 2016/0095385 A1* | 4/2016 | Nordstrom ............ A43B 13/20 36/29 |
| 2016/0114546 A1 | 4/2016 | Yang |
| 2016/0120263 A1* | 5/2016 | Cortez ................... A43B 13/20 36/29 |
| 2016/0135543 A1 | 5/2016 | Anceresi et al. |
| 2016/0152825 A1 | 6/2016 | Lomoelder et al. |
| 2016/0192741 A1 | 7/2016 | Mark |
| 2016/0206042 A1 | 7/2016 | Cross et al. |
| 2016/0206046 A1 | 7/2016 | Cross |
| 2016/0242499 A1* | 8/2016 | Droege ................. A43B 13/42 |
| 2016/0242506 A1 | 8/2016 | Kim |
| 2016/0278476 A1* | 9/2016 | Stien ..................... A43B 7/20 |
| 2016/0286898 A1 | 10/2016 | Manz et al. |
| 2016/0295956 A1 | 10/2016 | Wang et al. |
| 2016/0302517 A1* | 10/2016 | Jessiman .............. A43B 13/187 |
| 2017/0006962 A1 | 1/2017 | Tanabe et al. |
| 2017/0006965 A1 | 1/2017 | Musho et al. |
| 2017/0049183 A1 | 2/2017 | Foxen |
| 2017/0071291 A1 | 3/2017 | Follet et al. |
| 2017/0086532 A1* | 3/2017 | Youngs ................. B32B 27/065 |

(56) References Cited

U.S. PATENT DOCUMENTS

| | | | |
|---|---|---|---|
| 2017/0095033 A1 | 4/2017 | Farina et al. | |
| 2017/0095034 A1 | 4/2017 | Dupre et al. | |
| 2017/0157893 A1 | 6/2017 | Simmons et al. | |
| 2017/0196305 A1 | 7/2017 | Barnes et al. | |
| 2017/0196306 A1* | 7/2017 | Arciuolo | A43B 5/02 |
| 2017/0202309 A1 | 7/2017 | Sterman et al. | |
| 2017/0224049 A1* | 8/2017 | Stien | A43B 13/125 |
| 2017/0368722 A1 | 12/2017 | Jacobsen | |
| 2018/0000196 A1* | 1/2018 | Lovell | A43B 13/141 |
| 2018/0020762 A1 | 1/2018 | Jamison | |
| 2018/0116337 A1 | 5/2018 | Montross et al. | |
| 2018/0177261 A1 | 6/2018 | Amis et al. | |
| 2018/0192736 A1 | 7/2018 | Luedecke | |
| 2018/0255870 A1* | 9/2018 | Oda | A43B 7/1415 |
| 2018/0360156 A1 | 12/2018 | Whiteman et al. | |
| 2019/0008234 A1 | 1/2019 | Christensen et al. | |
| 2019/0082787 A1 | 3/2019 | Tanabe et al. | |
| 2019/0223546 A1 | 7/2019 | Bartel et al. | |
| 2019/0225784 A1 | 7/2019 | Farr et al. | |
| 2019/0313733 A1 | 10/2019 | Bartel et al. | |
| 2023/0189922 A1* | 6/2023 | Ellis | A43B 13/14 5/655.3 |

FOREIGN PATENT DOCUMENTS

| | | |
|---|---|---|
| CN | 101166435 A | 4/2008 |
| CN | 101516222 A | 8/2009 |
| CN | 102711543 A | 10/2012 |
| CN | 202950081 U | 5/2013 |
| CN | 103813730 A | 5/2014 |
| CN | 105120700 A | 12/2015 |
| CN | 105239261 A | 1/2016 |
| CN | 105361343 A | 3/2016 |
| CN | 105682500 A | 6/2016 |
| CN | 106102501 A | 11/2016 |
| DE | 2108204 A1 | 8/1972 |
| DE | 2736974 A1 | 3/1979 |
| DE | 4210292 A1 | 9/1993 |
| EP | 931470 A2 | 7/1999 |
| EP | 1249184 A1 | 10/2002 |
| EP | 1405577 A2 | 4/2004 |
| EP | 1857005 A1 | 11/2007 |
| EP | 1869989 A1 | 12/2007 |
| EP | 2105058 A1 | 9/2009 |
| EP | 2462827 A2 | 6/2012 |
| EP | 3075277 A2 | 10/2016 |
| EP | 3349608 A1 | 7/2018 |
| JP | 2000106905 A | 4/2000 |
| JP | 2007268025 A | 10/2007 |
| JP | 5649151 B1 | 1/2015 |
| KR | 100912386 B1 | 8/2009 |
| KR | 10-2011-0004572 A | 1/2011 |
| KR | 20130000467 U | 1/2013 |
| WO | WO-1991/01660 A1 | 2/1991 |
| WO | WO-1994/21454 A1 | 9/1994 |
| WO | WO-2000/41544 A2 | 7/2000 |
| WO | WO-2009069871 A1 | 6/2009 |
| WO | WO-2011043507 A1 | 4/2011 |
| WO | WO-2016004360 A1 | 1/2016 |
| WO | WO-2016179265 A1 | 11/2016 |
| WO | WO-2017058419 A1 | 4/2017 |
| WO | WO-2018017890 A1 | 1/2018 |
| WO | WO-2018017893 A1 | 1/2018 |

OTHER PUBLICATIONS

Stefanyshyn, D.J. et al., "Energy Aspects Associated with Sports Shoes," Sportverl Sportschad, vol. 14, pp. 82-89, Georg Thieme Verlag, Stuttgart, DE, 2000.

Stefanyshyn, D.J. et al., "Influence of a midsole bending stiffness on joint energy and jump height performance," Medicine & Science in Sports & Exercise, vol. 32, No. 2, pp. 471-476, American College of Sports Medicine, 2000.

Stefanyshyn, D.J. et al., "Mechanical Energy Contribution of the Metatarsophalangeal Join to Running and Sprinting," J. Biomechanics, vol. 30, Nos. 11-12, pp. 1081-1085, Elsevier Science Ltd, 1997.

Nigg, Benno M. et al., "Shoes Inserts and Orthotics for Sport and Physical Activities," Medicine & Science in Sports & Exercise, vol. 31, Issue 7, pp. S421-S428, Jul. 1999.

Roy, Jean-Pierre R. et al., "Shoes Midsole Longitudinal Bending Stiffness and Running Economy, Joint Energy, and EMG," Medicine & Science in Sports & Excercise, vol. 38, No. 3, pp. 562-569, American College of Sports Medicine, 2006.

European Patent Office as the International Searching Authority, International Search Report and Written Opinion for Application No. PCT/US2016/048859, mailed Nov. 7, 2016.

European Patent Office as the International Searching Authority, International Search Report and Written Opinion for Application No. PCT/US2016/048854, mailed Nov. 25, 2016.

European Patent Office as the International Searching Authority, International Search Report and Written Opinion for Application No. PCT/US2017/043170, mailed Oct. 27, 2017.

European Patent Office as the International Searching Authority, International Search Report and Written Opinion for Application No. PCT/US2017/043164, mailed Oct. 24, 2017.

European Patent Office as the International Searching Authority, International Search Report and Written Opinion for Application No. PCT/US2017/043160, mailed Oct. 24, 2017.

European Patent Office as the International Searching Authority, International Search Report and Written Opinion for Application No. PCT/US2017/043167, mailed Oct. 27, 2017.

European Patent Office (ISA), International Preliminary Report on Patentabilty for Application No. PCT/2017/043160, mailed Jul. 24, 2018.

European Patent Office (ISA), International Preliminary Report on Patentabilty for Application No. PCT/2017/043164, mailed Jul. 24, 2018.

European Patent Office (ISA), International Preliminary Report on Patentabilty for Application No. PCT/2017/043170, mailed Jul. 24, 2018.

European Patent Office (ISA), International Preliminary Report on Patentabilty for Application No. PCT/2017/043167, mailed Jul. 24, 2018.

United States Patent and Trademark Office, Office Action for U.S. Appl. No. 15/248,051, mailed Dec. 10, 2018.

European Patent Office (ISA), International Preliminary Report on Patentability for International Application No. PCT/US2016/048854, mailed Apr. 12, 2018.

European Patent Office (ISA), International Preliminary Report on Patentability for International Application No. PCT/US2016/048859, mailed Apr. 12, 2018.

United States Patent and Trademark Office, Notice of Allowance for U.S. Appl. No. 15/574,933, mailed Mar. 4, 2019.

United States Patent and Trademark Office, Non-Final Office Action for U.S. Appl. No. 15/574,912, mailed Jun. 6, 2019.

Japan Patent Office, Notice of Reasons for Rejection for JP Application No. 2018-516734, mailed Jun. 3, 2019.

Korean Intellectual Property Office, Office Action for KR Application No. 10-2018-7012450, mailed Jun. 19, 2019.

Korean Intellectual Property Office, Office Action for KR Application No. 10-2018-7012449, mailed Jun. 19, 2019.

European Patent Office (ISA), International Search Report and Written Opinion for PCT Application No. PCT/US2019/027470, mailed Jul. 25, 2019.

European Patent Office (ISA), International Search Report and Written Opinion for PCT Application No. PCT/US2019/027480, mailed Aug. 9, 2019.

Japan Patent Office, Notice of Reasons for Rejection for JP Application No. 2018-516733, mailed Jun. 17, 2019.

United States Patent and Trademark Office, Office Action for U.S. Appl. No. 15/248,059, mailed Jun. 6, 2018.

United States Patent and Trademark Office, Office Action for U.S. Appl. No. 16/318,735, mailed Jul. 9, 2019.

Japan Patent Office, Notice of Reasons for Rejection for JP Application No. 2018-516734, mailed Dec. 10, 2019.

(56) References Cited

OTHER PUBLICATIONS

United States Patent and Trademark Office, Notice of Allowance and Fee(s) Due for U.S. Appl. No. 16/384,154, mailed Jan. 21, 2020.
United States Patent and Trademark Office, Non-Final Office Action for U.S. Appl. No. 15/904,664, mailed Jan. 2, 2020.
United States Patent and Trademark Office, Non-Final Office Action for U.S. Appl. No. 15/248,051, mailed Jan. 2, 2020.
United States Patent and Trademark Office, Notice of Allowance and Fee(s) Due for U.S. Appl. No. 15/904,568, mailed Dec. 10, 2019.
Korean Intellectual Property Office, Office Action for Application No. 10-2019-7004900, mailed Feb. 17, 2020.
Korean Intellectual Property Office, Office Action for Application No. 10-2018-7012450, mailed Jan. 30, 2020.
United States Patent and Trademark Office, Non-Final Office Action for U.S. Appl. No. 15/248,051, mailed May 15, 2018.
"Youngs Modulus is a Measure of Stiffness". ChristineDeMerchant. com. URL=https://www.christinedemerchant.com/youngsmodulus. html. Accessed Dec. 4, 2018. (Year: 2012).
United States Patent and Trademark Office, Non-Final Office Action for U.S. Appl. No. 15/248,059, mailed Jun. 6, 2018.
Japan Patent Office, Notice of Reasons for Rejection for JP Application No. 2018-516733, mailed Feb. 28, 2020.
European Patent Office, Communication pursuant to Article 94(3) EPC for EP Application No. 16760309.1, mailed Mar. 5, 2020.
Korean Intellectual Property Office, Office Action for Application No. 10-2019-7004898, mailed Feb. 17, 2020.
Korean Intellectual Property Office, Office Action for Application No. 10-2019-7004899, mailed Feb. 17, 2020.
Korean Intellectual Property Office, Office Action for Application No. 10-2018-7012449, mailed Feb. 24, 2020.
China National Intellectual Property Administration, Notification of the First Office Action and Search Report for No. 201680064966.9, mailed Mar. 27, 2020.
China National Intellectual Property Administration, Notification of the First Office Action and Search Report for No. 201680064951.2, mailed Mar. 27, 2020.
CompositesWord. "Composites 101: Fibers and resins". URL= https://www.compositesworld.com/articles/composites-101-fibers-and-resins. Accessed Jun. 5, 2020. Published Mar. 14, 2016. (Year 2016).
United States Patent and Trademark Office, Non-Final Office Action for U.S. Appl. No. 15/905,036, mailed Jun. 10, 2020.
Japan Patent Office, Notice of Reasons for Rejection for JP Application No. 2018-516734, mailed Aug. 4, 2020.
China National Intellectual Property Administration, Notification of First Office Action for CN Application No. 201780044388.7, mailed Jun. 30, 2020.
China National Intellectual Property Administration, Notification of First Office Action for CN Application No. 201780044468.2, mailed Jul. 1, 2020.
China Patent Office, Office Action dated May 21, 2021 for Application No. 201980007331.9.
United States Patent and Trademark Office Non-Final Office Action for U.S. Appl. No. 17/231,349 dated Jun. 15, 2021.
United States Patent and Trademark Office, Non-Final Office Action for U.S. Appl. No. 17/231,617 dated Oct. 4, 2021.
Japanese Patent Office, Office Action for Application No. 2020-180295 dated Nov. 16, 2021.
China National Intellectual Property Administration, Second Office Action for application No. 201980007331.9 mailed Nov. 25, 2021.
United States Patent and Trademark Office, Non-Final Office Action for U.S. Appl. No. 16/383,116, mailed Sep. 18, 2020.
United States Patent and Trademark Office, Final Office Action for U.S. Appl. No. 16/383,116, mailed Jan. 27, 2021.
United States Patent and Trademark Office, Non-Final Office Action for U.S. Appl. No. 16/383,116, mailed Jun. 16, 2021.
Mexico Patent Office, Office Action for application No. MX/a/2018/004048 dated Jul. 27, 2021.
Japan Patent Office, Office Action for application No. 2020-180295 mailed Nov. 16, 2021.
Jeff Sloan, "Composites 101: Fibers and Resins". Composites World, Available at: URL=https://www.connpositesworld.conn/articles/connposites-101-fibers-and-resins, Accessed Jun. 5, 2020, Published Mar. 14, 2016.
United States Patent and Trademark Office, Non-Final Office Action for U.S. Appl. No. 16/718,340 mailed Jun. 6, 2022.
China Patent Office, Second Office Action for CN Application No. 202110225763.6 mailed Jun. 15, 2022.
China National Intellectual Property Administration, First Office Action for application No. 202110857378.3 mailed May 6, 2022.
China National Intellectual Property Administration, First Office Action for application No. 202110857946.X mailed May 7, 2022.
China National Intellectual Property Administration, Second Office Action for Application No. 202110533408.5 mailed Jul. 12, 2022.
European Patent Office, Extended European Patent Search Report for 21200615.9 mailed Feb. 14, 2022.
United States Patent and Trademark Office, Non-Final Office Action for U.S. Appl. No. 17/231,220 mailed Jul. 5, 2022.
United States Patent and Trademark Office, Non-Final Office Action for U.S. Appl. No. 17/231,274 mailed Jul. 5, 2022.
United States Patent and Trademark Office, Non-Final Office Action for U.S. Appl. No. 16/992,063, mailed Jul. 25, 2022.
European Patent Office, Office Action for Application No. 20166644.3 mailed Jul. 5, 2022.
Japan Patent Office, Decision of Rejection Office Action for Application No. 2020-180295 mailed Jul. 12, 2022.
Uspto, Non-Final Office Action for U.S. Appl. No. 17/231,671, mailed Sep. 8, 2022.
Japan Patent Office, Office Action for application No. 2018-516734 mailed Sep. 20, 2022.

* cited by examiner

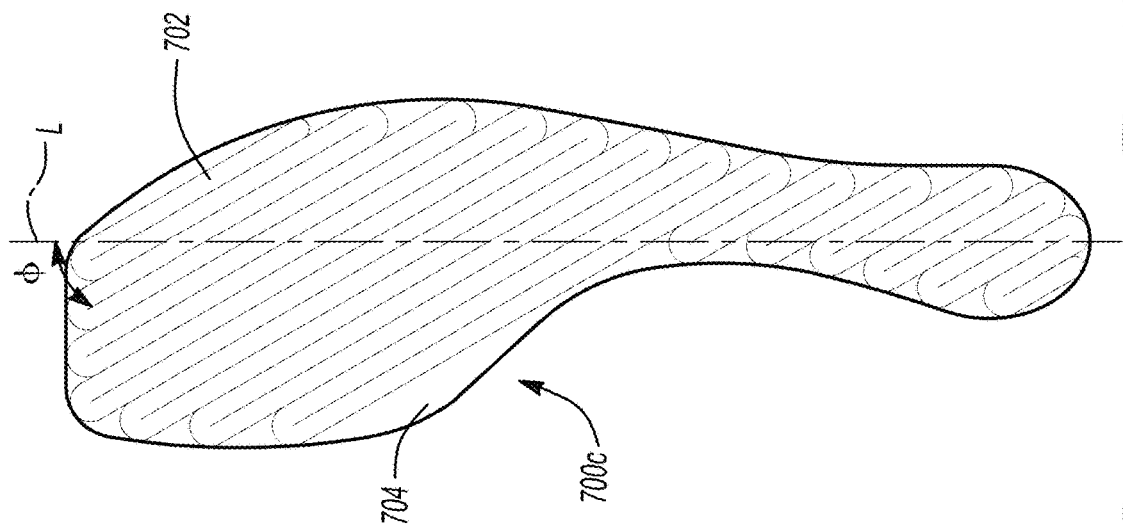
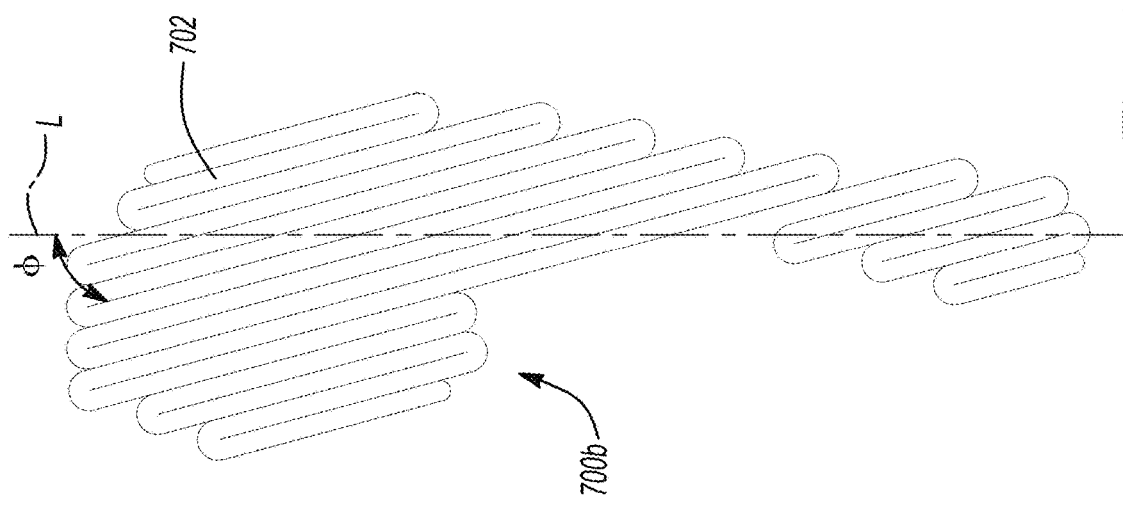
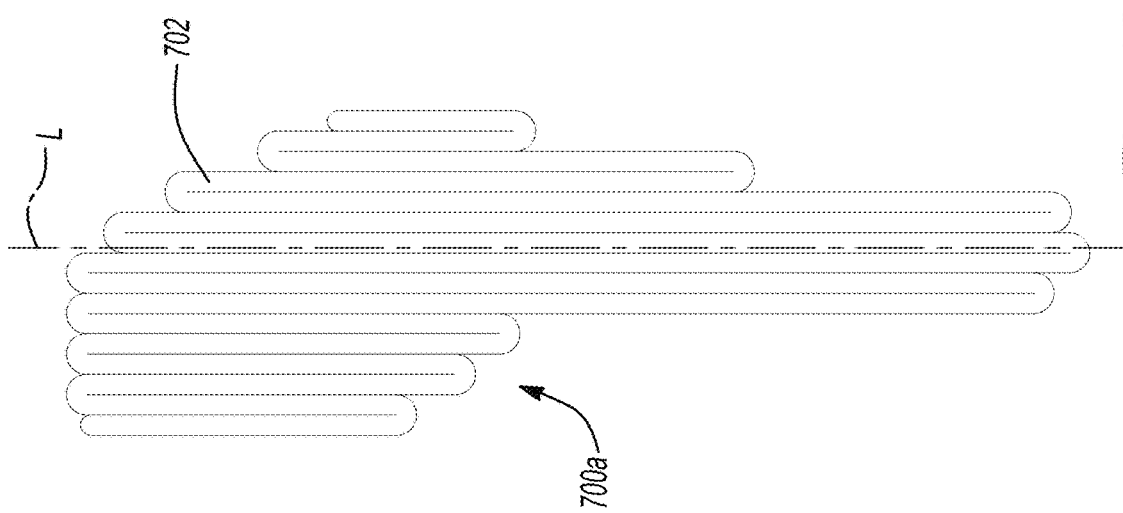

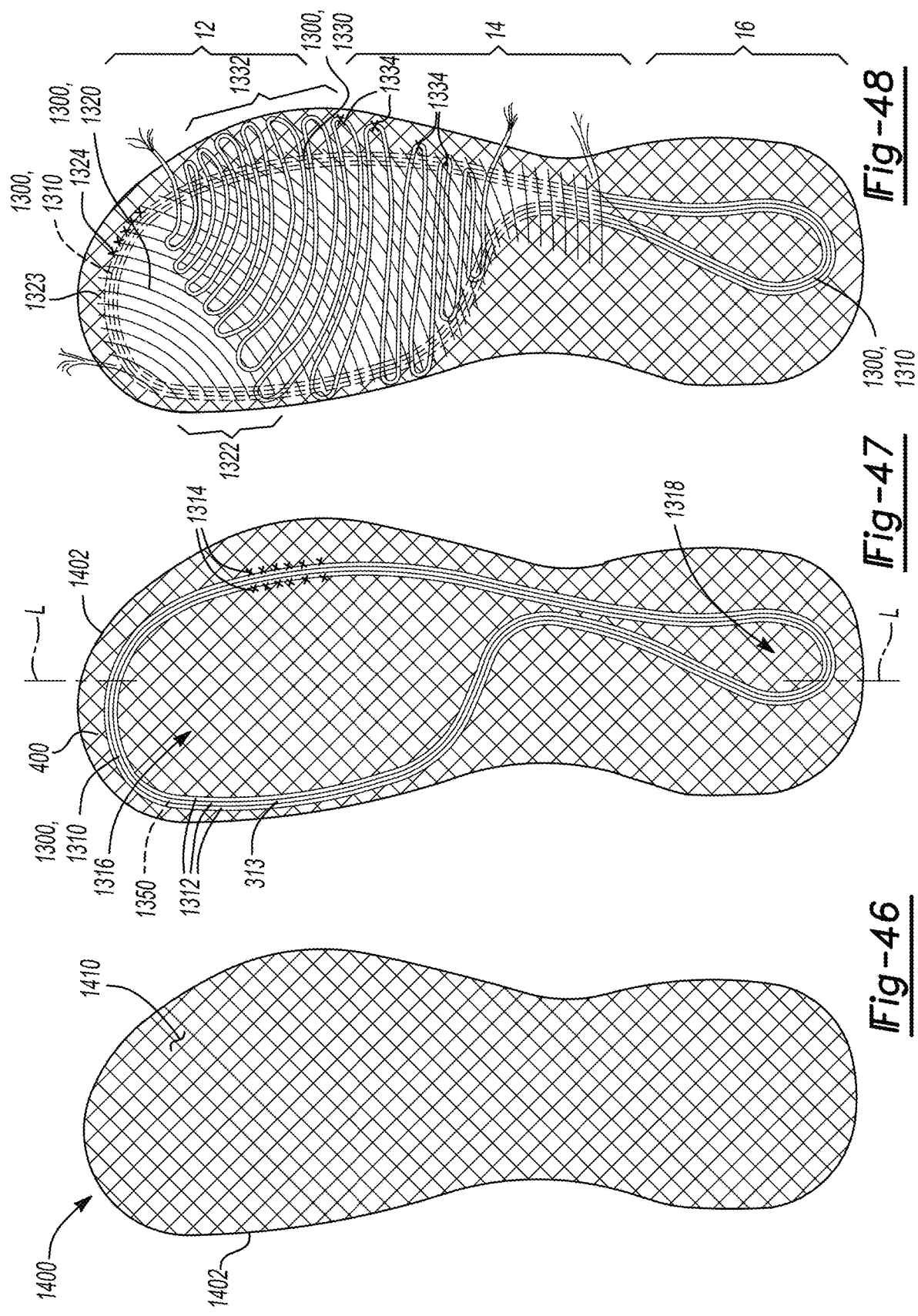

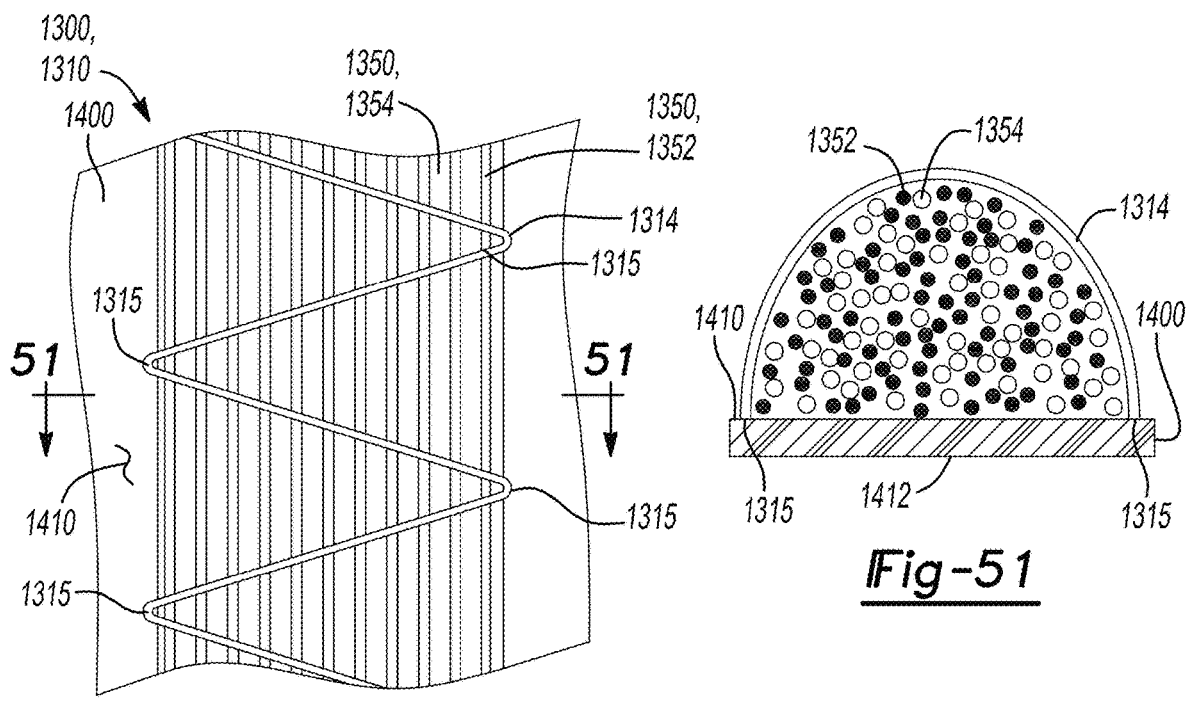
Fig-50
Fig-51
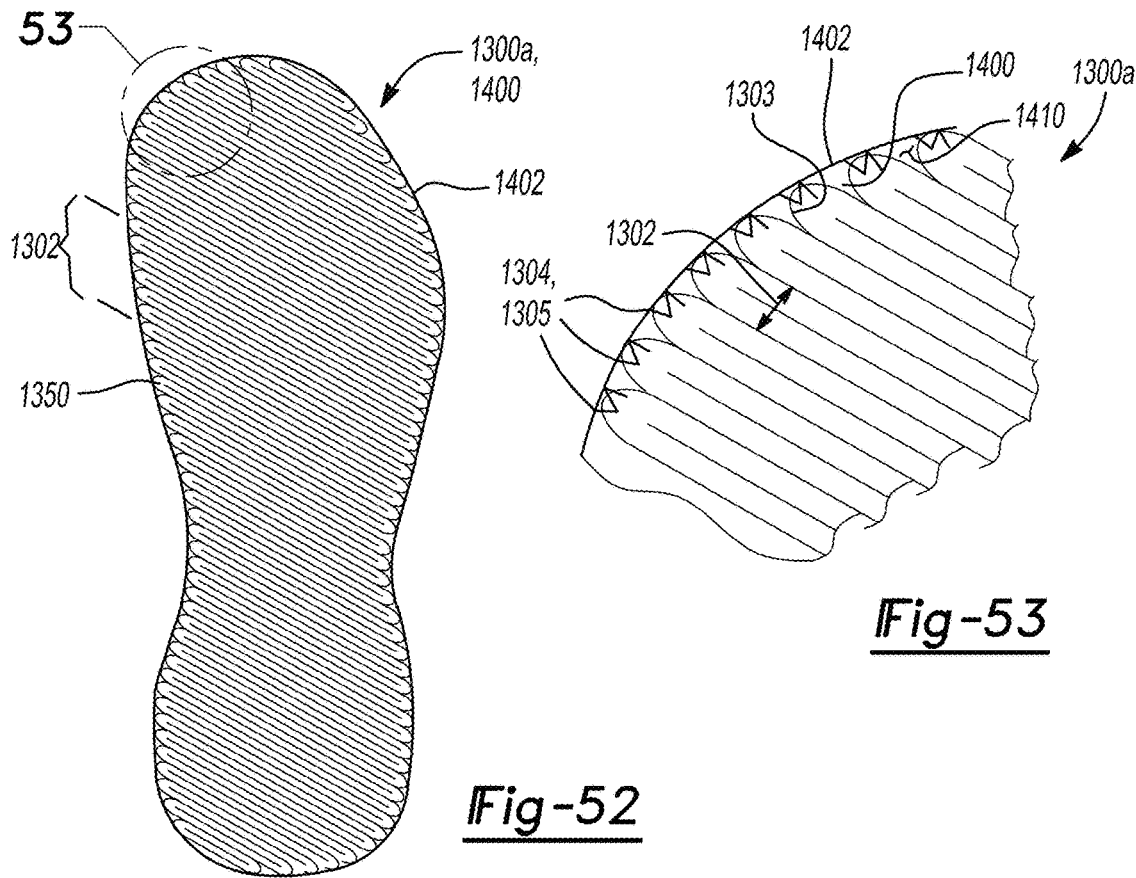
Fig-52
Fig-53

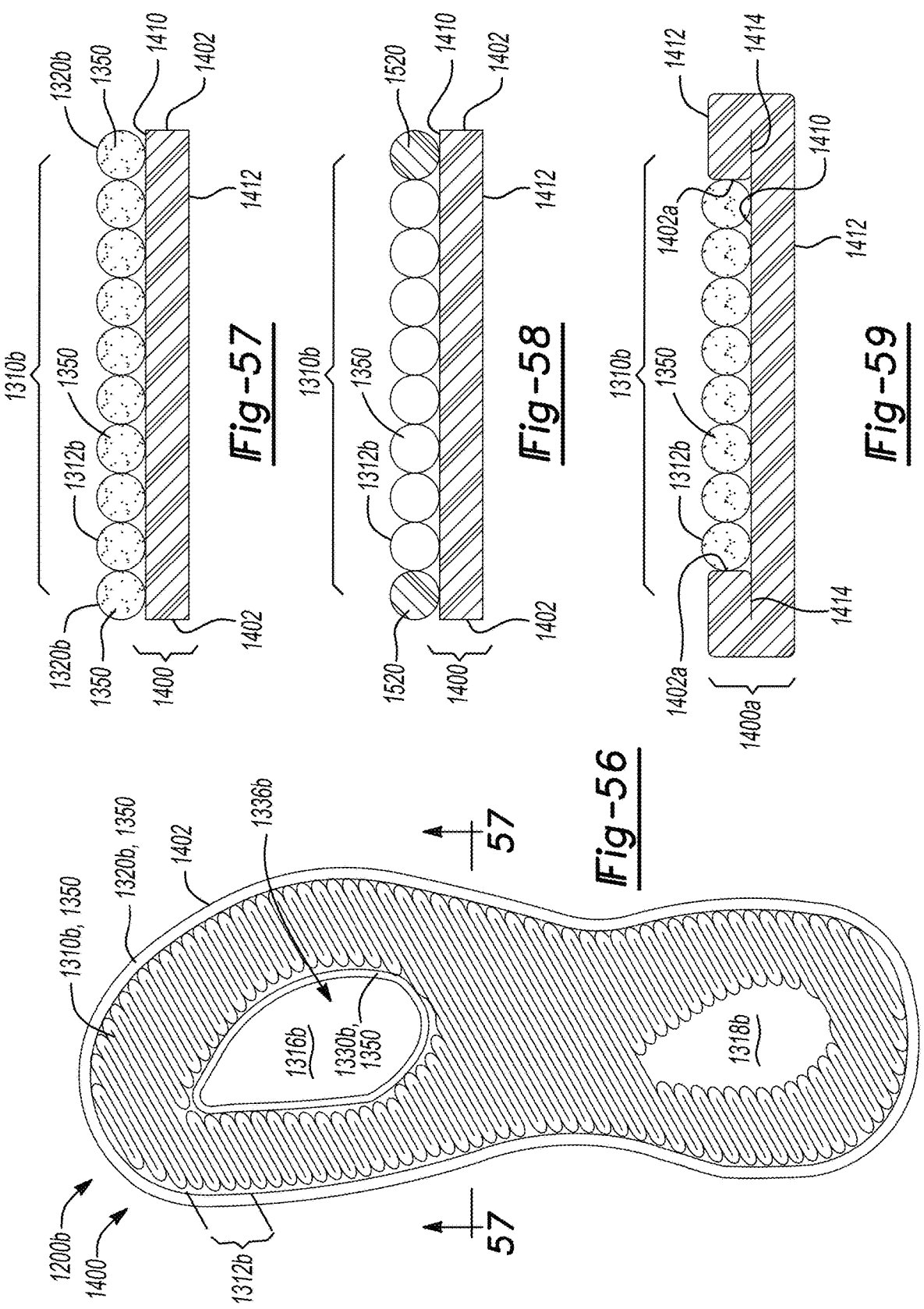

FOOTWEAR PLATE

CROSS REFERENCE TO RELATED APPLICATIONS

This application is a Continuation of U.S. application Ser. No. 16/992,063, filed Aug. 12, 2020, which is a Continuation of U.S. application Ser. No. 15/904,568, filed Feb. 26, 2018, which is a Continuation of U.S. application Ser. No. 15/574,889, filed Nov. 17, 2017, which is the national phase of International Application No. PCT/US2017/043170, filed Jul. 20, 2017, which claims priority to U.S. Provisional Application Ser. No. 62/364,594, filed Jul. 20, 2016, to U.S. Provisional Application Ser. No. 62/364,585, filed Jul. 20, 2016, to U.S. Ser. No. 15/248,051, filed Aug. 26, 2016, to U.S. Ser. No. 15/248,059, filed Aug. 26, 2016, and to U.S. Provisional Application Ser. No. 62/474,030, filed Mar. 20, 2017, the disclosures of which are hereby incorporated by reference in their entirety.

TECHNICAL FIELD

The present disclosure relates to articles of footwear including sole structures with footwear plates and foam for improving efficiency in the performance of the footwear during running motions

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole or a sockliner located within a void proximate to the bottom portion of the upper.

The metatarsophalangeal (MTP) joint of the foot is known to absorb energy as it flexes through dorsiflexion during running movements. As the foot does not move through plantarflexion until the foot is pushing off of a ground surface, the MTP joint returns little of the energy it absorbs to the running movement and, thus, is known to be the source of an energy drain during running movements. Embedding flat and rigid plates having longitudinal stiffness within a sole structure is known to increase the overall stiffness thereof. While the use of flat plates stiffens the sole structure for reducing energy loss at the MTP joint by preventing the MTP joint from absorbing energy through dorsiflexion, the use of flat plates also adversely increases a mechanical demand on ankle plantarflexors of the foot, thereby reducing the efficiency of the foot during running movements, especially over longer distances.

DRAWINGS

The drawings described herein are for illustrative purposes only of selected configurations and are not intended to limit the scope of the present disclosure.

Figure 10:
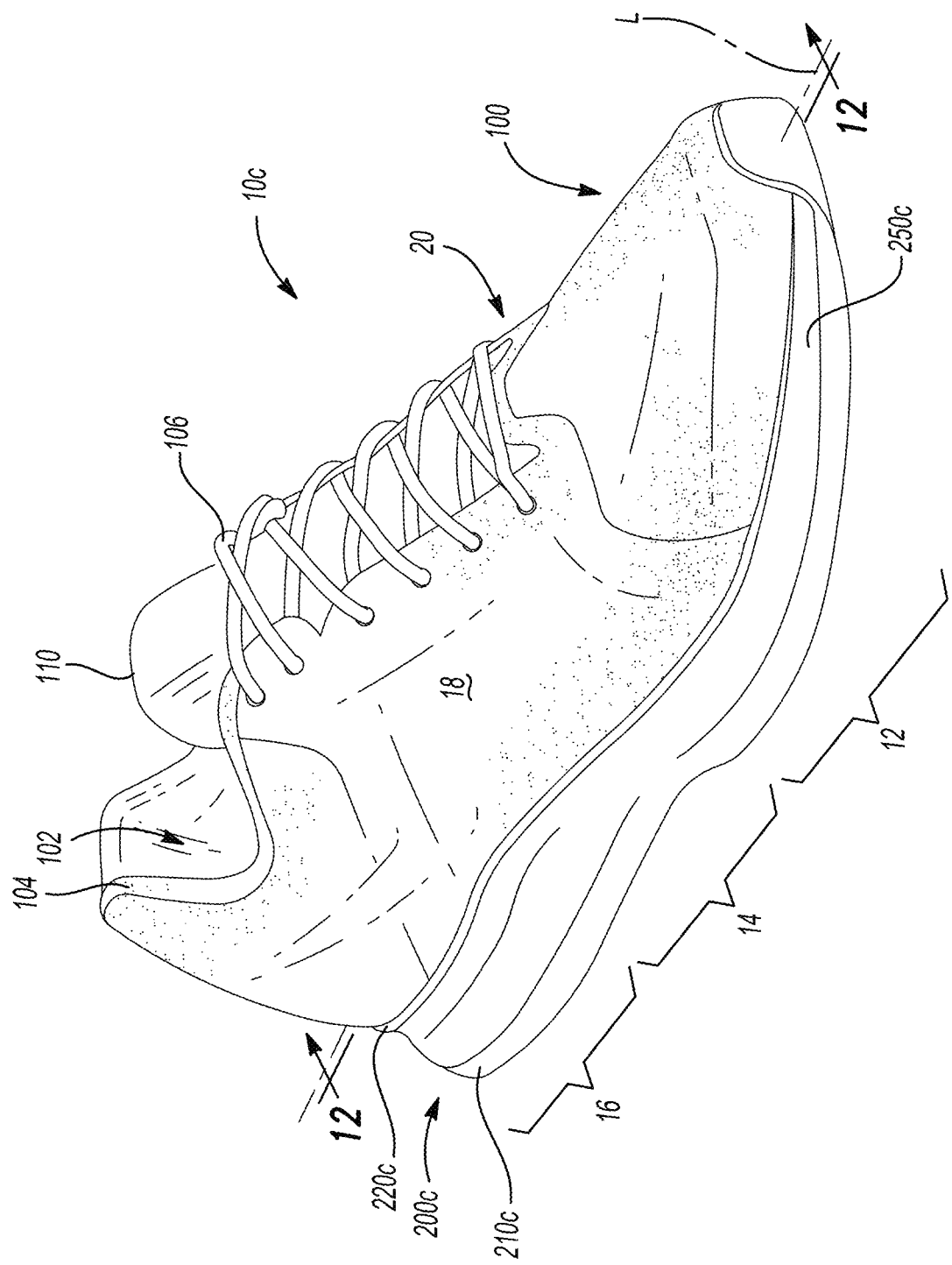
FIG. 10 is a top perspective view of an article of footwear in accordance with principles of the present disclosure.
Figure 12:
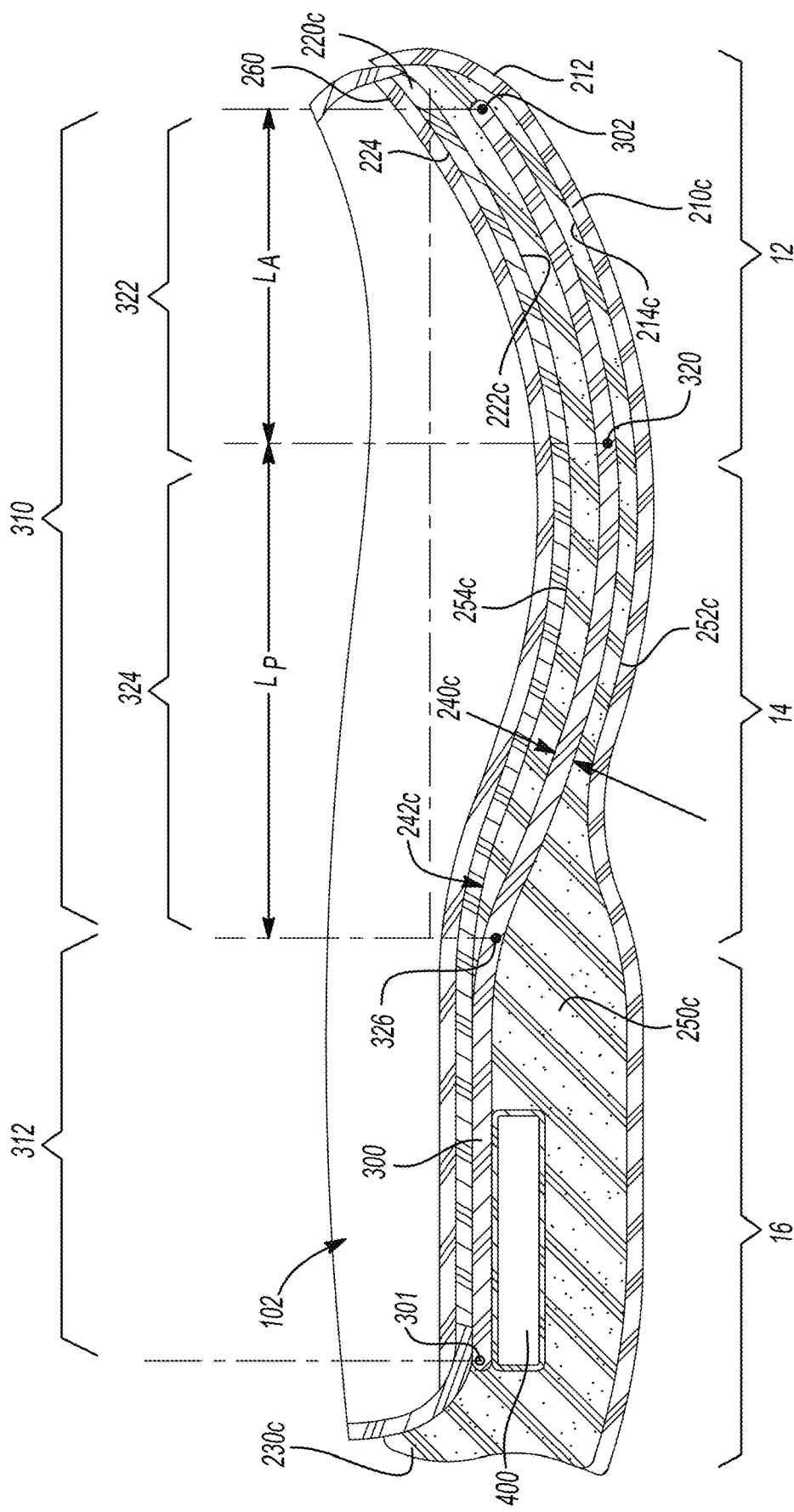
Figure 13:
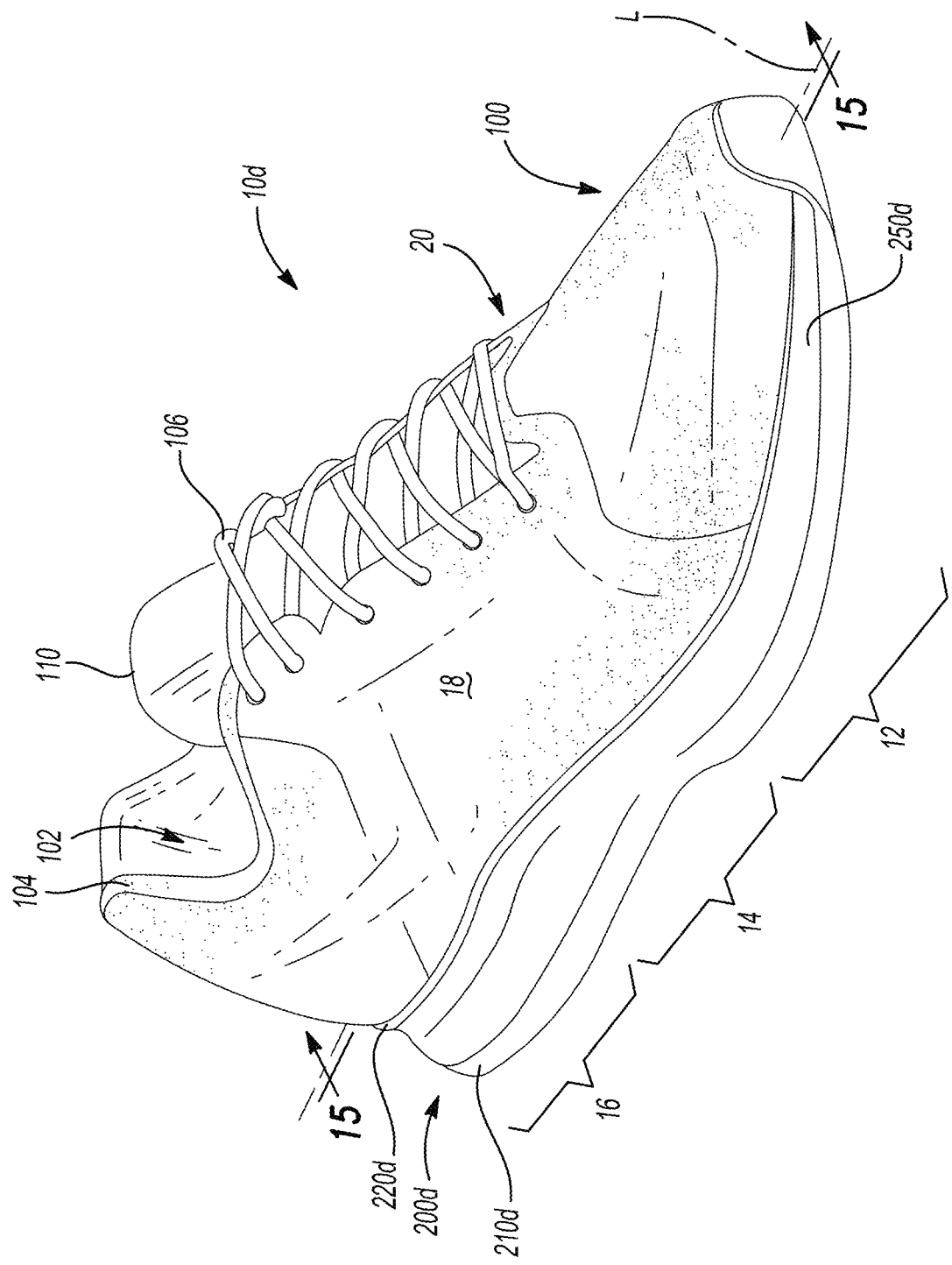
Figure 14:
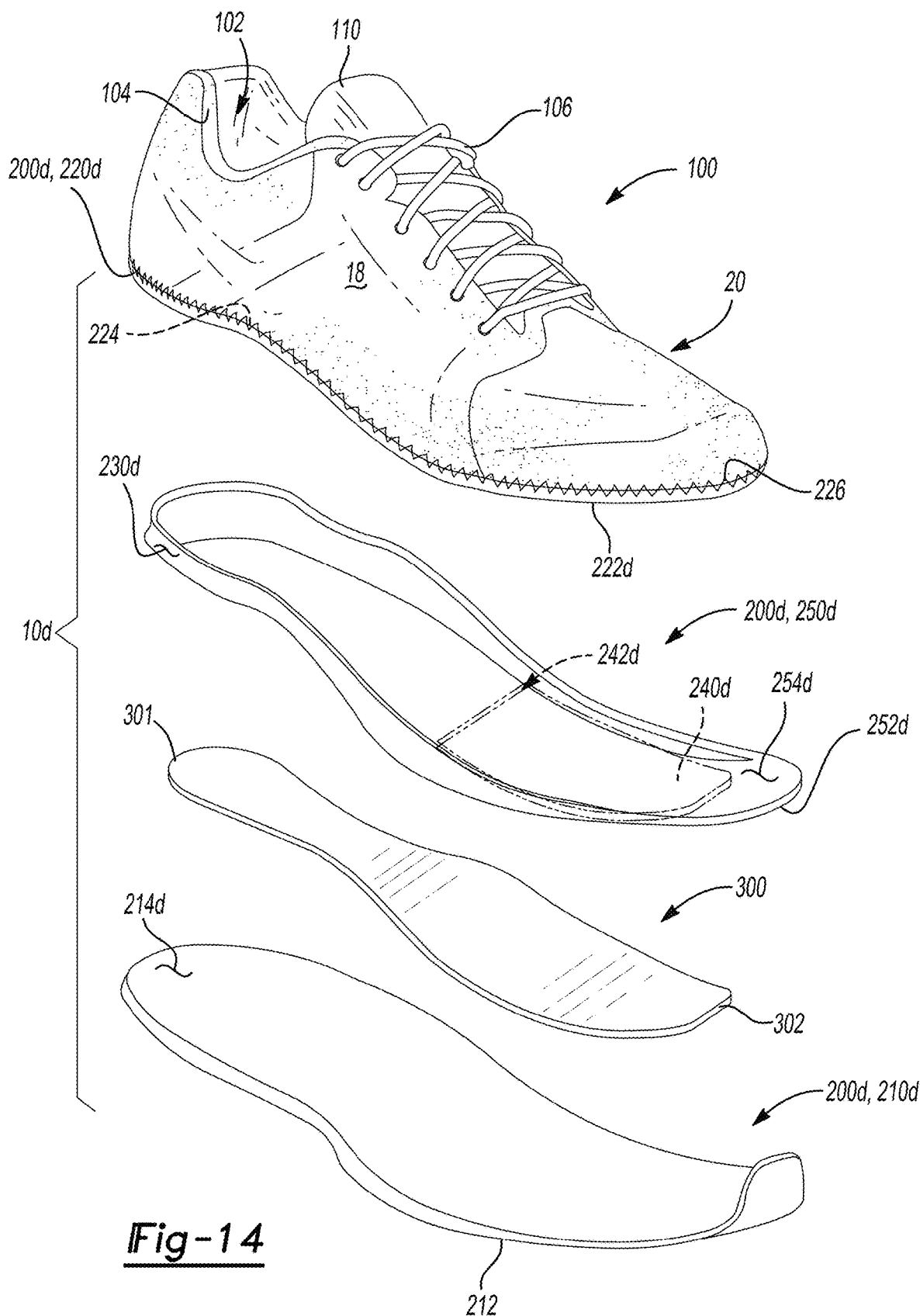
Figure 15:
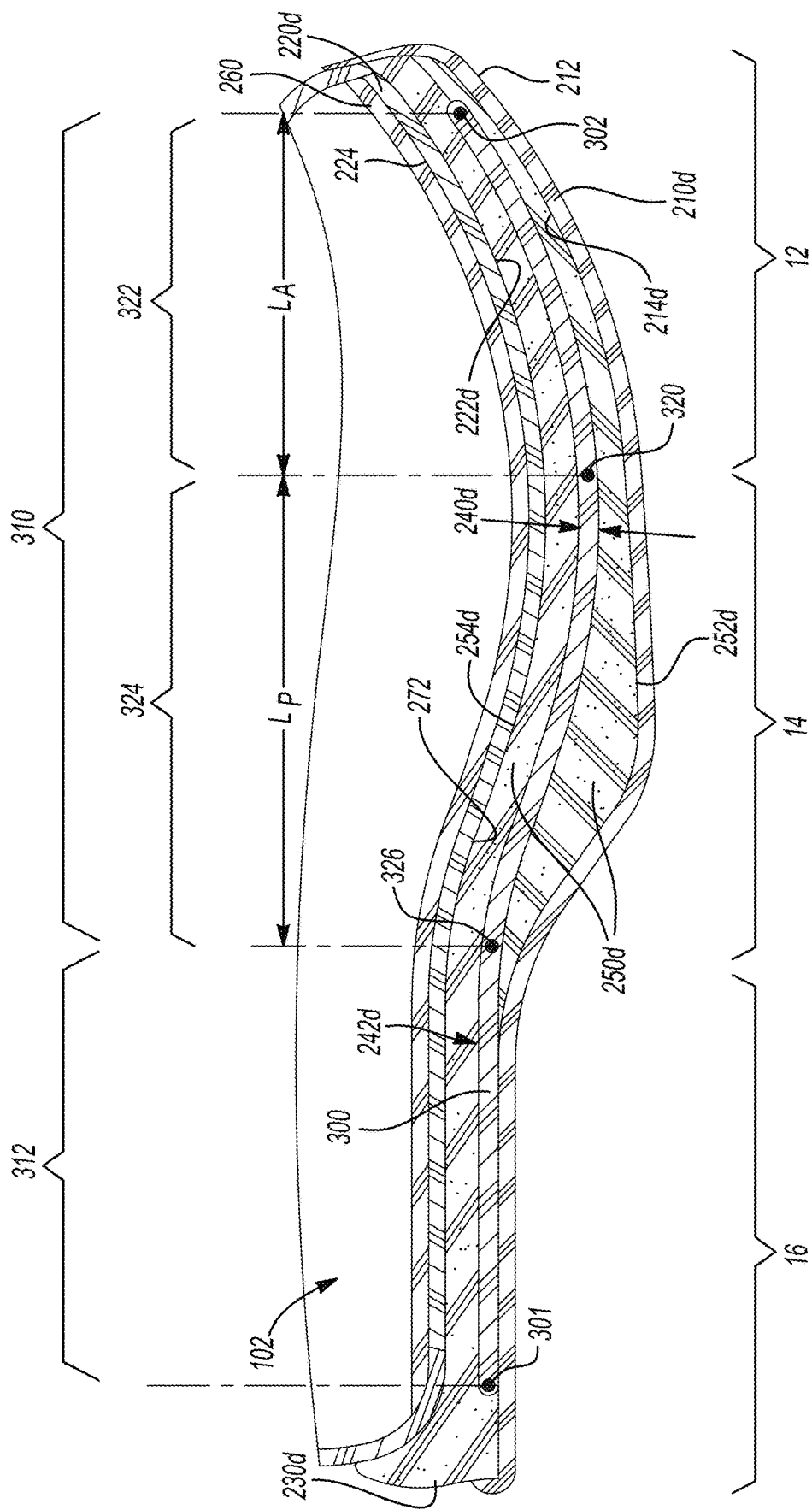
Figure 16:
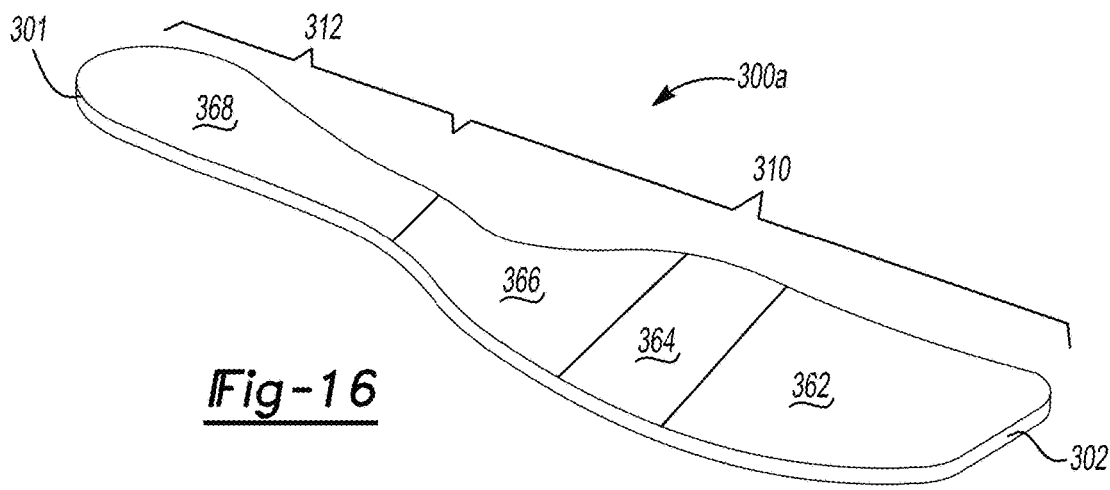
Figure 17:
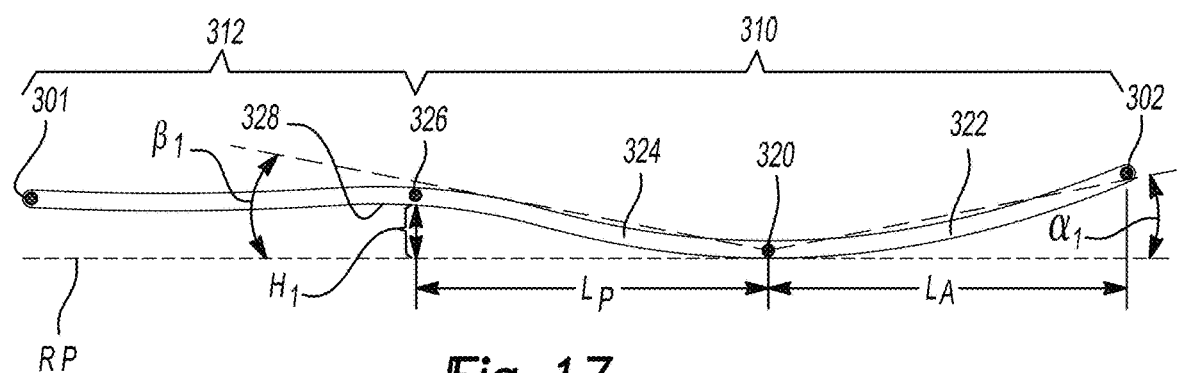
Figure 18:
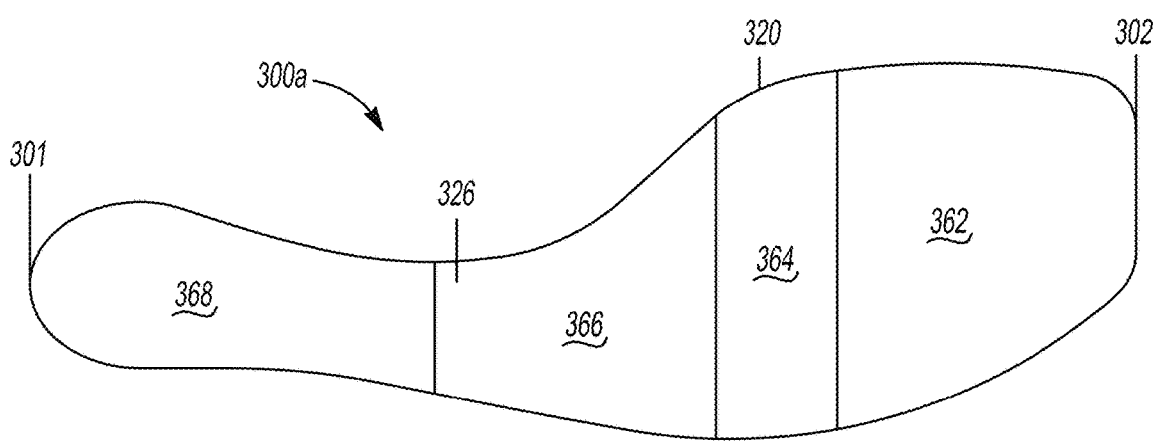
Figure 19:
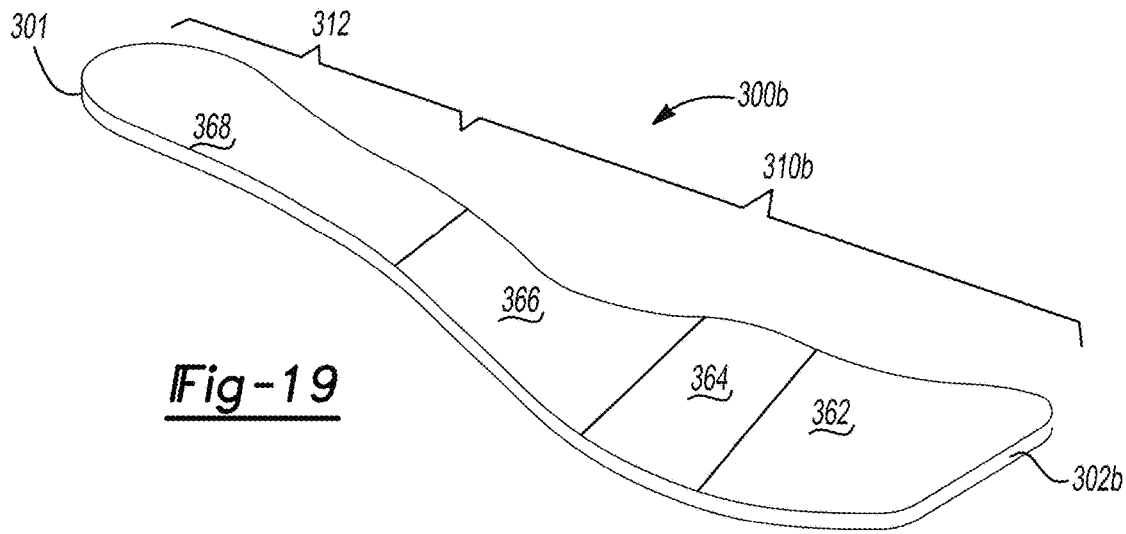
Figure 20:
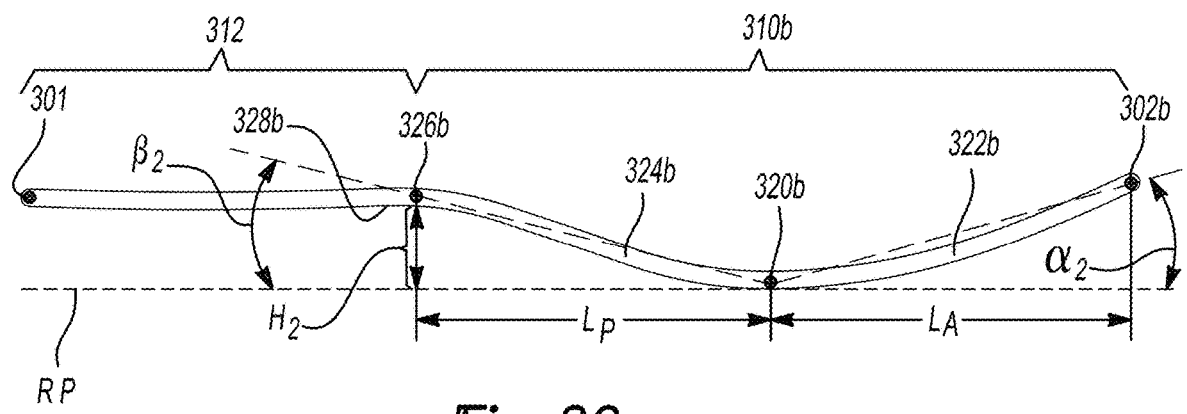
Figure 21:
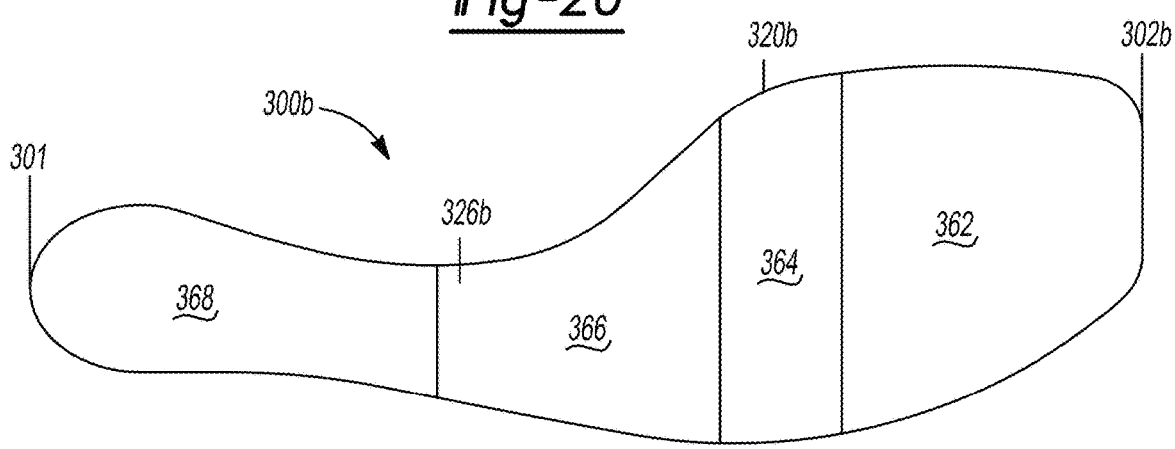
Figure 22:
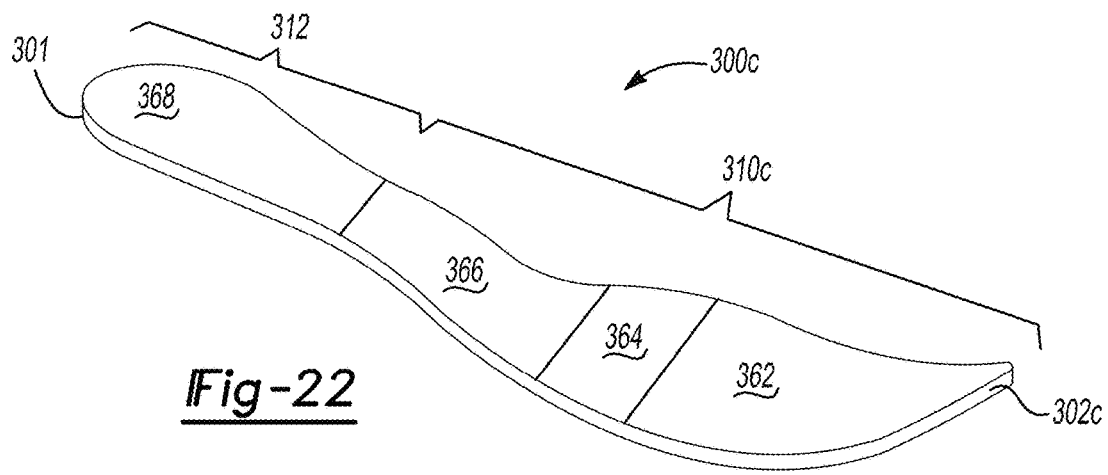
Figure 23:
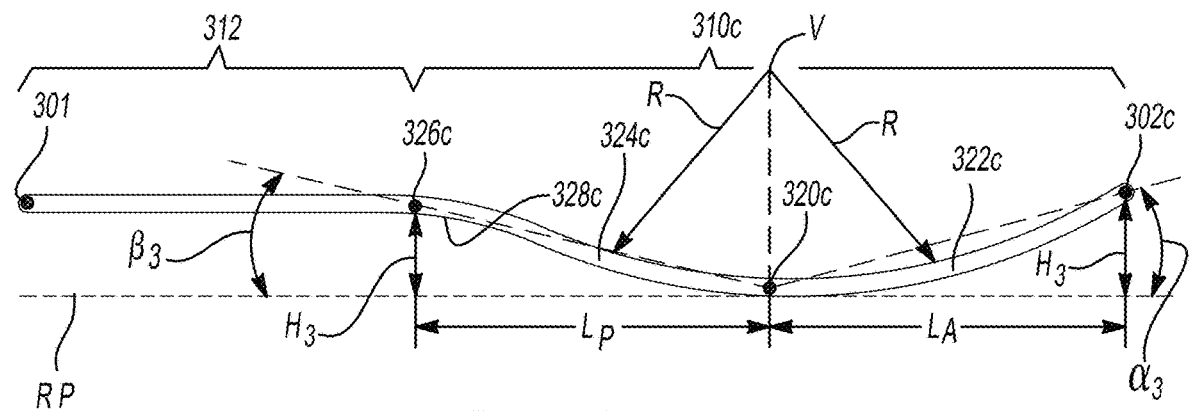
Figure 24:
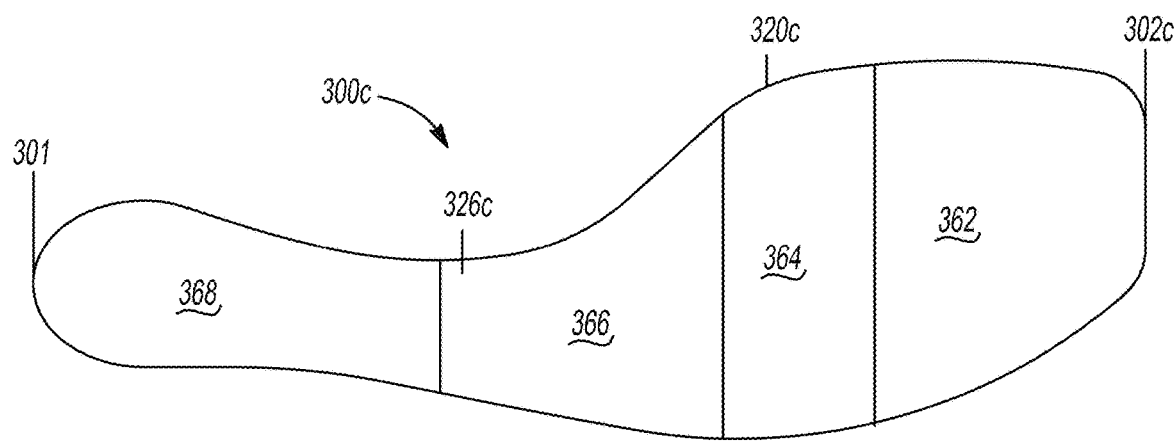
Figure 25:
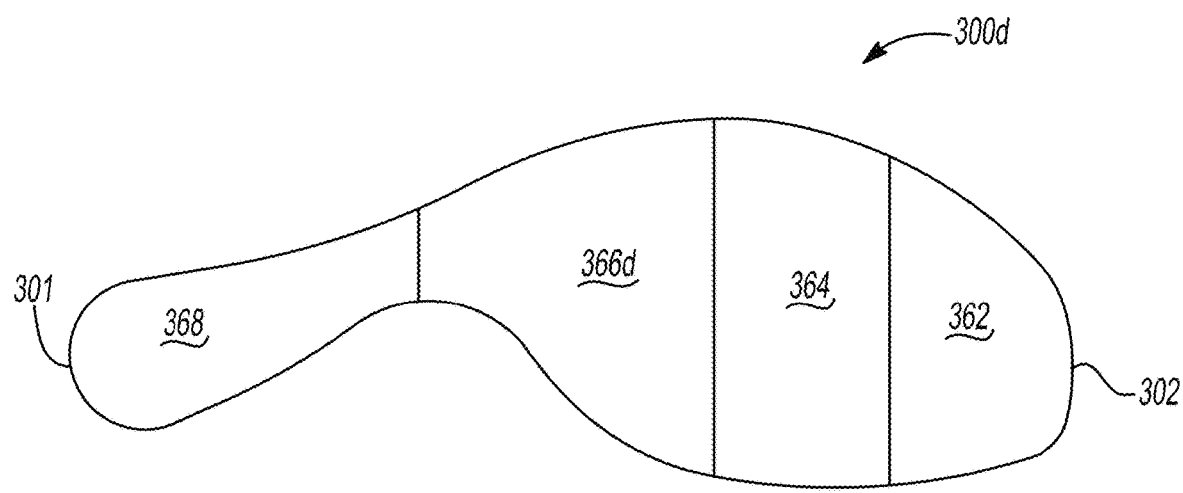
Figure 26:
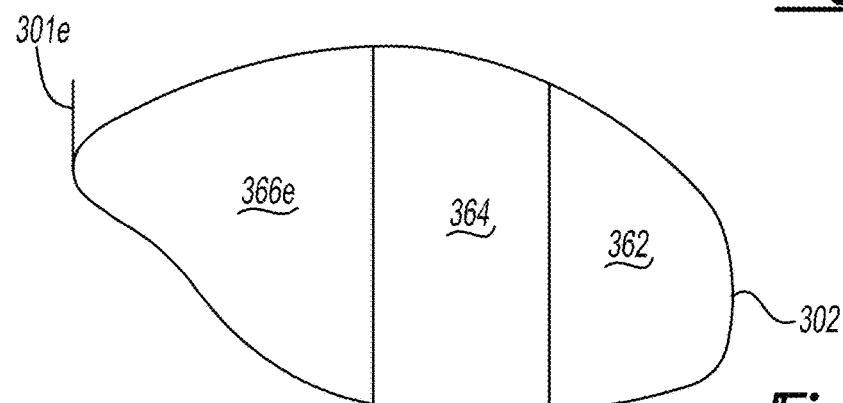
Figure 27:
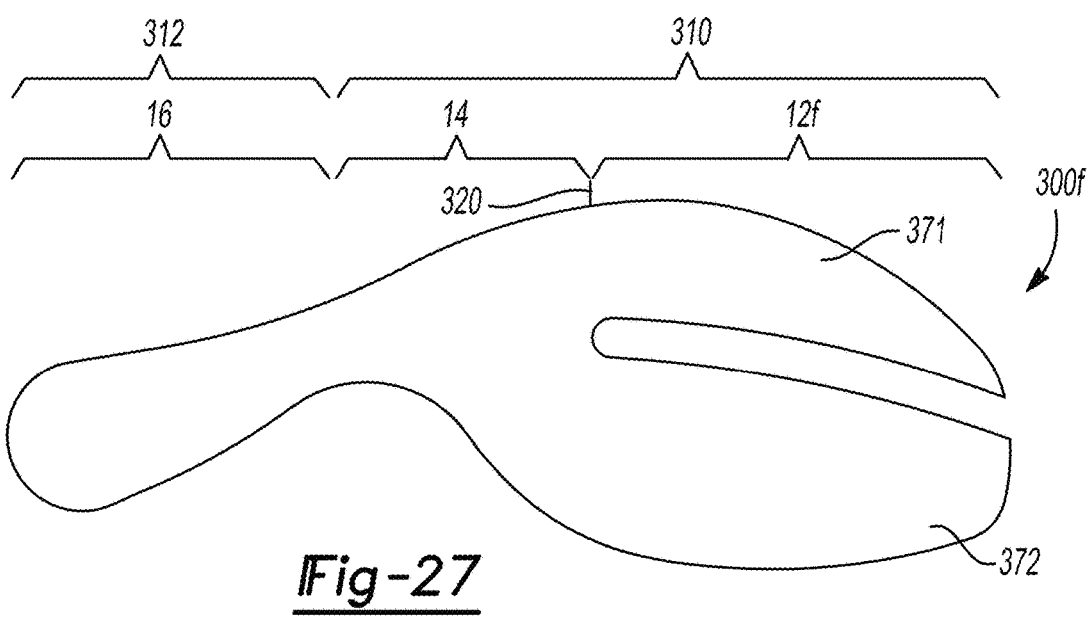
Figure 28:
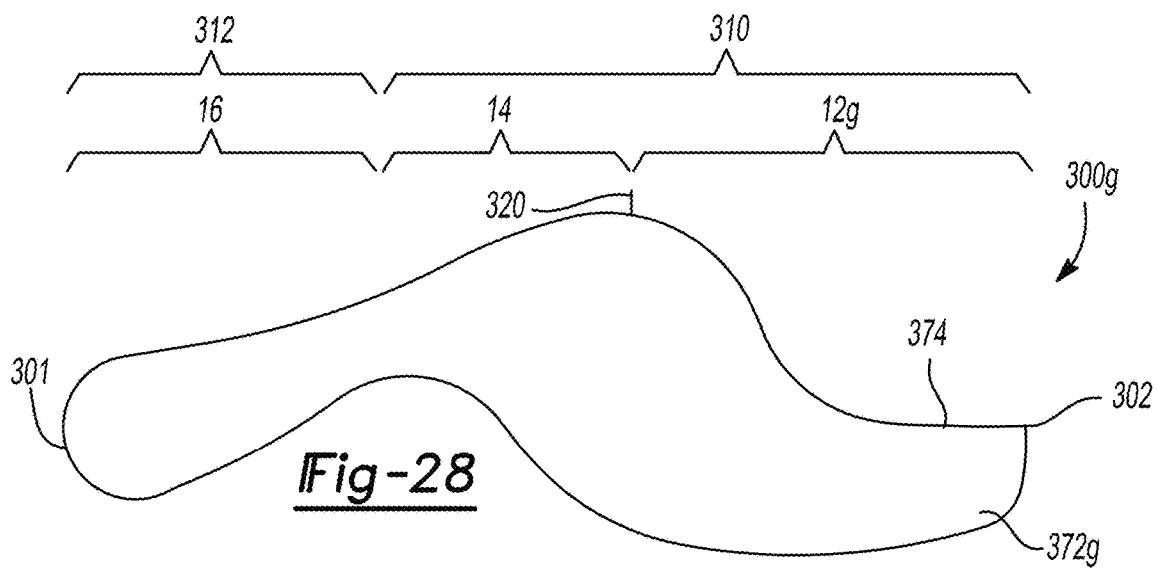
Figure 29:
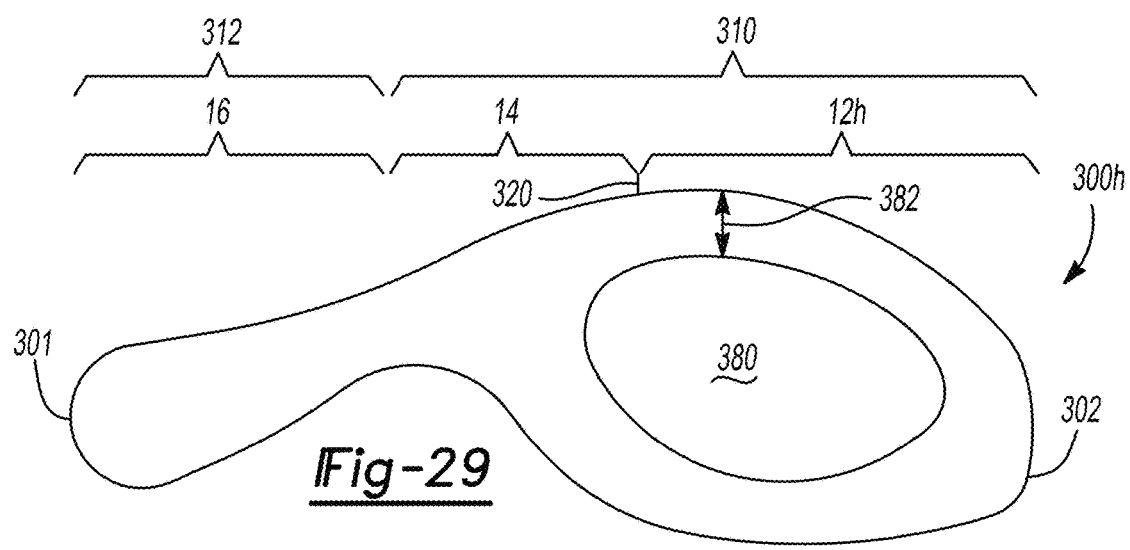
Figure 30:
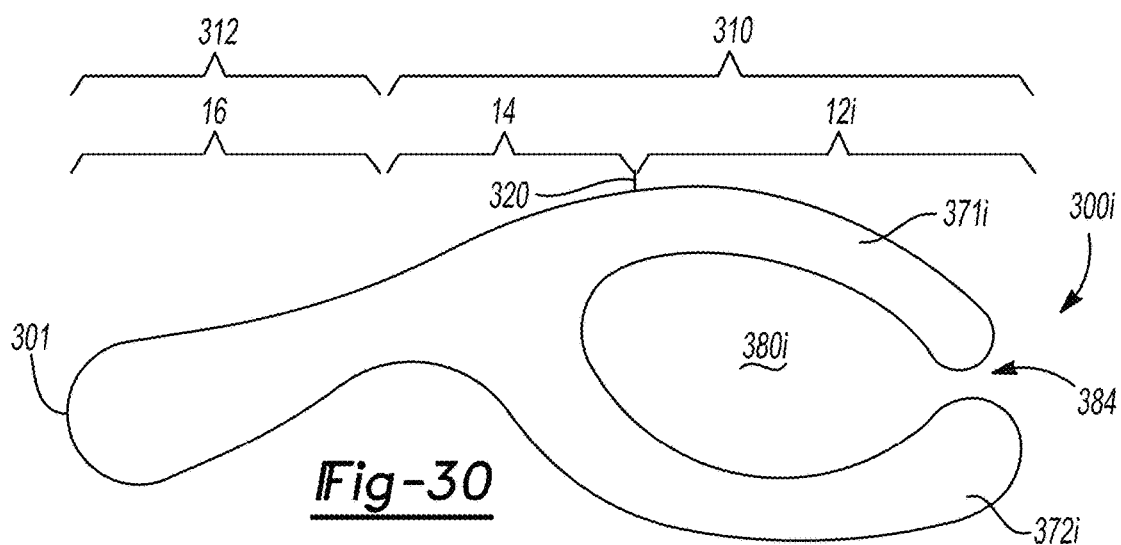
Figure 31:
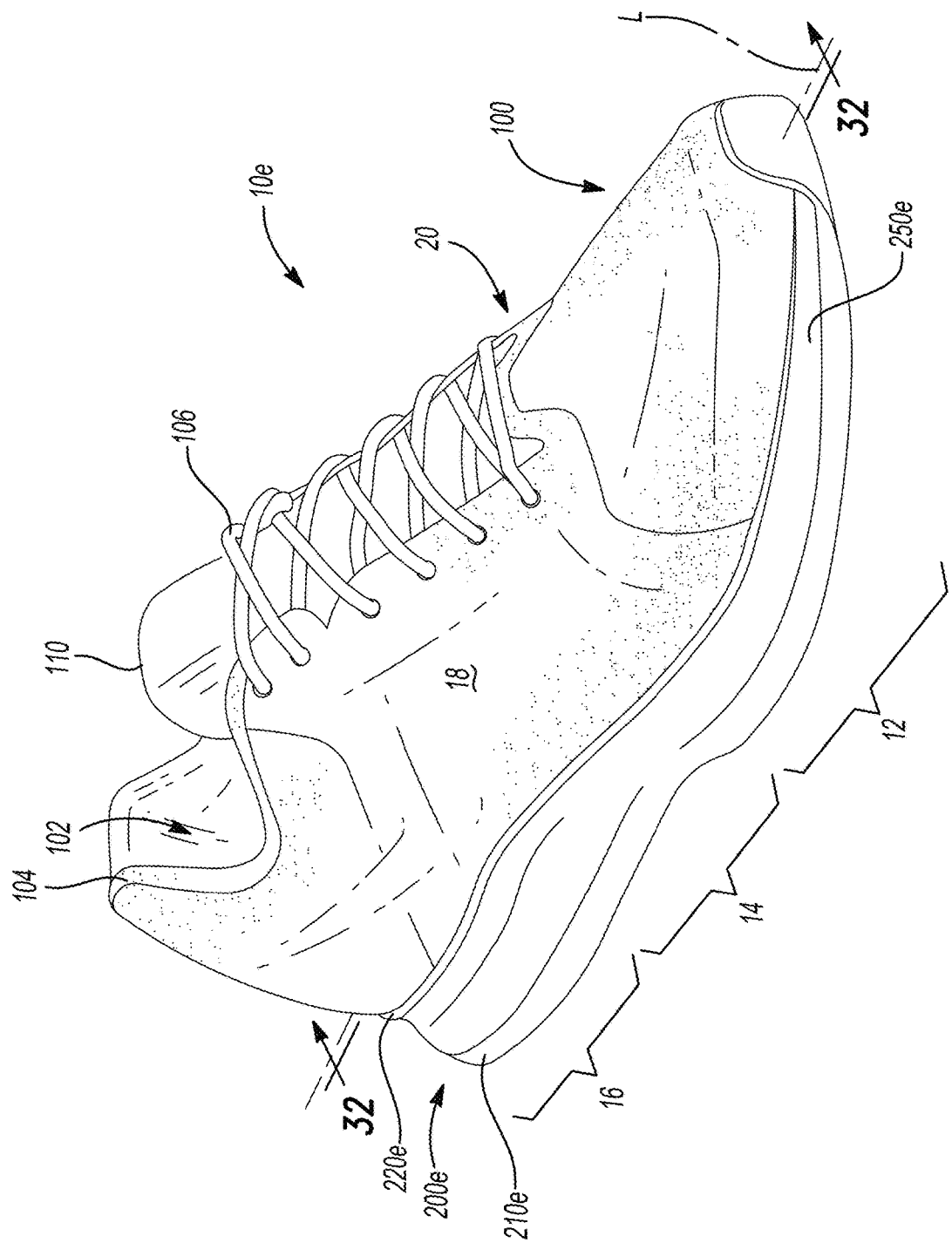
Figure 32:
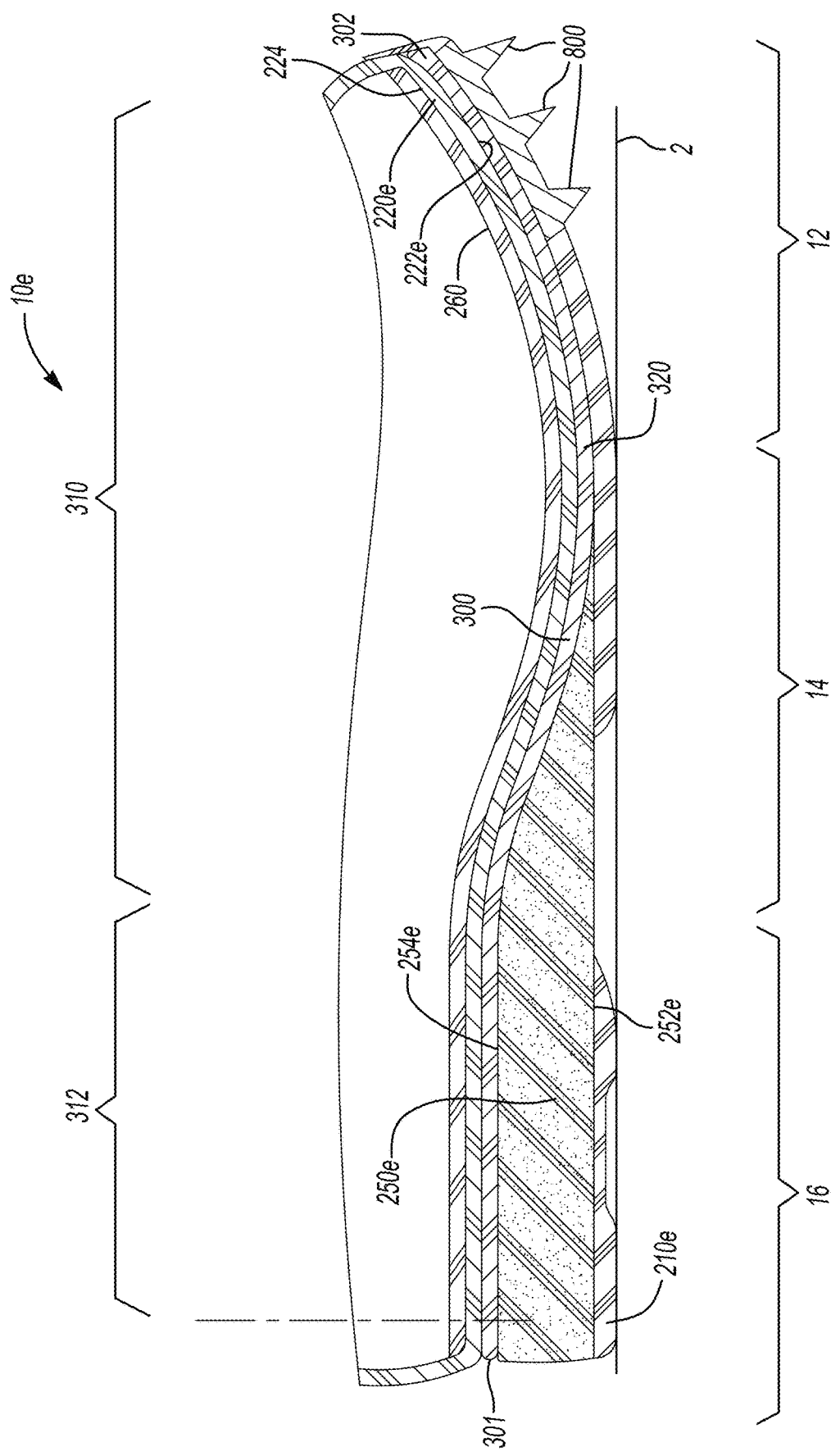
Figure 33:
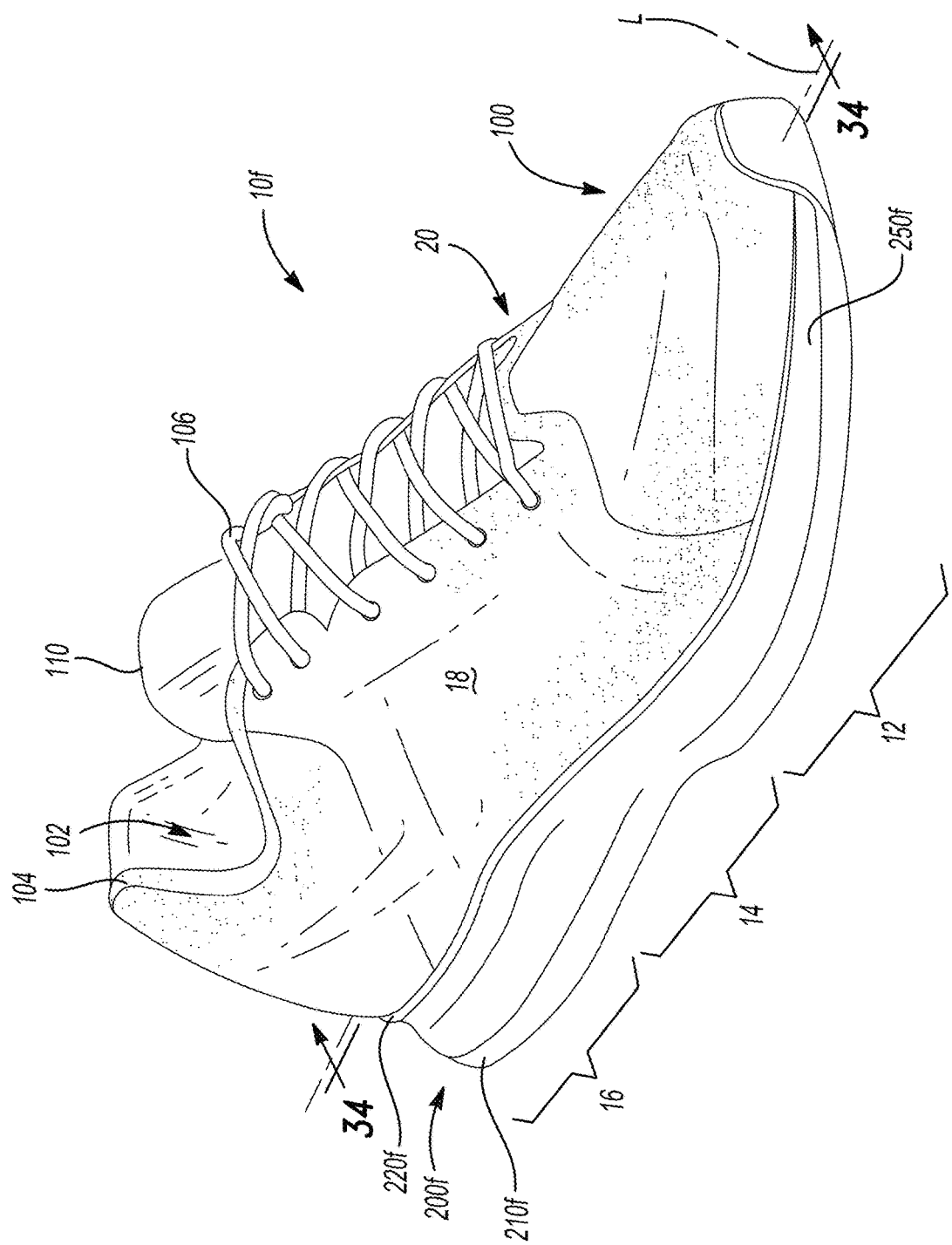
Figure 34:
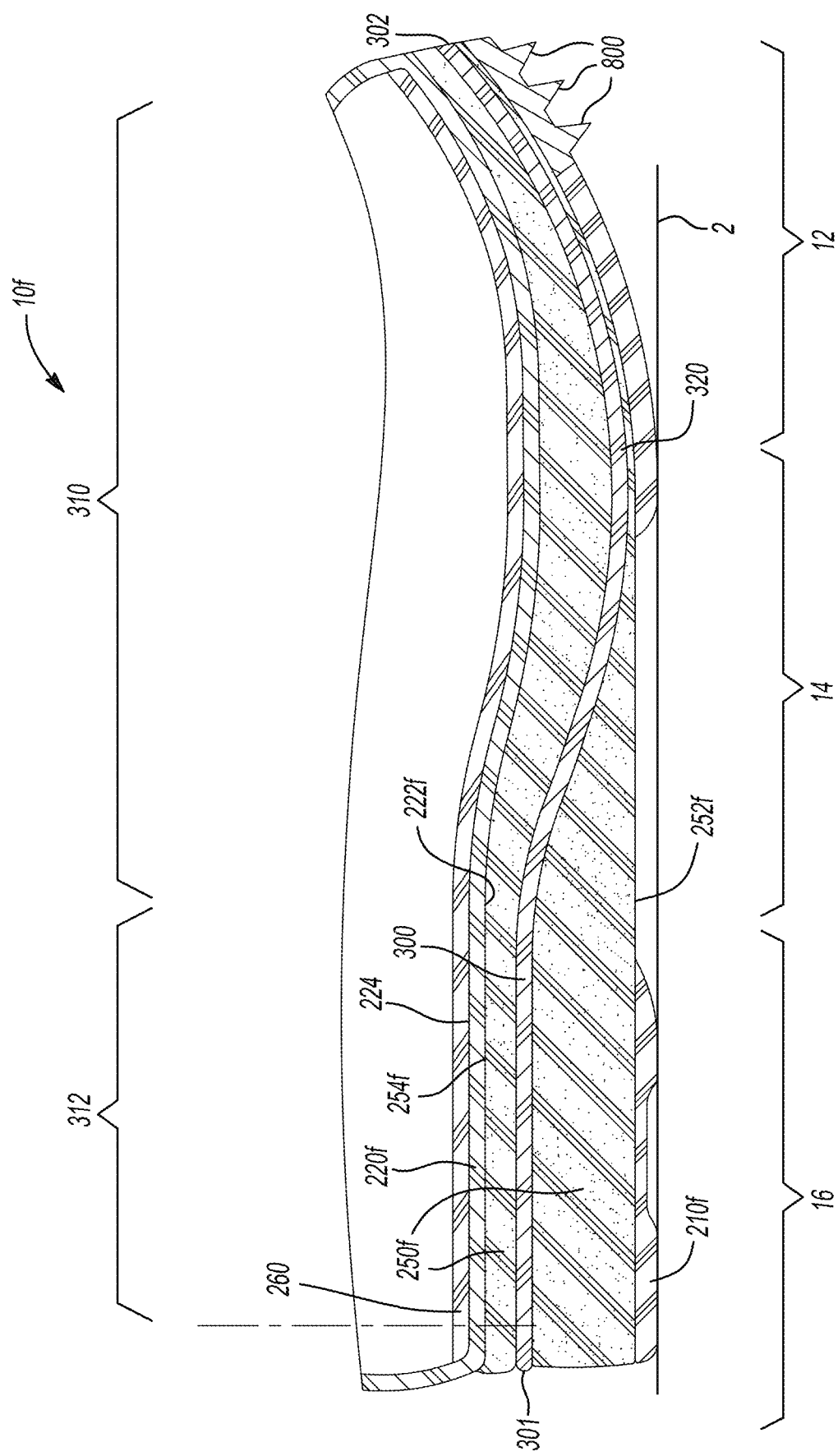
Figure 35:
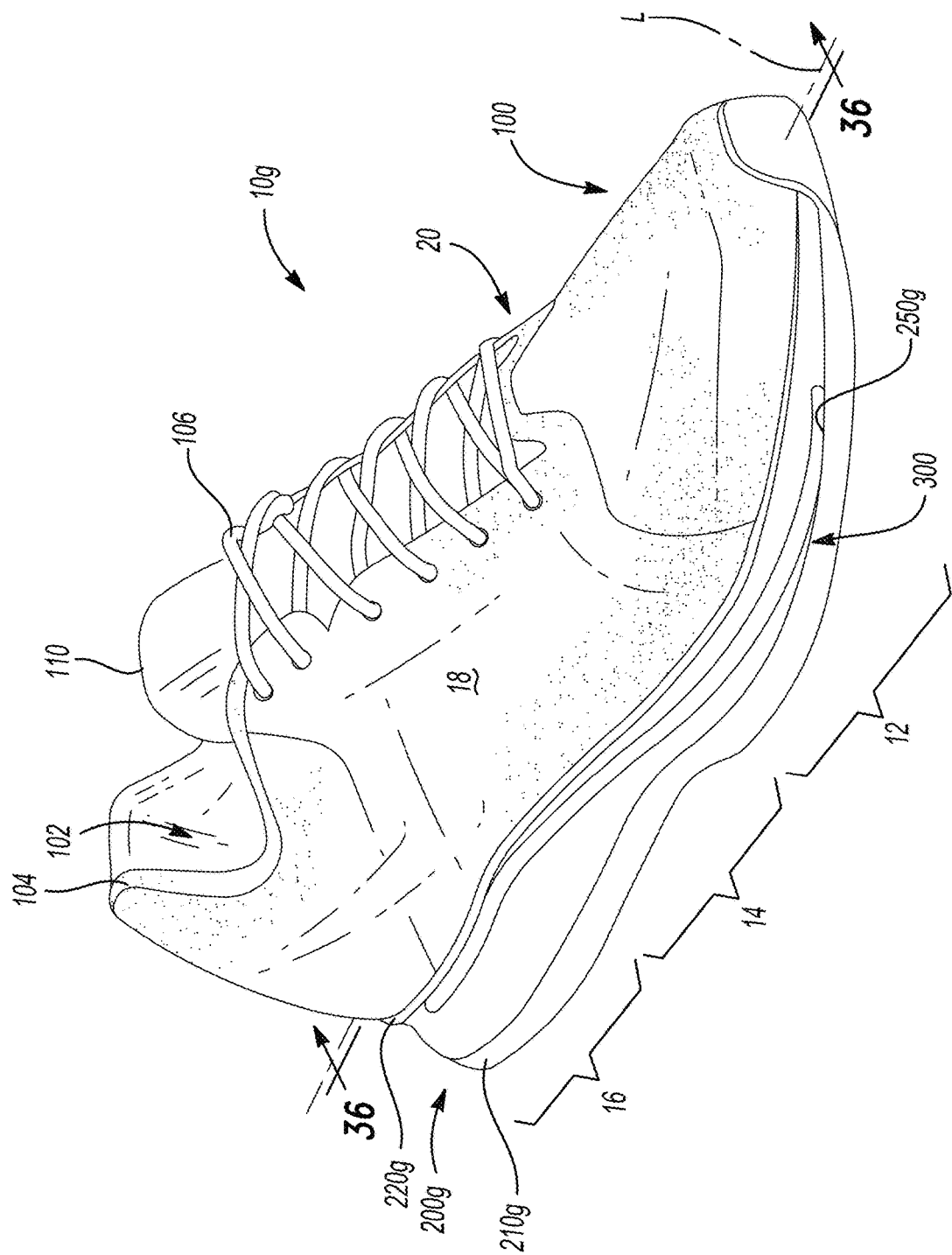
Figure 36:
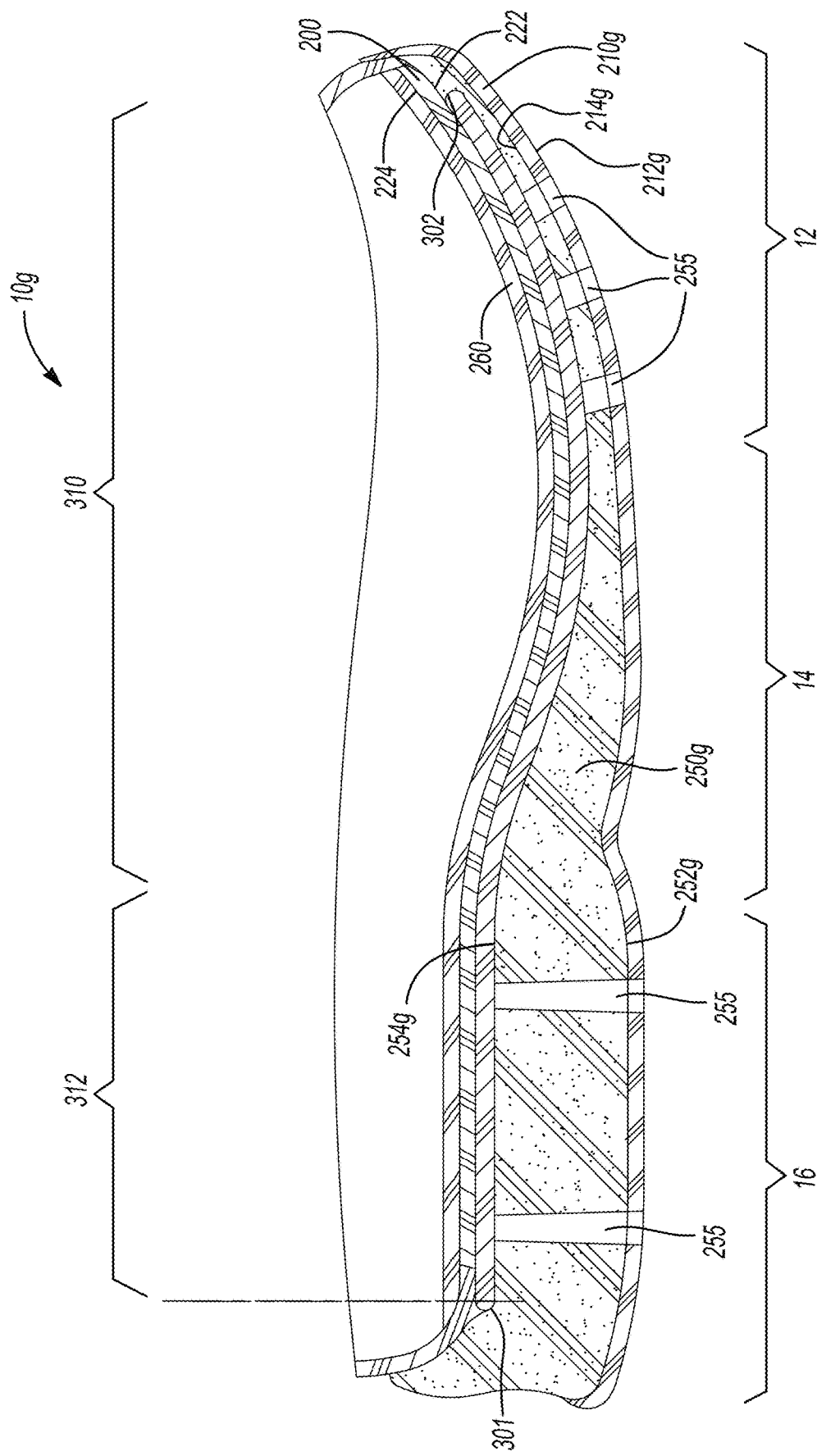
Figure 37:
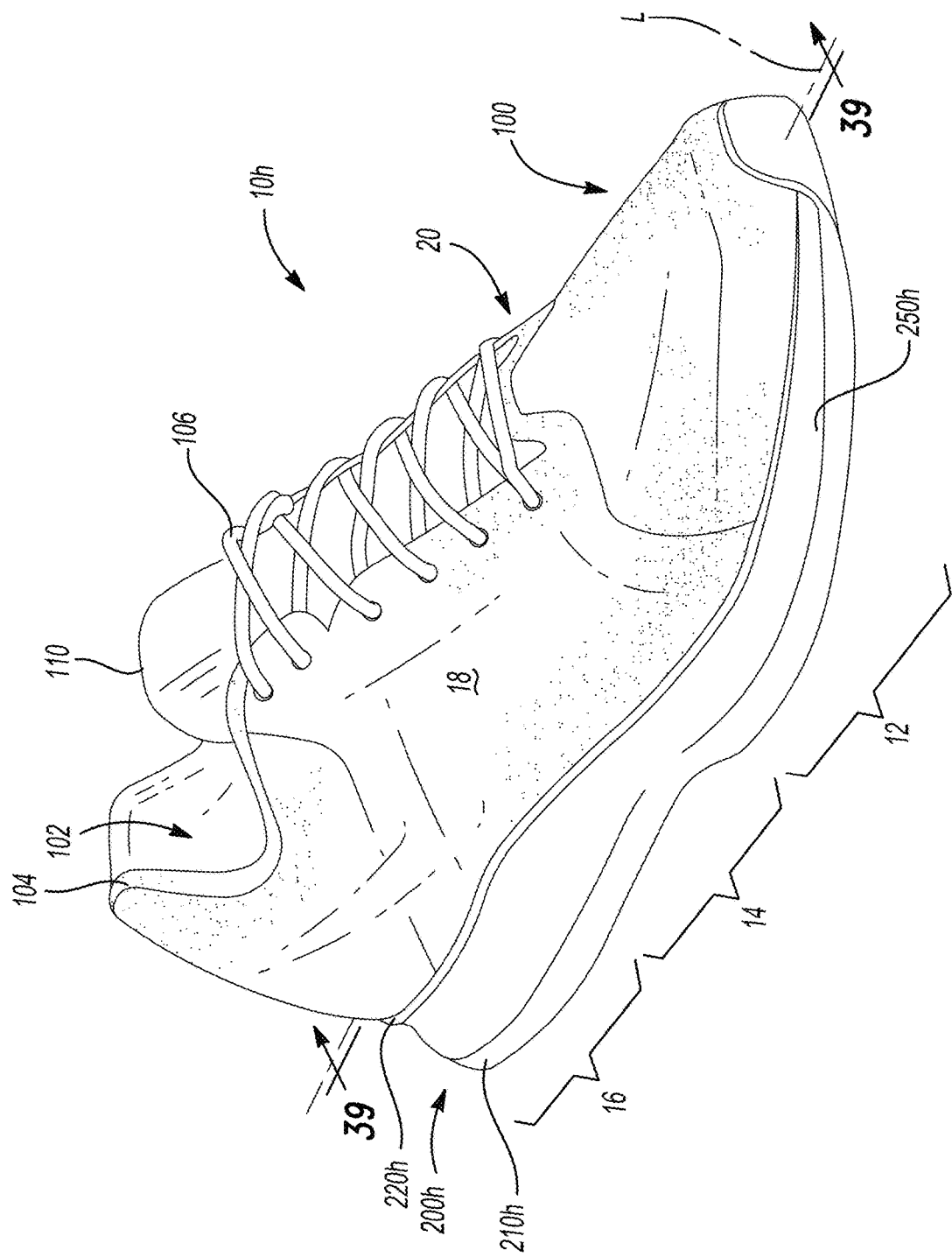
Figure 38:
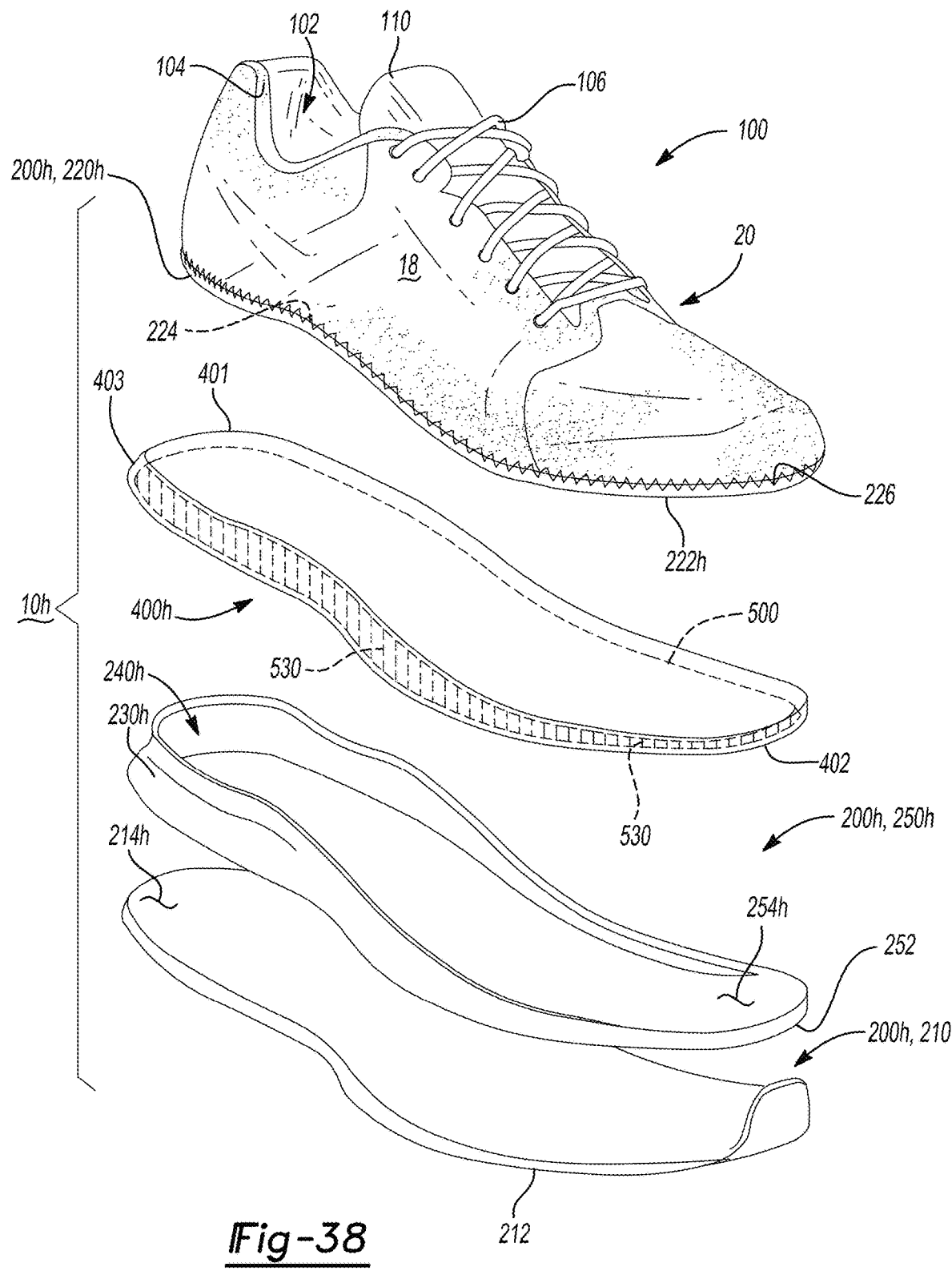
Figure 39:
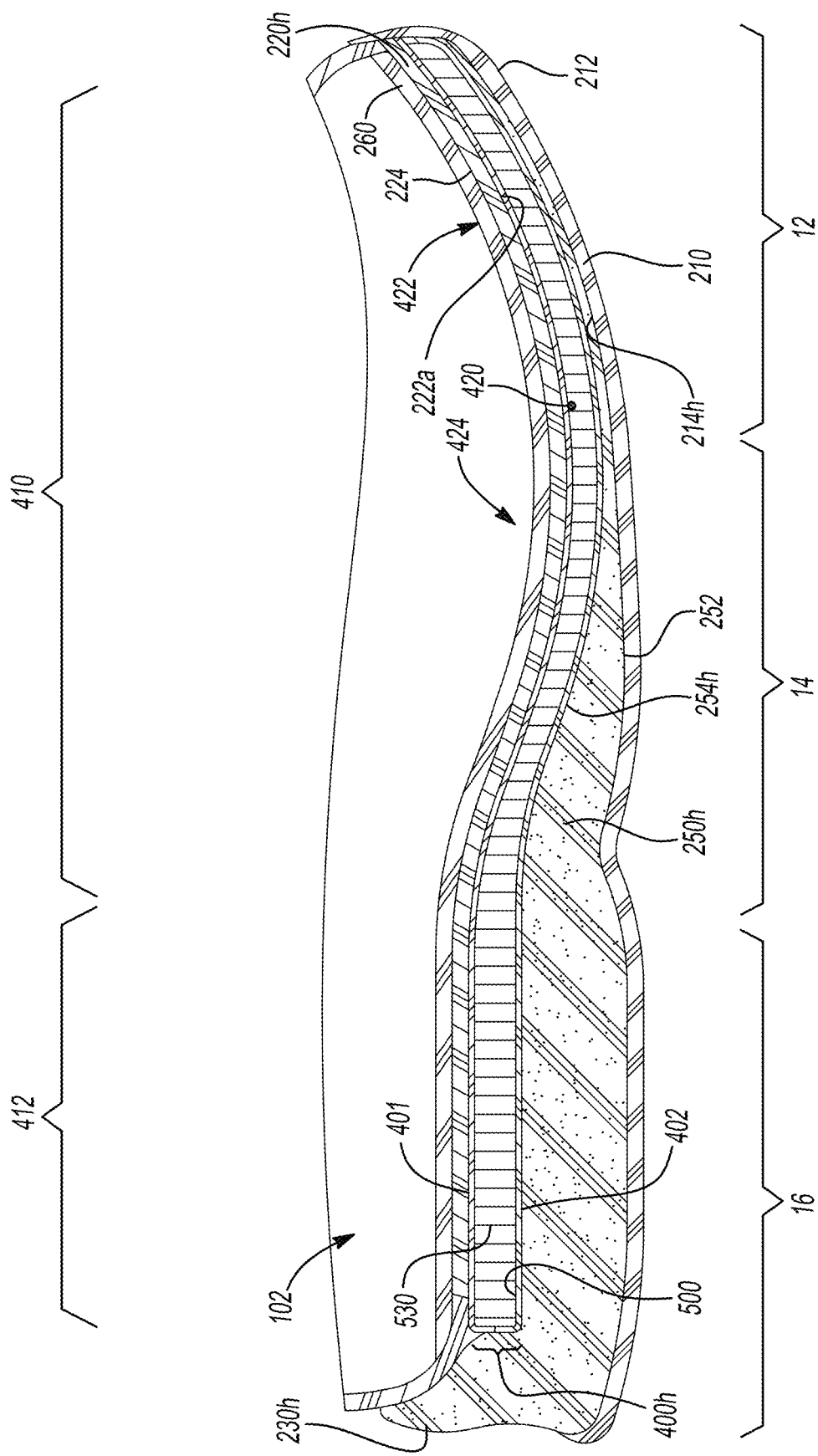
Figure 41:
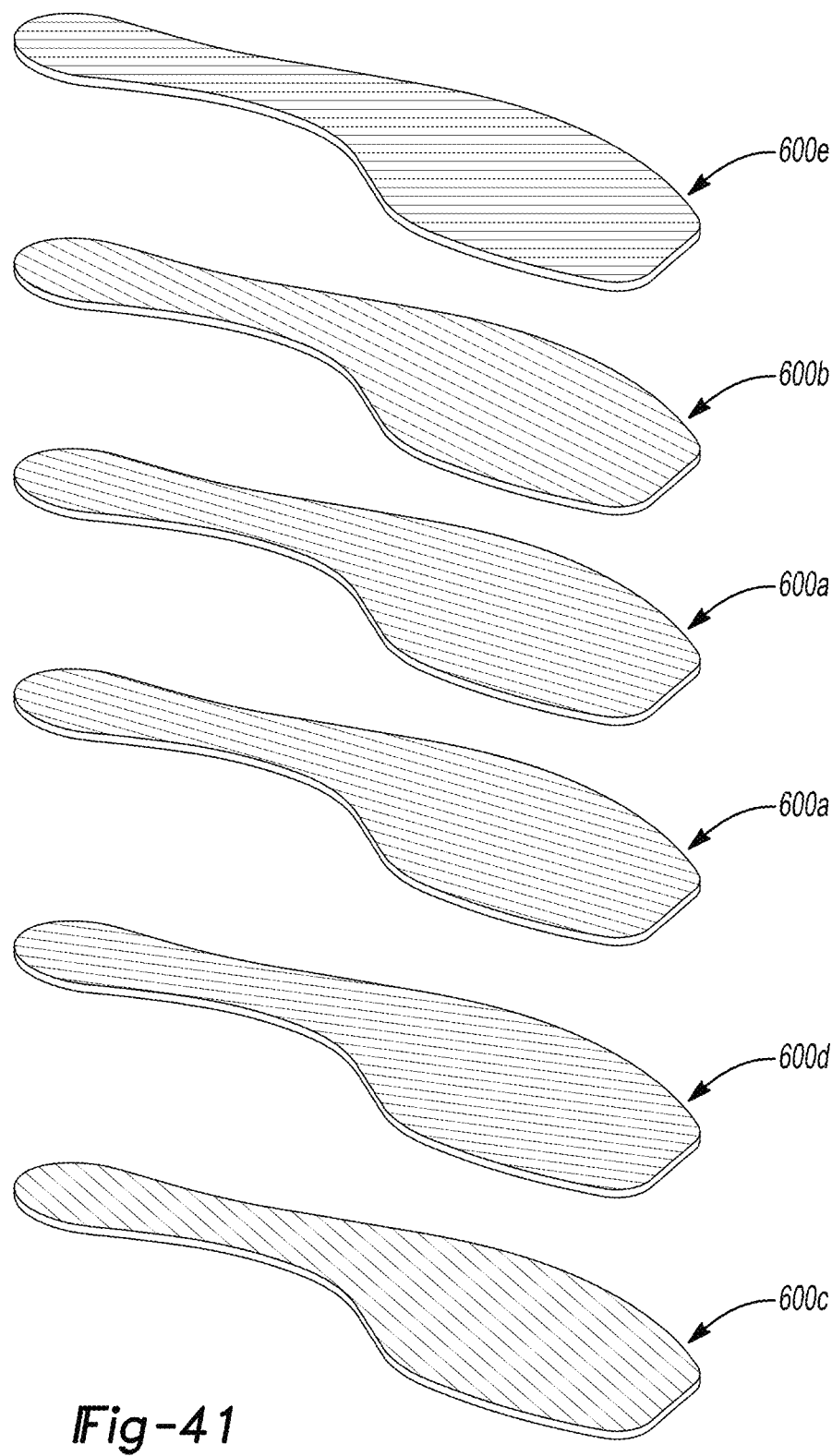
Figure 42E:
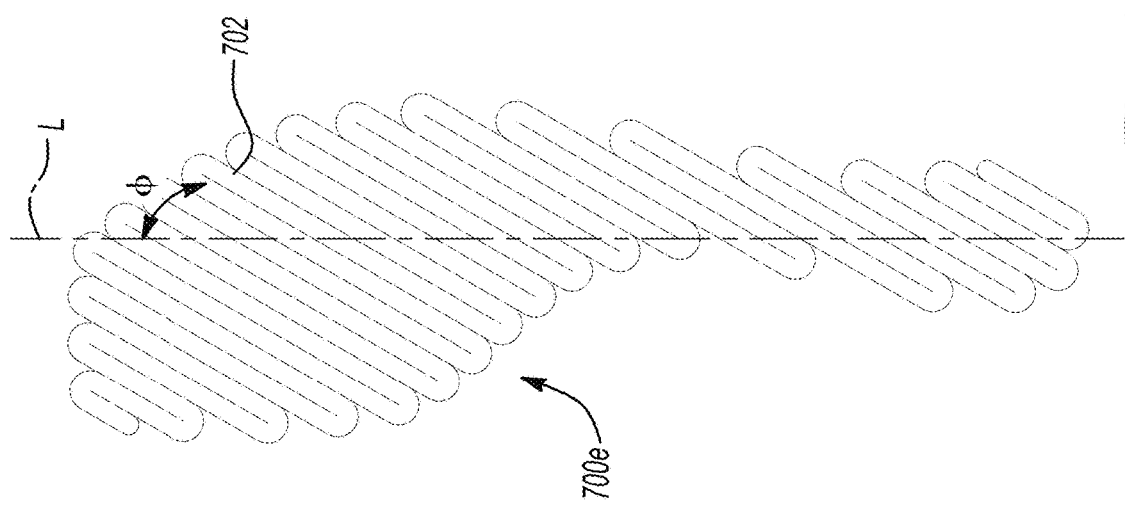
Figure 42D:
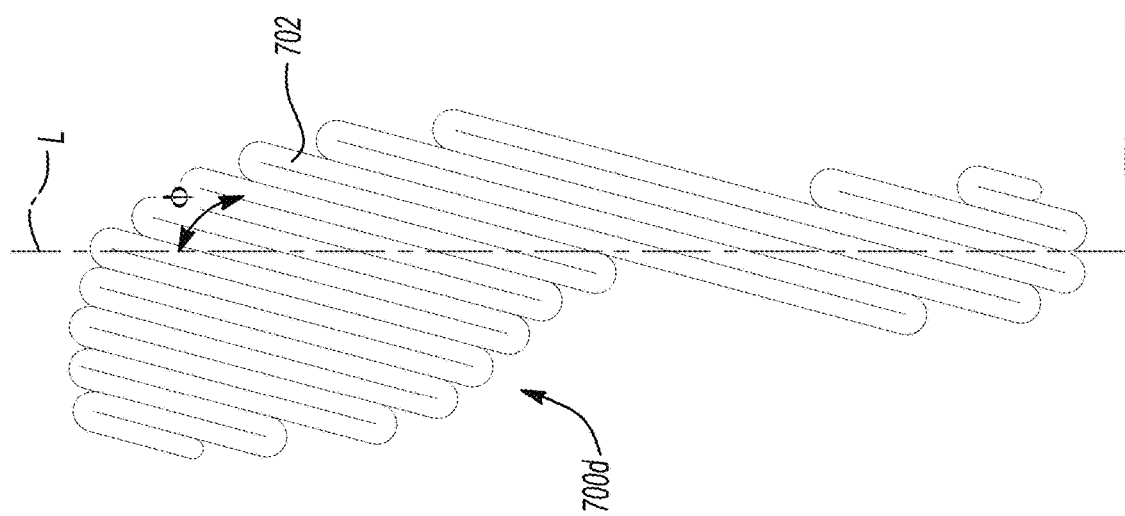
Figure 43:
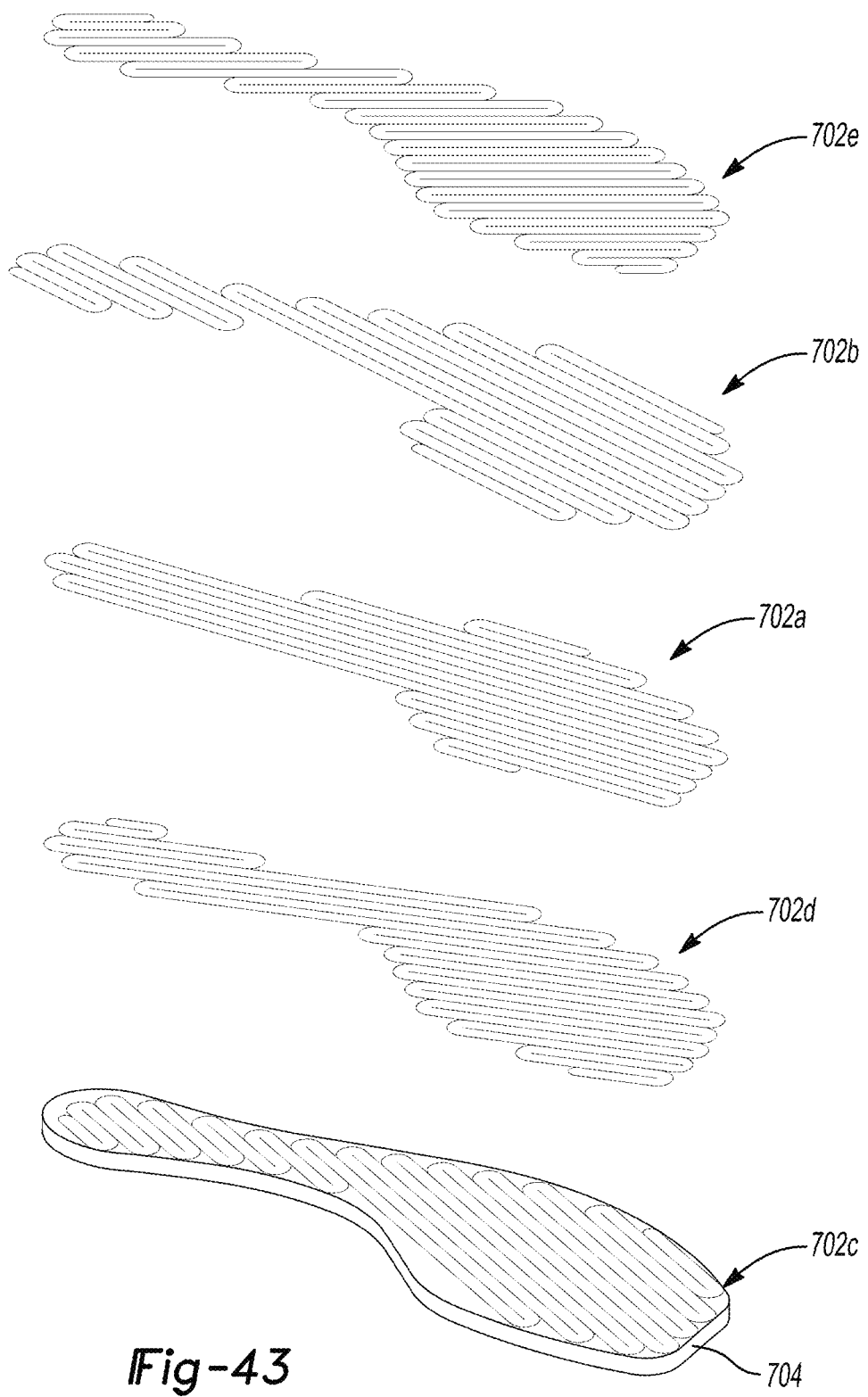
Figure 45:
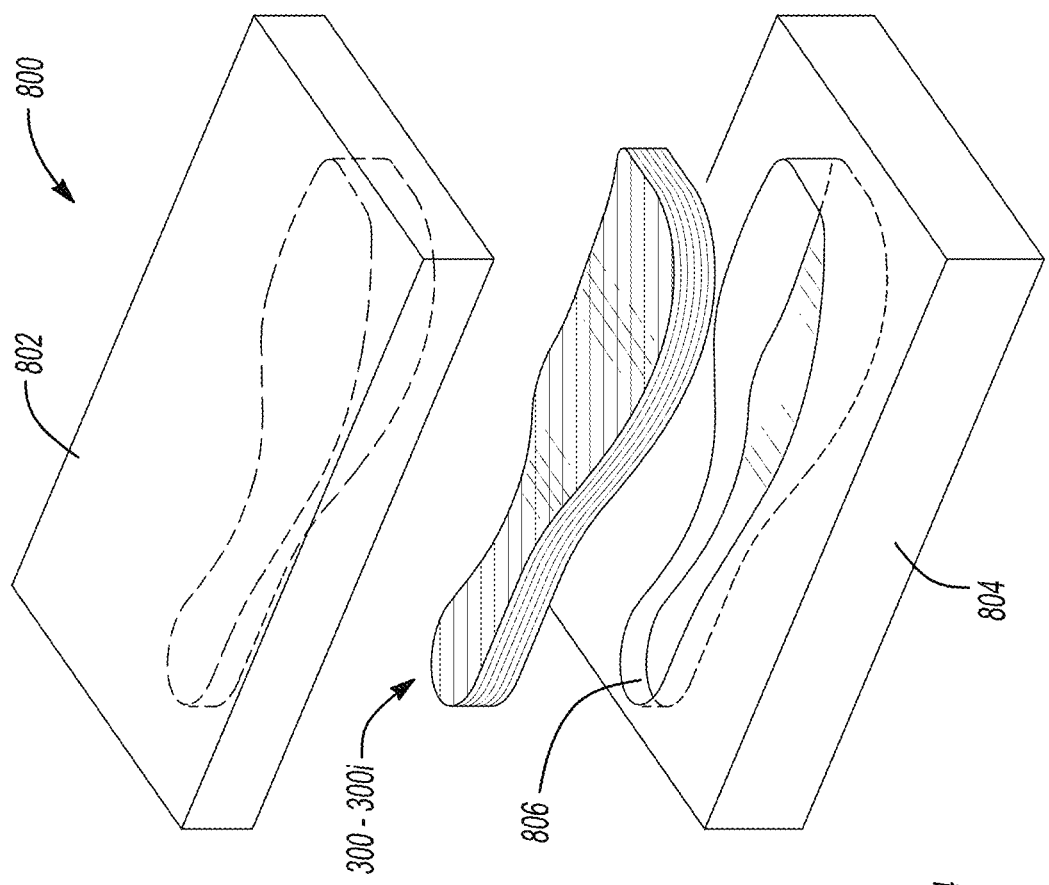
Figure 44:
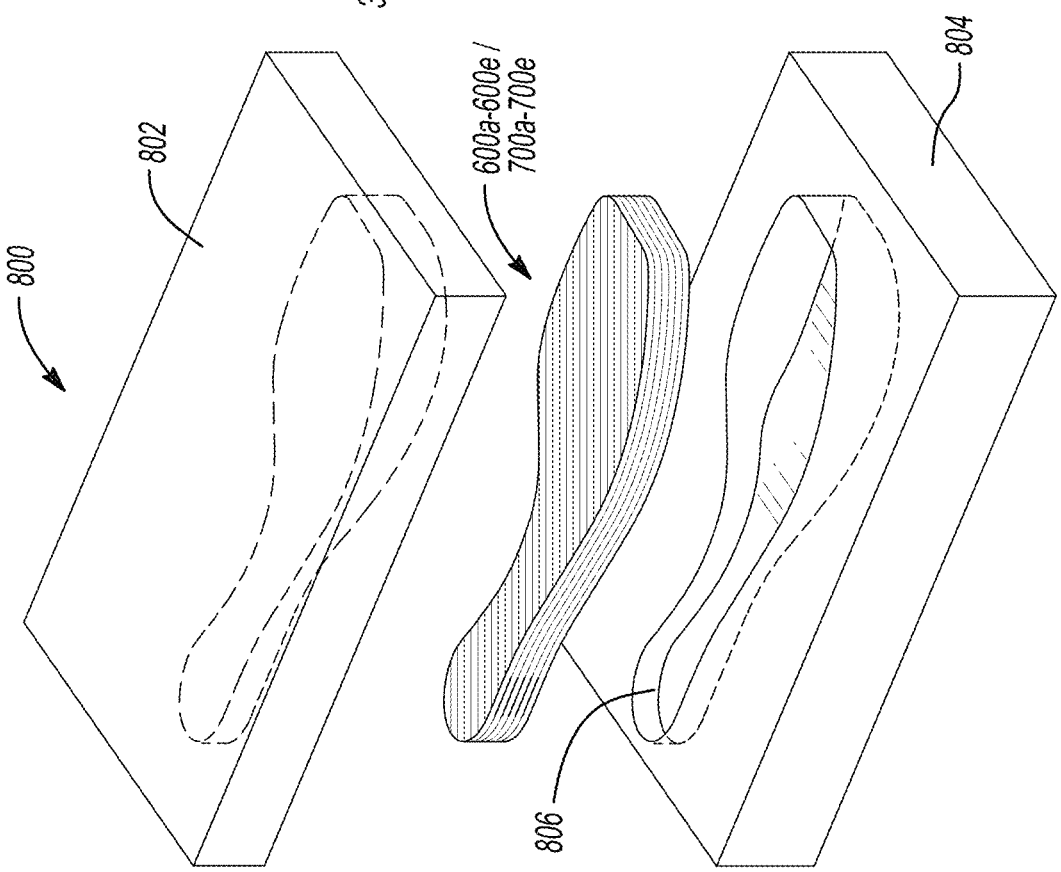
Figure 49:
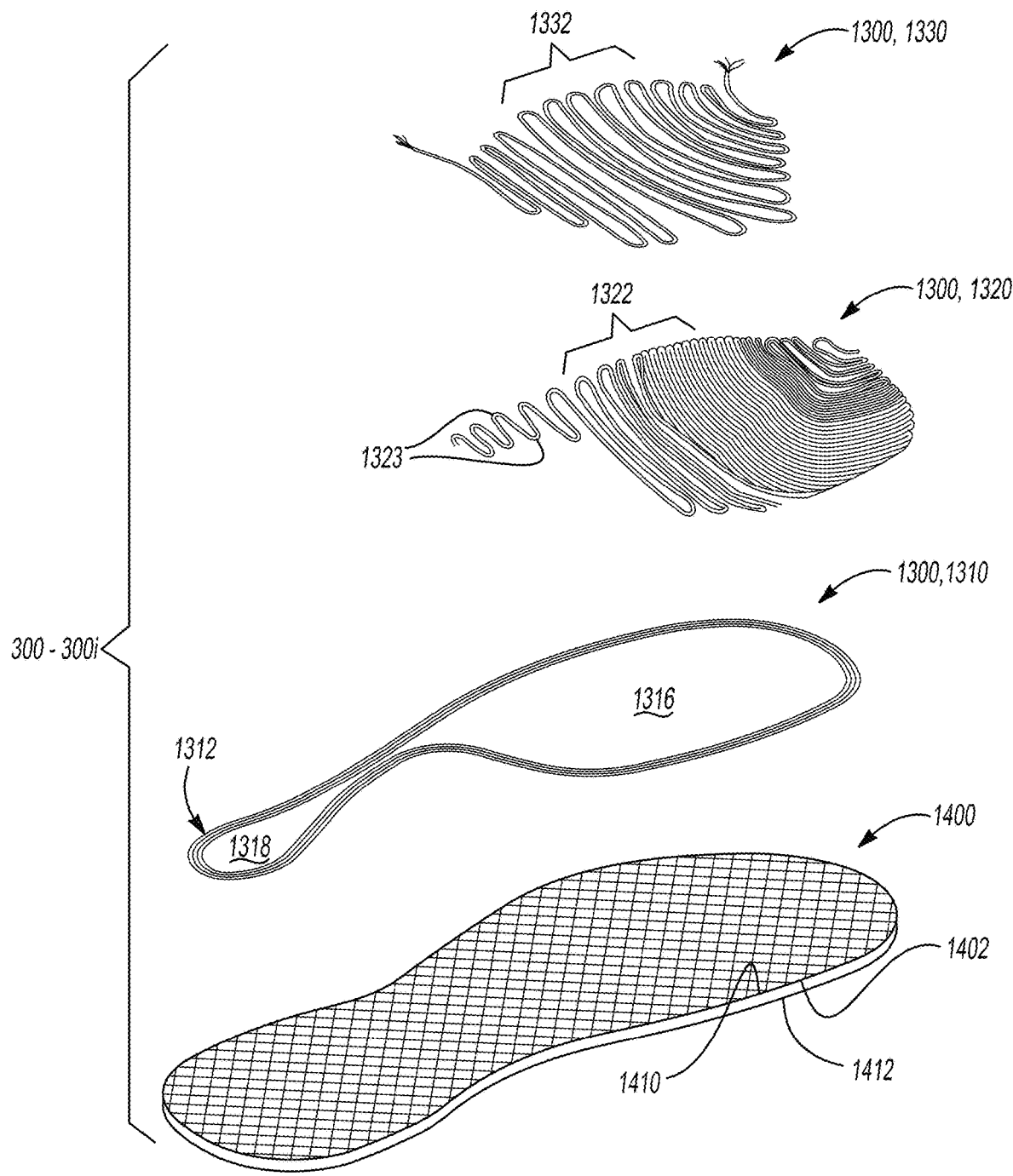
Figure 54:
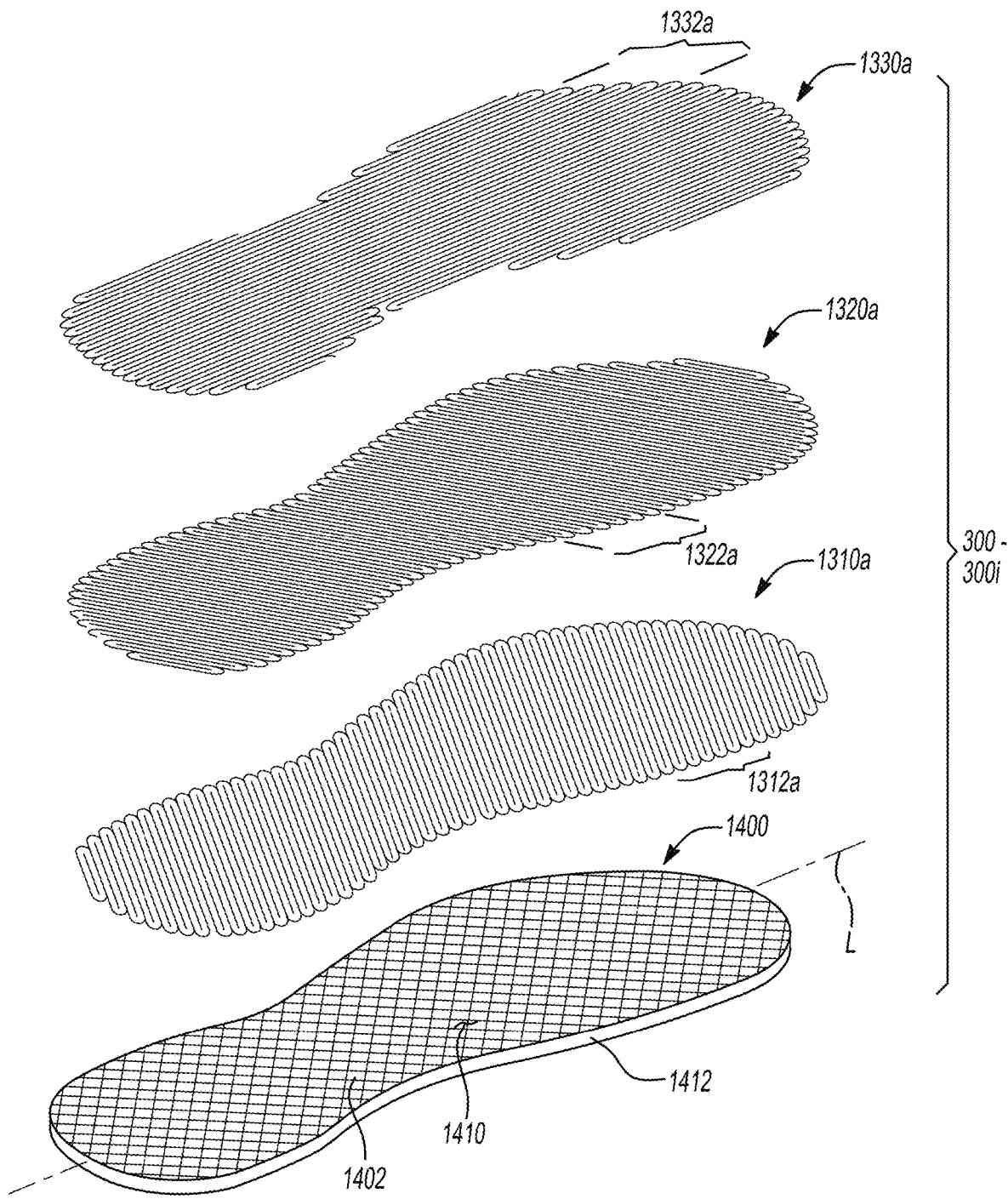
Figure 55:
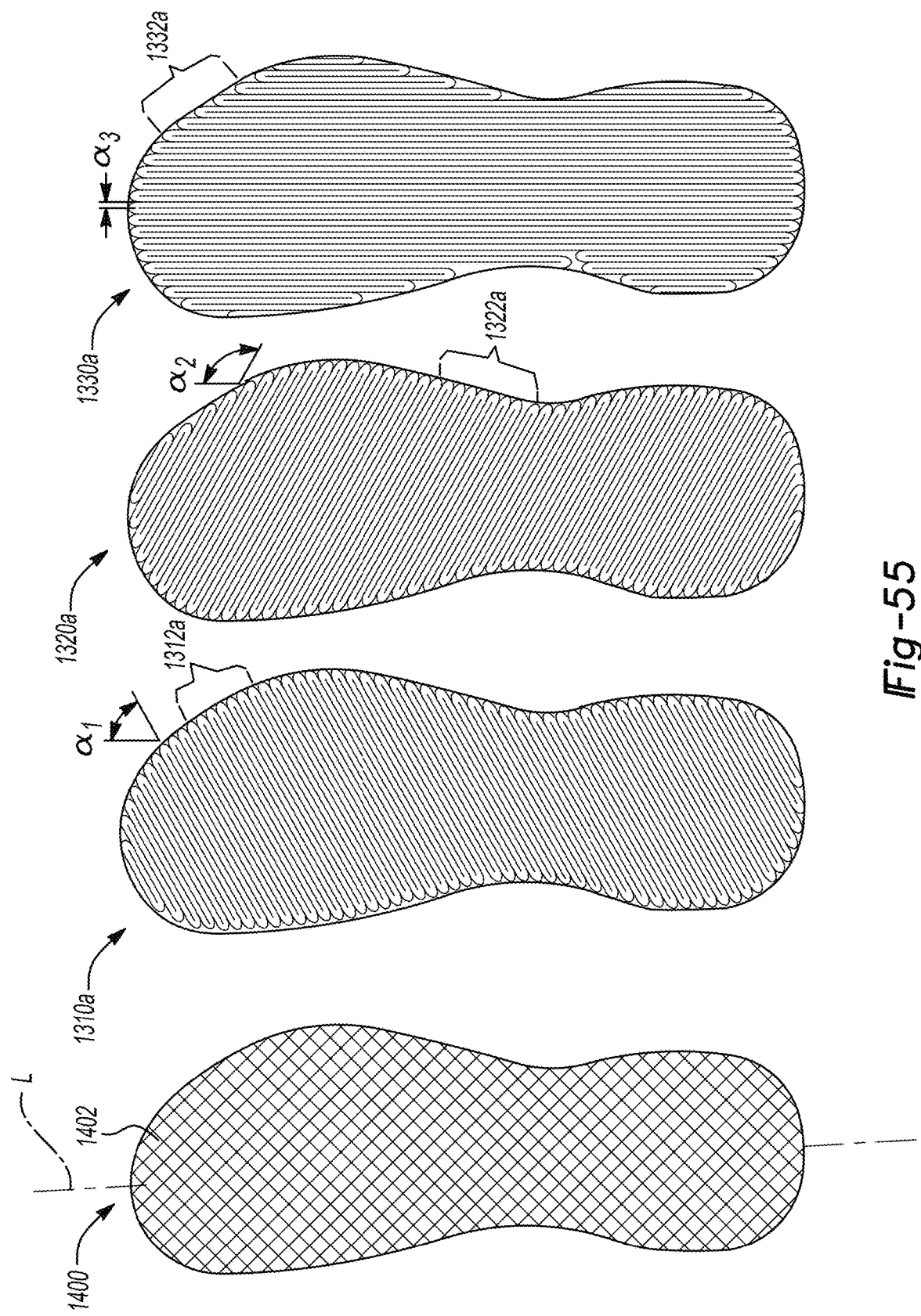
Figure 60:
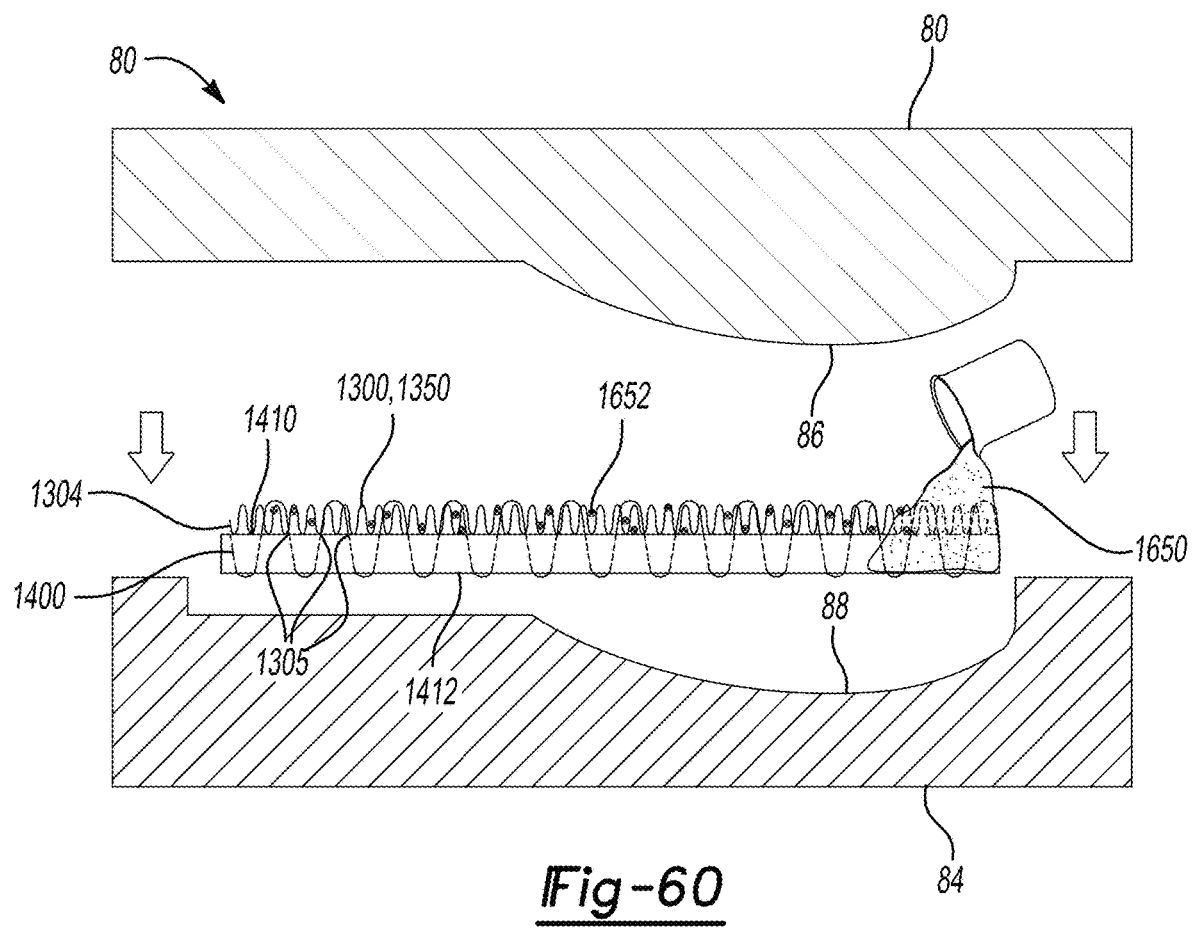
Figure 61:
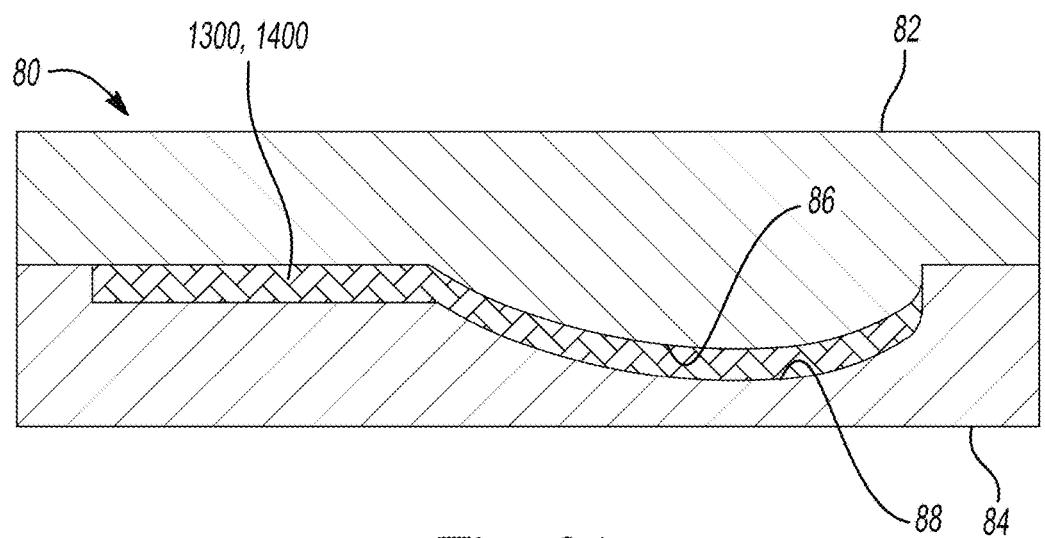
Figure 62:
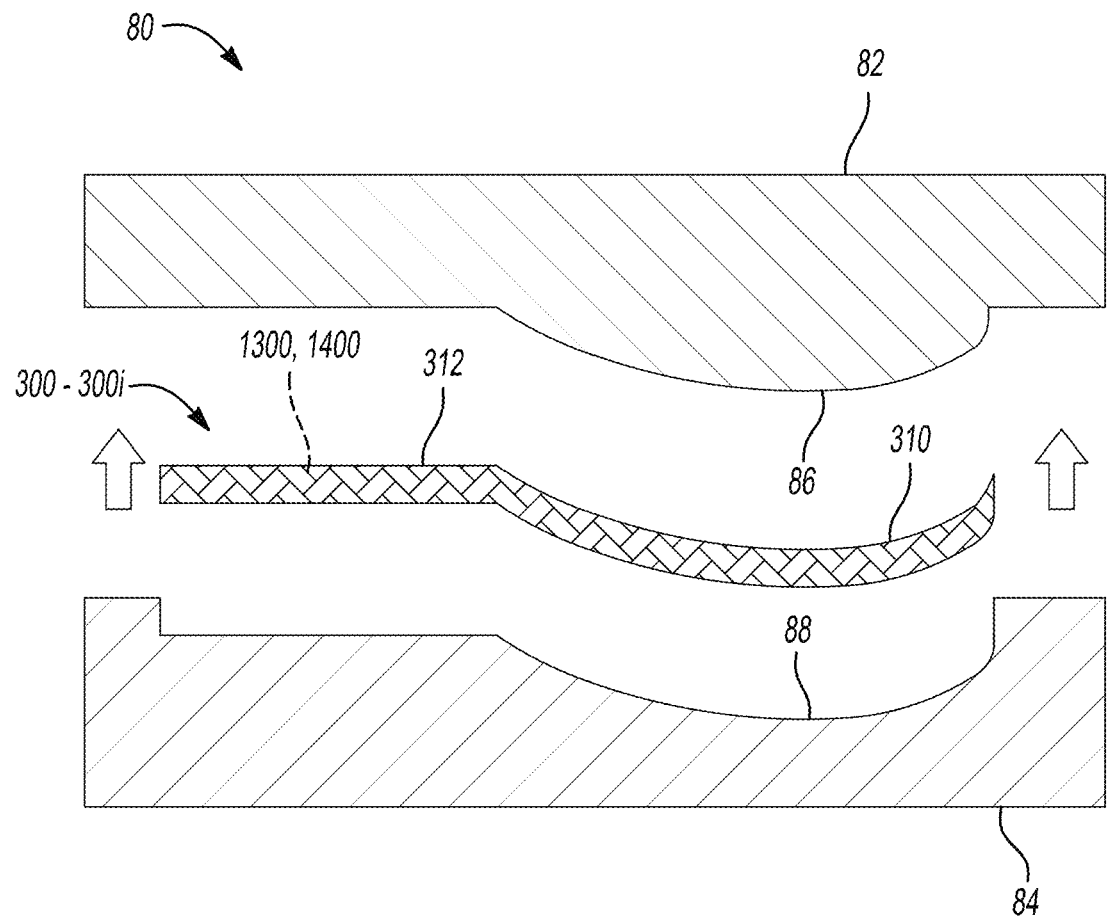

FIG. 12 is a cross-sectional view taken along line 12-12 of FIG. 10 showing a cushioning member received within a cavity between an inner surface of an outsole and a bottom surface of a midsole, and a footwear plate embedded within the cushioning member in a forefoot region of the footwear and disposed between the cushioning member and the bottom surface of midsole in a heel region of the footwear;

FIG. 13 is a top perspective view of an article of footwear in accordance with principles of the present disclosure;

FIG. 14 is an exploded view of the article of footwear of FIG. 13 showing a cushioning member received within a cavity between an inner surface of an outsole and a bottom surface of a midsole, and a footwear plate embedded within the cushioning member in a forefoot region of the footwear and disposed between the cushioning member and the inner surface of the outsole in a heel region of the footwear;

FIG. 15 is a cross-sectional view taken along line 15-15 of FIG. 13 showing a cushioning member received within a cavity between an inner surface of an outsole and a bottom surface of a midsole, and a footwear plate embedded within the cushioning member in a forefoot region of the footwear and disposed between the cushioning member and the inner surface of the outsole in a heel region of the footwear;

FIG. 16 is a top perspective view of a footwear plate for use in an article of footwear in accordance with principles of the present disclosure;

FIG. 17 is a side view of the footwear plate of FIG. 16;

FIG. 18 is a top view of the footwear plate of FIG. 16;

FIG. 19 is a top perspective view of a footwear plate for use in an article of footwear in accordance with principles of the present disclosure;

FIG. 20 is a side view of the footwear plate of FIG. 19;

FIG. 21 is a top view of the footwear plate of FIG. 19;

FIG. 22 is a top perspective view of a footwear plate for use in an article of footwear in accordance with principles of the present disclosure;

FIG. 23 is a side view of the footwear plate of FIG. 22;

FIG. 24 is a top view of the footwear plate of FIG. 22;

FIG. 25 is a top view of a footwear plate for use in an article of footwear in accordance with principles of the present disclosure;

FIG. 26 is a top view of a footwear plate for use in an forefoot region of an article of footwear in accordance with principles of the present disclosure;

FIG. 27 is a top view of a footwear plate for use in an article of footwear in accordance with principles of the present disclosure;

FIG. 28 is a top view of a footwear plate for use in an article of footwear in accordance with principles of the present disclosure;

FIG. 29 is a top view of a footwear plate for use in an article of footwear in accordance with principles of the present disclosure;

FIG. 30 is a top view of a footwear plate for use in an article of footwear in accordance with principles of the present disclosure;

FIG. 31 provides a top perspective view of an article of footwear in accordance with principles of the present disclosure;

FIG. 32 is a cross-sectional view taken along line 32-32 of FIG. 31 showing a footwear plate disposed between an outsole and a midsole in a forefoot region of the footwear and disposed between a cushioning member and the midsole in a heel region of the footwear;

FIG. 33 provides a top perspective view of an article of footwear in accordance with principles of the present disclosure;

FIG. 34 is a cross-sectional view taken along line 34-34 of FIG. 33 showing a footwear plate disposed between an outsole and a cushioning member;

FIG. 35 provides a top perspective view of an article of footwear in accordance with principles of the present disclosure;

FIG. 36 is a cross-sectional view taken along line 36-36 of FIG. 35 showing a plurality of apertures formed through an outsole and a cushioning member to expose a footwear plate disposed between the cushioning member and a midsole;

FIG. 37 is a top perspective view of an article of footwear in accordance with principles of the present disclosure;

FIG. 38 is an exploded view of the article of footwear of FIG. 37 showing a fluid-filled bladder disposed upon a cushioning member within a cavity between an inner surface of an outsole and a bottom surface of a midsole;

FIG. 39 is a cross-sectional view taken along line 39-39 of FIG. 37 showing a fluid-filled bladder disposed upon a cushioning member within a cavity between an inner surface of an outsole and a bottom surface of a midsole;

FIGS. 40A-40E show various prepreg fiber sheets used in forming a footwear plate in accordance with the principles of the present disclosure;

FIG. 41 is an exploded view of a stack of prepreg fiber sheets used to form a footwear plate in accordance with the principles of the present disclosure;

FIGS. 42A-42E show various layers of fiber strands used in forming a footwear plate in accordance with the principles of the present disclosure;

FIG. 43 is an exploded view of layers of fiber strands used to form a footwear plate in accordance with the principles of the present disclosure;

FIG. 44 is a perspective view of a mold for use in forming a footwear plate in accordance with the principles of the present disclosure, the mold shown in conjunction with a stack of fibers prior to being formed into a footwear plate;

FIG. 45 is a perspective view of a mold for use in forming a footwear plate in accordance with the principles of the present disclosure, the mold shown in conjunction with a formed footwear plate;

FIG. 46 is a top view of a substrate used to form a footwear plate in accordance with the principles of the present disclosure;

FIG. 47 is a top view of a first tow of fibers attached to a top surface of the substrate of FIG. 46 to form a first layer on the substrate;

FIG. 48 is a top view of an embroidered preform including first, second, and third tows of fibers attached to the top surface of the substrate of FIG. 46 to form corresponding first, second, and third layers on the substrate;

FIG. 49 is an exploded view of the embroidered preform of FIG. 48 showing the first, second, and third tows of fibers and the substrate;

FIG. 50 is a close up view of the first tow of fibers of FIG. 47 attached to the substrate via first stitching;

FIG. 51 is a cross-sectional view taken along line 51-51 of FIG. 50 showing the first stitching attaching the first tow of fibers to a top surface of the substrate and the fibers including non-polymer fibers and polymer fibers;

FIG. 52 provides a top view of a tow of fibers attached to a substrate and forming a first layer on the substrate in accordance with principles of the present disclosure;

FIG. 53 provides a detailed view of a portion of FIG. 52 showing the tow including looped portions disposed proximate a peripheral edge of the substrate for connecting adjacent segments of the first tow;

FIG. 54 provides an exploded view of an embroidered preform including a substrate and first, second, and third tows of fibers attached to the substrate to form corresponding first, second, and third layers on the substrate in accordance with principles of the present disclosure;

FIG. 55 provides a side-by-side top view of the substrate and the first, second, and third tows of fibers attached to the substrate of FIG. 54;

FIG. 56 provides a top view of a preform plate including a first tow of fibers and a second tow of fibers disposed upon a top surface of a substrate in accordance with principles of the present disclosure;

FIG. 57 provides a cross-sectional view taken along line 57-57 of FIG. 56 showing the second tow of fibers disposed along a perimeter edge of the substrate to provide an outer reinforcement area for the first tow of fibers;

FIG. 58 provides an alternate cross-sectional view taken along line 57-57 of FIG. 56 showing a polymeric material replacing the second tow of fibers to provide an outer reinforcement area for the first tow of fibers;

FIG. 59 provides an alternate cross-sectional view taken along line 57-57 of FIG. 56 showing a perimeter edge of the substrate including a fold to provide an outer reinforcement area for the first tow of fibers;

FIG. 60 is a schematic view of a mold showing an embroidered preform including a tow of fibers attached to a substrate positioned between an upper mold portion of the mold and a lower mold portion of the mold when the mold is open in accordance with principles of the present disclosure;

FIG. 61 is a schematic view of the mold of FIG. 60 showing the embroidered preform between the upper mold portion and the lower mold portion when the mold is closed; and FIG. 62 is a schematic view of the mold of FIG. 60 showing the mold open and the embroidered preform molded and cured to form a substantially rigid footwear plate having a curved portion and a substantially flat portion imparted by the upper mold portion and the lower mold portion.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a sole structure for an article of footwear having an upper portion. The sole structure includes an outsole, a plate disposed between the outsole and the upper, and a first cushioning layer disposed between the concave portion and the upper. The plate includes an anterior-most portion disposed in a forefoot region of the sole structure and a posterior-most point disposed closer to a heel region of the sole structure than the anterior-most point. The plate also includes a concave portion extending between the anterior-most point and the posterior-most point and including a constant radius of curvature from the anterior-most point to a metatarsophalangeal (MTP) point of the sole structure. The MTP point opposes the MTP joint of a foot during use.

Implementations of the disclosure may include one or more of the following optional features. In some implementations, the anterior-most point and the posterior-most point are co-planar. The plate may also include a substantially flat portion disposed within the heel region of the sole structure. The posterior-most point may be located within the substantially flat portion.

In some examples, the sole structure includes a blend portion disposed between and connecting the concave portion and the substantially flat portion. The blend portion may include a substantially constant curvature. The anterior-most point and the posterior-most point may be co-planar at a junction of the blend portion and the substantially flat portion.

The sole structure may include a second cushioning layer disposed between the substantially flat portion and the upper. A third cushioning layer may be disposed between the outsole and the plate. In some examples, the third cushioning layer is disposed within the heel region. The third cushioning layer may extend from the heel region to the forefoot region.

The sole structure may also include at least one fluid-filled chamber disposed between the plate and the upper and/or between the outsole and the plate. The at least one fluid-filled chamber may be disposed within at least one of the second cushioning layer and the third cushioning layer.

In some examples, the MTP point is located approximately thirty percent (30%) of the total length of the plate from the anterior-most point. A center of the radius of curvature may be located at the MTP point. The constant radius of curvature may extend from the anterior-most point past the MTP point. The constant radius of curvature may extend from the anterior-most point past the MTP point at least forty percent (40%) of the total length of the plate from the anterior-most point.

In some examples, the outsole includes a ground-contacting surface and an inner surface formed on an opposite side of the outsole than the ground-contact surface. The inner surface may be directly attached to the plate. The inner surface may be attached to the plate proximate to the concave portion.

Another aspect of the disclosure provides a sole structure for an article of footwear having an upper. The sole structure includes an outsole, a plate disposed between the outsole and the upper, and a first cushioning layer disposed between the curved portion and the upper. The plate includes an anterior-most point disposed in a forefoot region of the sole structure, and a posterior-most point disposed closer to a heel region of the sole structure than the anterior-most point. The plate also includes a curved portion extending between and connecting the anterior-most point and the posterior-most point and including a constant radius of curvature from the anterior-most point to a metatarsophalangeal (MTP) point of the sole structure. The MTP point opposes the MTP joint of a foot during use.

This aspect may include one or more of the following optional features. In some implementations, the anterior-most point and the posterior-most point are co-planar. The plate may include a substantially flat portion disposed within the heel region of the sole structure, the posterior-most point being located within the substantially flat portion.

In some examples, the sole structure includes a blend portion disposed between and connecting the curved portion and the substantially flat portion. The blend portion may include a substantially constant curvature. The anterior-most point and the posterior-most point may be co-planar at a junction of the blend portion and the substantially flat portion.

The sole structure may include a second cushioning layer disposed between the substantially flat portion and the upper. A third cushioning layer may be disposed between the outsole and the plate. The third cushioning layer may be disposed within the heel region. The third cushioning layer may extend from the heel region to the forefoot region.

In some examples, the sole structure includes at least one fluid-filled chamber disposed between the plate and the upper and/or between the outsole and the plate. At least one fluid-filled chamber may be disposed within at least one of the second cushioning layer and the third cushioning layer.

In some examples, the MTP point is located approximately thirty percent (30%) of the total length of the plate from the anterior-most point. A center of the radius of curvature may be located at the MTP point. The constant radius of curvature may extend from the anterior-most point past the MTP point. The constant radius of curvature may extend from the anterior-most point past the MTP point at least forty percent (40%) of the total length of the plate from the anterior-most point.

The outsole may include a ground-contacting surface and an inner surface formed on an opposite side of the outsole than the ground-contact surface. The inner surface may be directly attached to the plate. The inner surface may be attached to the plate proximate to the curved portion.

Yet another aspect of the disclosure provides a sole structure for an article of footwear having an upper. The sole structure includes an outsole, a plate disposed between the outsole, and the upper and a first cushioning layer disposed between the curved portion and the upper. The plate includes an anterior-most point disposed in a forefoot region of the sole structure and a posterior-most point disposed closer to a heel region of the sole structure than the anterior-most point. The plate also includes a curved portion extending between and connecting the anterior-most point and the posterior-most point and including a circular curvature from the anterior-most point to a metatarsophalangeal (MTP) point of the sole structure. The MTP point opposes the MTP joint of a foot during use.

This aspect may include one or more of the following optional features. In some implementations, the anterior-most point and the posterior-most point are co-planar. The plate may include a substantially flat portion disposed within the heel region of the sole structure. The posterior-most point may be located within the substantially flat portion. The plate may also include a substantially flat portion disposed within the heel region of the sole structure. The posterior-most point may be located within the substantially flat portion.

In some examples, the sole structure includes a blend portion disposed between and connecting the curved portion and the substantially flat portion. The blend portion includes a substantially constant curvature. The anterior-most point and the posterior-most point may be co-planar at a junction of the blend portion and the substantially flat portion.

The sole structure may include a second cushioning layer disposed between the substantially flat portion and the upper. A third cushioning layer may be disposed between the outsole and the plate. The third cushioning layer may be disposed within the heel region. In some examples, the third cushioning layer extends from the heel region to the forefoot region.

The sole structure may include at least one fluid-filled chamber disposed between the plate and the upper and/or between the outsole and the plate. The at least one fluid-filled chamber may be disposed within at least one of the second cushioning layer and the third cushioning layer.

In some examples, the MTP point is located approximately thirty percent (30%) of the total length of the plate from the anterior-most point. A center of the circular curvature may be located at the MTP point. The circular curvature may extend from the anterior-most point past the MTP point. The circular curvature may extend from the anterior-most point past the MTP point at least forty percent (40%) of the total length of the plate from the anterior-most point.

In some implementations, the outsole includes a ground-contacting surface and an inner surface formed on an opposite side of the outsole than the ground-contact surface. The inner surface may be directly attached to the plate. Additionally or alternatively, the inner surface may be attached to the plate proximate to the curved portion. In some examples, the sole structure further includes a second cushioning layer disposed on an opposite side of the plate than the first cushioning layer to form at least a portion of the outsole.

Another aspect of the disclosure provides a sole structure for an article of footwear having an upper portion. The sole structure includes an outsole, a plate disposed between the outsole and the upper, and a first cushioning layer disposed between the concave portion and the upper. The plate includes an anterior-most portion disposed in a forefoot region of the sole structure and a posterior-most point disposed closer to a heel region of the sole structure than the anterior-most point. The plate also includes a concave portion extending between the anterior-most point and the posterior-most point and including a constant radius of curvature from the anterior-most point to a metatarsophalangeal (MTP) point of the sole structure. The MTP point opposes the MTP joint of a foot during use.

Implementations of the disclosure may include one or more of the following optional features. In some implementations, the anterior-most point and the posterior-most point are co-planar. The plate may also include a substantially flat portion disposed within the heel region of the sole structure. The posterior-most point may be located within the substantially flat portion.

In some examples, the sole structure includes a blend portion disposed between and connecting the concave portion and the substantially flat portion. The blend portion may include a substantially constant curvature. The anterior-most point and the posterior-most point may be co-planar at a junction of the blend portion and the substantially flat portion.

The sole structure may include a second cushioning layer disposed between the substantially flat portion and the upper. A third cushioning layer may be disposed between the outsole and the plate. In some examples, the third cushioning layer is disposed within the heel region. The third cushioning layer may extend from the heel region to the forefoot region.

The sole structure may also include at least one fluid-filled chamber disposed between the plate and the upper and/or between the outsole and the plate. The at least one fluid-filled chamber may be disposed within at least one of the second cushioning layer and the third cushioning layer.

In some examples, the MTP point is located approximately thirty percent (30%) of the total length of the plate from the anterior-most point. A center of the radius of curvature may be located at the MTP point. The constant radius of curvature may extend from the anterior-most point past the MTP point. The constant radius of curvature may extend from the anterior-most point past the MTP point at least forty percent (40%) of the total length of the plate from the anterior-most point.

In some examples, the outsole includes a ground-contacting surface and an inner surface formed on an opposite side of the outsole than the ground-contact surface. The inner surface may be directly attached to the plate. The inner surface may be attached to the plate proximate to the concave portion.

Yet another aspect of the disclosure provides a sole structure for an article of footwear having an upper. The sole structure includes an outsole, a plate disposed between the outsole and the upper, and a first cushioning layer disposed between the curved portion and the upper. The plate includes an anterior-most point disposed in a forefoot region of the sole structure, and a posterior-most point disposed closer to a heel region of the sole structure than the anterior-most point. The plate also includes a curved portion extending between and connecting the anterior-most point and the posterior-most point and including a constant radius of curvature from the anterior-most point to a metatarsophalangeal (MTP) point of the sole structure. The MTP point opposes the MTP joint of a foot during use.

This aspect may include one or more of the following optional features. In some implementations, the anterior-most point and the posterior-most point are co-planar. The plate may include a substantially flat portion disposed within the heel region of the sole structure, the posterior-most point being located within the substantially flat portion.

In some examples, the sole structure includes a blend portion disposed between and connecting the curved portion and the substantially flat portion. The blend portion may include a substantially constant curvature. The anterior-most point and the posterior-most point may be co-planar at a junction of the blend portion and the substantially flat portion.

The sole structure may include a second cushioning layer disposed between the substantially flat portion and the upper. A third cushioning layer may be disposed between the outsole and the plate. The third cushioning layer may be disposed within the heel region. The third cushioning layer may extend from the heel region to the forefoot region.

In some examples, the sole structure includes at least one fluid-filled chamber disposed between the plate and the upper and/or between the outsole and the plate. At least one fluid-filled chamber may be disposed within at least one of the second cushioning layer and the third cushioning layer.

In some examples, the MTP point is located approximately thirty percent (30%) of the total length of the plate from the anterior-most point. A center of the radius of curvature may be located at the MTP point. The constant radius of curvature may extend from the anterior-most point past the MTP point. The constant radius of curvature may extend from the anterior-most point past the MTP point at least forty percent (40%) of the total length of the plate from the anterior-most point.

The outsole may include a ground-contacting surface and an inner surface formed on an opposite side of the outsole than the ground-contact surface. The inner surface may be directly attached to the plate. The inner surface may be attached to the plate proximate to the curved portion.

Yet another aspect of the disclosure provides a sole structure for an article of footwear having an upper. The sole structure includes an outsole, a plate disposed between the outsole, and the upper and a first cushioning layer disposed between the curved portion and the upper. The plate includes an anterior-most point disposed in a forefoot region of the sole structure and a posterior-most point disposed closer to a heel region of the sole structure than the anterior-most point. The plate also includes a curved portion extending between and connecting the anterior-most point and the posterior-most point and including a circular curvature from the anterior-most point to a metatarsophalangeal (MTP) point of the sole structure. The MTP point opposes the MTP joint of a foot during use.

This aspect may include one or more of the following optional features. In some implementations, the anterior-most point and the posterior-most point are co-planar. The plate may include a substantially flat portion disposed within the heel region of the sole structure. The posterior-most point may be located within the substantially flat portion. The plate may also include a substantially flat portion disposed within the heel region of the sole structure. The posterior-most point may be located within the substantially flat portion.

In some examples, the sole structure includes a blend portion disposed between and connecting the curved portion and the substantially flat portion. The blend portion includes a substantially constant curvature. The anterior-most point and the posterior-most point may be co-planar at a junction of the blend portion and the substantially flat portion.

The sole structure may include a second cushioning layer disposed between the substantially flat portion and the upper. A third cushioning layer may be disposed between the outsole and the plate. The third cushioning layer may be disposed within the heel region. In some examples, the third cushioning layer extends from the heel region to the forefoot region.

The sole structure may include at least one fluid-filled chamber disposed between the plate and the upper and/or between the outsole and the plate. The at least one fluid-filled chamber may be disposed within at least one of the second cushioning layer and the third cushioning layer.

In some examples, the MTP point is located approximately thirty percent (30%) of the total length of the plate from the anterior-most point. A center of the circular curvature may be located at the MTP point. The circular curvature may extend from the anterior-most point past the MTP point. The circular curvature may extend from the anterior-most point past the MTP point at least forty percent (40%) of the total length of the plate from the anterior-most point.

In some implementations, the outsole includes a ground-contacting surface and an inner surface formed on an opposite side of the outsole than the ground-contact surface. The inner surface may be directly attached to the plate. Additionally or alternatively, the inner surface may be attached to the plate proximate to the curved portion. In some examples, the sole structure further includes a second cushioning layer disposed on an opposite side of the plate than the first cushioning layer to form at least a portion of the outsole.

Another aspect of the disclosure includes a plate for an article of footwear having a substrate, a first strand portion attached to the substrate and forming a first layer on the substrate, and a second strand portion disposed on the first layer and forming a second layer. The first strand portion is attached to the substrate via first stitching that crosses over the first strand portion and penetrates the substrate at first attachment locations that are spaced apart from the first strand portion. The second strand portion is attached to the substrate via second stitching that crosses over the second strand portion, extends through the first strand portion, and penetrates the substrate at second attachment locations.

In some configurations configuration, the first strand portion is disposed between the second attachment locations and the second strand portion. The first strand portion and the second strand portion may be portions of the same, continuous strand. The first strand portion and the second strand portion may be formed from the same material or different materials.

In some examples, the first strand portion is formed from a first tow of fibers. The first tow of fibers may include at least one of carbon fibers, boron fibers, glass fibers, and polymeric fibers. In some examples, the second strand portion is formed from a second tow of fibers. The second tow of fibers may include at least one of carbon fibers, boron fibers, glass fibers, and polymeric fibers.

In some implementations, the second tow of fibers includes approximately the same number of fibers as the first tow of fibers. In other implementations, the second tow of fibers includes a different number of fibers than the first tow of fibers. The first strand portion and the second strand portion may have different lengths or may have approximately the same length.

In some configurations, the first strand portion forms a first void in the first layer. The substrate may be exposed within the first void. Additionally, the second strand portion may form a second void in the second layer. Here, the second void may align with the first void to expose the substrate at the second layer or the second void may be spaced apart from the first void.

The first strand portion may be applied to the substrate in a first shape and the second strand portion may be applied to the first layer in a second shape. In one configuration, the first shape is approximately the same as the second shape. In another configuration, the first shape is different than the second shape.

The first stitching and the second stitching may be formed from resin. The first stitching and the second stitching may be formed from the same material as the substrate. In some examples, at least one of the first stitching and the second stitching has a higher melting point than the substrate. Additionally or alternatively, the first stitching may zigzag across the first strand portion between the first attachment locations. Similarly, the second stitching may zigzag across the second strand portion between the second attachment locations.

Another aspect of the disclosure includes a plate for an article of footwear having a substrate defining a peripheral edge, a first strand portion attached to the substrate, and a second strand portion disposed on the first layer. The first strand portion includes first segments that each extend between two different locations along the peripheral edge of the substrate to form a first layer on the substrate. The first segments are disposed adjacent and substantially parallel to one another. The second strand portion includes second segments that each extend between two different locations along the peripheral edge of the substrate to form a second layer on the first layer. The second segments being convergent with the first segments and disposed adjacent and substantially parallel to one another.

At least one of the first strand portion and the second strand portion may be a continuous strand or the first and second strand portions may be portions of the same, continuous strand. In some examples, the first strand portion and the second strand portion are formed from the same material, while in other examples, the first strand portion and the second strand portion are formed from different materials.

In some configurations, the first strand portion is formed from a first tow of fibers. In these configurations, the first tow of fibers may include at least one of carbon fibers, boron fibers, glass fibers, and polymeric fibers.

In some configurations, the second strand portion is formed from a second tow of fibers. In these configurations, the second tow of fibers includes at least one of carbon fibers, boron fibers, glass fibers, and polymeric fibers. The second tow of fibers may include approximately the same number of fibers as the first tow of fibers, or the second tow of fibers may include a different number of fibers than the first tow of fibers.

In some implementations, the first strand portion includes first looped portions disposed proximate to the peripheral edge of the substrate, the first looped portions connecting adjacent first segments. Additionally, the second strand portion may include second looped portions disposed proximate to the peripheral edge of the substrate, the second looped portions connecting adjacent second segments.

The first strand portion may form a first void in the first layer. Here, the substrate may be exposed within the first void. Additionally or alternatively, the second strand portion may form a second void in the second layer. The second void may be aligned with the first void to expose the substrate at the second layer, or the second void is spaced apart from the first void.

In some configurations, the first segments are applied to the substrate at a first angle relative to a longitudinal axis of the substrate and the second segments are applied to the first layer at a second angle relative to the longitudinal axis of the substrate that is different than the first angle. In these configurations, a third strand portion may be disposed on the second layer and include third segments that each extend between two different locations along the peripheral edge of the substrate to form a third layer on the second layer. The third segments may be convergent with the first segments and the second segments and disposed adjacent and substantially parallel to one another. In some examples, the third segments are applied to the second layer at a third angle relative to the longitudinal axis of the substrate that is different than the first angle and the second angle.

In some implementations, the first strand portion is attached to the substrate via first stitching and the second strand portion is attached to the substrate via second stitching. At least one of the first stitching and the second stitching may be formed from the same material as the substrate. At least one of the first stitching and the second stitching has a higher melting point than the substrate in some example. At least one of the first stitching and the second stitching may be formed from resin. Moreover, the first stitching may zigzag across the first strand portion and penetrate the substrate at first attachment locations and the second stitching may additionally or alternatively zigzag across the second strand portion and penetrate the substrate at second attachment locations. The first attachment locations may be spaced apart from the first strand portion. The first strand portions may be disposed between the second layer and the second attachment locations. The second stitching may extend through the first strand portion. In some configurations, the first layer and the second layer are anisotropic.

Yet another aspect of the disclosure provides a plate for an article of footwear. The plate includes a substrate and a first strand portion attached to the substrate and forming a first layer on the substrate. The first strand portion forms a first void in the first layer to expose the substrate within the first void.

In some implementations, the plate includes a second strand portion disposed on the first layer and forming a second layer. The first strand portion and the second strand portion may be portions of the same, continuous strand. The first strand portion and the second strand portion may be formed from the same material. In some examples, the first strand portion and the second strand portion are formed from different materials. The first strand portion and the second strand portion may have different lengths. In some examples, the first strand portion and the second strand portion have approximately the same length.

In some configurations, the second strand portion forms a second void in the second layer. The second void may be aligned with the first void to expose the substrate at the second layer. The second void may be spaced apart from the first void. In some implementations, the first strand is applied to the substrate in a first shape and the second strand portion is applied to the first layer in a second shape. The first shape may be approximately the same as the second shape. The first shape may be different than the second shape.

In some examples, the first strand portion is attached to the substrate by stitching. The stitching may be formed from resin. The stitching may also be formed from the same material as the substrate. The stitching may have a higher melting point than the substrate. In some configurations, the stitching zigzags across the first strand portion between attachment locations located on the substrate.

The first strand portion may be formed from a first tow of fibers. The first tow of fibers may include at least one of carbon fibers, boron fibers, glass fibers, and polymeric fibers. The second strand portion may be disposed on the first layer and form a second layer, the second strand portion being formed from a second tow of fibers. The second tow of fibers may include at least one of carbon fibers, boron fibers, glass fibers, and polymeric fibers. The second tow of fibers may include approximately the same number of fibers as the first tow of fibers. The second tow of fibers may include a different number of fibers than the first tow of fibers.

Yet another aspect of the disclosure provides a plate for an article of footwear. The plate includes a substrate defining a first region and a second region, a first strand portion, and a second strand portion. The first strand portion is attached to and opposing the substrate in one of the first region and the second region and including a first pattern providing the one of the first region and the second region with first performance characteristics. The second strand portion is attached to and opposing the substrate in the other of the first region and the second region and including a second pattern different than the first pattern. The second strand portion also provides the other of the first region and the second region with second performance characteristics different than the first performance characteristics.

The first strand portion may form a first edge to define a shape of the one of the first region and the second region. The second strand portion may form a second edge to define a shape of the other of the first region and the second region. The first edge may be spaced apart and separated from the second edge. The first edge may abut the second edge. In some configurations, the first strand portion and the second strand portion may be portions of the same, continuous strand. The first strand portion and the second strand portion may be formed from the same material. The first strand portion and the second strand portion may be formed from different materials.

The first strand portion may be formed from a first tow of fibers. The first tow of fibers may include at least one of carbon fibers, boron fibers, glass fibers, and polymeric fibers. The second strand portion may be formed from a second row of fibers. The second tow of fibers may include at least one of carbon fibers, boron fibers, glass fibers, and polymeric fibers. The second tow of fibers may include approximately the same numbers of fibers as the first tow of fibers. The second tow of fibers may include a different number of fibers than the first tow of fibers.

In some examples, the first strand portion and the second strand portion have different lengths. The first strand portion and the second strand portion may have approximately the same length. At least one of the first strand portion and the second strand portion may form a void in at least one of the first region and the second region. The substrate may be exposed within the void. The first strand portion and the second strand portion may have different thicknesses. In some configurations, the first strand portion and the second strand portion have approximately the same thickness. The first region and the second region may have different thicknesses. The first region and the second region may have approximately the same thickness.

In some implementations, one of the first region and the second region is located in one of a forefoot portion, a midfoot portion, and a heel portion of the article of footwear. The other of the first region and the second region may be located in another of the forefoot portion, the midfoot portion, and the heel portion of the article of footwear. The first strand portion may be attached to the substrate via first stitching and the second strand portion may be attached to the substrate via second stitching. At least one of the first stitching and the second stitching may be formed from resin. At least one of the first stitching and the second stitching may be formed from the same material as the substrate. In some examples, at least one of the first stitching and the second stitching has a higher melting point than the substrate. The first stitching may zigzag across the first strand portion and penetrate the substrate at the first attachment locations that are spaced apart from the first strand portion. The second stitching may zigzag across the second strand portion and penetrate the substrate at the second attachment locations that are spaced apart from the second strand portion.

Yet another aspect of the disclosure provides a plate for an article of footwear. The plate includes a substrate and a first strand portion. The substrate has a forefoot region and a heel region. The first strand portion is attached to the substrate and includes a plurality of segments that extend between a first end disposed in the forefoot region and a second end disposed in the heel region. The plurality of segments crossing one another in a midfoot region are disposed between the forefoot region and the heel region.

In some implementations, the first strand portion is formed from a continuous strand. The first strand portion may include first looped portions joining respective first ends of the plurality of segments and second looped portions joining respective second ends of the plurality of segments. The plurality of segments, the first looped portions, and the second looped portions cooperate to provide the first strand portion with a continuous construction. The first strand portion may extend onto an upper of the article of footwear.

In some configurations, the plate includes tensile strands extending between and connecting the first strand portion to an upper of the article of footwear. The tensile strands may be attached to the first strand portion along at least one of the plurality of segments between the first end and the second end of the at least one of the plurality of segments. The plate may further include a lace operable to move the upper between a tightened state and a relaxed state. The tensile strands may extend between and join the lace and the at least one of the plurality of segments.

The substrate may include cleat members extending from a surface thereof. In some examples, the first strand portion is attached to the surface of the substrate and extends around a portion of the cleat members. The first strand portion may be attached to the surface of the substrate and surround at least one of the cleat members. The first strand portion may further be attached to the surface of the substrate and at least one of the plurality of segments surrounding at least one of the cleat members.

In some examples, the plurality of segments are woven together at the midfoot region. The first strand portion may be formed from a first tow of fibers. The first tow of fibers may include at least one of carbon fibers, boron fibers, glass fibers, and polymeric fibers. The first strand portion may form at least one void between at least two of the segments. The substrate may be exposed within the at least one void. In some configurations, a first bundle of the plurality of segments and a second bundle of the plurality of segments cooperate to define the at least one void. The at least one void may be disposed between the first bundle and the second bundle.

Another aspect of the disclosure includes a method of forming a plate for an article of footwear. The method includes stitching a first strand portion to a substrate to form a first layer on the substrate, and stitching a second strand portion on the first layer to form a second layer. The first strand portion includes applying first stitching that crosses over the first strand portion and penetrates the substrate at first attachment locations that are spaced apart from the first strand portion. The second strand portion includes applying second stitching that crosses over the second strand portion, extends through the first strand portion, and penetrates the substrate at second attachment locations.

In some examples, stitching the second strand portion on the first layer includes positioning the first strand portion between the second attachment locations and the second strand portion. The method also includes forming the first strand portion and the second strand portion of the same, continuous strand. The method may further include forming the first strand portion and the second strand portion from the same material. In some implementations, the method includes forming the first strand portion and the second strand portion from different materials.

The first strand portion may be formed from a first tow of fibers. Forming the first strand portion from the first tow of fibers may include forming the first strand portion from at least one of carbon fibers, boron fibers, glass fibers, and polymeric fibers. The second strand portion may be formed from a second tow of fibers. Forming the second strand portion from the second tow of fibers may include forming the second strand portion from at least one of carbon fibers, boron fibers, glass fibers, and polymeric fibers. Forming the second strand from the second tow of fibers may include providing approximately the same number of fibers as the first tow of fibers. Forming the second strand from the second tow of fibers may include providing a different number of fibers than the first tow of fibers.

In some examples, the method includes the first strand portion and the second strand portion being formed with different lengths. The first strand portion and the second strand portion may be approximately the same length. Stitching the first strand portion to the substrate may include forming a first void in the first layer. The method may include exposing the substrate within the first void. Stitching the second strand portion on the first layer may include forming a second void in the second layer. The second void may include aligning the second void with the first void to expose the substrate at the second layer. Forming the second void may include spacing apart the second void from the first void.

In some configurations, stitching the first strand portion to the substrate includes applying the first strand portion to the substrate in a first shape. Stitching the second strand portion on the first layer may include applying the second strand portion to the first layer in a second shape. Applying the first strand portion in the first shape and applying the second strand portion in the second shape may include applying the first strand portion and the second strand portion in approximately the same shape. In some examples, applying the first strand portion in the first shape and applying the second strand portion in the second shape includes applying the first strand portion and the second strand portion in different shapes. The method may include at least one of applying the first stitching and applying the second stitching may include applying stitching formed from resin. The method may further include at least one of applying the first stitching and applying the second stitching may include applying stitching that is formed from the same material as the substrate.

In some implementations, the method includes at least one of applying the first stitching and applying the second stitching may include applying stitching that has a higher melting point than the substrate. Applying the first stitching may include zigzagging the first stitching across the first strand portion between first attachment locations. Applying the second stitching may include zigzagging the second stitching across the second strand portion between the second attachment locations. In some examples, the method includes applying at least one of heat and pressure to the first strand portion and the second strand portion to bind the first strand portion to both the substrate and the second strand portion. Applying at least one of heat and pressure may include forming the substrate, the first strand portion, and the second strand portion into a desired shape.

Another aspect of the disclosure includes a method of forming a plate for an article of footwear. The method includes attaching a first strand portion to a substrate and positioning a second strand portion on the first layer. Attaching the first strand portion includes positioning first segments of the first strand portion on the substrate with each first segment extending between two different locations along a peripheral edge of the substrate to form a first layer on the substrate. The first segment is disposed adjacent and substantially parallel to one another. Positioning a second strand portion includes positioning second segments of the second strand portion on the first layer with each second segment extending between two different locations along the peripheral edge of the substrate to form a second layer on the first layer. The second segments is convergent with the first segments and disposed adjacent and substantially parallel to one another.

The method may include at least one of attaching the first strand portion to the substrate and positioning the second strand portion on the first layer may include positioning a continuous strand. Attaching the first strand portion to the substrate and positioning the second strand portion on the first layer may include positioning a single, continuous strand. The method may include forming the first strand portion and the second strand portion from the same material. In some examples, the method may include forming the first strand portion and the second strand portion from different materials.

In some implementations, the method includes forming the first strand portion from a first tow of fibers. The first strand portion from the first tow of fibers may include forming the first strand portion from at least one of carbon fibers, boron fibers, glass fibers, and polymeric fibers. The method may also include forming the second strand portion from a second tow of fibers. The second strand portion from the second tow of fibers may include forming the second strand portion from at least one of carbon fibers, boron fibers, glass fibers, and polymeric fibers. Forming the second strand from the second tow of fibers may include providing approximately the same number of fibers as the first tow of fibers. Forming the second strand from the second tow of fibers may include providing a different number of fibers than the first tow of fibers.

In some examples, the method includes providing the first strand portion with first looped portions disposed proximate to the peripheral edge of the substrate, the first looped portions connecting adjacent first segments. The method may also include providing the second strand portion with second looped portions disposed proximate to the peripheral edge of the substrate, the second looped portions connecting adjacent second segments. Attaching the first strand portion to the substrate may include forming a first void in the first layer. The method may also include exposing the substrate within the first void.

In some examples, the method includes positioning the second strand portion on the first layer and includes forming a second void in the second layer. Forming the second void may include aligning the second void with the first void to expose the substrate at the second layer. Forming the second void may include spacing apart the second void from the first void. Positioning the first segments of the first strand portion on the substrate may include applying the first segments at a first angle relative to a longitudinal axis of the substrate. Positioning the second segments of the second strand portion on the first layer may include applying the second segments at a second angle relative to the longitudinal axis of the substrate that is different than the first angle. In some examples, positioning a third strand portion on the second layer includes positioning third segments of the third strand portion on the second layer with each third segment extending between two different locations along the peripheral edge of the substrate to form a third layer on the second layer. The third segments may be convergent with the first segments and the second segments and disposed adjacent and substantially parallel to one another. Positioning the third segments on the second layer may include applying the third segments at a third angle relative to the longitudinal axis of the substrate that is different than the first angle and the second angle.

Attaching the first strand portion to the substrate may include applying first stitching and positioning the second strand portion on the first layer may include applying second stitching. At least one of applying the first stitching and applying the second stitching may include applying stitching that is formed from the same material as the substrate. At least one of applying the first stitching and applying the second stitching may include applying stitching that has a higher melting point than the substrate. In some examples, applying the first stitching includes zigzagging the first stitching across the first strand portion between first attachment locations. Applying the second stitching may include zigzagging the second stitching across the second strand portion between second attachment locations. Applying the second stitching may include extending the second stitching through the first strand portion. The method may include applying at least one of heat and pressure to the first strand portion and the second strand portion to bind the first strand portion to both the substrate and the second strand portion. Applying at least one of heat and pressure may include forming the substrate, the first strand portion, and the second strand portion into a desired shape.

Yet another aspect of the disclosure includes a method of forming a plate for an article of footwear. The method includes attaching a first strand portion to a substrate to form a first layer on the substrate. The first strand portion may form a first void in the first layer to expose the substrate within the first void.

The method may include positioning a second strand portion on the first layer to form a second layer. The method may also include forming the first strand portion and the second strand portion of the same, continuous strand. In some examples, the method includes forming the first strand portion and the second strand portion from the same material. The method may also include forming the first strand portion and the second strand portion from different materials. The method may further include providing the first strand portion and the second strand portion with different lengths. The first strand portion and the second strand portion may be formed with approximately the same length.

In some configurations, positioning the second strand portion includes forming a second void in the second layer. The method may also include aligning the second void with the first void to expose the substrate at the second layer. The method may further include spacing the second void apart from the first void.

Attaching the first strand portion may include applying the first strand portion to the substrate in a first shape and positioning the second strand portion may include applying the second strand portion on the first layer in a second shape. Applying the first strand portion in the first shape and applying the second strand portion in the second shape may include applying the first strand portion and the second strand portion in approximately the same shape. Applying the first strand portion in the first shape and applying the second strand portion in the second shape may include applying the first strand portion and the second strand portion in different shapes. Attaching the first strand portion to the substrate may include applying stitching. Applying stitching may also include applying stitching formed from resin. Applying stitching may further include applying stitching formed from the same material as the substrate. In some examples, applying stitching includes applying stitching having a higher melting point than the substrate. Applying stitching may further include zigzagging the stitching across the first strand portion between first attachment locations located on the substrate.

In some implementations, the method includes forming the first strand portion from a first tow of fibers. Forming the first strand portion from the first tow of fibers may also include forming the first strand portion from at least one of carbon fibers, boron fibers, glass fibers, and polymeric fibers. The method may also include positioning a second strand portion on the first layer to form a second layer, the second strand portion being formed from a second tow of fibers. Forming the second strand portion from the second tow of fibers may include forming the second strand portion from at least one of carbon fibers, boron fibers, glass fibers, and polymeric fibers. Forming the second strand portion from the second tow of fibers may include providing approximately the same number of fibers as the first tow of fibers. Forming the second strand portion from the second tow of fibers may further include providing a different number of fibers than the first tow of fibers.

Yet another aspect of the disclosure provides a method of forming an article of footwear. The method includes defining a first region and a second region on a substrate, attaching a first strand portion to the substrate in one of the first region and the second region, and attaching a second strand portion to the substrate in the other of the first region and the second region. Attaching a first strand portion to the substrate includes forming the first strand into a first pattern that opposes the substrate and provides the one of the first region and the second region with first performance characteristics. Attaching a second strand portion to the substrate includes forming the second strand portion into a second pattern different than the first pattern that opposes the substrate and provides the other of the first region and the second region with second performance characteristics different than the first performance characteristics.

Forming the first strand portion may include forming a first edge to define a shape of the one of the first region and the second region. Forming the second strand portion may include forming a second edge to define a shape of the other of the first region and the second region. In some examples, the method includes spacing the first edge apart from the second edge. The method may further include abutting the first edge against the second edge.

In some examples, the method includes forming the first strand portion and the second strand portion of the same, continuous strand. The method may also include forming the first strand portion and the second strand portion from the same material. The first strand portion and the second strand portion may be formed from different materials. The method may further include forming the first strand portion from a first tow of fibers. Forming the first strand portion from the first tow of fibers may include forming the first strand portion from at least one of carbon fibers, boron fibers, glass fibers, and polymeric fibers. In some examples, the method includes forming the second strand portion from a second tow of fibers. Forming the second strand portion from the second tow of fibers may include forming the second strand portion from at least one of carbon fibers, boron fibers, glass fibers, and polymeric fibers.

Forming the second strand from the second tow of fibers may include providing approximately the same number of fibers as the first tow of fibers. Forming the second strand from the second tow of fibers may include providing a different number of fibers than the first tow of fibers. In some examples, the method includes providing the first strand portion and the second strand portion with different lengths. The method may include providing the first strand portion and the second strand portion with approximately the same length. The method may also include at least one of attaching the first strand portion to the substrate and attaching the second strand portion to the substrate may include forming a void in at least one of the first region and the second region. In some implementations, the method includes exposing the substrate within the void. The first strand portion and the second strand portion may be provided with different thicknesses. The method may further include providing the first strand portion and the second strand portion with approximately the same thickness. Additionally or alternatively, the first region and the second region may be provided with different thicknesses. In some examples, the method includes providing the first region and the second region with approximately the same thickness.

In some configurations, the method includes locating one of the first region and the second region in one of a forefoot portion, a midfoot portion, and a heel portion of the article of footwear. The method may also include locating the other of the first region and the second region in another of the forefoot portion, the midfoot portion, and the heel portion of the article of footwear. In some examples, the method includes attaching the first strand portion to the substrate via first stitching and attaching the second strand portion to the substrate via second stitching. Attaching the first strand portion to the substrate via first stitching and attaching the second strand portion to the substrate via second stitching may include using stitching formed from resin. Attaching the first strand portion to the substrate via first stitching and attaching the second strand portion to the substrate via second stitching may include using stitching formed from the same material as the substrate. Attaching the first strand portion to the substrate via first stitching and attaching the second strand portion to the substrate via second stitching may include using stitching having a higher melting point than the substrate.

In some examples, the method includes zigzagging the first stitching across the first strand portion and penetrating the substrate at first attachment locations that are spaced apart from the first strand portion. The method may also include zigzagging the second stitching across the second strand portion and penetrating the substrate at second attachment locations that are spaced apart from the second strand portion. The method may further include zigzagging the second stitching across the second strand portion and penetrating the substrate at second attachment locations that are spaced apart from the second strand portion.

Yet another aspect of the disclosure provides a method of forming an article of footwear. The method includes attaching a first strand portion to a flexible substrate to form a first layer on the substrate, positioning the substrate on a first mold surface to change a shape of the substrate, applying at least one of heat and pressure to the first strand portion and the substrate to conform the substrate to the shape of the first mold surface, and incorporating the substrate into an article of footwear.

In some examples, the method includes attaching a second strand portion to the substrate to form a second layer on the substrate. Attaching the second strand portion to the substrate may include attaching the second strand portion adjacent to the first strand portion. Attaching the second strand portion to the substrate may also include overlapping at least a portion of the second strand portion on the first strand portion.

In some implementations, the method includes forming the first strand portion and the second strand portion of the same, continuous strand. The first strand portion and the second strand portion may be formed from the same material. Additionally or alternatively, the first strand portion and the second strand portion may be formed from different materials.

The method may also include forming the first strand portion from a first tow of fibers. Forming the first strand portion from the first tow of fibers may include forming the first strand portion from at least one of carbon fibers, boron fibers, glass fibers, and polymeric fibers. The method may further include forming the second strand portion from a second tow of fibers. Forming the second strand portion from the second tow of fibers may include forming the second strand portion from at least one of carbon fibers, boron fibers, glass fibers, and polymeric fibers. Forming the second strand from the second tow of fibers may also include providing approximately the same number of fibers as the first tow of fibers. In some examples, forming the second strand from the second tow of fibers includes providing a different number of fibers than the first tow of fibers.

In some configurations, the method includes providing the first strand portion and the second strand portion with different lengths. The method may also include providing the first strand portion and the second strand portion with approximately the same length. At least one of attaching the first strand portion to the substrate and attaching the second strand portion to the substrate may include forming a void in at least one of the first layer and the second layer. In some examples, the method includes exposing the substrate within the void. The first strand portion and the second strand portion may be provided with different thicknesses. Additionally or alternatively, the first strand portion and the second strand portion may be provided with approximately the same thickness. The method may also include providing the first layer and the second layer with different thicknesses. In some examples, the method includes providing the first layer and the second layer with approximately the same thickness.

Conforming the substrate to the shape of the first mold surface may include providing the substrate with a forefoot portion, a midfoot portion, and a heel portion. The method may include attaching the first strand portion to the substrate via first stitching and attaching the second strand portion to the substrate via second stitching. Attaching the first strand portion to the substrate via first stitching and attaching the second strand portion to the substrate via second stitching may include using stitching formed from resin. Attaching the first strand portion to the substrate via first stitching and attaching the second strand portion to the substrate via second stitching may also include using stitching formed from the same material as the substrate. In some examples, attaching the first strand portion to the substrate via first stitching and attaching the second strand portion to the substrate via second stitching includes using stitching having a higher melting point than the substrate. Applying at least one of heat and pressure may include activating a resin material incorporated into the first strand portion.

In some configurations, the method includes infusing the first strand portion with a liquid material. Applying at least one of heat and pressure may include subjecting the substrate and the first strand portion to at least one of vacuum molding and compression molding to cure the liquid material. Curing the liquid material may include curing a thermoset material. Curing a thermoset material may include curing at least one of an epoxy, a polyurethane, a polymerizable composition, and a pre-polymer. In some examples, infusing the first strand portion with a liquid material includes adding a polymer to the liquid material to increase the ductility of the liquid material once cured. Adding a polymer to the liquid material may include adding at least one of rubber and a block copolymer.

In some examples, the method includes forming the substrate from a thermoplastic film. The method may include attaching the first strand portion to the thermoplastic film via stitching. Attaching the first strand portion to the thermoplastic film via stitching may include using stitching formed from a thermoplastic material. Applying at least one of heat and pressure to the first strand portion and the substrate may include thermoforming the thermoplastic film and the thermoplastic stitching to join the first strand portion to the substrate. Applying at least one of heat and pressure may include subjecting the substrate and the first strand portion to at least one of vacuum molding and compression molding.

Yet another aspect of the disclosure provides a method of forming an article of footwear. The method includes attaching a first strand portion to a first substrate to form a first layer on the first substrate and attaching a second strand portion to a second substrate to form a second layer on the second substrate. The method also includes positioning the second substrate on the first substrate to form a substrate stack, positioning the substrate stack on a first mold surface, applying at least one of heat and pressure to the substrate stack to conform the substrate stack to the shape of the first mold surface, and incorporating the substrate stack into an article of footwear.

In some examples, applying at least one of heat and pressure includes activating a resin material incorporated into the first strand portion and the second strand portion. The method may include infusing the first strand portion and the second strand portion with a liquid material. Applying at least one of heat and pressure may include subjecting the substrate stack to at least one of vacuum molding and compression molding to cure the liquid material. Curing the liquid material may include curing a thermoset material. Curing a thermoset material may include curing at least one of an epoxy, a polyurethane, a polymerizable composition, and a pre-polymer. In some examples, infusing the first strand portion and the second strand portion with a liquid material includes adding a polymer to the liquid material to increase the ductility of the liquid material once cured. Adding a polymer to the liquid material may include adding at least one of rubber and a block copolymer.

In some configurations, the method includes forming at least one of the first substrate and the second substrate from a thermoplastic film. The method may include attaching the first strand portion to the first substrate via first stitching and attaching the second strand portion to the second substrate via second stitching. Attaching the first strand portion to the first substrate via first stitching and attaching the second strand portion to the second substrate via second stitching may include using stitching formed from a thermoplastic material. Applying at least one of heat and pressure to the substrate stack may include thermoforming the thermoplastic film of the first substrate and the first stitching to join the first strand portion and the first substrate and thermoforming the thermoplastic film of the second substrate and the second stitching to join the second strand portion and the second substrate. In some examples, the method includes attaching the first strand portion to the first substrate via first stitching and attaching the second strand portion to the second substrate via second stitching. Attaching the first strand portion to the substrate via first stitching and attaching the second strand portion to the substrate via second stitching may include using stitching formed from resin. Attaching the first strand portion to the substrate via first stitching and attaching the second strand portion to the substrate via second stitching may further include using stitching formed from the same material as the substrate.

In some examples, attaching the first strand portion to the substrate via first stitching and attaching the second strand portion to the substrate via second stitching includes using stitching having a higher melting point than the substrate. Applying at least one of heat and pressure may include activating a resin material incorporated into at least one of the first strand portion and the second stand portion. Applying at least one of heat and pressure may include subjecting the substrate stack to at least one of vacuum molding and compression molding. The method may include forming the first strand portion and the second strand portion from the same material. Additionally or alternatively, the method may include forming the first strand portion and the second strand portion from different materials.

In some examples, the method includes forming the first strand portion from a first tow of fibers. Forming the first strand portion from the first tow of fibers may include forming the first strand portion from at least one of carbon fibers, boron fibers, glass fibers, and polymeric fibers. The method may include forming the second strand portion from a second tow of fibers. Forming the second strand portion from the second tow of fibers may include forming the second strand portion from at least one of carbon fibers, boron fibers, glass fibers, and polymeric fibers. In some examples, forming the second strand from the second tow of fibers includes providing approximately the same number of fibers as the first tow of fibers. The second strand from the second tow of fibers may include providing a different number of fibers than the first tow of fibers.

In some configurations, the method includes providing the first strand portion and the second strand portion with different lengths. Additionally or alternatively, the method may include providing the first strand portion and the second strand portion with approximately the same length. At least one of attaching the first strand portion to the first substrate and attaching the second strand portion to the second substrate may include forming a void in at least one of the first layer and the second layer. The method may include exposing the substrate within the void. The method may also include providing the first strand portion and the second strand portion with different thicknesses. Additionally or alternatively, the method may include providing the first strand portion and the second strand portion with approximately the same thickness. In some examples, the first layer and the second layer are provided with different thicknesses. The method may further include providing the first layer and the second layer with approximately the same thickness. Conforming the substrate stack to the shape of the first mold surface may include providing the substrate stack with a forefoot portion, a midfoot portion, and a heel portion.

Yet another aspect of the disclosure provides a method of forming a plate for an article of footwear. The method includes providing a substrate having a forefoot region and a heel region, attaching a first strand portion to the substrate having a plurality of segments that extend between a first end disposed in the forefoot region and a second end disposed in the heel region, and crossing the plurality of segments in a midfoot region disposed between the forefoot region and the heel region.

In some implementations, attaching the first strand portion to the substrate includes attaching a continuous strand. Attaching the first strand portion to the substrate may include joining respective first ends of the plurality of segments via first looped portions and joining respective second ends of the plurality of segments via second looped portions to provide the first strand portion with a continuous construction. The method may also include extending the first strand portion onto an upper of the article of footwear.

In some examples, the method includes extending tensile strands between the first strand portion and an upper of the article of footwear. Extending tensile strands between the first strand portion and the upper may include connecting the first strand portion and the upper via the tensile strands. The method may include attaching the tensile strands to the first strand portion along at least one of the plurality of segments between the first end and the second end of the at least one of the plurality of segments. The method may further include extending the tensile strands between a lace operable to move the upper between a tightened state and a relaxed state and the at least one of the plurality of segments. Extending the tensile strands between the lace and the at least one of the plurality of segments may include connecting the tensile strands to the lace and the at least one of the plurality of segments.

In some configurations, the method includes providing the substrate with cleat members that extend from a surface thereof. The method may include attaching the first strand portion to the surface of the substrate and extending the first strand portion around a portion of the cleat members. The method may further include attaching the first strand portion to the surface of the substrate and surrounding at least one of the cleat members with the first strand portion. The method may also include attaching the first strand portion to the surface of the substrate and surrounding at least one of the cleat members with at least one of the plurality of segments. In some examples, the method includes weaving the plurality of segments together at the midfoot region.

The method may include forming the first strand portion from a first tow of fibers. Forming the first strand portion from the first tow of fibers may include forming the first strand portion from at least one of carbon fibers, boron fibers, glass fibers, and polymeric fibers. Attaching the first strand portion to the substrate may include forming at least one void between at least two of the segments. The method may also include exposing the substrate within the at least one void. In some examples, the method includes defining the at least one void between a first bundle of the plurality of segments and a second bundle of the plurality of segments. The method may further include exposing the substrate within the at least one void.

The details of one or more implementations of the disclosure are set forth in the accompanying drawings and the description below. Other aspects, features, and advantages will be apparent from the description and drawings, and from the claims.

During running movements, an application point of footwear providing the push-off force from the ground surface is located in a forefoot portion of the footwear. The application point of the footwear opposes a metatarsophalangeal (MTP) joint of the foot. A distance between an ankle joint of the athlete and a line of action of the application point providing the push-off force defines a lever arm length about the ankle. A mechanical demand for the ankle plantarflexors (e.g., calf muscles tendon unit) can be based on a push-off moment at the ankle determined by multiplying the length of the lever arm by a magnitude of the push-off force controlled by the athlete. Stiff and flat footwear plates generally increase the mechanical demand at the ankle due to stiff, flat plate causing the application point with the ground surface to shift anteriorly. As a result, the lever arm distance and the push-off moment increases at the ankle joint. Implementations herein are directed toward shorting the length of the lever arm from the ankle joint to reduce the push-off moment at the ankle by providing a stiff footwear plate that includes a curved portion opposing the MTP joint.

Figure 1:
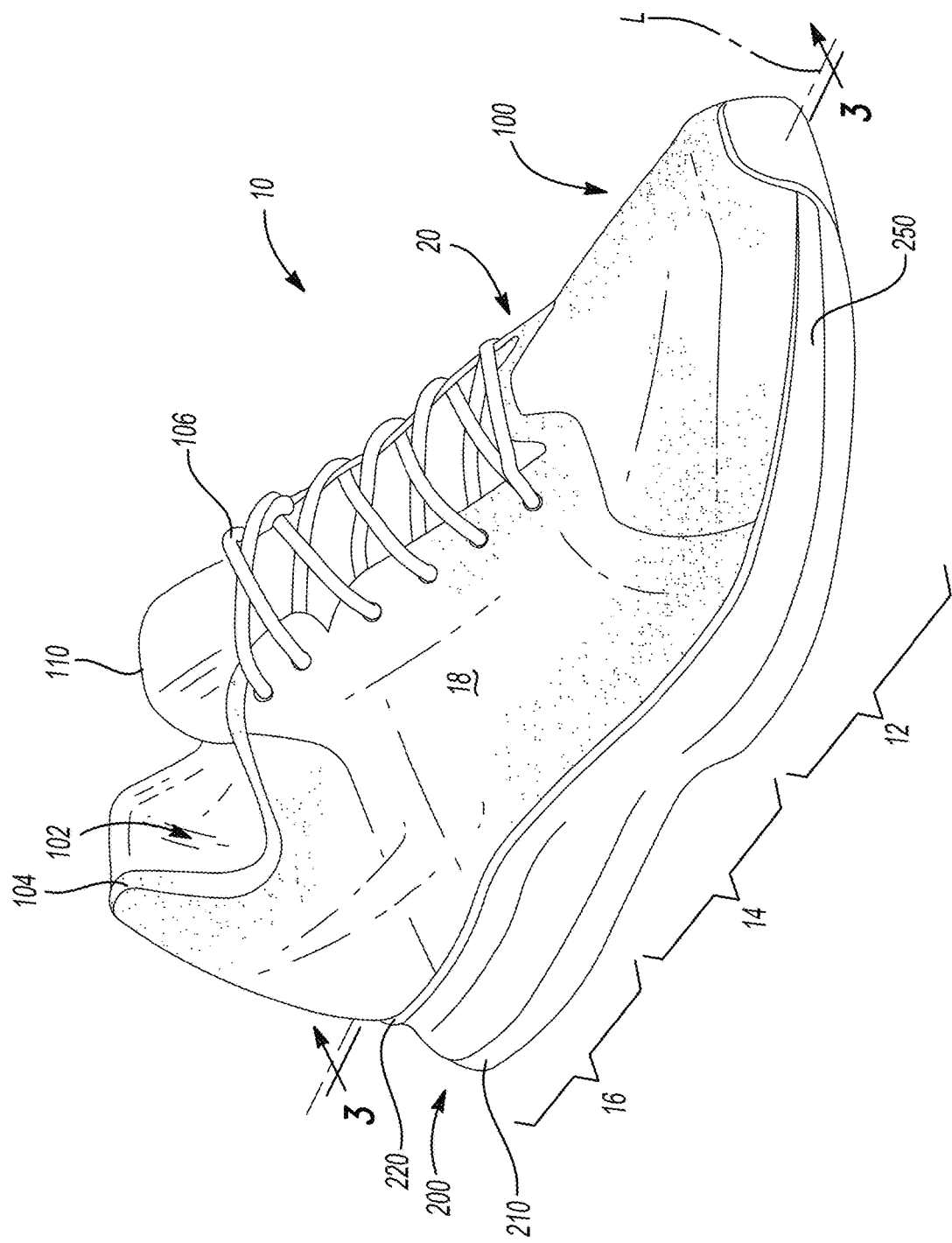
FIG. 1 is a top perspective view of an article of footwear in accordance with principles of the present disclosure.
Figure 2:
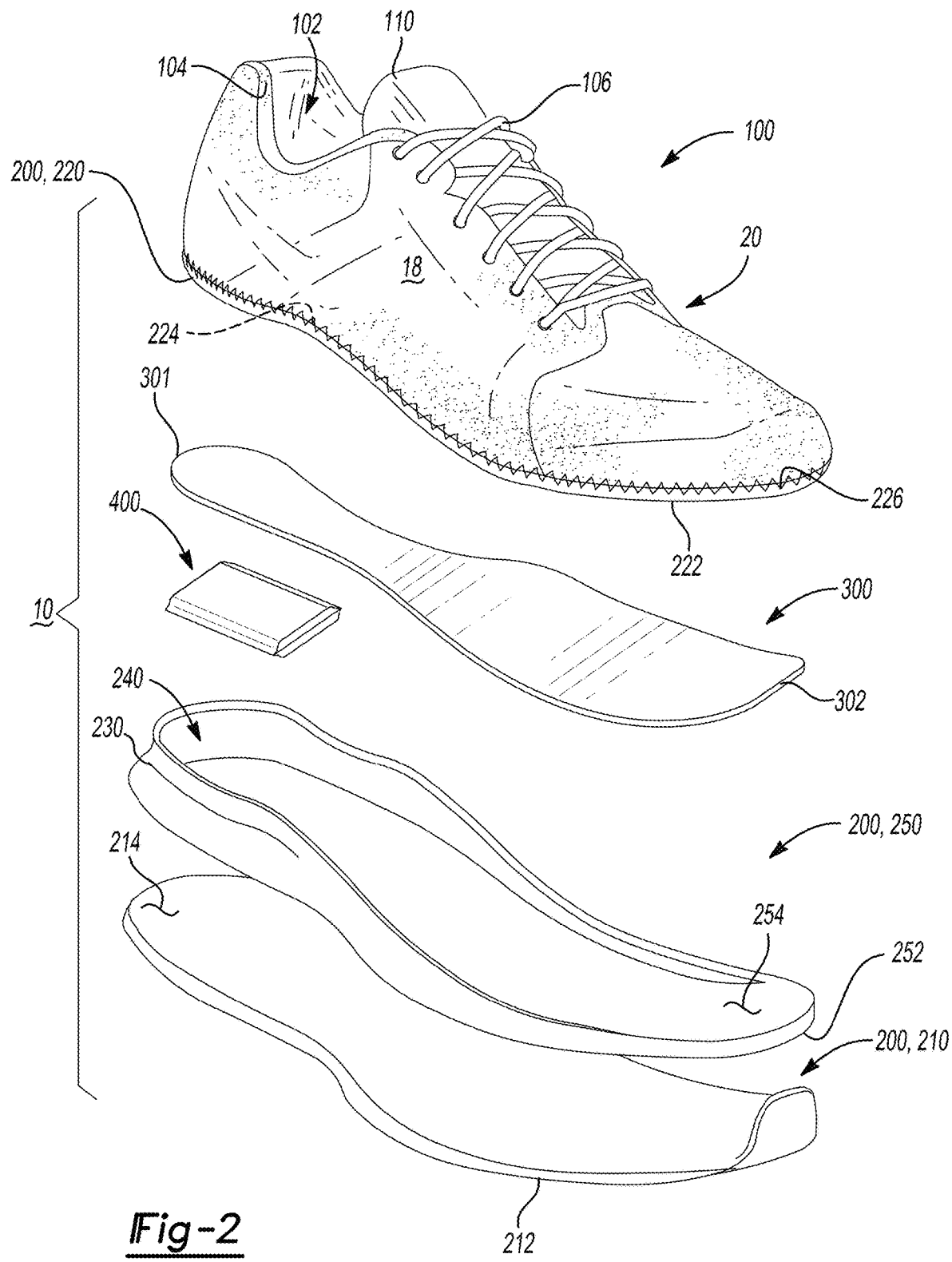
FIG. 2 is an exploded view of the article of footwear of FIG. 1 showing a footwear plate disposed upon a cushioning member within a cavity between an inner surface of an outsole and a bottom surface of a midsole.
Figure 3:
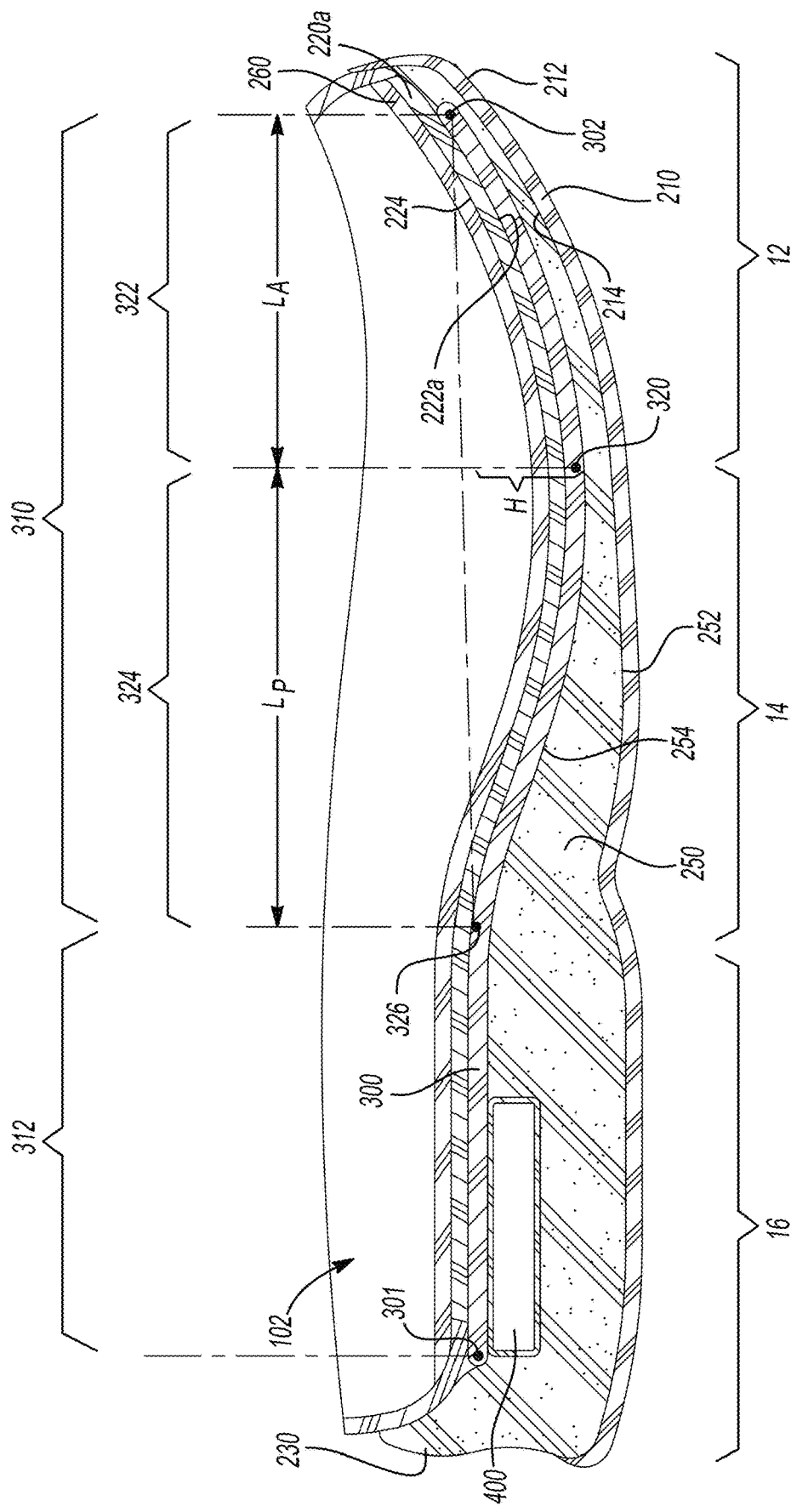
FIG. 3 is a cross-sectional view taken along line 3-3 of FIG. 1 showing a footwear plate disposed upon a cushioning member within a cavity between an inner surface of an outsole and a bottom surface of a midsole.

Referring to FIGS. 1-3, an article of footwear 10 is provided and includes an upper 100 and a sole structure 200 attached to the upper 100. The article of footwear 10 may be divided into one or more portions. The portions may include a forefoot portion 12, a mid-foot portion 14, and a heel portion 16. The forefoot portion 12 may correspond with toes and joints connecting metatarsal bones with phalanx bones of a foot during use of the footwear 10. The forefoot portion 12 may correspond with the MTP joint of the foot. The mid-foot portion 14 may correspond with an arch area of the foot, and the heel portion 16 may correspond with rear portions of the foot, including a calcaneus bone, during use of the article of footwear 10. The footwear 10 may include lateral and medial sides 18, 20, respectively, corresponding with opposite sides of the footwear 10 and extending through the portions 12, 14, 16.

The upper 100 includes interior surfaces that define an interior void 102 that receives and secures a foot for support on the sole structure 200, during use of the article of footwear 10. An ankle opening 104 in the heel portion 16 may provide access to the interior void 102. For example, the ankle opening 104 may receive a foot to secure the foot within the void 102 and facilitate entry and removal of the foot to and from the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited to, textiles, foam, leather, and synthetic leather. The materials may be selected and located to impart properties of durability, air-permeability, wear-resistance, flexibility, and comfort.

In some implementations, the sole structure 200 includes an outsole 210, a cushioning member 250, and a midsole 220 arranged in a layered configuration. The sole structure 200 (e.g., the outsole 210, the cushioning member 250, and the midsole 220) defines a longitudinal axis L. For example, the outsole 210 engages with a ground surface during use of the article of footwear 10, the midsole 220 attaches to the upper 100, and the cushioning member 250 is disposed therebetween to separate the midsole 220 from the outsole 210. The midsole 220 may correspond to a conventional strobel. Accordingly, the term "strobel" and "midsole" may be used interchangeably when referring to element 220 unless otherwise indicated. For example, the cushioning member 250 defines a bottom surface 252 opposing the outsole 210 and a top surface 254 disposed on an opposite side of the cushioning member 250 than the bottom surface 252 and opposing the midsole 220. The top surface 254 may be contoured to conform to the profile of the bottom surface (e.g., plantar) of the foot within the interior void 102. In some examples, the sole structure 200 may also incorporate additional layers such as an insole 260 (FIGS. 2 and 3) or sockliner, which may reside within the interior void 102 of the upper 100 to receive a plantar surface of the foot to enhance the comfort of the footwear 10. In some examples, a sidewall 230 surrounds at least a portion of a perimeter of the cushioning member 250 and separates the cushioning member 250 and the midsole/strobel 220 to define a cavity 240 therebetween. For instance, the sidewall 230 and the top surface 254 of the cushioning member 250 may cooperate to retain and support the foot upon the cushioning member 250 when the interior void 102 receives the foot therein. For instance, the sidewall 230 may define a rim around at least a portion of the perimeter of the contoured top surface 254 of the cushioning member 250 to cradle the foot during use of the footwear 10 when performing walking or running movements. The rim may extend around the perimeter of the midsole 220 when the cushioning member 250 attaches to the midsole 220.

In some configurations, a footwear plate 300 is disposed upon the top surface 254 of the cushioning member 250 and underneath the midsole 220 to reduce energy loss at the MTP joint while enhancing rolling of the foot as the footwear 10 rolls for engagement with a ground surface during a running motion. The footwear plate 300 may define a length extending through at least a portion of the length of the sole structure 200. In some examples, the length of the plate 300 extends through the forefoot, mid-foot, and heel portions 12, 14, 16 of the sole structure 200. In other examples, the length of the plate 300 extends through the forefoot portion 12 and the mid-foot portion 14, and is absent from the heel portion 16.

In some examples, the footwear plate 300 includes a uniform local stiffness (e.g., tensile strength or flexural strength) throughout the entire surface area of the plate 300. The stiffness of the plate may be anisotropic where the stiffness in one direction across the plate is different from the stiffness in another direction. For instance, the plate 300 may be formed from at least two layers of fibers anisotropic to one another to impart gradient stiffness and gradient load paths across the plate 300. In one configuration, the plate 300 provides a greater longitudinal stiffness (e.g., in a direction along the longitudinal axis L) than a transverse stiffness (e.g., in a direction transverse to the longitudinal axis L). In one example, the transverse stiffness is at least ten percent (10%) lower than the longitudinal stiffness. In another example, the transverse stiffness is from about ten percent (10%) to about twenty percent (20%) of the longitudinal stiffness. In some configurations, the plate 300 is formed from one or more layers of tows of fibers and/or layers of fibers including at least one of carbon fibers, boron fibers, glass fibers, and polymeric fibers. In a particular configuration, the fibers include carbon fibers, or glass fibers, or a combination of both carbon fibers and glass fibers. The tows of fibers may be affixed to a substrate. The tows of fibers may be affixed by stitching or using an adhesive. Additionally or alternatively, the tows of fibers and/or layers of fibers may be consolidated with a thermoset polymer and/or a thermoplastic polymer. Accordingly, the plate 300 may have a tensile strength or flexural strength in a transverse direction substantially perpendicular to the longitudinal axis L. The stiffness of the plate 300 may be selected for a particular wearer based on the wearer's tendon flexibility, calf muscle strength, and/or MTP joint flexibility. Moreover, the stiffness of the plate 300 may also be tailored based upon a running motion of the athlete. In other configurations, the plate 300 is formed from one or more layers/plies of unidirectional tape. In some examples, each layer in the stack includes a different orientation than the layer disposed underneath. The plate may be formed from unidirectional tape including at least one of carbon fibers, boron fibers, glass fibers, and polymeric fibers. In some examples, the one or more materials forming the plate 300 include a Young's modulus of at least 70 gigapascals (GPa).

In some implementations, the plate 300 includes a substantially uniform thickness. In some examples, the thickness of the plate 300 ranges from about 0.6 millimeter (mm) to about 3.0 mm. In one example, the thickness of the plate is substantially equal to one 1.0 mm. In other implementations, the thickness of the plate 300 is non-uniform such that the plate 300 may define a greater thickness in the mid-foot portion 14 of the sole structure 200 than the thicknesses in the forefoot portion 12 and the heel portion 16.

The outsole 210 may include a ground-engaging surface 212 and an opposite inner surface 214. The outsole 210 may attach to the upper 100. In some examples, the bottom surface 252 of the cushioning member 250 affixes to the inner surface 214 of the outsole and the sidewall 230 extends from the perimeter of the cushioning member 250 and attaches to the midsole 220 or the upper 100. The example of FIG. 1 shows the outsole 210 attaching to the upper 100 proximate to a tip of the forefoot portion 12. The outsole 210 generally provides abrasion-resistance and traction with the ground surface during use of the article of footwear 10. The outsole 210 may be formed from one or more materials that impart durability and wear-resistance, as well as enhance traction with the ground surface. For example, rubber may form at least a portion of the outsole 210.

The midsole/strobel 220 may include a bottom surface 222 and a footbed 224 disposed on an opposite side of the midsole 220 than the bottom surface 222. Stitching 226 or adhesives may secure the midsole 220 to the upper 100. The footbed 224 may be contoured to conform to a profile of the bottom surface (e.g., plantar) of the foot. The bottom surface 222 may oppose the inner surface 214 of the outsole 210 to define a space therebetween for receiving the cushioning member 250.

FIG. 2 provides an exploded view of the article of footwear 10 showing the outsole 210, the cushioning member 250 disposed upon the inner surface 214 of the outsole 210, and the substantially rigid footwear plate 300 disposed between the top surface 254 of the cushioning member 250 and the bottom surface 222 of the midsole 220. The cushioning member 250 may be sized and shaped to occupy at least a portion of empty space between the outsole 210 and the midsole 220. Here, the cavity 240 between the cushioning member 250 and the bottom surface 222 of the midsole 220 defines a remaining portion of empty space that receives the footwear plate 300. Accordingly, the cushioning member 250 and the plate 300 may substantially occupy the entire volume of space between the bottom surface 222 of the midsole 220 and the inner surface 214 of the outsole 210. The cushioning member 250 may compress resiliently between the midsole 220 and the outsole 210. In some configurations, the cushioning member 250 corresponds to a slab of polymer foam having a surface profile configured to receive the footwear plate 300 thereon. The cushioning member 250 may be formed from any suitable materials that compress resiliently under applied loads. Examples of suitable polymer materials for the foam materials include ethylene vinyl acetate (EVA) copolymers, polyurethanes, polyethers, and olefin block copolymers. The foam can also include a single polymeric material or a blend of two or more polymeric materials including a polyether block amide (PEBA) copolymer, the EVA copolymer, a thermoplastic polyurethane (TPU), and/or the olefin block copolymer. The cushioning member 250 may include a density within a range from about 0.05 grams per cubic centimeter (g/cm$^3$) to about 0.20 g/cm$^3$. In some examples, the density of the cushioning member 250 is approximately 0.1 g/cm$^3$. Moreover, the cushioning member 250 may include a hardness within the range from about eleven (11) Shore A to about fifty (50) Shore A. The one or more materials forming the cushioning member 250 may be suitable for providing an energy return of at least 60-percent (60%).

In some examples, a fluid-filled bladder 400 is disposed between the footwear plate 300 and the cushioning member 250 in at least one portion 12, 14, 16 of the sole structure 200 to enhance cushioning characteristics of the footwear 10 responsive to ground-reaction forces. For instance, the fluid-filled bladder 400 may define an interior void that receives a pressurized fluid and provides a durable sealed barrier for retaining the pressurized fluid therein. The pressurized fluid may be air, nitrogen, helium, or dense gases such as sulfur hexafluoride. The fluid-filled bladder may additionally or alternatively contain liquids or gels. In other examples, the fluid-filled bladder 400 is disposed between the cushioning member 250 and the outsole 210, or between the plate 300 and the midsole 220. FIGS. 2 and 3 show the fluid-filled bladder 400 residing in the heel portion 16 of the sole structure 200 to assist with attenuating the initial impact with the ground surface occurring in the heel portion 16. In other configurations, one or more fluid-filled bladders 400 may additionally or alternatively extend through the mid-foot portion 14 and/or forefoot portion 12 of the sole structure 200. The cushioning member 250 and the fluid-filled bladder 400 may cooperate with enhance functionality and cushioning characteristics when the sole structure 200 is under load.

The length of the footwear plate 300 may extend between a first end 301 and a second end 302. The first end 301 may be disposed proximate to the heel portion 16 of the sole structure 200 and the second end 302 may be disposed proximate to the forefoot portion 12 of the sole structure 200. The first end 301 may also be referred to as a "posterior-most point" of the plate 300 while the second end 302 may also be referred to as an "anterior-most point" of the plate. In some examples, the length of the footwear plate 300 is less than a length of the cushioning member 250. The footwear plate 300 may also include a thickness extending substantially perpendicular to the longitudinal axis L of the sole structure 200 and a width extending between the lateral side 18 and the medial side 20. Accordingly, the length, the width, and the thickness of the plate 300 may substantially occupy the cavity 240 defined by the top surface 254 of the cushioning member 250 and the bottom surface 222 of the midsole and may extend through the forefoot, mid-foot, and heel portions 12, 14, 16, respectively, of the sole structure 200. In some examples (e.g., FIG. 35), peripheral edges of the footwear plate 300 are visible along the lateral and/or medial sides 18, 20 of the footwear 10.

Referring to FIG. 3, a partial cross-sectional view taken along line 3-3 of FIG. 1 shows the footwear plate 300 disposed between the cushioning member 250 and the midsole 220 and the cushioning member 250 disposed between the outsole 210 and the footwear plate 300. The insole 260 may be disposed upon the footbed 224 within the interior void 102 under the foot. FIG. 3 shows the cushioning member 250 defining a reduced thickness to accommodate the fluid-filled bladder 400 within the heel region 16. In some examples, the cushioning member 250 encapsulates the bladder 400, while in other examples, the cushioning member 250 merely defines a cut-out for receiving the bladder 400. In some configurations, a portion of the plate 300 is in direct contact with the fluid-filled bladder 400. The cushioning member 250 may define a greater thickness in the heel portion 16 of the sole structure 200 than in the forefoot portion 12. In other words, the gap or distance separating the outsole 210 and the midsole 220 decreases in a direction along the longitudinal axis L of the sole structure 200 from the heel portion 16 toward the forefoot portion 12. In some implementations, the top surface 254 of the cushioning member 250 is smooth and includes a surface profile contoured to match the surface profile of the footwear plate 300 such that the footwear plate 300 and the cushioning member 250 mate flush with one another. The cushioning member 250 may define a thickness in the forefoot portion 12 of the sole structure within a range from about seven (7) millimeters (mm) to about twenty (20) mm. In one example, the thickness of the cushioning member 250 in the forefoot portion 12 is about twelve (12) mm.

In some configurations, e.g., the footwear plate 10f of FIGS. 33 and 34, footwear having spikes for track events, i.e., "track shoes", incorporates a cushioning member 250f (FIG. 34) within the forefoot portion 12 between the plate 300 and outsole 210 that has a reduced thickness of about eight (8) mm. In these configurations, the cushioning member 250 may be absent between the plate 300 and outsole 210 within the forefoot portion 12. Moreover, cushioning material associated with the same cushioning member 250 or a different cushioning member may be disposed between the plate 300 and the midsole 220 and extend through the forefoot, mid-foot, and heel portions 12, 14, 16, respectively.

The footwear plate 300 includes a curved region 310 extending through the forefoot portion 12 and the mid-foot portion 14 of the sole structure 200. The terms "curved portion", "concave portion", and "circular portion" may also be used to describe the curved region 310. The footwear plate 300 may optionally include a substantially flat region 312 extending through the heel portion 16 from the curved region 310 to the posterior-most point 301 of the plate 300. The curved region 310 is associated with a radius of curvature about an MTP point 320 to define an anterior curved portion 322 extending from one side of the MTP point 320 and a posterior curved portion 324 extending from the other side of the MTP point 320. For instance, the anterior curved portion 322 extends between the MTP point 320 and the anterior-most point (AMP) 302 (e.g., second end 302) of the plate 300, while the posterior curved portion 324 extends between the MTP point 320 and an aft point 326 disposed at a junction of the curved region 310 and the flat region 312. In some examples, the anterior curved portion 322 and the posterior curved portion 324 are associated with the same radius of curvature that is mirrored about the MTP point 320. In other examples, the anterior curved portion 322 and the posterior curved portion 324 are each associated with a different radius of curvature. In some configurations, a portion of the posterior curved portion 324 is associated with the same radius of curvature as the anterior curved portion 322. Accordingly, the curved portions 322, 324 may each include a corresponding radius of curvature that may be the same or may be different from one another. In some examples, the radius of curvatures differ from one another by at least two percent (2%). The radius of curvatures for the curved regions 322, 324 may range from 200 millimeters (mm) to about 400 mm. In some configurations, the anterior curved portion 322 includes a radius of curvature that continues the curvature of the posterior curved portion 324 such that the curved portions 322, 324 define the same radius of curvature and share a same vertex. Additionally or alternatively, the plate may define a radius of curvature that connects the posterior curved portion 324 to the substantially flat region 312 of the plate 300. As used herein, the term "substantially flat" refers to the flat region 312 within five (5) degrees horizontal, i.e., within five (5) degrees parallel to the ground surface.

The MTP point 320 is the closest point of the footwear plate 300 to the inner surface 214 of the outsole 210 while the aft point 326 and the AMP 302 of the plate 300 are disposed further from the outsole 210 than the MTP point 320. In some configurations, the posterior-most point 301 and the AMP 302 are co-planar. In some examples, the MTP point 320 of the plate 300 is disposed directly below the MTP joint of the foot when the foot is received within the interior void 102 of the upper 100. In other examples, the MTP point 320 is disposed at a location that is further from a toe end of the sole structure 200 than the MTP joint. The anterior curved and posterior curved portions 322, 324, respectively, of the curved region 310 provide the plate 300 with a longitudinal stiffness that reduces energy loss proximate to the MTP joint of the foot, as well as enhances rolling of the foot during running motions to thereby reduce a lever arm distance and alleviate strain on the ankle joint.

In some implementations, the AMP 302 and the aft point 326 are located above the MTP point 320 by a distance substantially equal to position height H. Here, the position height H extends from the MTP 320 in a direction substantially perpendicular to the longitudinal axis L of the sole structure 200. The height H ranges from about three (3) millimeters (mm) to about twenty-eight (28) mm. In other examples, the height H ranges from about three (3) mm to about seventeen (17) mm. In one example, the height H is equal to about seventeen (17) mm. Thus, the toes of the foot residing above the anterior curved portion 322 may be biased upward due to the anterior curved portion 322 extending away from the outsole 210 from the MTP point 320 toward the AMP 302. Additionally or alternatively, a length $L_A$ of the anterior curved portion 322 may be substantially equal to a length $L_P$ of the posterior curved portion 324. As used herein, the $L_A$ and $L_P$ are each measured along a line extending substantially parallel to the longitudinal axis L between the MTP point 320 and respective ones of the AMP 302 and the aft point 326. In other words, the lengths $L_A$ and $L_P$ are each associated with a distance between the MTP point 320 and a corresponding one of the AMP 302 and the aft point 326. In some configurations, the $L_A$ and the $L_P$ are each equal to about thirty percent (30%) of a total length of the plate 300 while a length of the flat region 312 accounts for the remaining forty percent (40%) of the total length of the plate 300. In other configurations, the $L_A$ is equal from about twenty-five percent (25%) to about thirty-five percent (35%) of the total length of the plate 300, $L_P$ is equal from about twenty-five percent (25%) to about thirty-five percent (35%) of the total length of the plate 300, and the length of the flat region 312 is equal to the balance. In other configurations, $L_A$, $L_P$, and the length of the flat region 312 are substantially equal. Varying the radius of curvature of the curved region 310 causes the lengths $L_A$ and $L_P$ and/or the height (H) of the anterior-most point 302 and the aft point 306 to change relative to the MTP point 320. For instance, decreasing the radius of curvature causes an angle between the MTP point 320 and the AMP 302 to increase as well as the height H of the AMP 302 above the MTP point 320 to also increase. In configurations when the curved portions 322, 324 each include a different radius of curvature, the corresponding lengths La and Lp and/or the height from the MTP point 320 may be different. Accordingly, the radius of curvature of the curved region 310 may vary for different shoe sizes, may vary depending upon an intended use of the footwear 10, and/or may vary based upon the anatomical features of the foot on a wearer-by-wear basis.

In some implementations, the MTP point 320 is located approximately thirty percent (30%) of the total length of the plate from the AMP 302. A center of the radius of curvature of the curved region 310 may be located at the MTP point 320. In some examples, the curved region 310 (e.g., concave portion and convex portion opposite the concave portion) is associated with a constant radius of curvature that extends from the AMP 302 past the MTP point 320. In these examples, the constant radius of curvature may extend from the AMP 302 past the MTP point 320 at least forty percent (40%) of the total length of the plate 300 from the AMP 302.

Figure 4:
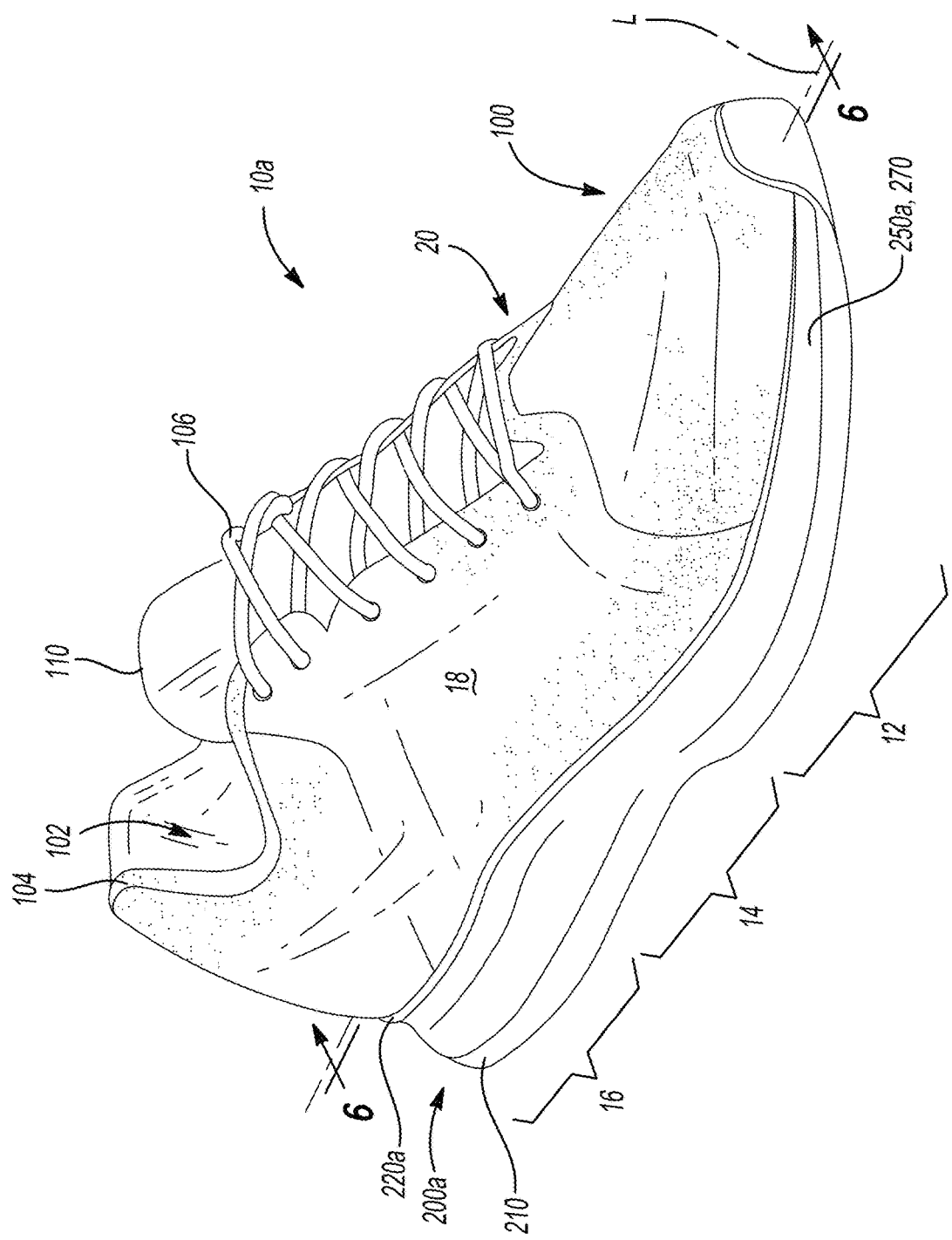
FIG. 4 is a top perspective view of an article of footwear in accordance with principles of the present disclosure.
Figure 5:
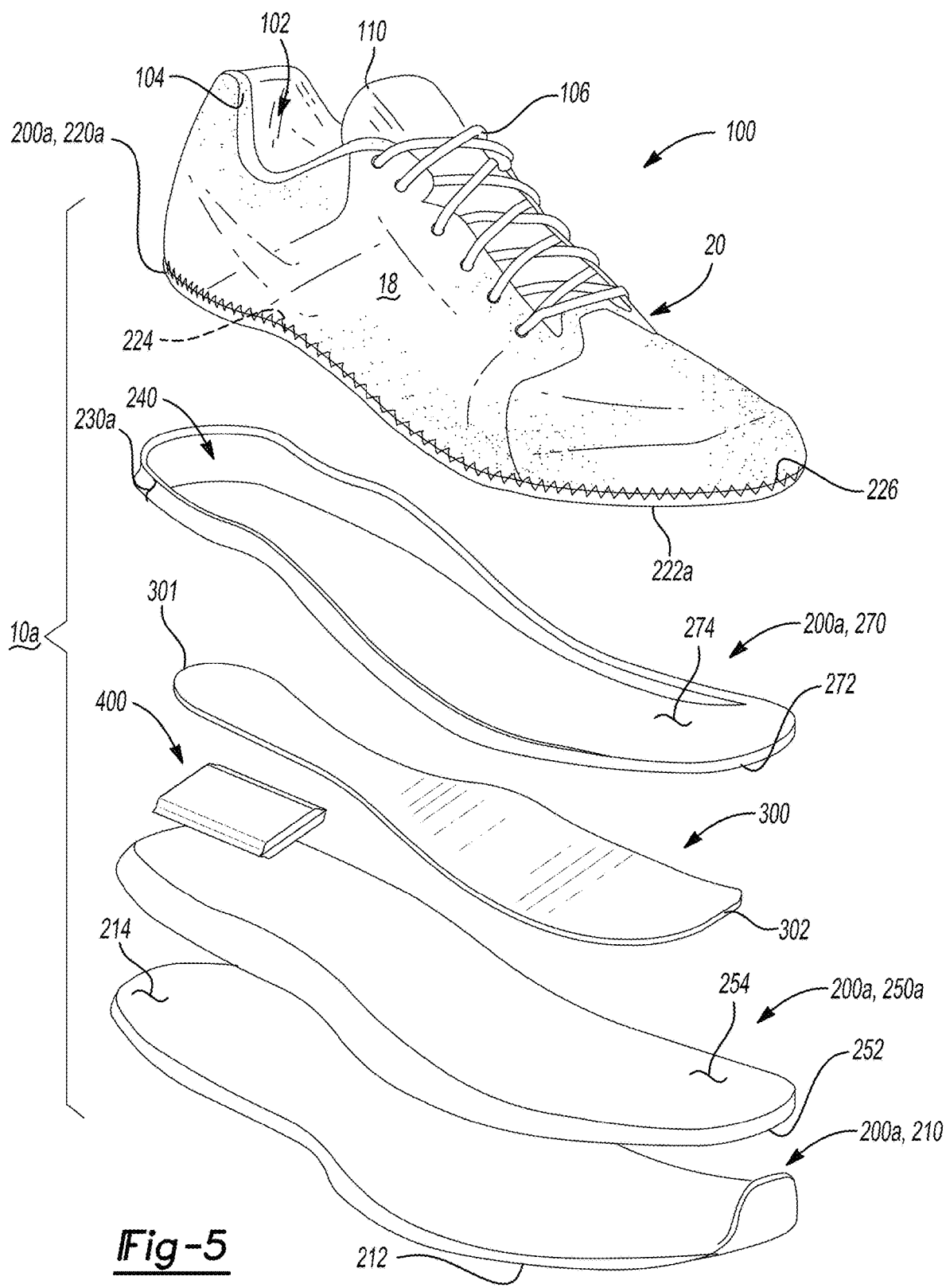
FIG. 5 is an exploded view of the article of footwear of FIG. 4 showing a footwear plate disposed between a first cushioning member and a second cushioning member within a cavity between an inner surface of an outsole and a bottom surface of a midsole.
Figure 6:
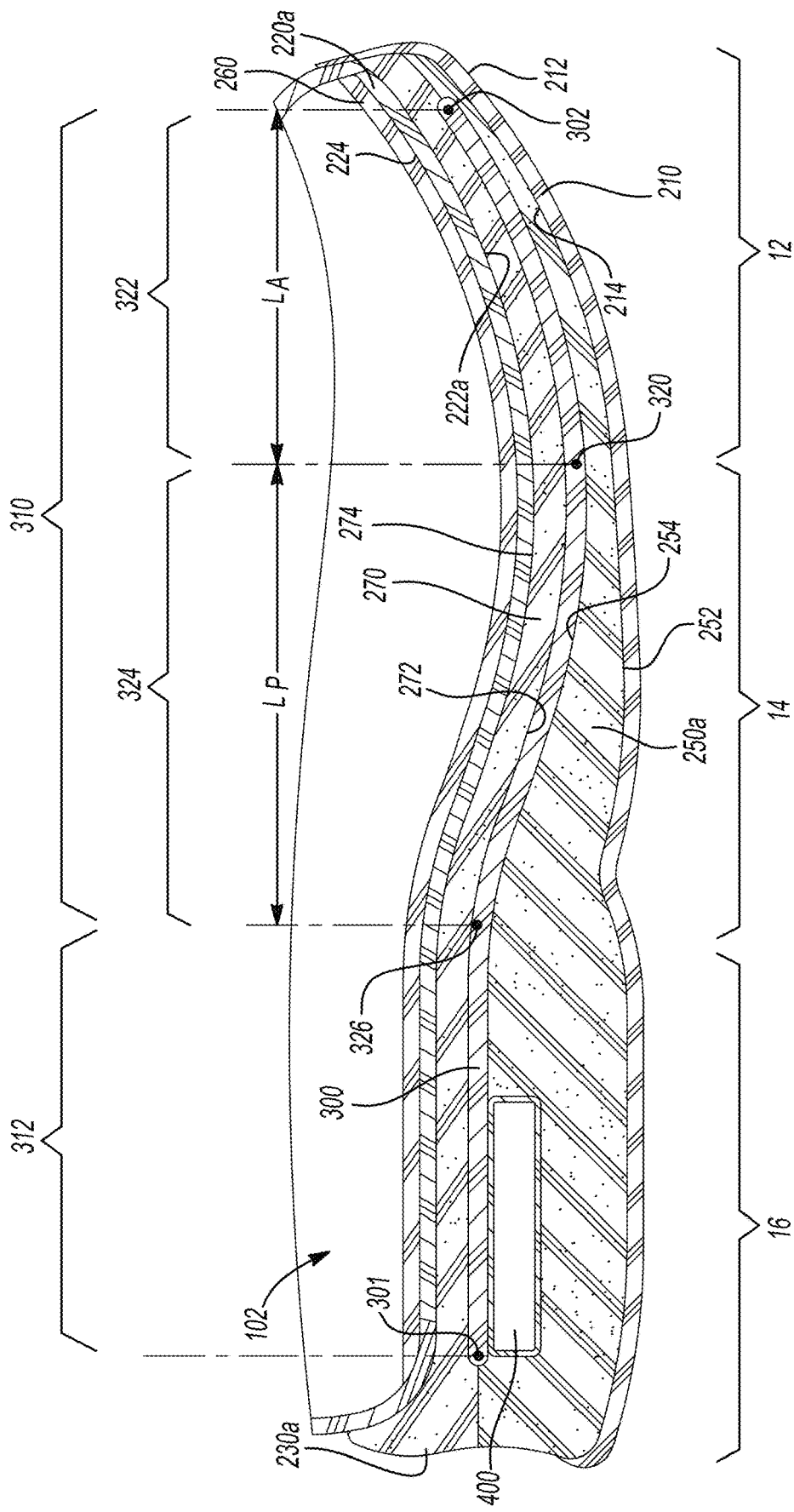
FIG. 6 is a cross-sectional view taken along line 6-6 of FIG. 4 showing a footwear plate disposed between a first cushioning member and a second cushioning member within a cavity between an inner surface of an out sole and a bottom surface of a midsole.

FIGS. 4-6 provide an article of footwear 10a that includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The sole structure 200a may include the outsole 210, a first cushioning member 250a, the footwear plate 300, a second cushioning member 270, and a midsole/strobel 220a arranged in the layered configuration. FIG. 5 provides an exploded view of the article of footwear 10a showing the sole structure 200a (e.g., the outsole 210, the cushioning members 250a, 270, the plate 300, and the midsole 220a) defining a longitudinal axis L. The outsole 210 includes the inner surface 214 disposed on an opposite side of the outsole 210 than the ground-engaging surface 212. The midsole 220a includes a bottom surface 222a disposed on an opposite side of the midsole 220a than the footbed 224 and opposing the inner surface 214 of the outsole 210.

The first cushioning member 250a, the footwear plate 300, and the second cushioning member 270 are disposed between the inner surface 214 and the bottom surface 222a to separate the midsole 220a from the outsole 210. For example, the first cushioning member 250a includes the bottom surface 252 received by the inner surface 214 of the outsole 210 and a top surface 254a disposed on an opposite side of the cushioning member 250a than the bottom surface 252 and opposing the midsole 220a to support the footwear plate 300 thereon. The second cushioning member 270 is disposed on an opposite side of the footwear plate 300 than the first cushioning member. For instance, the second cushioning member 270 includes a bottom surface 272 opposing the footwear plate 300 and a top surface 274 disposed on an opposite side of the second cushioning member 270 than the bottom surface 272 and opposing the bottom surface 222a of the midsole 220a. The top surface 274 may be contoured to conform to the profile of the bottom surface (e.g., plantar) of the foot within the interior void 102. As with the cushioning member 250 of FIGS. 1-3, the second cushioning member 270 may define a sidewall 230a surrounding at least a portion of a perimeter of the second cushioning member 270. The sidewall 230a may define a rim that extends around the perimeter of the midsole 220a when the second cushioning member 270 attaches to the midsole 220a.

In some configurations, a total thickness of the first and second cushioning members 250a, 270, respectively, is equal to the thickness of the cushioning member 250 of the article of footwear 10 of FIGS. 1-3. The thickness of the first cushioning member 250 may be the same or different than the thickness of the second cushioning member 270. The first and second cushioning members 250a, 270 are operative to embed or sandwich the footwear plate 300 therebetween such that the footwear plate 300 is spaced apart from both the inner surface 214 of the outsole 210 and the bottom surface 222a of the midsole 220a. Accordingly, the cushioning members 250a, 270 and the plate 300 may substantially occupy the entire volume of space between the bottom surface 222a of the midsole/strobel 220a and the inner surface 214 of the outsole 210.

The cushioning members 250a, 270 may compress resiliently between the midsole 220 and the outsole 210. The cushioning members 250a, 270 may each be formed from a slab of polymer foam which may be formed from the same one or more materials forming the cushioning member 250 of FIGS. 1-3. For instance, the cushioning members 250a, 270 may be formed from one or more of EVA copolymers, polyurethanes, polyethers, olefin block copolymers, PEBA copolymers, and/or TPUs. In some implementations, the cushioning members 250a, 270 provide different cushioning characteristics. For instance, the first cushioning member 250a may compress resiliently under applied loads to prevent the plate 300 from translating into contact with ground surface while the second cushioning member 270 may provide a level of soft-type cushioning for the foot to attenuate ground-reaction forces and enhance comfort for the wearer's foot. The sole structure 200a may also incorporate the fluid-filled bladder 400 between the footwear plate 300 and the first cushioning member 250a in at least one portion 12, 14, 16 of the sole structure to enhance cushioning characteristics of the footwear 10 in responsive to ground-reaction forces. For instance, the bladder 400 may be filled with a pressurized fluid such as air, nitrogen, helium, sulfur hexafluoride, or liquids/gels. Accordingly, the cushioning members 250a, 270 separated by the plate 300 and the fluid-filled bladder 400 may cooperate to provide gradient cushioning to the article of footwear 10a that changes as the applied load changes (i.e., the greater the load, the more the cushioning members 250a, 270 compress and, thus, the more responsive the footwear performs). The cushioning members 250a, 270 may include densities within a range from about 0.05 g/cm$^3$ to about 0.20 g/cm$^3$. In some examples, the density of the cushioning members 250a, 270 is approximately 0.1 g/cm$^3$. Moreover, the cushioning members 250a, 270 may include hardnesses within the range from about eleven (11) Shore A to about fifty (50) Shore A.

The one or more materials forming the cushioning members 250a, 270 may be suitable for providing an energy return of at least 60-percent (60%).

The footwear plate 300 defines the length extending between the first end 301 and the second end 302 (e.g., AMP 302) that may be the same as or less than the lengths of the cushioning members 250a, 270. The length, width, and thickness of the plate 300 may substantially occupy the volume of space between the top surface 254 of the first cushioning member 250 and the bottom surface 272 of the second cushioning member 270 and may extend through the forefoot, mid-foot, and heel portions 12, 14, 16, respectively, of the sole structure 200a. In some examples, the plate 300 extends through the forefoot portion 12 and the mid-foot portion 14 of the sole structure 200a but is absent from the heel portion 16. In some examples, peripheral edges of the footwear plate 300 are visible along the lateral and/or medial sides 18, 20 of the footwear 10a. In some implementations, the top surface 254 of the first cushioning member 250a and the bottom surface 272 of the second cushioning member 270 are smooth and include surface profiles contoured to match the surface profiles of the opposing sides of the footwear plate 300 such that the footwear plate 300 mates flush with each of the cushioning members 250a, 270.

As described above with reference to FIGS. 1-3, the footwear plate 300 may include the uniform local stiffness that may or may not be anisotropic. For instance, the plate 300 may be formed from one or more layers and/or tows of fibers including at least one of carbon fibers, boron fibers, glass fibers, and polymeric fibers. Thus, the plate 300 may provide a greater thickness along the longitudinal direction of the sole structure than the stiffness in direction transverse (e.g., perpendicular) to the longitudinal axis L. For instance, the stiffness of the plate 300 in the transverse direction may be at least 10-percent less than the stiffness of the plate 300 in the longitudinal direction, or may be approximately 10-percent to 20-percent of the thickness of the plate 300 along the longitudinal direction (e.g., parallel to longitudinal axis L). Moreover, the plate 300 may include a substantially uniform thickness within the range of about 0.6 mm to about 3.0 mm across the plate 300 or a non-uniform thickness that varies across the plate, e.g., the thickness of the plate 300 in the mid-foot portion 14 is greater than the thicknesses in the forefoot portion 12 and the heel portion 16.

FIG. 6 provides a partial cross-sectional view taken along line 6-6 of FIG. 4 showing the footwear plate 300 disposed between the first and second cushioning members 250a, 270, respectively, the first cushioning member 250a disposed between the outsole 210 and the footwear plate 300, and the second cushioning member 270 disposed between the midsole 220a and the footwear plate 300. The insole 260 may be disposed upon the footbed 224 within the interior void 102 under the foot. The first cushioning member 250a may encapsulate the bladder 400 or define a cut-out for receiving the bladder 400, while a portion of the plate 300 may be in direct contact with the bladder 400. According to at least one aspect, one of a first distal end and a second distal end of the bladder 400 can be substantially aligned with an edge of the plate 300 and, more particularly, with the first end or posterior-most point 301 of the plate 300. In some configurations, the first cushioning member 250a defines a greater thickness in the heel portion 16 of the sole structure 200a than in the forefoot portion 12 and the top surface 254 includes a surface profile contoured to match the surface profile of the footwear plate 300 supported thereon. The second cushioning member 270 may cooperate with the first cushioning member 250a to define a space for enclosing the footwear plate 300 therebetween. For instance, portions of the bottom surface 272 of the second cushioning member 270 and the top surface 254 of the first cushioning member 250a may be recessed to define a cavity for retaining the footwear plate 300. In some implementations, the thickness of the second cushioning member 270 is greater in the forefoot and mid-foot portions 12, 14, respectively, than the thickness of the first cushioning member 250a. Advantageously, the increased thickness provided by the second cushioning member 270 in the forefoot and mid-foot portions 12, 14, respectively, increases the separation distance between the MTP joint of the foot and the footwear plate 300 and, thus, enhances cushioning characteristics of the footwear 10a in response to ground-reaction forces when the footwear 10a performs running movements/motions. In some configurations, the thickness of the second cushioning member 270 is greater than the thickness of the first cushioning member 250a at locations opposing the MTP point 320 of the plate 300. In these configurations, the second cushioning member 270 may define a maximum thickness at a location opposing the MTP point 320 that is equal to a value within a range from about 3.0 mm to about 13.0 mm. In one example, the maximum thickness is equal to approximately 10.0 mm. The thickness of the second cushioning member 270 may taper along the direction from the MTP point 320 to the AMP 302 such that the thickness of the second cushioning member 270 proximate to the AMP 302 is approximately sixty-percent (60%) less than the maximum thickness proximate to the MTP point 320. On the other hand, the first cushioning member 250a may define a minimum thickness at the location opposing the MTP point 320 that is equal to a value within a range from about 0.5 mm to about 6.0 mm. In one example, the minimum thickness is equal to approximately 3.0 mm.

The footwear plate 300 includes the curved region 310 extending through the forefoot portion 12 and the mid-foot portion 14 and may optionally include the substantially flat region 312 extending through the heel portion 16 from the aft point 326 at the curved region 310 to the posterior-most point 301 of the plate 300. The radius of curvature of the curved region 310 defines the anterior curved portion 322 extending between MTP point 320 and the AMP 302 at the toe end of the sole structure 200a, and the posterior curved portion 322 extending between the MTP point 320 and the aft point 326. In some configurations, the anterior curved portion 322 and the posterior curved portion 324 each include the same radius of curvature mirrored about the MTP point 320. In other configurations, the curved portions 322, 324 are each associated with a different radius of curvature. Accordingly, the curved portions 322, 324 may each include a corresponding radius of curvature that may be the same or may be different from one another. In some examples, the radius of curvatures differ from one another by at least two percent (2%). The radius of curvatures for the curved regions 322, 324 may range from about 200 millimeters (mm) to about 400 mm. In some configurations, the anterior curved portion 322 includes a radius of curvature that continues the curvature of the posterior curved portion 324 such that the curved portions 322, 324 define the same radius of curvature and share a same vertex. Additionally or alternatively, the plate may define a radius of curvature that connects the posterior curved portion 324 to the substantially flat region 312 of the plate 300. As used herein, the term "substantially flat" refers to the flat region 312 within five (5) degrees horizontal, i.e., within five (5) degrees parallel to the ground surface.

The curved portions 322, 324 may each account for about 30-percent (%) of the total length of the plate 300 while the length of the flat region 312 may account for the remaining 40-percent (%) of the length of the plate 300. The anterior curved and posterior curved portions 322, 324, respectively, of the curved region 310 provide the plate 300 with a longitudinal stiffness that reduces energy loss proximate to the MTP joint of the foot, as well as enhances rolling of the foot during running motions to thereby reduce a lever arm distance and alleviate strain on the ankle joint. The AMP 302 and the aft point 326 are located above the MTP point 320 and may be located above the MTP point 320 by a distance substantially equal position height H. Moreover, the length $L_A$ of the anterior curved portion 322 and the length $L_P$ of the posterior curved portion 324 (e.g., measured along the line extending substantially parallel to the longitudinal axis L between the MTP point 320 and respective ones of the AMP 302 and the aft point 326) may be substantially equal to one another or may be different. As described above with reference to FIGS. 1-3, varying the radius of curvature of the curved region 310 causes the lengths $L_A$ and $L_P$ and/or the height (H) of the anterior most point 302 and the aft point 306 to change relative to the MTP point 320. In doing so, the stiffness of the plate 300 may vary to provide a custom footwear plate 300 tailored for the wearer's shoe size, the intended use of the footwear 10, and/or the wearer's anatomical features of the foot.

Figure 7:
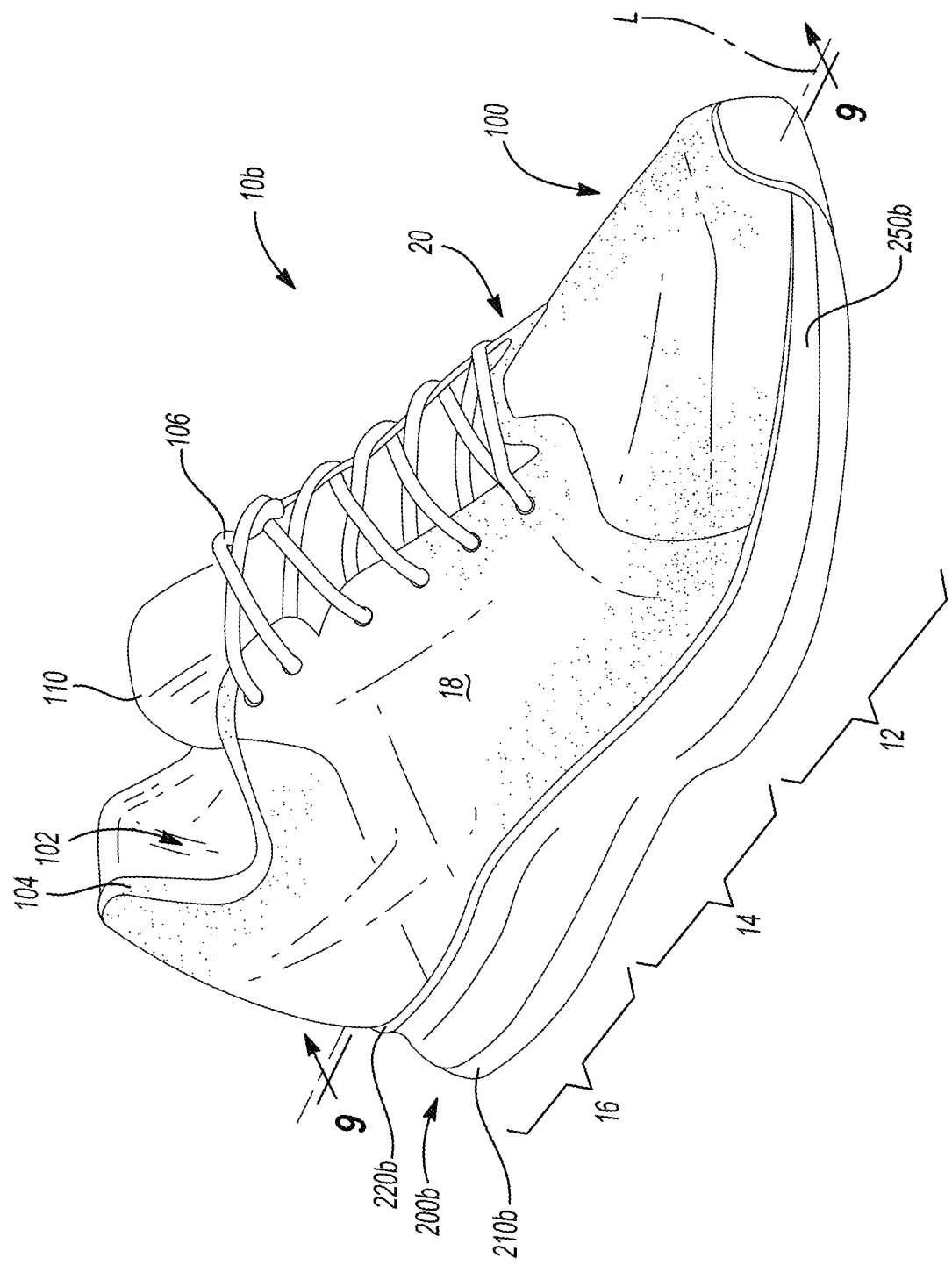
FIG. 7 is a top perspective view of an article of footwear in accordance with principles of the present disclosure.
Figure 8:
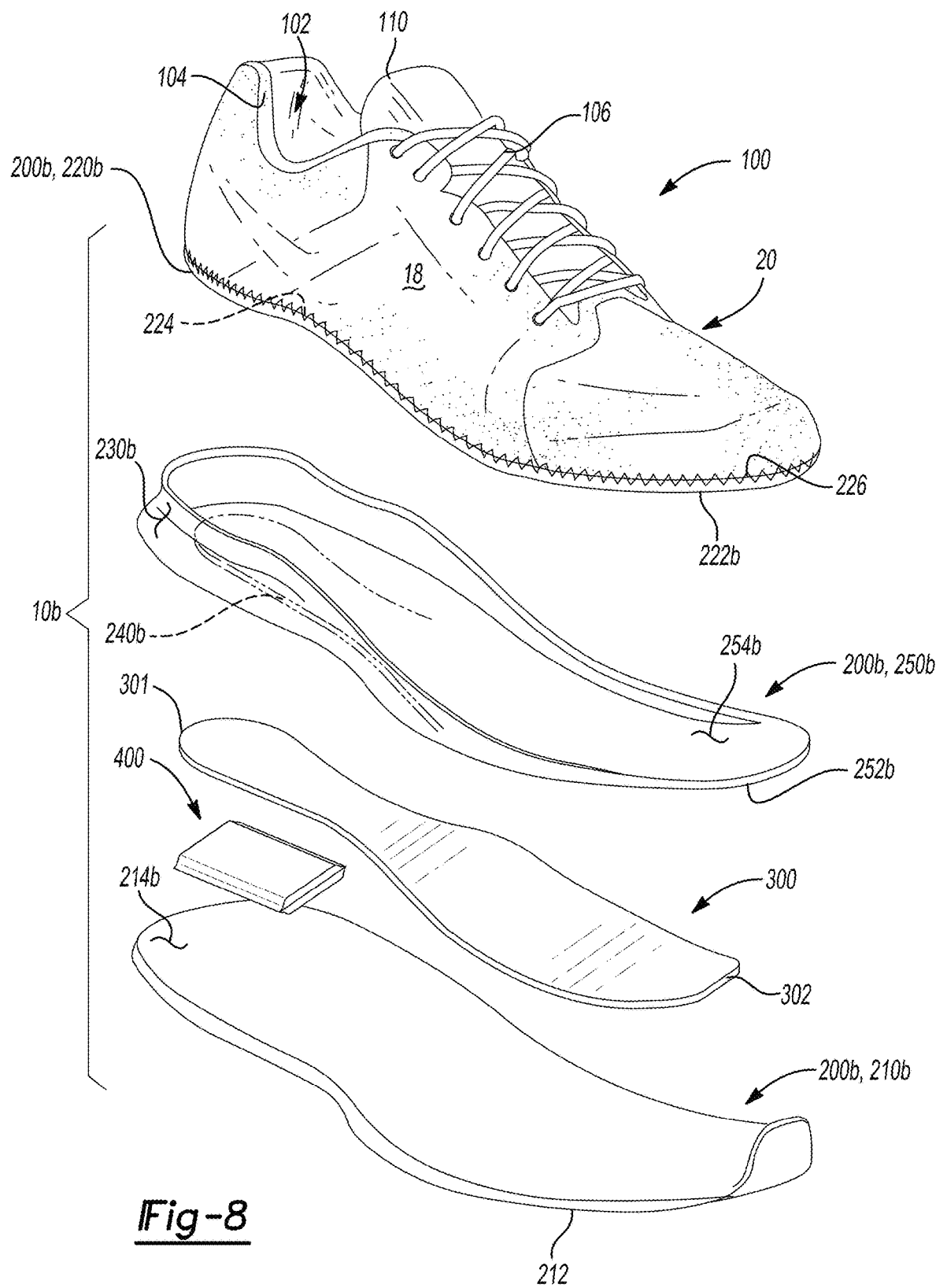
FIG. 8 is an exploded view of the article of footwear of FIG. 7 showing a cushioning member received within a cavity between an inner surface of an outsole and a bottom surface of a midsole, and a footwear plate disposed upon the inner surface in a forefoot region of the footwear and embedded within the cushioning member in a heel region of the footwear.
Figure 9:
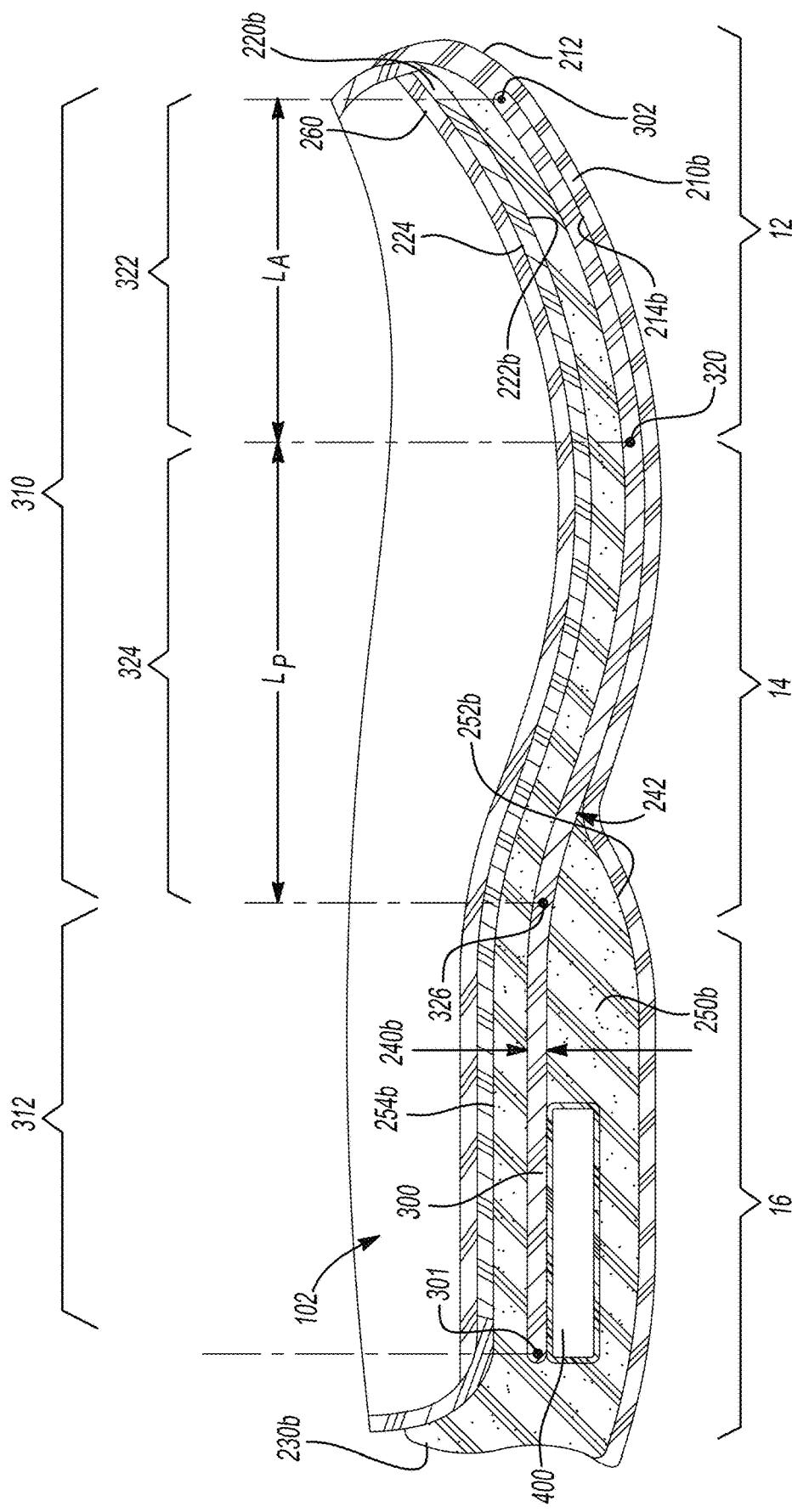
FIG. 9 is a cross-sectional view taken along line 9-9 of FIG. 7 showing a cushioning member received within a cavity between an inner surface of an outsole and a bottom surface of a midsole, and a footwear plate disposed upon the inner surface in a forefoot region of the footwear and embedded within the cushioning member in a heel region of the footwear.

FIGS. 7-9 provide an article of footwear 10b that includes an upper 100 and a sole structure 200b attached to the upper 100. In view of the substantial similarity in structure and function of the components associated with the article of footwear 10 with respect to the article of footwear 10b, like reference numerals are used hereinafter and in the drawings to identify like components while like reference numerals containing letter extensions are used to identify those components that have been modified.

FIG. 8 provides an exploded view of the article of footwear 10b showing the sole structure 200b include an outsole 210b, a cushioning member 250b, and a midsole/strobel 220b arranged in a layered configuration and defining a longitudinal axis L. The outsole 210b includes an inner surface 214b disposed on an opposite side of the outsole 210b than the ground-engaging surface 212. The midsole 220b includes a bottom surface 222b disposed on an opposite side of the midsole 220b than the footbed 224. The cushioning member 250b is disposed between the inner surface 214b and the bottom surface 222b to separate the midsole 220b from the outsole 210b. For example, the cushioning member 250a includes a bottom surface 252b opposing the inner surface 214b of the outsole 210 and a top surface 254b disposed on an opposite side of the cushioning member 250b than the bottom surface 252b and opposing the midsole 220b. The top surface 254b may be contoured to conform to the profile of the bottom surface (e.g., plantar of the foot) within the interior void 102. As with the cushioning member 250 of the article of FIGS. 1-3, the cushioning member 250b may define a sidewall 230b surrounding at least a portion of a perimeter of the second cushioning member 250b. The sidewall 230b may define a rim that extends around the perimeter of the midsole 220a when the cushioning member 250b attaches to the midsole 220b.

The cushioning member 250b may compress resiliently between the midsole 220b and the outsole 210b and may be formed from the same one or more materials forming the cushioning member 250 of FIGS. 1-3. For instance, the cushioning member 250b may be formed form one or more of EVA copolymers, polyurethanes, polyethers, olefin block copolymers, PEBA copolymers, and/or TPUs. The sole structure 200a may also incorporate the fluid-filled bladder 400 between the footwear plate 300 and the first cushioning member 250a in at least one portion 12, 14, 16 of the sole structure to enhance cushioning characteristics of the footwear 10 in responsive to ground-reaction forces. For instance, the bladder 400 may be filled with a pressurized fluid such as air, nitrogen, helium, sulfur hexafluoride, or liquids/gels.

In some configurations, the cushioning member 250b defines a cavity 240b (e.g., sleeve) within an interior portion between the top surface 254b and the bottom surface 252b in the heel portion 16 of the sole structure 200b. FIG. 9 provides a partial cross-sectional view taken along 9-9 of FIG. 7 showing the substantially flat region 312 of the footwear plate 300 received within the cavity 240b of the cushioning member 250b and the curved region 310 exposed from the cavity 240b between the bottom surface 252b of the cushioning member 250b and the inner surface 214b of the outsole 210b. FIG. 9 shows the bottom surface 252b of the cushioning member 250b defining an access opening 242 to the cavity 240b for receiving the substantially flat portion 312 of the plate 300. The cavity 240b may be contiguous with a cut-out formed within the cushioning member 250b for embedding the fluid-filled bladder 400. Thus, the sole structure 200b incorporated by the article of footwear 10b of FIGS. 7-9 includes the bottom surface 252b of the cushioning member 250b affixing to the inner surface 214b of the outsole 210b in the heel portion 16, while the curved region 310 of the plate 300 extending out of the cavity 240b of the cushioning member 250b at the access opening 242 is in direct contact with the inner surface 214 in the forefoot and mid-foot portions 12, 14, respectively. Accordingly, the cavity 240b defined by the cushioning member 250b is operative to embed/encapsulate at least a portion (e.g., flat region 312) of the plate 300 therein. As with the cushioning member 250 and plate 300 of FIGS. 1-3, the cushioning member 250b and the plate 300 may substantially occupy the entire volume of space between the bottom surface 222b of the midsole 220b and the inner surface 214b of the outsole 210b.

The insole 260 may be disposed upon the footbed 224 within the interior void 102 under the foot. The cushioning member 250b may encapsulate the bladder 450 or define a cut-out for receiving the bladder 400, while a portion of the plate 300 may be in direct contact with the bladder 400. The cut-out receiving the bladder 400 may be contiguous with the cavity 240b formed through the cushioning member 250b. In some configurations, the cushioning member 250b defines a greater thickness in the heel portion 16 of the sole structure 200b than in the forefoot portion 12. In some examples, the thickness of the cushioning member 250b separating the bottom surface 222b of the midsole 220b and the plate 300 is greater at locations proximate to the curved region 310 of the plate 300 than at the locations proximate to the substantially flat region 312 of the plate 300. In these examples, the cushioning member 250b is operative to increase the separation distance between the plate 300 and the midsole 220b such that the MTP joint of the foot is prevented from contacting the plate 300 during use of the footwear 10b while performing running movements/motions. The cushioning member 250b may define a thickness in the forefoot portion 12 of the sole structure 200b within a range from about seven (7) millimeters (mm) to about twenty (20) mm. In one example, the thickness of the cushioning member 250b in the forefoot portion 12 is about twelve (12) mm. The cushioning member 250b may include a density within a range from about 0.05 grams per cubic centimeter (g/cm³) to about 0.20 g/cm³. In some examples, the density of the cushioning member 250b is approximately 0.1 g/cm³. Moreover, the cushioning member 250b may include a hardness within the range from about eleven (11) Shore A to about fifty (50) Shore A. The one or more materials forming the cushioning member 250b may be suitable for providing an energy return of at least 60-percent (60%).

As described above with reference to FIGS. 1-3, the footwear plate 300 may include the uniform local stiffness that may or may not be anisotropic. For instance, the plate 300 may be formed from one or more tows of fibers including at least one of carbon fibers, boron fibers, glass fibers, and polymeric fibers. Thus, the plate 300 may provide a greater thickness along the longitudinal direction of the sole structure than the stiffness in direction transverse (e.g., perpendicular) to the longitudinal axis L. For instance, the stiffness of the plate 300 in the transverse direction may be approximately 10-percent to 20-percent of the thickness of the plate 300 along the longitudinal direction (e.g., parallel to longitudinal axis L). Moreover, the plate 300 may include a substantially uniform thickness within the range of about 0.6 mm to about 3.0 mm across the plate 300 or a non-uniform thickness that varies across the plate, e.g., the thickness of the plate 300 in the mid-foot portion 14 is greater than the thicknesses in the forefoot portion 12 and the heel portion 16. In some examples, the plate 300 includes a thickness equal to about 1.0 mm.

The radius of curvature of the curved region 310 defines the anterior curved portion 322 extending between MTP point 320 and the AMP 302 at the toe end of the sole structure 200b, and the posterior curved portion 322 extending between the MTP point 320 and the aft point 326. In some configurations, the anterior curved portion 322 and the posterior curved portion 324 each include the same radius of curvature mirrored about the MTP point 320. In other configurations, the curved portions 322, 324 are each associated with a different radius of curvature. The curved portions 322, 324 may each account for about 30-percent (%) of the total length of the plate 300 while the length of the flat region 312 may account for the remaining 40-percent (%) of the length of the plate 300. The anterior curved and posterior curved portions 322, 324, respectively, of the curved region 310 provide the plate 300 with a longitudinal stiffness that reduces energy loss proximate to the MTP joint of the foot, as well as enhances rolling of the foot during running motions to thereby reduce a lever arm distance and alleviate strain on the ankle joint. The AMP 302 and the aft point 326 are located above the MTP point 320 and may be located above the MTP point 320 by a distance substantially equal position height H. Moreover, the length $L_A$ of the anterior curved portion 322 and the length $L_P$ of the posterior curved portion 324 (e.g., measured along the line extending substantially parallel to the longitudinal axis L between the MTP point 320 and respective ones of the AMP 302 and the aft point 326) may be substantially equal to one another or may be different. As described above with reference to FIGS. 1-3, varying the radius of curvature of the curved region 310 causes the lengths $L_A$ and $L_P$ and/or the height (H) of the anterior most point 302 and the aft point 306 to change relative to the MTP point 320. In doing so, the stiffness of the plate 300 may vary to provide a custom footwear plate 300 tailored for the wearer's shoe size, the intended use of the footwear 10, and/or the wearer's anatomical features of the foot.

Figure 11:
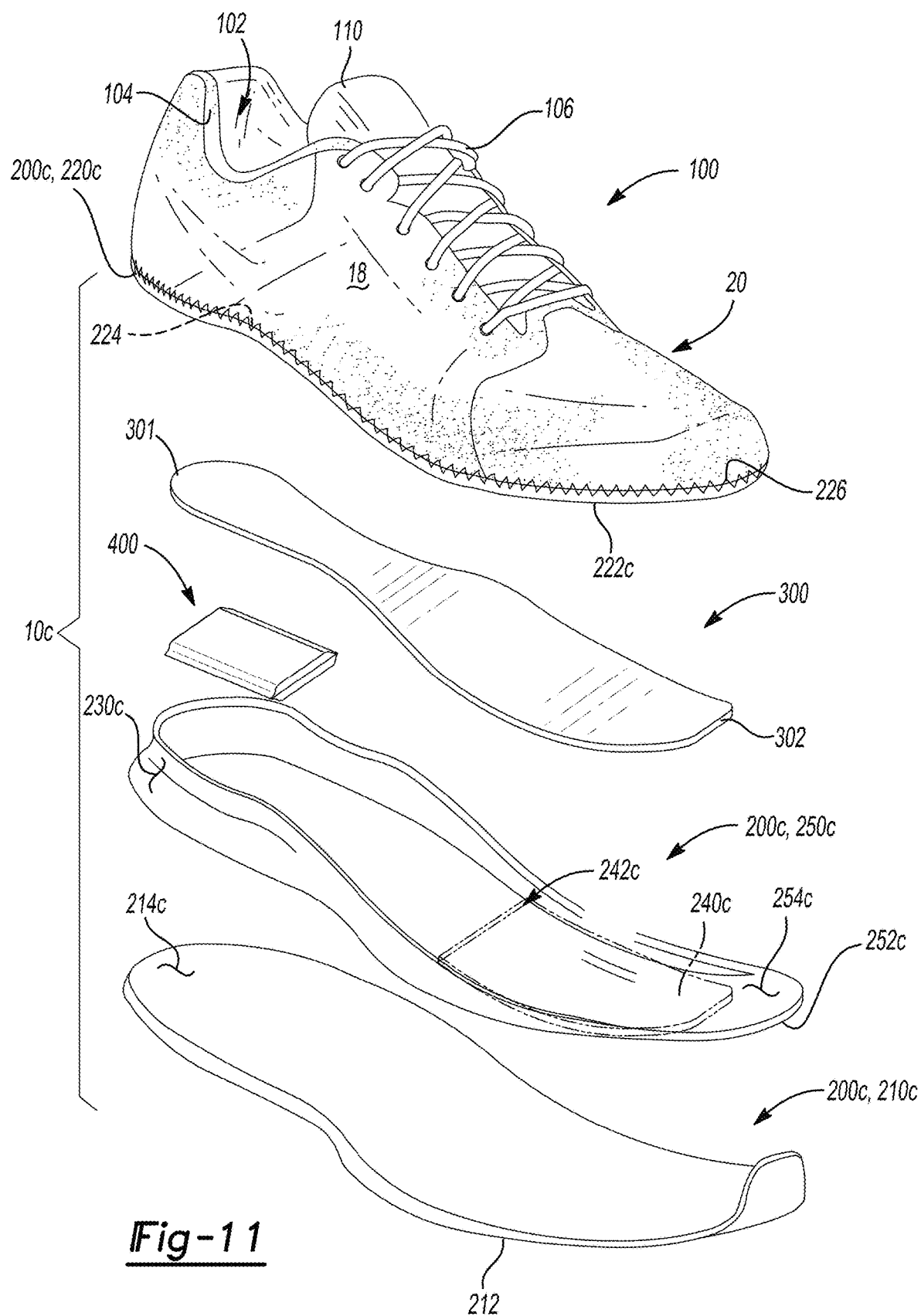
FIG. 11 is an exploded view of the article of footwear of FIG. 10 showing a cushioning member received within a cavity between an inner surface of an outsole and a bottom surface of a midsole, and a footwear plate embedded within the cushioning member in a forefoot region of the footwear and disposed between the cushioning member and the bottom surface of midsole in a heel region of the footwear.

FIGS. 10-12 provide an article of footwear 10c that includes an upper 100 and a sole structure 200c attached to the upper 100. In view of the substantial similarity in structure and function of the components associated with the article of footwear 10 with respect to the article of footwear 10c, like reference numerals are used hereinafter and in the drawings to identify like components while like reference numerals containing letter extensions are used to identify those components that have been modified.

FIG. 11 provides an exploded view of the article of footwear 10c showing the sole structure 200c including an outsole 210c, a cushioning member 250c, and a midsole/strobel 220c arranged in a layered configuration and defining a longitudinal axis L. The outsole 210c includes an inner surface 214c disposed on an opposite side of the outsole 210c than the ground-engaging surface 212. The midsole 220c includes a bottom surface 222c disposed on an opposite side of the midsole 220c than the footbed 224. The cushioning member 250c is disposed between the inner surface 214c and the bottom surface 222c to separate the midsole 220c from the outsole 210c. For example, the cushioning member 250c includes a bottom surface 252c opposing the inner surface 214c of the outsole 210c and a top surface 254c disposed on an opposite side of the cushioning member 250c than the bottom surface 252c and opposing the midsole 220c. The top surface 254c may be contoured to conform to the profile of the bottom surface (e.g., plantar) of the foot within the interior void 102. As with the cushioning member 250 of the article of FIGS. 1-3, the cushioning member 250c may define a sidewall 230c surrounding at least a portion of a perimeter of the second cushioning member 250c. The sidewall 230c may define a rim that extends around the perimeter of the midsole 220c when the cushioning member 250c attaches to the midsole 220c.

The cushioning member 250c may compress resiliently between the midsole 220c and the outsole 210c and may be formed from the same one or more materials forming the cushioning member 250 of FIGS. 1-3. For instance, the cushioning member 250c may be formed form one or more of EVA copolymers, polyurethanes, polyethers, olefin block copolymers, PEBA copolymers, and/or TPUs. The sole structure 200c may also incorporate the fluid-filled bladder 400 between the footwear plate 300 and the cushioning member 250c in at least one portion 12, 14, 16 of the sole structure 200c to enhance cushioning characteristics of the footwear 10c in responsive to ground-reaction forces. For instance, the bladder 400 may be filled with a pressurized fluid such as air, nitrogen, helium, sulfur hexafluoride, or liquids/gels. The cushioning member 250c may include a density within a range from about 0.05 grams per cubic centimeter (g/cm³) to about 0.20 g/cm³. In some examples, the density of the cushioning member 250c is approximately 0.1 g/cm³. Moreover, the cushioning member 250 may include a hardness within the range from about eleven (11) Shore A to about fifty (50) Shore A. The one or more materials forming the cushioning member 250c may be suitable for providing an energy return of at least 60-percent (60%).

In some configurations, the cushioning member 250c defines a cavity 240c (e.g., sleeve) within an interior portion between the top surface 254c and the bottom surface 252c in the forefoot and mid-foot portions 12, 14, respectively, of the sole structure 200c. FIG. 12 provides a partial cross-sectional view taken along 12-12 of FIG. 10 showing the curved region 310 of the footwear plate 300 received within the cavity 240c of the cushioning member 250 and the substantially flat region 312 exposed from the cavity 240c between the top surface 254c of the cushioning member 250c and the bottom surface 222c of the midsole 220c. FIG. 12 shows the top surface 254c of the cushioning member 250c defining an access opening 242c to the cavity 240c for receiving the curved region 310 of the plate 300. Thus, the sole structure 200c incorporated by the article of footwear 10c of FIGS. 10-12 includes the top surface 254c of the cushioning member 250c affixing to the bottom surface 222c of the midsole 220c in the forefoot and mid-foot portions 12, 14, respectively, while the substantially flat region 312 of the plate 300 extending out of the cavity 240c of the cushioning member 250c at the access opening 242c is in direct contact with the bottom surface 222c in the heel portion 16. The entire bottom surface 252c of the cushioning member 250c affixes to the inner surface 214c of the outsole 210c. Accordingly, the cavity 240c defined by the cushioning member 250c is operative to embed/encapsulate at least a portion (e.g., curved region 310) of the plate 300 therein. In other words, the curved region 310 of the plate supporting the MTP joint of the foot is separated from the outsole 210c and the midsole 220c by respective portions of the cushioning member 250c on opposite sides of the cavity 240c. As with the cushioning member 250 and plate 300 of FIGS. 1-3, the cushioning member 250c and the plate 300 may substantially occupy the entire volume of space between the bottom surface 222c of the midsole 220c and the inner surface 214c of the outsole 210c. The insole 260 may be disposed upon the footbed 224 within the interior void 102 under the foot. The cushioning member 250c may encapsulate the bladder 400 or define a cut-out for receiving the bladder 400, while a portion of the plate 300 may be in direct contact with the bladder 400. In some configurations, the cushioning member 250c defines a greater thickness in the heel portion 16 of the sole structure 200c than in the forefoot portion 12. The cushioning member 250c may define a thickness in the forefoot portion 12 of the sole structure 200c within a range from about seven (7) millimeters (mm) to about twenty (20) mm. In one example, the thickness of the cushioning member 250c in the forefoot portion 12 is about twelve (12) mm. In some implementations, the thickness of the cushioning member 250c between the plate 300 and the bottom surface 222c of the midsole 220c in the forefoot portion 12 is within a range from about three (3) mm to about twenty-eight (28) mm. Additionally or alternatively, the thickness of the cushioning member 250c between the plate 300 and the inner surface 214c of the outsole 210c in the forefoot portion 12 is within a range from about two (2) mm to about thirteen (13) mm.

As described above with reference to FIGS. 1-3, the footwear plate 300 may include the uniform local stiffness that may or may not be anisotropic. For instance, the plate 300 may be formed from one or more tows of fibers including at least one of carbon fibers, boron fibers, glass fibers, and polymeric fibers. Thus, the plate 300 may provide a greater thickness along the longitudinal direction of the sole structure than the stiffness in direction transverse (e.g., perpendicular) to the longitudinal axis L. For instance, the stiffness of the plate 300 in the transverse direction may be approximately 10-percent to 20-percent of the thickness of the plate 300 along the longitudinal direction (e.g., parallel to longitudinal axis L). Moreover, the plate 300 may include a substantially uniform thickness within the range of about 0.6 mm to about 3.0 mm across the plate 300 or a non-uniform thickness that varies across the plate, e.g., the thickness of the plate 300 in the mid-foot portion 14 is greater than the thicknesses in the forefoot portion 12 and the heel portion 16.

The radius of curvature of the curved region 310 defines the anterior curved portion 322 extending between MTP point 320 and the AMP 302 at the toe end of the sole structure 200a, and the posterior curved portion 322 extending between the MTP point 320 and the aft point 326. In some configurations, the anterior curved portion 322 and the posterior curved portion 324 each include the same radius of curvature mirrored about the MTP point 320. In other configurations, the curved portions 322, 324 are each associated with a different radius of curvature. The curved portions 322, 324 may each account for about 30-percent (%) of the total length of the plate 300 while the length of the flat region 312 may account for the remaining 40-percent (%) of the length of the plate 300. The anterior curved and posterior curved portions 322, 324, respectively, of the curved region 310 provide the plate 300 with a longitudinal stiffness that reduces energy loss proximate to the MTP joint of the foot, as well as enhances rolling of the foot during running motions to thereby reduce a lever arm distance and alleviate strain on the ankle joint. In other configurations, the curved portions 322, 324 may each account for from about twenty-five percent (25%) to about thirty-five percent (35%) of the total length of the plate 300. The AMP 302 and the aft point 326 are located above the MTP point 320 and may be located above the MTP point 320 by a distance substantially equal position height H. Moreover, the length $L_A$ of the anterior curved portion 322 and the length $L_P$ of the posterior curved portion 324 (e.g., measured along the line extending substantially parallel to the longitudinal axis L between the MTP point 320 and respective ones of the AMP 302 and the aft point 326) may be substantially equal to one another or may be different. As described above with reference to FIGS. 1-3, varying the radius of curvature of the curved region 310 causes the lengths $L_A$ and $L_P$ and/or the height (H) of the anterior most point 302 and the aft point 306 to change relative to the MTP point 320. In doing so, the stiffness of the plate 300 may vary to provide a custom footwear plate 300 tailored for the wearer's shoe size, the intended use of the footwear 10, and/or the wearer's anatomical features of the foot.

FIGS. 13-15 provide an article of footwear 10d that includes an upper 100 and a sole structure 200d attached to the upper 100. In view of the substantial similarity in structure and function of the components associated with the article of footwear 10 with respect to the article of footwear 10d, like reference numerals are used hereinafter and in the drawings to identify like components while like reference numerals containing letter extensions are used to identify those components that have been modified.

FIG. 14 provides an exploded view of the article of footwear 10d showing the sole structure 200d including an outsole 210d, a cushioning member 250d, and a midsole 220d arranged in a layered configuration and defining a longitudinal axis L. The outsole 210d includes an inner surface 214d disposed on an opposite side of the outsole 210d than the ground-engaging surface 212. The midsole 220d includes a bottom surface 222d disposed on an opposite side of the midsole 220d than the footbed 224. The cushioning member 250d is disposed between the inner surface 214d and the bottom surface 222d to separate the midsole 220d from the outsole 210d. For example, the cushioning member 250d includes a bottom surface 252d opposing the inner surface 214d of the outsole 210d and a top surface 254d disposed on an opposite side of the cushioning member 250d than the bottom surface 252d and opposing the midsole 220d. The top surface 254d may be contoured to conform to the profile of the bottom surface (e.g., plantar) of the foot within the interior void 102. As with the cushioning member 250 of the article of FIGS. 1-3, the cushioning member 250d may define a sidewall 230d surrounding at least a portion of a perimeter of the second cushioning member 250d. The sidewall 230d may define a rim that extends around the perimeter of the midsole 220d when the cushioning member 250d attaches to the midsole 220d. The cushioning member 250d may compress resiliently between the midsole 220d and the outsole 210d and may be formed from the same one or more materials forming the cushioning member 250 of FIGS. 1-3. For instance, the cushioning member 250d may be formed form one or more of EVA copolymers, polyurethanes, polyethers, olefin block copolymers, PEBA copolymers, and/or TPUs. The cushioning member 250d may include a density within a range from about 0.05 grams per cubic centimeter ($g/cm^3$) to about 0.20 $g/cm^3$. In some examples, the density of the cushioning member 250d is approximately 0.1 $g/cm^3$. Moreover, the cushioning member 250d may include a hardness within the range from about eleven (11) Shore A to about fifty (50) Shore A. The one or more materials forming the cushioning member 250d may be suitable for providing an energy return of at least 60-percent (60%).

In some configurations, the cushioning member 250d defines a cavity 240d (e.g., sleeve) within an interior portion between the top surface 254d and the bottom surface 252d in the forefoot and mid-foot portions 12, 14, respectively, of the sole structure 200d. In these configurations, the bottom surface 252d of the cushioning member 250d tapers toward the top surface 254d to define a reduced thickness for the cushioning member 250d in the heel portion 16 compared to the thickness in the forefoot and mid-foot portion 12, 14, respectively.

FIG. 15 provides a partial cross-sectional view taken along 15-15 of FIG. 13 showing the curved region 310 of the footwear plate 300 received within the cavity 240d of the cushioning member 250 and the substantially flat region 312 exposed from the cavity 240d between the bottom surface 254d of the cushioning member 250d and the inner surface 214d of the midsole 220d. Whereas the top surface 254c of the cushioning member 250c of FIGS. 10-12 defines the access opening 242c to the cavity 240c, the bottom surface 252d of the cushioning member 250d defines an access opening 242d to the cavity 240d for receiving the curved region 310 of the plate 300. Thus, bottom surface 252d of the cushioning member 250d affixes to the inner surface 214d of the outsole 210d in the forefoot and mid-foot portions 12, 14, respectively, while the substantially flat region 312 of the plate 300 extending out of the cavity 240d of the cushioning member 250d at the access opening 242d formed through the bottom surface 252d is in direct contact with the inner surface 214d in the heel portion 16. In some examples, the aft point 326 of the plate 300 is disposed within a blend portion disposed between and connecting the curved region 310 to the substantially flat region 312 and the bottom surface 252d of the cushioning member 250d tapers upward toward the top surface 254d at a location proximate to the blend portion of the plate 300. FIG. 15 also shows the outsole 210d tapering into contact with the plate 300 as the bottom surface 252d of the cushioning member 250d tapers toward the top surface 252d. For instance, the outsole 210d tapers into contact with the substantially flat region 312 of the plate 300 at a location proximate to where the plate 300 extends through the access opening 242d. Accordingly, the cavity 240d defined by the cushioning member 250d is operative to embed/encapsulate at least a portion (e.g., curved region 310) of the plate 300 therein. In other words, the curved region 310 of the plate supporting the MTP joint of the foot is separated from the outsole 210d and the midsole 220d by respective portions of the cushioning member 250d on opposite sides of the cavity 240d. As with the cushioning member 250 and plate 300 of FIGS. 1-3, the cushioning member 250d and the plate 300 may substantially occupy the entire volume of space between the bottom surface 222d of the midsole 220d and the inner surface 214d of the outsole 210d. The insole 260 may be disposed upon the footbed 224 within the interior void 102 under the foot. The cushioning member 250d may define a thickness in the forefoot portion 12 of the sole structure 200d within a range from about seven (7) millimeters (mm) to about twenty (20) mm. In one example, the thickness of the cushioning member 250d in the forefoot portion 12 is about twelve (12) mm. In some implementations, the thickness of the cushioning member 250d between the plate 300 and the bottom surface 222d of the midsole 220d in the forefoot portion 12 is within a range from about three (3) mm to about twenty-eight (28) mm. Additionally or alternatively, the thickness of the cushioning member 250d between the plate 300 and the inner surface 214d of the outsole 210d in the forefoot portion 12 is within a range from about two (2) mm to about thirteen (13) mm.

FIGS. 16-18 provide a footwear plate 300a that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300a, like reference numerals are used hereinafter and in the drawings to identify like components while like reference numerals containing letter extensions are used to identify those components that have been modified.

FIG. 16 provides a top perspective view of the footwear plate 300a defining a length that extends between the first end 301 corresponding to a posterior-most point and the second end 302 corresponding to the anterior most point (AMP) of the plate 300a. The terms "first end" and "posterior-most point" will be used interchangeably herein. The terms "second end" and "AMP" of the plate 300 will be used interchangeably herein. The footwear plate 300a may be segmented across the length to define a toe segment 362, a MTP segment 364, a bridge segment 366, and a heel segment 368. The toe segment 362 corresponds to the toes of the foot while the MTP segment corresponds to the MTP joint connecting the metatarsal bones with the phalanx bones of the foot. The toe segment 362 and the MTP segment 364 of the plate 300a may correspond to the forefoot portion 12 of the sole structure 200-200d of FIGS. 1-15. The bridge segment 366 corresponds with the arch area of the foot and connects the MTP segment 364 to the heel segment 368. The bridge segment 366 may correspond to the mid-foot portion 14 and the heel segment 358 may correspond to the heel portion 16 when the plate 300a is incorporated into the sole structure 200-200d of FIGS. 1-15. FIG. 16 shows the footwear plate 300a including the curved region 310 (including segments 362, 364, 366) and the substantially flat region 312 (including segment 368).

FIG. 17 provides a side view of the footwear plate 300a of FIG. 16 showing the MTP point 320 as a closest point of the footwear plate 300a to a horizontal reference plane RP extending substantially parallel to a ground surface (not shown). For instance, the MTP point 320 is tangent to the horizontal reference plane RP and may be disposed directly beneath the MTP joint of the foot when the foot is received by the interior void 102 of the footwear 10-10d. In other configurations, the MTP point 320 is disposed beneath and slightly behind the MTP joint of the foot such that anterior curved portion 322 is underneath the MPT joint of the foot. The anterior curved portion 322 of the curved region 310 may define a corresponding radius of curvature and a length $L_A$ between the MTP point 320 and the AMP 302, while the posterior curved portion 324 of the curved region 310 may define a corresponding radius of curvature and a length $L_P$ between the MTP point 320 and the aft point 326. As used herein, the $L_A$ and $L_P$ are each measured along the horizontal reference plane RP between the MTP point 320 and respective ones of the AMP 302 and the aft point 326. In some examples, the $L_A$ of the anterior curved portion 322 (including the toe segment 362 and the MTP segment 364) accounts for approximately thirty percent (30%) of the length of the sole structure 200-200d, the $L_P$ of the posterior curved portion 324 (including the bridge segment 366) accounts for approximately thirty percent (30%) of the length of the sole structure 200-200d, and the substantially flat portion 312 (including the heel segment 368) accounts for approximately forty percent (40%) of the length of the sole structure 200-200d. In other examples, the $L_A$ of the anterior curved portion 322 is within the range from about twenty-five percent (25%) to about thirty-five percent (35%) of the length of the sole structure 200-200d, the $L_P$ of the posterior curved portion 324 is within the range from about twenty-five percent (25%) to about thirty-five percent (35%) of the length of the sole structure 200-200d, and the substantially flat region 312 includes the remainder of the length of the sole structure 200-200d.

The radius of curvature associated with the anterior curved portion 322 results in the AMP 302 extending from the MTP point 320 at an angle α1 relative to the horizontal reference plane RP. Accordingly, the anterior curved portion 322 allows the toe segment 362 of the plate 300a to bias the toes of the foot in a direction away from the ground surface. The angle α1 may include a value within a range from about 12-degrees to about 35-degrees. In one example, angle α1 includes a value approximately equal to 24-degrees. Similarly, the radius of curvature associated with the posterior curved portion 324 results in the aft point 326 extending from the MTP point 320 at an angle β1 relative to the horizontal reference plane RP. The angle β1 may include a value within a range from about 12-degrees to about 35-degrees. In one example, angle β1 includes a value approximately equal to 24-degrees. In some configurations, angles α1 and β1 are substantially equal to one another such that the radii of curvature are equal to one another and share the same vertex.

In some implementations, the aft point 326 is disposed along a blend portion 328 along the curved region 310 of the plate 300 that includes a radius of curvature configured to join the curved region 310 at the posterior curved portion 324 to the substantially flat region 312. Thus, the blend portion 328 is disposed between and connecting the constant radius of curvature of the curved region 310 and the substantially flat region 312. In some examples, the blend portion includes a substantially constant radius of curvature. The blend portion 328 may allow the substantially flat region 312 of the plate to extend between the first end 301 (posterior-most point) and the aft point 326 in a direction substantially parallel to the horizontal reference plane RP (as well as the ground surface). As a result of the radius of curvature of the posterior curved portion 324 and the radius of curvature of the blend portion 328, the aft point 326 may include a position height $H_1$ above the MTP point 320. As used herein, the position height $H_1$ of the aft point 326 corresponds to a separation distance extending in a direction substantially perpendicular to the horizontal reference plane RP between the aft point 326 and the reference plane RP. The position height $H_1$ may include a value within the range from about 3 mm to about 28 mm in some examples, while in other examples the position height $H_1$ may include a value within the range from about 3 mm to about 17 mm. In one example, the position height $H_1$ is equal to about 17 mm. In some implementations, the posterior-most point 301 and the AMP 302 are co-planer at a junction of the blend portion 328 and the substantially flat region 312.

FIG. 18 provides a top view of the footwear plate 300a of FIG. 16 showing the toe segment 362, the MTP segment 364, the bridge segment 366, and the heel segment 368 defined across the length of the plate 300a. The MTP point 320 may reside within the MTP segment 364 joining the toe segment 362 to the bridge segment 366. The aft point 326 may be disposed within the bridge segment 366 at a location proximate to where the bridge segment 366 joins with the heel segment 368. For instance, the radius of curvature of the blend portion 328 (FIG. 17) may seamlessly join the bridge segment 366 associated with the posterior curved portion 324 to the heel segment 368 associated with the flat region 312 of the plate 300.

FIGS. 19-21 provide a footwear plate 300b that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300b, like reference numerals are used hereinafter and in the drawings to identify like components while like reference numerals containing letter extensions are used to identify those components that have been modified.

FIG. 19 provides a top perspective view of the footwear plate 300b defining a length that extends between the first end 301 and an AMP 302b of the plate 300b. The plate 300b may be segmented across the length to define the toe segment 362, the MTP segment 364, the bridge segment 366, and the heel segment 368. FIG. 19 shows the footwear plate 300b including a curved region 310b (including segments 362, 364, 366) and the substantially flat region 312 (including segment 368).

FIG. 20 provides a side view of the footwear plate 300b of FIG. 19 showing an MTP point 320b of the curved region 310b of the footwear plate 300b tangent to the horizontal reference plane RP and disposed underneath the MTP joint of the foot when the foot is received by the interior void 102 of the footwear 10-10d. An anterior curved portion 322b extending between the MTP point 320b and the AMP 302b includes a radius of curvature that is smaller than the radius of curvature of the anterior curved portion 322 of FIGS. 16-18. Thus, the radius of curvature associated with the anterior curved portion 322b results in the AMP 302b extending from the MTP point 320b at an angle α2 relative to the horizontal reference plane RP that is greater than the angle α1 associated with the anterior curved portion 322 of FIGS. 16-18. Accordingly, the anterior curved portion 322b is associated with a steeper slope than that of the anterior curved portion 322 of FIGS. 16-18 such that the toe segment 362 of the plate 300b biases the toes of the foot further away from the ground surface compared to the plate 300a of FIGS. 16-18. In other examples, the $L_A$ of the anterior curved portion 322b is within the range from about twenty-five percent (25%) to about thirty-five percent (35%) of the length of the sole structure 200-200d, the $L_P$ of the posterior curved portion 324b is within the range from about twenty-five percent (25%) to about thirty-five percent (35%) of the length of the sole structure 200-200d, and the substantially flat region 312 includes the remainder of the length of the sole structure 200-200d.

Similarly, a posterior curved portion 324b extending between the MTP point 320b and an aft point 326b includes a radius of curvature that is smaller than the radius of curvature of the posterior curved portion 324 of FIGS. 16-18. Thus, the radius of curvature associated with the posterior curved portion 324b results in the aft point 326b extending from the MTP point 320b at an angle β2 relative to the horizontal reference plane RP that is greater than the angle β1 associated with the posterior curved portion 324 of FIGS. 16-18. Accordingly, the posterior curved portion 324b is associated with a steeper slope than that of the posterior curved portion 324 of FIGS. 16-18 such that the bridge segment 366 of the plate 300b biases the MTP joint of the foot toward the ground surface further away from the heel of the foot compared to the plate 300a of FIGS. 16-18. The angle α2 may include a value within a range from about 12-degrees to about 35-degrees. In one example, angle α2 includes a value approximately equal to 24-degrees. Similarly, the radius of curvature associated with the posterior curved portion 324b results in the aft point 326b extending from the MTP point 320b at an angle β2 relative to the horizontal reference plane RP. The angle β2 may include a value within a range from about 12-degrees to about 35-degrees. In one example, angle β1 includes a value approximately equal to 24-degrees. In some configurations, angles α2 and β2 are substantially equal to one another such that the radii of curvature are equal to one another and share the same vertex.

The curved portions 322b, 324b may each include a corresponding radius of curvature that may be the same or may be different from one another. In some examples, the radius of curvatures differ from one another by at least two percent (2%). The radius of curvatures for the curved regions 322b, 324b may range from about 200 millimeters (mm) to about 400 mm. In some configurations, the anterior curved portion 322b includes a radius of curvature that continues the curvature of the posterior curved portion 324b such that the curved portions 322b, 324b define the same radius of curvature and share a same vertex. Additionally or alternatively, the plate may define a radius of curvature that connects the posterior curved portion 324b to the substantially flat region 312 of the plate 300b. As used herein, the term "substantially flat" refers to the flat region 312 within five (5) degrees horizontal, i.e., within five (5) degrees parallel to the ground surface.

In some implementations, the aft point 326 is disposed along a blend portion 328b along the curved region 310b of the plate 300b that includes a radius of curvature configured to join the curved region 310b at the posterior curved portion 324b to the substantially flat region 312b. Thus, the blend portion 328b is disposed between and connecting the constant radius of curvature of the curved region 310 and the substantially flat region 312. In some examples, the blend portion includes a substantially constant radius of curvature. As with the blend portion 328 of the curved region 310 of FIGS. 16-18, the blend portion 328b may allow the substantially flat region 312 of the plate 300b to extend between the first end 301 (posterior-most point) and the aft point 326b in a direction substantially parallel to the horizontal reference plane RP (as well as the ground surface). As a result of the radius of curvature of the posterior curved portion 324b and the radius of curvature of the blend portion 328b, the aft point 326b may include a position height $H_2$ above the MTP point 320 that is greater than the position height $H_1$ of the aft point 326 above the MTP point 320 of FIGS. 16-18. The position height $H_2$ may include a value within the range from about 3 mm to about 28 mm in some examples, while in other examples the position height $H_2$ may include a value within the range from about 3 mm to about 17 mm. In one example, the position height $H_2$ is equal to about 17 mm. In some implementations, the posterior-most point 301 and the AMP 302b are co-planer at a junction of the blend portion 328b and the substantially flat region 312.

FIG. 21 provides a top view of the footwear plate 300b of FIG. 19 showing the toe segment 362, the MTP segment 364, the bridge segment 366, and the heel segment 368 segmented across the length of the plate 300b. The MTP point 320b may reside within the MTP segment 364 joining the toe segment 362 to the bridge segment 366. The aft point 326b may be disposed within the bridge segment 366 at a location proximate to where the bridge segment 366 joins with the heel segment 368. For instance, the radius of curvature of the blend portion 328b (FIG. 20) may seamlessly join the bridge segment 366 associated with the posterior curved portion 324b to the heel segment 368 associated with the flat region 312 of the plate 300b.

FIGS. 22-24 provide a footwear plate 300d that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300c, like reference numerals are used hereinafter and in the drawings to identify like components while like reference numerals containing letter extensions are used to identify those components that have been modified.

FIG. 22 provides a top perspective view of the footwear plate 300c defining a length that extends between the first end 301 and an AMP 302c of the plate 300c. The plate 300c may be segmented across the length to define the toe segment 362, the MTP segment 364, the bridge segment 366, and the heel segment 368. FIG. 22 shows the footwear plate 300c including a curved region 310c (including segments 362, 364, 366) and the substantially flat region 312 (including segment 368).

FIG. 23 provides a side view of the footwear plate 300c of FIG. 22 showing the curved region 310c being semi-circular such that an anterior curved portion 322c and a posterior curved portion 324c are associated with a same radius of curvature R and share a common vertex V such that the curved portions 322c, 324c are mirrored about an MTP point 320c. In some configurations, the radius R includes a value within a range from about 86 mm to about 202 mm. In other configurations, the radius R includes a value within a range from about 140 mm to about 160 mm. Example values for the radius R may include about 87 mm, 117 mm, 151 mm, or 201 mm. The MTP point 320c is tangent to the horizontal reference plane RP and disposed underneath the MTP joint of the foot when the foot is received by the interior void 102 of the footwear 10-10d. Accordingly, the MTP point 320c corresponds to a center of the curved region 310c including the curved portions 322c, 324c. The anterior curved portion 322c extends between the MTP point 320c and an AMP 302b while the posterior curved portion 324c extends between the MTP point 320c and an aft point 326c.

The anterior curved portion 322c may define a length $L_A$ between the MTP point 320c and the AMP 302c that is substantially equal to a length $L_P$ of the posterior curved portion 324c between the MTP point 320c and the aft point 326c. As used herein, the $L_A$ and $L_P$ are each measured along the horizontal reference plane RP between the MTP point 320c and respective ones of the AMP 302c and the aft point 326c. In some configurations, the $L_A$ and $L_P$ are each equal to about 81 mm when the footwear plate 300c is incorporated by an article of footwear 10-10d associated with a men's size 10. In some examples, the $L_A$ of the anterior curved portion 322c (including the toe segment 362 and the MTP segment 364) accounts for approximately thirty percent (30%) of the length of the sole structure 200-200d, the $L_P$ of the posterior curved portion 324 (including the bridge segment 366) accounts for approximately thirty percent (30%) of the length of the sole structure 200-200d, and the substantially flat portion 312 (including the heel segment 368) accounts for approximately forty percent (40%) of the length of the sole structure 200-200d. In other examples, the $L_A$ of the anterior curved portion 322c is within the range from about twenty-five percent (25%) to about thirty-five percent (35%) of the length of the sole structure 200-200d, the $L_P$ of the posterior curved portion 324c is within the range from about twenty-five percent (25%) to about thirty-five percent (35%) of the length of the sole structure 200-200d, and the substantially flat region 312 includes the remainder of the length of the sole structure 200-200d.

The AMP 302c extends from the MTP point 320c at an angle α3 relative to the horizontal reference plane RP while the aft point 326c extends from the MTP point 320c at an angle β3 relative to the horizontal reference plane RP. As the curved portions 322c, 324c are associated with the same radius of curvature R and share the common vertex V, the angles α3 and β3 are substantially equal to one another. The value of the angles α3 and β3 ranges from about 11 degrees to about 35 degrees in some examples and from about 20 degrees to about 25 degrees in other examples. Example values for the angles α3 and β3 include about 12 degrees, 16 degrees, 22 degrees, or 57 degrees. The angle α3 corresponds to the angle by which the toe segment 362 of the plate 300c biases the toes of the foot upward and away from the ground surface when the foot is received by the interior void 102 of the footwear 10-10d.

Moreover, the aft point 326c and the AMP 302c may each include a same position height $H_3$ above the MTP point 320c. As with the plates 300a and 300b of FIGS. 16-18 and 19-21, respectively, the position height $H_3$ of the aft point 326c and the MTP point 320c corresponds to a separation distance extending in a direction substantially perpendicular to the horizontal reference plane RP between the MTP point 320c and respective ones of the aft point 326c and the AMP 302c. In some configurations, the position height $H_3$ includes a value within a range from about 17 mm to about 57 mm. Example values for the position height $H_3$ may include about 17 mm, 24 mm, 33 mm, or 57 mm.

In some implementations, the aft point 326c is disposed along a blend portion 328c along the curved region 310c of the plate 300 that includes a radius of curvature configured to join the curved region 310c at the posterior curved portion 324c to the substantially flat region 312. Thus, the blend portion 328c is disposed between and connecting the constant radius of curvature of the curved region 310c and the substantially flat region 312. In some examples, the blend portion includes a substantially constant radius of curvature. The blend portion 328c may allow the substantially flat region 312 of the plate 300c to extend between the first end 301 (posterior-most point) and the aft point 326c in a direction substantially parallel to the horizontal reference plane RP (as well as the ground surface). Accordingly, the AMP 302c and the aft point 326c may be substantially co-planar with the junction between the blend portion 328c and the substantially flat region 312. As such, the heel segment 368 and a portion of the bridge segment 366 extending between the first end 301 and the aft point 326c of the plate 300c can be substantially flat. The blend portion 328c may include a radius of curvature of about 133.5 mm when the footwear plate 300c is incorporated by an article of footwear 10-10d associated with a men's size 10. In some implementations, the posterior-most point 301 and the AMP 302c are co-planer at a junction of the blend portion 328c and the substantially flat region 312.

FIG. 24 provides a top view of the footwear plate 300c of FIG. 22 showing the toe segment 362, the MTP segment 364, the bridge segment 366, and the heel segment 368 segmented across the length of the plate 300c. The MTP point 320c may reside within the MTP segment 364 joining the toe segment 362 to the bridge segment 366. The aft point 326b may be disposed within the bridge segment 366 at a location proximate to where the bridge segment 366 joins with the heel segment 368. For instance, the radius of curvature of the blend portion 328c (FIG. 23) may seamlessly join the bridge segment 366 associated with the posterior curved portion 324c to the heel segment 368 associated with the flat region 312 of the plate 300c. In view of the foregoing, the footwear plate 300c of FIGS. 22-24, the following parameters may be designated for a size 10 men's shoe:

1. R=201 mm, α3=12 degrees, $H_3$=17 mm, $L_A$=81 mm, and radius of curvature of blend portion 328c equal to 134 mm;
2. R=151 mm, α3=16 degrees, $H_3$=24 mm, $L_A$=81 mm, and radius of curvature of blend portion 328c equal to 134 mm;
3. R=117 mm, α3=22 degrees, $H_3$=33 mm, $L_A$=81 mm, and radius of curvature of blend portion 328c equal to 134 mm; and
4. R=87 mm, α3=35 degrees, $H_3$=57 mm, $L_A$=81 mm, and radius of curvature of blend portion 328c equal to 134 mm.

With reference to the footwear plates 300-300c of FIGS. 1-24, the curved region 322-322c allows the overall longitudinal stiffness of the plate 300-300c to reduce energy loss at the MTP joint of the wearer's foot while facilitating rolling of the foot during walking/running motions to thereby reduce a lever arm distance and alleviate strain at the ankle joint of the wearer. The radius of curvature associated with the anterior curved portion 322-322c particularly influences the longitudinal stiffness of the plate 300-300c as well as how the foot will roll during walking/running motions. In some examples, the plate 300-300c omits the substantially flat region 312 to define a length extending between the aft point 326-326c and the AMP 302-302c. The MTP point 320-320c corresponds to the closest (e.g., lowest) point of the plate 300-300c to the ground surface and may located at, or just behind, the MTP joint of the foot when received by the interior void 102 of the footwear 10-10d on top of the sole structure 200-200d. One or more cushioning members 250-250c, 270 may be incorporated by the sole structure 200-200d. The cushioning member(s) 250-250c, 270 may define a greatest thickness over top the MTP point 320-320c of the footwear plate 300-300c for maximizing the distance between the MTP joint of the foot and the MTP point 320-320c. The cushioning member(s) 250-250c, 270 may include high performance (soft and low energy loss) foam materials having a resiliency of at least 60-percent when compressed under an applied load to assist in returning energy during use of the footwear 10-10d while performing walking/running movements. The different geometries of the footwear plates 300-300c impart different mechanical advantages to athletes, such as runners having different running styles, e.g., forefoot strikers vs. heel strikers. The radii of curvature of the curved portions 322-322c, 324-324c produce different angles α1-α3, such that position heights $H_1$-$H_3$ differ for different shoe sizes.

FIG. 25 provides a top view of a footwear plate 300d that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300d, like reference numerals are used hereinafter and in the drawings to identify like components while like reference numerals containing letter extensions are used to identify those components that have been modified.

The footwear plate 300d defines a length that extends between the first end 301 and the second end 302 and is segmented across the length to define the toe segment 362, the MTP segment 364, a bridge segment 366d, and the heel segment 368. The bridge segment 366d of the plate 300d defines a reduced width at a location proximate to the heel segment 368 compared to the widths of the bridge segment 366 of the plates 300a, 300b, 300c. The narrow bridge segment 366d reduces the weight of the footwear plate 300d while increasing flexibility thereof. The MTP segment 364 is associated with a widest part of the plate 300d while the toe segment 362 is slightly narrow to support the toes of the foot.

Referring to FIG. 26, a top view of a footwear plate 300e that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300e, like reference numerals are used hereinafter and in the drawings to identify like components while like reference numerals containing letter extensions are used to identify those components that have been modified.

FIG. 26 shows the footwear plate 300e without the heel segment 368 associated with the substantially flat region 312. The plate 300e defines a reduced length extending between a first end 301e and the second end 302 and is segmented across the length to define the toe segment 362, the MTP segment 364, and a truncated bridge segment 366e. Here, the first end 301e of the plate 300e is associated with the aft point 326-326d of the plates 300-300d.

In some examples, the truncated bridge segment 366e is associated with a reduced length sufficient for supporting a Tarsometatarsal joint of the foot. As such, the plate 300e may define only the curved region 310 including the truncated bridge segment 366e, the MTP segment 364, and the toe segment 362. Moreover, the plate 300e may be formed from one contiguous sheet of material.

FIG. 27 provides a top view of a footwear plate 300f that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300f, like reference numerals are used hereinafter and in the drawings to identify like components while like reference numerals containing letter extensions are used to identify those components that have been modified.

The footwear plate 300f defines a length extending between the first end 301 and the second end 302 and through a split forefoot portion 12f, the mid-foot portion 14, and the heel portion 16 thereof. The plate 300f includes the curved region 310 extending through the split forefoot portion 12f and the mid-foot portion 14. The plate 300f may also include the substantially flat region 312 extending through the heel portion 16 from the curved region 310 to the first end 301 of the plate 300f.

The split forefoot portion 12f of the plate 300f includes a lateral segment 371 and a medial segment 372. In some examples, the lateral and medial segments 371, 372, respectively, extend from the MTP point 320 of the plate 300f. Splitting the forefoot portion 12f into the lateral segment 371 and the medial segment 372 may provide greater flexibility of the plate 300f. In some examples, the medial segment 372 is wider than the lateral segment 371. In one example, the medial segment 372 is associated with a width suitable for supporting a first MTP bone (e.g., big toe) and a hallux of the foot. The plate 300f may be formed from one contiguous sheet of material.

FIG. 28 provides a top view of a footwear plate 300g that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300g, like reference numerals are used hereinafter and in the drawings to identify like components while like reference numerals containing letter extensions are used to identify those components that have been modified.

The footwear plate 300g defines a length extending between the first end 301 and the second end 302 and through a finger-shaped forefoot portion 12g, the mid-foot portion 14, and the heel portion 16 thereof. The plate 300g includes the curved region 310 extending through the finger-shaped forefoot portion 12g and the mid-foot portion 14. The plate 300g may also include the substantially flat region 312 extending through the heel portion 16 from the curved region 310 to the first end 301 of the plate 300g.

The finger-shaped forefoot portion 12g of the plate 300g includes a medial segment 372g having a lateral curvature 374. In some examples, the medial segment 372g extends from the MTP point 320 of the plate 300g and is associated with a width suitable for supporting the first MTP bone (e.g., big toe) of the foot. The lateral curvature 374 removes a portion of the plate 300f that would otherwise support the second through fifth MTP bones. The plate 300g may be formed from one contiguous sheet of material.

FIG. 29 provides a top view of a footwear plate 300h that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300h, like reference numerals are used hereinafter and in the drawings to identify like components while like reference numerals containing letter extensions are used to identify those components that have been modified.

The footwear plate 300h defines a length extending between the first end 301 and the second end 302 and through a halo-shaped forefoot portion 12h, the mid-foot portion 14, and the heel portion 16 thereof. The plate 300h includes the curved region 310 extending through the halo-shaped forefoot portion 12h and the mid-foot portion 14. The plate 300h may also include the substantially flat region 312 extending through the heel portion 16 from the curved region 310 to the first end 301 of the plate 300h.

The halo-shaped forefoot portion 12h of the plate 300h includes an interior cut-out region 380 formed through the forefoot portion 12h of the plate 300h. The cut-out region 380 is surrounded by a rim 382 bounded by an outer periphery of the plate 300h. In some examples, the rim 382 extends from the MTP point 320 of the plate 300h and is configured to support the foot underneath while the interior cut-out region 380 is associated with an open area to reduce weight of the plate 300h. The plate 300h may be formed from one contiguous sheet of material. In some configurations, the plate 300h is formed by applying a first tow of fibers on a substrate and forming a void in the first tow of fibers associated with the shape of the cut-out region 380 to expose the substrate. The exposed portion of the substrate may then be removed (e.g., cut-out) to form the cut-out region 380. Additionally, a second tow of fibers may extend around a perimeter of the void formed by the first tow of fibers to provide structural support for the cut-out region 380 once the at least one of heat and pressure is applied to form the plate 300h.

FIG. 30 provides a top view of a footwear plate 300i that may be incorporated into any one of the articles of footwear 10, 10a, 10b, 10c, 10d, 10e, 10f, 10g, and 10h of FIGS. 1-15 and 31-39 in place of the footwear plate 300. In view of the substantial similarity in structure and function of the components associated with the footwear plate 300 with respect to the footwear plate 300i, like reference numerals are used hereinafter and in the drawings to identify like components while like reference numerals containing letter extensions are used to identify those components that have been modified.

The footwear plate 300i defines a length extending between the first end 301 and the second end 302 and through a claw-shaped forefoot portion 12i, the mid-foot portion 14, and the heel portion 16 thereof. The plate 300i includes the curved region 310 extending through the claw-shaped forefoot portion 12i and the mid-foot portion 14. The plate 300i may also include the substantially flat region 312 extending through the heel portion 16 from the curved region 310 to the first end 301 of the plate 300i.

The claw-shaped forefoot portion 12i of the plate 300i includes a lateral segment 371i and a medial segment 372i. In some examples, the lateral and medial segments 371i, 372i, respectively, extend from the MTP point 320 of the plate 300f. The segments 371i, 372i may cooperate to define an interior cut-out region 380i similar to the cut-out region of the plate 300h of FIG. 29 except an opening 384 separates the segments 371i, 372i to allow the segments 371i, 372i to flex independently from one another. Thus, the claw-shaped forefoot portion 12i provides lateral and medial segments 371i, 372i, respectively, capable of flexing independently of one another similar to the segments 371, 372 of the split-forefoot portion 12f of FIG. 27 except interior cut-out region 380i provides the plate 300i with a reduced weight compared to the weight of the plate 300f incorporating the split forefoot portion 12f. The plate 300i may be formed from one contiguous sheet of material.

FIGS. 31 and 32 provide an article of footwear 10e that includes an upper 100 and a sole structure 200e attached to the upper 100. In view of the substantial similarity in structure and function of the components associated with the article of footwear 10 with respect to the article of footwear 10e, like reference numerals are used hereinafter and in the drawings to identify like components while like reference numerals containing letter extensions are used to identify those components that have been modified.

The sole structure 200e may include an outsole 210e, a cushioning member 200e, the footwear plate 300, and a midsole/strobel 220e arranged in a layered configuration. FIG. 32 provides a partial cross-sectional view taken along line 32-32 of FIG. 31 showing the footwear plate 300 disposed between the cushioning member 250e and the midsole 220e in the mid-foot and heel portions 14, 16, respectively, and between the outsole 210e and the midsole 220e in the forefoot portion 12. The cushioning member 250e includes a bottom surface 252e opposing a ground surface 2 and a top surface 254e disposed on an opposite side of the cushioning member 250e than the bottom surface 252e and affixed to the plate 300. The outsole 210e may correspond to one or more ground-contacting segments that may affix to the bottom surface 252e of the cushioning member 250e and the plate 300. In some configurations, the outsole 210e is omitted so that the bottom surface 252e of the cushioning member 250e contacts the ground surface 2 in the mid-foot and heel portions 14, 16, respectively, of the sole structure 200e, while the plate 300 contacts the ground surface 2 in the forefoot portion 12 of the sole structure 200e, i.e., the curved region 310 of the plate 300.

In some implementations, one or more protrusions 800 (e.g., track spikes) extend away from the plate 300 and the outsole 210e in a direction toward the ground surface 2 to provide traction therewith. The protrusions 800 may attach directly to the plate 300 or the outsole 210e.

FIG. 32 shows no cushioning material is disposed above the MTP point 320 (e.g., between the plate 300 and the midsole 220e) or below the MTP point 320 (e.g., between the plate 300 and the outsole 210e). Accordingly, the cushioning material 250e is provided in the mid-foot and heel portions 14, 16, respectively, to attenuate an initial impact of ground-reaction forces during running motions while no cushioning material 250e is provided in the forefoot portion 12 where cushioning is less essential to reduce the weight of the sole structure 200e. The exemplary footwear 10e incorporating the sole structure 200e may be associated with a track shoe for shorter distance track events. Moreover, the insole 260 may be disposed upon the footbed 224 of the midsole 220e within the interior void 102 underneath the foot.

FIGS. 33 and 34 provide an article of footwear 10e that includes an upper 100 and a sole structure 200f attached to the upper 100. In view of the substantial similarity in structure and function of the components associated with the article of footwear 10 with respect to the article of footwear 10f, like reference numerals are used hereinafter and in the drawings to identify like components while like reference numerals containing letter extensions are used to identify those components that have been modified.

The sole structure 200f may include an outsole 210f, a cushioning member 200f, the footwear plate 300, and a midsole/strobel 220f arranged in a layered configuration. FIG. 34 provides a partial cross-sectional view taken along line 34-34 of FIG. 33 showing the footwear plate 300 disposed between the cushioning member 250*f* and the midsole 220*f*, and the cushioning member 250*f* disposed between the plate 300 and the outsole 210*f* and/or the ground-surface 2. The cushioning member 250*f* includes a bottom surface 252*f* opposing a ground surface 2 and a top surface 254*f* disposed on an opposite side of the cushioning member 250*f* than the bottom surface 252*f* and affixed to the plate 300. The outsole 210*f* may correspond to one or more ground-contacting segments that may affix to the bottom surface 252*f* of the cushioning member 250*f*. In some configurations, the outsole 210*f* is omitted so that the bottom surface 252*f* of the cushioning member 250*f* contacts the ground surface 2. Moreover, the insole 260 may be disposed upon the footbed 224 of the midsole 220*f* within the interior void 102 underneath the foot.

The cushioning member 250*f* may define a greater thickness in the heel portion 16 of the sole structure 200*f* than in the forefoot portion 12. In other words, a gap or distance separating outsole 210*f* and the midsole 220*f* decreases in a direction along the longitudinal axis L of the sole structure 200 from the heel portion 16 toward the forefoot portion 12. In some implementations, the top surface 254*f* of the cushioning member 250*f* is smooth and includes a surface profile contoured to match the surface profile of the footwear plate 300 such that the footwear plate 300 and the cushioning member 250*f* mate flush with one another. The cushioning member 250*f* may define a thickness in the forefoot portion 12 of the sole structure within a range from and including eight (8) mm to about and including nine (9) mm. Accordingly, the thickness of the cushioning member 250*f* opposing the curved region 310 of the plate 300 may be only thick enough to prevent the plate 300 from directly contacting the ground surface 2 during running motions.

In some implementations, the one or more protrusions 800 (e.g., track spikes) extend away from the plate 300 and the outsole 210*f* in a direction toward the ground surface 2 to provide traction therewith. The protrusions 800 may attach directly to the plate 300, the cushioning member 250*f*, or the outsole 210*f*.

FIGS. 35 and 36 provide an article of footwear 10*g* that includes an upper and a sole structure 200*g* attached to the upper 100. In view of the substantial similarity in structure and function of the components associated with the article of footwear 10 with respect to the article of footwear 10*g*, like reference numerals are used hereinafter and in the drawings to identify like components while like reference numerals containing letter extensions are used to identify those components that have been modified.

FIG. 35 provides a top perspective view of the article of footwear 10*g* showing the sole structure 200*g* including an outsole 210*g*, a cushioning member 250*g*, the footwear plate 300, and the midsole/strobel 220 arranged in a layered configuration and defining a longitudinal axis L. In some configurations, a peripheral edge of the footwear plate 300 is visible from the exterior of the footwear 10*g* along the lateral and medial sides 18, 20, respectively. In these configurations, the footwear 10*g* may be designed with an intended use for walking.

FIG. 36 provides a partial cross-sectional view taken along line 36-36 of FIG. 35 showing the footwear plate 300 disposed between the cushioning member 250*g* and the midsole 220, and the cushioning member 250*g* disposed between the plate 300 and the outsole 210*g*. The insole 260 may be disposed upon the footbed 224 within the interior void 102 under the foot. While not included in the configuration of FIG. 36, the fluid-filled bladder 400 of FIGS. 1-3 could be incorporated by the sole structure 200*g* to provide additional cushioning. The outsole 210*g* includes a ground-engaging surface 212*g* and an inner surface 214*g* disposed on an opposite side of the outsole 210*g* than the ground-engaging surface 212*g* and opposing a bottom surface 252*g* of the cushioning member 250*g*. The cushioning member 250*g* includes the bottom surface 252*g* and a top surface 254*g* disposed on an opposite side of the cushioning member 250*g* than the bottom surface 252*g*.

The configuration of the sole structure 200*g* is substantially identical to the sole structure 200 of FIGS. 1-3 except that the sole structure 200*g* includes a plurality of apertures 255 formed through the outsole 210*g* and the cushioning member 250*g* to expose portions of the plate 300 when viewed from the bottom of the footwear 10*g*. FIG. 36 shows the plurality of apertures 255 located in the heel portion 16 and the forefoot portion 12. Other configurations may include more/less apertures 255 in the heel portion 16 and/or forefoot portion 12 as well as apertures in the mid-foot portion 14. In some implementations, only one of the portions 12, 14, 16 includes apertures 255. Each aperture 255 may be formed through the outsole 210*g* and the cushioning member 250*g* and extend in a direction substantially perpendicular to the longitudinal axis L. Advantageously, the apertures 255 are operative to reduce the overall weight of the sole structure 200*g* to provide a lighter article of footwear 10*g*. Apertures 255 may similarly be formed through any of the sole structures 200-200*f* of FIGS. 1-15 and 33-36.

FIGS. 37-39 provide an article of footwear 10*h* that includes an upper 100 and a sole structure 200*h* attached to the upper 100. In view of the substantial similarity in structure and function of the components associated with the article of footwear 10 with respect to the article of footwear 10*h*, like reference numerals are used hereinafter and in the drawings to identify like components while like reference numerals containing letter extensions are used to identify those components that have been modified.

The sole structure 200*h* may include the outsole 210, a first cushioning member 250*h*, a plate formed from a fluid-filled bladder 400*h*, and a midsole/strobel 220*h* arranged in the layered configuration. FIG. 38 provides an exploded view of the article of footwear 10*h* showing the sole structure 200*h* (e.g., the outsole 210*h*, the cushioning member 250*h*, and the midsole 220*h*) defining a longitudinal axis L. The outsole 210*h* includes an inner surface 214*h* disposed on an opposite side of the outsole 210 than the ground-engaging surface 212. The midsole 220*h* includes a bottom surface 222*h* disposed on an opposite side of the midsole 220*h* than the footbed 224 and opposing the inner surface 214*h* of the outsole 210*h*.

The cushioning member 250*h* and the fluid-filled bladder 400*h* are disposed between the inner surface 214*h* and the bottom surface 222*h* to separate the midsole 220*h* from the outsole 210*h*. For example, the cushioning member 250*h* includes the bottom surface 252 received by the inner surface 214*h* of the outsole 210*h* and a top surface 254*h* disposed on an opposite side of the cushioning member 250*h* than the bottom surface 252 and opposing the midsole 220*h* to support the bladder 400*h* thereon. In some examples, a sidewall 230*h* surrounds at least a portion of a perimeter of the cushioning member 250*h* and separates the cushioning member 250*h* and the midsole 220*h* to define a cavity 240*h* therebetween. For instance, the sidewall 230*h* may define a rim around at least a portion of the perimeter of the contoured top surface 254*h* of the cushioning member 250 to cradle the foot during use of the footwear 10 when performing walking or running movements. The rim may extend around the perimeter of the midsole 220 when the cushioning member 250 attaches to the midsole 220.

In some configurations, the fluid-filled bladder 400h is disposed upon the top surface 254h of the cushioning member 250h and underneath the midsole 220h to reduce energy loss at the MTP joint while enhancing rolling of the foot as the footwear 10h rolls for engagement with a ground surface during a running motion. As with the footwear plate 300 of FIGS. 1-3, the fluid-filled bladder 400h includes a greater stiffness than the stiffness of the cushioning member 250h and the outsole 210h. The fluid-filled bladder 400h may define a length extending through at least a portion of the length of the sole structure 200h. In some examples, the length of the bladder 400h extends through the forefoot, mid-foot, and heel portions 12, 14, 16 of the sole structure 200h. In other examples, the length of the bladder 400h extends through the forefoot portion 12 and the mid-foot portion 14, and is absent from the heel portion 16.

The cushioning member 250h may compress resiliently between the midsole 220h and the outsole 210h. The cushioning member 250h may be formed from a slab of polymer foam which may be formed from the same one or more materials forming the cushioning member 250 of FIGS. 1-3. For instance, the cushioning member 250h may be formed from one or more of EVA copolymers, polyurethanes, polyethers, olefin block copolymers, PEBA copolymers, and/or TPUs. The fluid-filled bladder 400h may also enhance cushioning characteristics of the footwear 10h in response to ground-reaction forces. For example, the bladder 400h may be filled with a pressurized fluid such as air, nitrogen, helium, sulfur, hexafluoride, or liquids/gels.

The length of the fluid-filled bladder 400h may be the same as or less than the length of the cushioning member 250h. The length, width, and thickness of the bladder 400h may substantially occupy the volume of space (e.g., cavity 240h) between the top surface 254h of the cushioning member 250h and the bottom surface 222h of the midsole 220h and may extend through the forefoot, mid-foot, and heel portions 12, 14, 16, respectively, of the sole structure 200h. In some examples, the bladder 400h extends through the forefoot portion 12 and the mid-foot portion 14 of the sole structure 200h but is absent from the heel portion 16. In some examples, a sidewall 403 of the bladder 400h is visible along the lateral and/or medial sides 18, 20 of the footwear 10h. In some implementations, the top surface 254h of the cushioning member 250h and the bottom surface 222h of the midsole 220h are smooth and include surface profiles contoured to match the surface profiles of the opposing sides of the bladder 400h such that the bladder 400h mates flush with cushioning member 250h and the midsole 220h.

The fluid-filled bladder 400h defines an interior cavity that receives the pressurized fluid while providing a durable sealed barrier for retaining the pressurized fluid therein. The bladder 400h may include an upper barrier portion 401 that opposes the bottom surface 222h of the midsole 220h and a lower barrier portion 402 disposed on an opposite side of the bladder 400h than the upper barrier portion 401 and opposing the top surface 254h of the cushioning member 250h. The sidewall 403 extends around the periphery of the bladder 400h and connects the upper barrier portion 401 to the lower barrier portion 402.

In some configurations, the interior cavity of the fluid-filled bladder 400h also receives a tether element 500 having an upper plate that attaches to upper barrier portion 401, a lower plate that attaches to the lower barrier portion 402, and a plurality of tethers 530 that extend between the upper and lower plates of the tether element 500. Adhesive bonding or thermobonding may be used to secure the tether element 500 to the bladder 400h. The tether element 500 is operative to prevent the bladder 400h from expanding outward or otherwise distending due to the pressure of the fluid within the internal cavity of the bladder 400h. Namely, the tether element 500 may limit expansion of the bladder 400h when under pressure to retain an intended shape of surfaces of the barrier portions 401 and 402.

FIG. 39 provides a partial cross-sectional view taken along line 39-39 of FIG. 37 showing the fluid-filled bladder 400h disposed between the cushioning member 250h and the midsole 220h, and the cushioning member 250h disposed between the outsole 210h and the bladder 400h. The insole 260 may be disposed upon the footbed 224 within the interior void 102 under the foot. In some configurations, the cushioning member 250h defines a greater thickness in the heel portion of the sole structure 200h than in the forefoot portion 12 and the top surface 254h includes a surface profile contoured to match the surface profile of lower barrier portion 402 of the bladder 400h thereon. The cushioning member 250h may cooperate with the midsole 220h for to define a space for enclosing the bladder 400h therebetween.

As with the footwear plates 300-300i, the bladder 400h includes a curved region 410 extending through the forefoot portion 12 and the mid-foot portion 14 and may optionally include a substantially flat region 412 extending through the heel portion 16 from an aft point at the curved region 410 to an AMP of the bladder 400h disposed proximate to the toe end of the sole structure 200h. The curved region may have a radius of curvature defining an anterior curved portion 422 and a posterior curved portion 424 similar to respective ones of the anterior and posterior curved portions 322, 324, respectively, of the footwear plate 300 of FIGS. 1-3. In some configurations, the curved portions 422, 424 each include the same radius of curvature that is mirrored about an MTP point 420 associated with the point of the bladder 400h disposed closest to the outsole 210h. In other configurations, the curved portions 422, 424 are each associated with a different radius of curvature. The curved portions 422, 424 may each account for about 30-percent (%) of the total length of the bladder 400h while the length of the flat region 412 may account for the remaining 40-percent (%) of the length of the bladder 400h. The anterior curved and posterior curved portions 422, 424, respectively, of the curved region 410 provide the bladder 400 with a longitudinal stiffness that reduces energy loss proximate to the MTP joint of the foot, as well as enhances rolling of the foot during running motions to thereby reduce a lever arm distance and alleviate strain on the ankle joint. While the example footwear 10h of FIGS. 37-39 incorporates the curved fluid-filled bladder 400h in place of the footwear plate 300 between the cushioning member 250h and the midsole 220h, the curved fluid-filled bladder 400h may replace the plate 300 in any of the articles of footwear 10-10g described above.

The footwear plates 300-300i described above may be manufactured using fiber sheets or textiles, including pre-impregnated (i.e., "prepreg") fiber sheets or textiles. Alternatively or additionally, the footwear plates 300-300i may be manufactured by strands formed from multiple filaments of one or more types of fiber (e.g., fiber tows) by affixing the fiber tows to a substrate or to each other to produce a plate having the strands of fibers arranged predominately at predetermined angles or in predetermined positions. When using strands of fibers, the types of fibers included in the strand can include synthetic polymer fibers which can be melted and re-solidified to consolidate the other fibers present in the strand and, optionally, other components such as stitching thread or a substrate or both. Alternatively or additionally, the fibers of the strand and, optionally the other components such as stitching thread or a substrate or both, can be consolidated by applying a resin after affixing the strands of fibers to the substrate and/or to each other. The above processes are described below.

With reference to FIGS. 40A-40E and 41, the footwear plates 300-300i are shown as being formed by using a series of stacked, prepreg fiber sheets 600a-600e. The prepreg fiber sheets 600a-600e may be formed from the same or different materials. For example, each of the sheets 600a-600e may be a unidirectional tape or a multi-axial fabric having a series of fibers 602 that are impregnated with resin. The fibers 602 may include at least one of carbon fibers, boron fibers, glass fibers, and other polymeric fibers that form the unidirectional sheet or multi-axial fabric. The polymeric fibers can compositionally comprise a polyurethane, a polyamide, a polyester, a polyether, a polyurethane co-polymer, a polyamide co-polymer, a polyester co-polymer, a polyether co-polymer, and any combination thereof. The polyurethane can be a thermoplastic polyurethane (TPU). The polymeric fibers can compositionally comprise polyethylene terephthalate (PET). The polymeric fibers can compositionally comprise an aramid. The polymeric fibers can compositionally comprise poly(p-phenylene-2,6-benzobisoxazole) (PBO).

Fibers such as carbon fibers, aramid fibers, and boron fibers may provide a high Young's modulus while glass fibers (e.g., fiberglass) and other polymer fibers (e.g., synthetic fibers such as polyamides other than aramid, polyesters, and polyolefins) provide a medium modulus. Alternatively, some of the sheets 600a-600e may be a unidirectional tape while others of the sheets 600a-600e are a multi-axial fabric. Further, each of the sheets 600a-600e may be include fibers 602 formed from the same material or, alternatively, one or more of the sheets 600a-600e includes fibers 602 formed from a different material than the fibers 602 of the other sheets 600a-600e.

During manufacturing of the plates 300-300i, unidirectional tape or multi-axial fabric is provided and is cut into fiber plies. The plies are cut out and angled with respect to one another and the shapes of the various sheets 600a-600e are cut from the stacked plies into the shapes shown in FIGS. 40A-40E. In so doing, the sheets 600a-600e include fibers 602 formed at different angles relative to one another such that a longitudinal axis of the fibers 602 of the unidirectional tape or multi-axial fabric is positioned at an angle (Φ) relative to a longitudinal axis (L) of each sheet 600a-600e once cut. Accordingly, when the sheets 600a-600e are stacked on one another, the longitudinal axes of the fibers 602 are positioned at different angles relative to the longitudinal axis of the plate 300-300i.

Figure 40C:
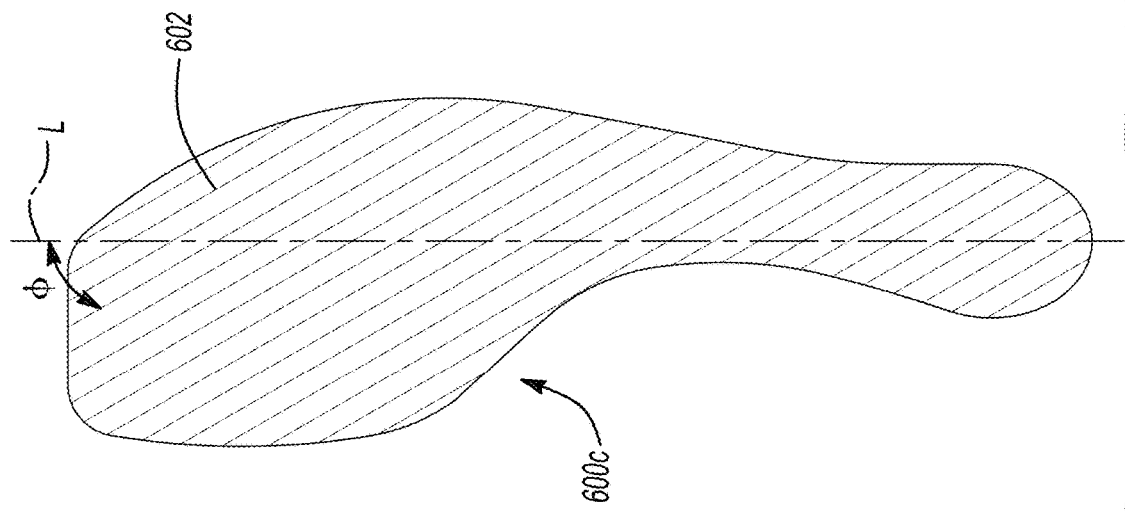
Figure 40B:
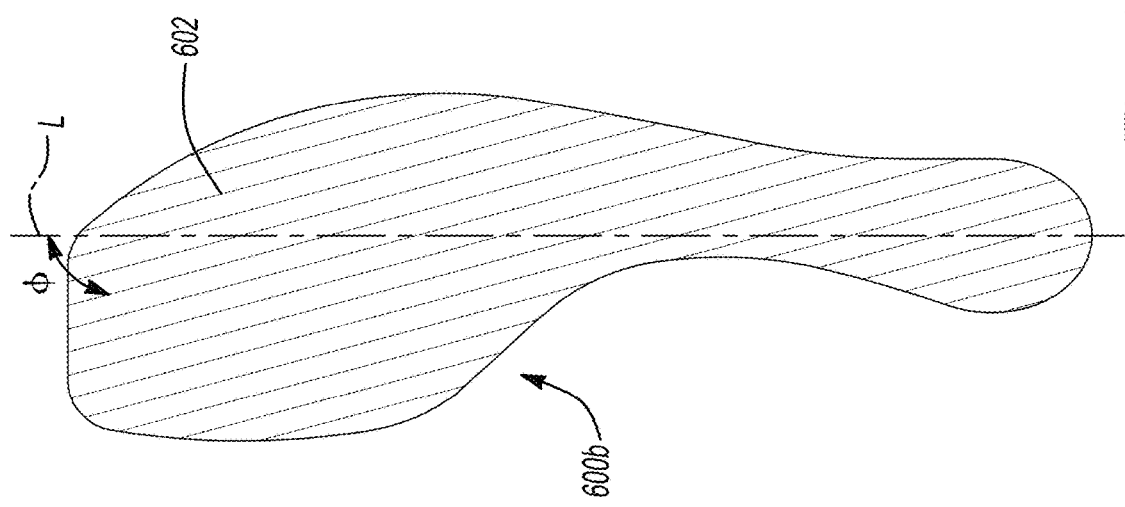
Figure 40A:
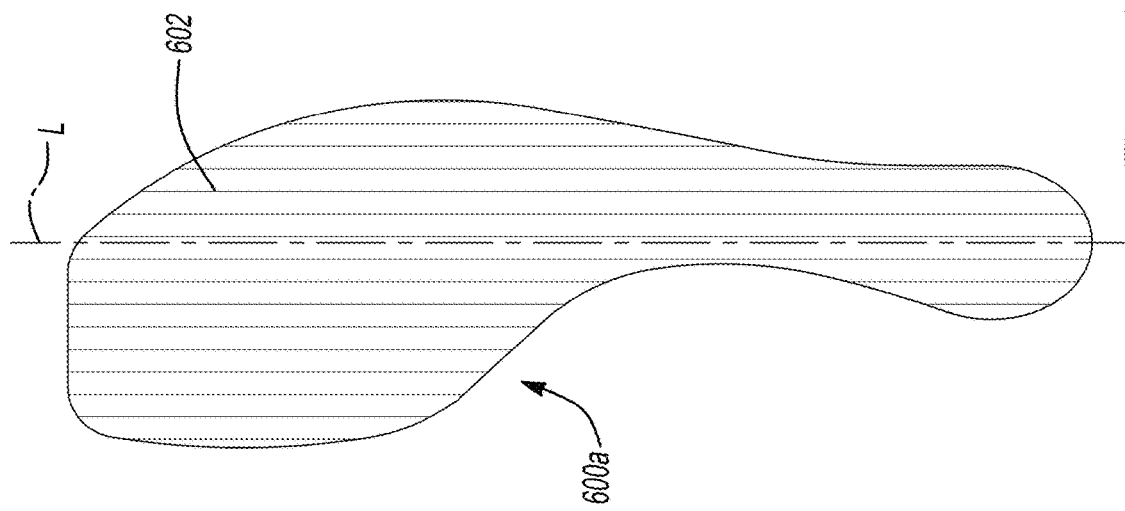
Figure 40E:
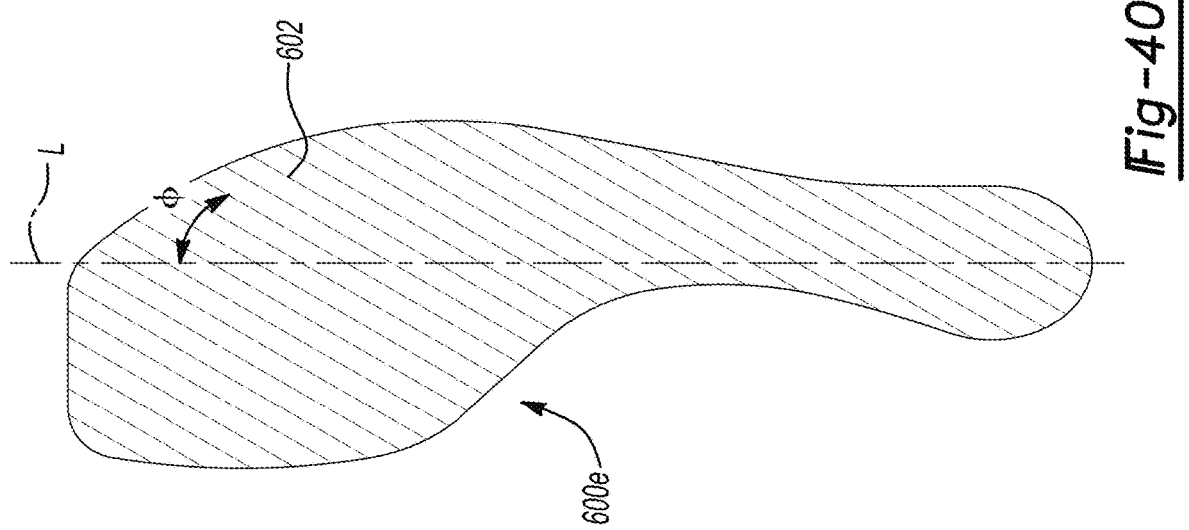
Figure 40D:
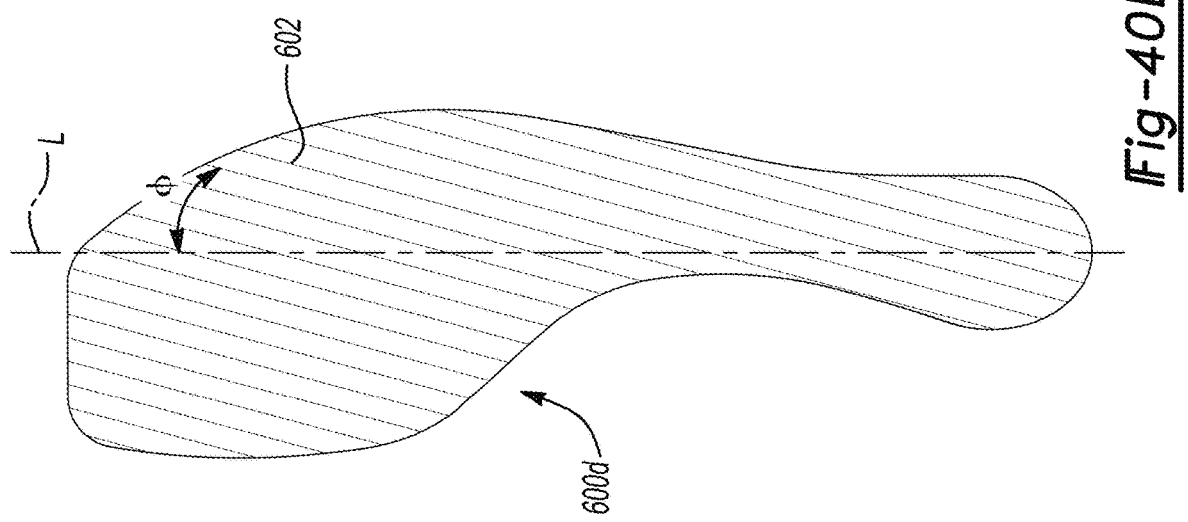

In one configuration, the angle (Φ) shown in FIG. 40A is zero degrees (0°), the angle (Φ) shown in FIG. 40B is −15 degrees (−15°), the angle (Φ) shown in FIG. 40C is −30 degrees (−30°), the angle (Φ) shown in FIG. 40D is 15 degrees (15°), and the angle (Φ) shown in FIG. 40E is 30 degrees (30°). When manufacturing the plates 300-300i, the plies are stacked such that when the sheets 600a-600e are cut from the stacked plies, the sheets 600a-600e have the shapes shown in FIGS. 40A-40E and are stacked in the order shown in FIG. 41. Namely, the bottom sheet 600c includes fibers 602 positioned at −30° relative to the longitudinal axis (L), the next sheet 600d includes fibers positioned at 15° relative to the longitudinal axis (L), the next two sheets 600a include fibers positioned at 0° relative to the longitudinal axis (L), the next sheet 600b includes fibers positioned at −15° relative to the longitudinal axis (L), and top and final sheet 600e includes fibers 602 positioned at 30° relative to the longitudinal axis (L). While the bottom sheet 600c is described as being positioned at an angle (Φ) of −30° relative to the longitudinal axis (L) and the top sheet 600e is described as being positioned at an angle (Φ) of 30° relative to the longitudinal axis (L), the bottom sheet 600c could alternative be positioned at an angle (Φ) of −15° relative to the longitudinal axis (L) and the top sheet 600e could alternatively be positioned at an angle (Φ) of 15° relative to the longitudinal axis (L). Further, while two (2) sheets 600a are described as being provided at an angle (Φ) of 0° relative to the longitudinal axis (L), more than two sheets 600a at an angle (Φ) of 0° could be provided. For example, eight (8) sheets 600a could be provided.

Once the plies are stacked and cut into the sheets 600a-600e, the stack is subjected to heat and pressure to impart the specific shape of the plates 300-300i to the staked sheets 600a-600e, as will be described in detail below. Additionally, when fibers which are pre-impregnated with resin are used, subjecting the stack to heat and pressure can melt or soften the pre-impregnated resin and affix the plies together and hold them in the specific shape. Alternatively or additionally, a liquid resin can be applied to the plies to affix the plates together and in some cases to consolidate the fibers, thereby increasing the tensile strength of the plate once the resin has solidified.

With reference to FIGS. 42A-42E and 43, the footwear plates 300-300i are shown as being formed by using a process of affixing strands of fibers to a substrate. Namely, the footwear plates 300-300i are formed from one or more strands 702 of fibers arranged in selected patterns to impart anisotropic stiffness and gradient load paths throughout the plates 300-300i. The strands 702 of fibers may be affixed to the same or separate substrates 704 and embroidered in a layered configuration. If the strands 702 of fibers are applied to separate substrates 704, the individual substrates 704 are stacked on top of one another once each substrate 704 is supplied with a strand 702 of fibers. If, on the other hand, only one substrate 704 is utilized in forming the plate 300-300i, a first strand 702 of fibers is applied to the substrate 704 with additional strands 702 of fibers (i.e., layers) being applied on top of the first strand 702. Finally, a single, continuous strand 702 of fibers may be used to form the plate 300-300i, whereby the strand 702 is initially applied and affixed to the substrate 704 and is subsequently layered on top of itself to form the layered construction shown in FIG. 43. While each of the foregoing processes may be used to form the plates 300-300i, the following process will be described as employing a single substrate 704 with individual strands 702 of fiber applied to form the construction shown in FIG. 43, whereby individual strands 702a-702e respectively form layers 700a-700e of a preformed plate.

Each strand 702 may refer to a tow of a plurality of fibers, a monofilament, yarn, or polymer pre-impregnated tows. For example, the strand 702 may include a plurality of carbon fibers and a plurality of resin fibers that, when activated, solidify and hold the carbon fibers in a desired shape and position relative to one another. As used herein, the term "tow" refers to a bundle (i.e., plurality of filaments (e.g., fibers) that may be twisted or untwisted and each tow may be designated a size associated with a number of fibers the corresponding tow contains. For instance, a single strand 702 may range in size from about 1,000 fibers per bundle to about 48,000 fibers per bundle. As used herein, the substrate 704 refers to any one of a veil, carrier, or backer to which at least one strand 702 of fibers is attached. The substrate 704 may be formed from a thermoset polymeric material or a thermoplastic polymeric material and can be a textile (e.g., knit, woven, or non-woven), an injection molded article, an organosheet, or a thermoformed article. In some configurations, the fibers associated with each strand 702 include at least one of carbon fibers, boron fibers, glass fibers, and polymeric fibers. Fibers such as carbon fibers, aramid fibers, and boron fibers may provide a high Young's modulus while glass fibers (e.g., fiberglass) and polymer fibers (e.g., synthetic fibers) provide a medium modulus.

When forming the plates 300-300i, a first strand 702c may be applied to the substrate 704. Namely, the first strand 702c may be applied directly to the substrate 704 and may be stitched to the substrate 704 to hold the first strand 702c in a desired location. In one configuration, the first strand 702c is applied to the substrate 704 such that the strand 702c is positioned at an angle (Φ) shown in FIG. 42C as being −30 degrees (−30°) relative to a longitudinal axis (L) of the substrate 704. Another or second strand 702d may be applied to the first strand 702c via stitching, for example, and may be formed at an angle (Φ) shown in FIG. 42B as being 15 degrees (−15°) relative to a longitudinal axis (L) of the substrate 704. A third strand 702a may be applied to the second strand at an angle (Φ) shown in FIG. 42A as being zero degrees (0°) relative to a longitudinal axis (L) of the substrate 704. A fourth strand 702b may be applied to the third strand at an angle (Φ) shown in FIG. 42D as being −15 degrees (15°) relative to a longitudinal axis (L) of the substrate 704. A fifth and final strand 702e may be applied to the second strand at an angle (Φ) shown in FIG. 42E as being 30 degrees (30°) relative to a longitudinal axis (L) of the substrate 704. While the first strand 702c is shown and described as being applied at an angle (Φ) shown in FIG. 42C as being −30 degrees (−30°) relative to a longitudinal axis (L) of the substrate 704 and the fifth strand 702e is shown and described as being applied at an angle (Φ) shown in FIG. 42E as being 30 degrees (30°) relative to a longitudinal axis (L) of the substrate 704, these angles (Φ) could alternatively be −15 degrees (−15°) and 15 degrees (15°), respectively.

The strands 702a-702e form the various layers 700a-700e of a pre-formed plate 300-300i. Once the layers 700a-700e are formed, the layers 700a-700e are subjected to heat and pressure to activate the impregnated resin of the various strands 702a-702e and, further, to impart the specific shape of the plates 300-300i to the layers 700a-700e, as will be described in detail below.

As set forth above, the plates 300-300i formed using the layered process (FIG. 43) include one fewer layer than the plates 300-300i formed via a prepreg fiber sheet (FIG. 41). Namely, the layered process may only utilize a single layer 700a having an angle (Φ) shown in FIG. 42A as being zero degrees (0°) relative to a longitudinal axis (L) of the substrate 704. While the layered process uses one less layer in forming the plates 300-300i, the resulting plates 300-300i have substantially the same properties (i.e., stiffness, thickness, etc.) as the plates 300-300i formed using a prepreg fiber sheet.

With particular reference to FIGS. 44 and 45, formation of a plate 300-300i is described in conjunction with a mold 800. The mold 800 includes a first mold half 802 and a second mold half 804. The mold halves 802, 804 include a mold cavity 806 having the shape of one of the various plates 300-300i to allow the mold 800 to impart the desired shape of the particular plate 300-300i to either the stacked sheets 600a-600e or to the layers 700a-700e.

After forming the stacked sheets 600a-600e or the layers 700a-700e, the sheets 600a-600e or layers 700a-700e are inserted between the mold halves 802, 804 within the mold cavity 806. At this point, the mold 800 is closed by moving the mold halves 802, 804 toward one another or by moving one of the mold halves 802, 804 toward the other mold half 802, 804. Once closed, the mold 800 applies heat and pressure to the stacked sheets 600a-600e or the layers 700a-700e disposed within the mold cavity 806 to activate the resin associated with the stacked sheets 600a-600e or the layers 700a-700e. The heat and pressure applied to the stacked sheets 600a-600e or the layers 700a-700e causes the particular shape of the mold cavity 806 to be applied to the stacked sheets 600a-600e or the layers 700a-700e and, once cured, the resin associated with the stacked sheets 600a-600e or the layers 700a-700e causes the stacked sheets 600a-600e or the layers 700a-700e to harden and retain the desired shape.

It should be noted that while the sheets 600a-600e and the layers 700a-700e are described as including a resin material, the sheets 600a-600e and the layers 700a-700e could additionally be supplied with resin that is infused within the mold 800. The infused resin could be in addition to the impregnated resin of the sheets 600a-600e and layers 700a-700e or, alternatively, could be used in place of the impregnated resin. The infused resin may include a thermoplastic material and/or a thermoset material. Additionally or alternatively, the infused resin may include other materials to increase the ductility of the footwear plate.

FIG. 46 provides a top view of an example substrate 400 for use in forming any of the footwear plates 300-300i discussed above. The substrate 1400 may be substantially thin, flat, and flexible. The substrate 1400, or at least a portion thereof, may be formed from a thermoset polymeric material or a thermoplastic polymeric material. In some configurations, the substrate 1400 includes a textile that may be knit, woven, or non-woven. The substrate 1400 may also optionally be formed form an injection molded article, a thermoformed article, or an organosheet. The substrate 1400 may be cut to a desired shape defined by a perimeter edge 1402. In some examples, the substrate 1400 is cut within an interior portion to form the cut-out portion 380 of the footwear plate 300h of FIG. 29 or the cut-out portion 380i of the footwear plate 300i of FIG. 30.

FIG. 47 provides a top view of a first tow 1300, 1310 of fibers 1350 affixed/attached to a top surface 1410 of the substrate 1400 of FIG. 46 to form a first layer on the substrate 1400. The first tow 1310 (i.e., first strand portion) forms a first void 1316 in the forefoot portion 12 and a second void 1318 in the heel portion 16 of the substrate 1400. In some examples, the first tow 1310 of fibers 1350 includes a plurality of first segments 1312 that each extend between two different locations along the substrate to form the first layer thereon and define the voids 1316, 1318 to expose the substrate 1400 therein. For instance, a portion of the first segments 1312 may extend between two different locations along the peripheral edge 1402 of the substrate 1400 in regions where the voids 1316, 1318 are absent. Other portions of the first segments 1312 extend between a first location along the peripheral edge 1402 of the substrate 1400 to a second location at an interior region of the substrate 1400 associated with a boundary of one of the voids 1316, 1318. The first segments 1312 may be disposed adjacent and substantially parallel to one another. In some examples, the first segments 1312 are applied to the substrate 1400 at a first angle relative to the longitudinal axis L of the substrate 1400. The first tow 1310 of fibers 1350 may also include first looped portions 1313 disposed proximate to the peripheral edge 1402 of the substrate 1400 that are operative to connect adjacent first segments 1312. FIG. 47 shows the first tow 1310 of fibers 1350 including curved paths that change directions based on anatomical features of the foot.

In some configurations, the first tow 1310 of fibers 1350 attaches to the substrate 1400 via first stitching 1314. For example, the first stitching 1314 may zigzag across the first tow 1310 between first attachment locations located on the substrate 1400. The first stitching 1314 may penetrate the substrate 1400 at the first attachment locations. Here, the attachment locations may be spaced apart from the first tow 1310 along the perimeter edge 1402 of the substrate 1400 as well as around the portions of the substrate 1400 exposed within the voids 1316, 1318. The first stitching 1314 may be formed from the same material as the substrate 1400 or the first stitching 1314 may be formed from a different material than the material forming the substrate 1400 such that the first stitching 1314 is associated with a higher melting point than the substrate 1400. Providing the stitching 1314 with a higher melting point than the substrate 1400 allows the stitching 1314 to melt after the substrate 1400 when heat is applied, thereby enabling the stitching 1314 to retain the first tow 1310 of fibers 1350 when the substrate 1400 begins to melt. In some examples, the first stitching 1314, or at least a portion thereof, is formed from resin.

FIG. 48 provides a top view of the first tow 1310 of fibers 1350, a second tow 1320 of fibers 1350, and a third tow 1330 of fibers 1350 affixed/attached to the substrate 1400 of FIG. 46 in a layered configuration to form an embroidered preform that may be heated, molded, and cured to form any of the curved and substantially rigid footwear plates 300-300i. Other configurations may include each tow 1310, 1320, 1330 affixed/attached to different substrates 1400 and layered to provide a stacked substrate 1400. The substrate(s) 1400 and/or tows 1310, 1320, 1330 may be trimmed prior to applying at least one of heat and pressure to form the footwear plate 300-300i.

FIG. 49 provides an exploded view of the embroidered preform of FIG. 48 showing each one of the substrate 1400, the first tow 1310, the second tow 1320, and the third tow 1330 such that each tow 1310, 1320, 1330 is formed from separate corresponding strands/bundles of fibers 1350. For example, at least one of the first tow 1310, the second tow 1320, and the third tow 1330 is formed from a corresponding continuous strand of fibers 1350. In other configurations, however, the tows 1310, 1320, 1330 may all be formed from the same continuous stand/bundle of fibers 1350. The tows 1310, 1320, 1330 may attach to the top surface 1410 of the substrate 1400 without penetrating a bottom surface 1412 disposed on an opposite side of the substrate 1400 than the top surface 1410.

In some examples, the first tow 1310 is associated with a first shape and the second tow 1320 is associated with a second shape that is different than the first shape. Similarly, the third tow 1330 is associated with a third shape that may be different than the first and third shapes. Accordingly, the layers associated with at least two of the tows 1310, 1320, 1330 may be anisotropic. Other configurations may include the first shape being approximately the same as the second shape and/or the third shape. In some implementations, at least two of the tows 1310, 1320, 1330 have approximately the same length. By contrast, other implementations include at least two of the tows 1310, 1320, 1330 having different lengths. For instance, the examples of FIGS. 48 and 49 show the first tow 1310 of fibers 1350 defining a length that extends through the forefoot, mid-foot, and heel portions 12, 14, 16, the second tow 1320 of fibers 1350 defining a second length shorter than the first length that extends through the forefoot and mid-foot portions 12, 14, and the third tow 1330 of fibers 1350 defining a third length shorter than the second length that extends within the forefoot and mid-foot portions 12, 14 of the substrate 1400. Each tow 1310, 1320, 1330 may be designed with an emphasis to provide corresponding performance characteristics different from the corresponding performance characteristics provided by the other tows 1310, 1320, 1330. Moreover, the layered configuration of the tows 1310, 1320, 1330 may provide a variable thickness throughout the forefoot, mid-foot, and heel portions 12, 14, 16 of the substrate 1400.

In some implementations, the second tow 1320 (i.e., second strand portion) is disposed on the first layer (e.g., the first tow 1310) and includes second segments 1322 that each extend between two different locations along the peripheral edge 1402 of the substrate 1400 to form a second layer on the first layer. The second segments 1322 may be convergent with the first segments 1312. The first tow 1310 of fibers 1350 and the second tow 1320 of fibers 1350 may be formed from the same or different materials. For instance, the first tow 1310 and/or the second tow 1320 may include at least one of carbon fibers, boron fibers, glass fibers, and polymeric fibers. In some examples, the second tow 1320 of fibers 1350 includes approximately the same number of fibers 1350 as the first tow 1310 of fibers 1350. In other examples, the second tow 1320 of fibers 1350 includes a different number of fibers 1350 than the first tow 1310 of fibers 1350. As with the first tow 1310, the second tow 1320 of fibers 1350 may include second looped portions 1323 disposed proximate to the peripheral edge 1402 of the substrate 1400 for connecting adjacent second segments 1322. In some configurations, one or more of the looped portions 1323 extend beyond the peripheral edge 1402 of the substrate 1400 and create pinch points when the layered configuration is subjected to pressure (e.g., molding) for consolidating the fibers 450 to form the footwear plate 300 when the layered configuration forming the embroidered preform is subjected to pressure (e.g., molding) for consolidating the fibers 1350 to form the footwear plate 300-300i. Accordingly, FIG. 48 shows the second tow 1320 of fibers 1350 cut along the peripheral edge 1402 of the substrate 1400 to remove the looped portions 1323, thereby removing the presence of pinch points when applying pressure to form the finished footwear plate 300-300i. Thus, adjacent second segments 1322 may be disconnected at the peripheral edge of the substrate 1400 once the corresponding looped portions 1323 are removed (e.g., by cutting).

The second tow 1320 of fibers 1350 may attach to the substrate 1400 via second stitching 1324 that may zigzag across the second tow 1320 between second attachment locations located on the substrate 1400. In some examples, the second stitching 1324 penetrates the substrate 1400 at the second attachment locations. Additionally or alternatively, the second stitching 1324 may extend through the first tow 1310 of fibers 1350. In other words, the second stitching 1324 may attach the second tow 1320 of fibers 1350 to the substrate 1400 by crossing over the second tow 1320 of fibers 1350, extending through the first tow 1310 of fibers, and penetrating the substrate 1400 at the second attachment locations.

In some scenarios, the first stitching 1314 and/or the second stitching 1324 are formed from resin. Additionally or alternatively, at least one of the first stitching 1314 and the second stitching 1324 is formed from the same material as the substrate 1400. In some configurations, at least one of the first stitching 1314 and the second stitching 1324 has a higher melting point than the substrate 1400. Here, the higher melting point allows the stitching(s) 1314, 1324 to melt after the substrate 1400 begins to melt during thermal processing so that the corresponding tows 1310, 1320 are kept in place by the stitching(s) 1314, 1324. The stitching(s) 1314, 1324 may also include materials that match optional infused polymers used for compression molding and/or vacuum molding.

The third tow 1330 (i.e., third strand portion) is disposed on the second layer (e.g., the second tow 1320) and includes third segments 1332 that each extend between two different locations along the peripheral edge 1402 of the substrate 1400 to form a third layer on the second layer. As with the first segments 1312 of the first tow 1310, the second segments 1322 and the third segments 1332 of the corresponding second and third tows 1320, 1330 may each be disposed adjacent and substantially parallel to one another. FIG. 48 shows the second segments 1322 of the second tow 1320 of fibers 1350 applied to the substrate at a second angle relative to the longitudinal axis of the substrate 1400 that is different than the first angle associated with the first segments 1312 of the first tow 1310 of fibers 1350. While FIG. 48 also shows the third segments 1332 of the third tow 1330 applied to the substrate 1400 at a third angle relative to the longitudinal axis of the substrate 1400 that is different than both the first angle associated with the first segments 1312 and the second angle associated with the second segments 1322, the third angle may be the same as one of the first angle and the second angle but different from the other one of the first angle and the second angle. In other words, other configurations may include the third tow 1330 having third segments 1332 that is convergent with only one of the first segments 1312 and the second segments 1322.

In some configurations, the third tow 1330 of fibers 1350 attaches to the substrate 1400 via third stitching 1334 that zigzags across the third tow 1330 between third attachment locations located on the substrate 1400. In some examples, the third stitching 1334 penetrates the substrate 1400 at the third attachment locations. Additionally or alternatively, the third stitching 1334 may extend through at least one of the first tow 1310 of fibers 1350 and the second tow 1320 of fibers 1350. In other words, the third stitching 1334 may attach the third tow 1330 of fibers 1350 to the substrate 1400 by crossing over the third tow 1330 of fibers 1350, extending through the first tow 1310 and/or the second tow 1320, and penetrating the substrate 1400 at the third attachment locations.

Referring to FIG. 50, a close-up view shows a portion of the first tow 1300, 1310 of fibers 1350 attached to the substrate 1400 via the first stitching 1314. The first tow 1310 is disposed upon the top surface 1410 of the substrate 1400 and the first stitching 1314 crosses (e.g., zigzags) over the first tow 1310 and penetrates the substrate 1400 at the first attachment locations 3115 that are spaced apart from the first tow 1310. The substrate 1400 and the first stitching 1314 may be formed from thermoplastic polymer materials that melt during the thermal processing. The first stitching 1314 may be formed from a first thermoplastic polymer material and the substrate 1400 may be formed from a second thermoplastic polymer material having a lower melting temperature than the first thermoplastic polymer material. Thus, the first stitching 1314 may retain the first tow 1310 of fibers 1350 in place without melting when the substrate 400 begins to melt during thermal processing. The fibers 1350 associated with the first tow 1310 may include non-polymer fibers 1352 and polymer fibers 1354. For instance, the non-polymer fibers 1352 may include carbon fibers, glass fibers, aramid fibers, and/or boron fibers. The polymer fibers 1354, on the other hand, may include thermoplastic polymer fibers having a higher melting temperature than that of the thermoplastic polymer materials used to form the substrate 1400 and/or the first stitching 1314. Moreover, the thermoplastic polymer materials used to form the substrate 1400 may include a melting temperature that is below a degradation temperature associated with the non-polymer fibers 1352 (e.g., carbon fibers).

FIG. 51 provides a cross-sectional view taken along line 51-51 of FIG. 50 showing the first stitching 1314 attaching the first tow 1310 of fibers 1350 to the top surface 1410 of the substrate 1400. The first stitching 1314 may penetrate through the surfaces 1410, 1412 of the substrate 1400 and zigzag across the first tow 1310 between the first attachment locations 1315. The non-polymer fibers 1352 (e.g., carbon fibers) and the polymer fibers 1354 (e.g., thermoplastic polymer fibers) may include circular cross sections that co-mingle with each other throughout the length of the first tow 1310.

One or more embroidered preforms formed by the tows 1310, 1320, 1330 of fibers 1350 may be incorporated into the series of stacked prepreg fiber sheets 600a-600e of FIG. 41 or the individual strands 702a-702e respectively forming the layers 700a-700e of FIG. 43 to tune the stiffness properties imparted by the finished footwear plate 300-300i. For instance, one or more embroidered preform layers may be provided in addition to, or replacing, any of the fiber sheets 600a-600e stacked in the order shown in FIG. 41 or any of the layers 700a-700e of FIG. 43.

FIG. 52 provides another tow 1300a of fibers 1350 attached to the substrate 1400 and forming a first layer on the substrate 1400. The tow 1300a of fibers 1350 includes a pattern of segments 1302 that are disposed adjacent and substantially parallel to one another. Whereas the first segments 1312 of the first tow 1310 of fibers 1350 of FIGS. 47-49 define voids 1316, 1318 exposing the substrate 1400, the segments 1302 extend continuously between two different locations along the peripheral edge 1402 of the substrate 1400 to form the first layer covering the substrate 400 without defining any voids, i.e., the segments 1302 extend across the substrate 1400 between the lateral and medial sides. The segments 1302 may extend in a direction that converges with the longitudinal axis of the substrate 1400. Referring to FIG. 53, a detailed view within phantom circle 53 of FIG. 52 shows the tow 1300a including looped portions 1303 disposed proximate to the peripheral edge 1402 of the substrate 1400 for connecting adjacent segments 1302. Moreover, the tow 1300a of fibers 1350 may attach to the substrate 1400 via stitching 1304 that may zigzag across the tow 1300a between attachment locations 1305 located on the substrate 1400. In some example, looped portions 1303 extending beyond the peripheral edge 1402 are removed to define the peripheral edge of the plate 300-300i, as well as eliminate the presence of pinch points when the preform is subjected to pressure (e.g., molding).

FIGS. 54 and 55 provide exploded (FIG. 54) and side-by-side (FIG. 55) views of an embroidered preform used to form any of the footwear plates 300-300i that be incorporated into any of the articles of footwear 10-10h. The embroidered preform associated with the footwear plate 300-300i includes the substrate 1400, a first tow 1310a of fibers 1350, a second tow 1320a of fibers 1350, and a third tow 1330a of fibers arranged in a layered configuration. The tows 1310a, 1320a, 1330a may be formed from the same continuous strand/bundle of fibers 1350 or at least one of the tows 1310a, 1320a, 1330a may be formed from a different continuous strand/bundle of fibers 1350. As with the tows 1310, 1320, 1330 of FIGS. 48 and 49, the tows 1310a, 1320a, 1330a may attach to the top surface 1410 of the substrate 1400 without penetrating the bottom surface 1412 of the substrate 1400 via stitching 1314, 1324, 1334 that crosses over corresponding tows 1310a, 1320a, 1330a between attachment locations disposed on the substrate 1400. The tows 1310a, 1320a, 1330a of fibers 1350 may also similarly include at least one of carbon fibers, boron fibers, glass fibers, and polymeric fibers. In other configurations, the at least a portion of the stitching 1314, 1324, 1334 penetrates the bottom surface 1412 of the substrate 1400.

The first tow 1310a of fibers 1350 includes first segments 1312a that each extend between two different locations along the peripheral edge 1402 of the substrate 1400 to form a first layer on the substrate 1400 (e.g., upon the top surface 1410). The first segments 1312 are disposed adjacent and substantially parallel to one another. FIG. 55 shows the first segments 1312a applied to the substrate 1400 at a first angle $\alpha_1$ relative to the longitudinal axis L of the substrate 400.

The second tow 1320a of fibers 1350 includes second segments 1322a that each extend between two different locations along the peripheral edge 1402 of the substrate 1400 to form a second layer on the first layer. Here, the second segments 1322a are convergent with the first segments 1312a and disposed adjacent and substantially parallel to one another. For instance, the second segments 1322a may be applied to the first layer at a second angle $\alpha_2$ relative to the longitudinal axis L of the substrate 1400 that is different than the first angle $\alpha_1$. In some examples, the first layer associated with the first tow 1310a and the second layer associated with the second tow 1320a are anisotropic to impart gradient stiffness and gradient load paths throughout the plate 300-300i.

The third tow 1330a of fibers 1350 includes third segments 1332a that each extend between two different locations along the peripheral edge 1402 of the substrate 1400 to form a third layer on the second layer. Here, the third segments 1332a are convergent with the first segments 1312a and the second segments 1322a and disposed adjacent and substantially parallel to one another. For instance, the third segments 1332a may be applied to the second layer at a third angle as relative to the longitudinal axis L of the substrate 1400 that is different than the first angle $\alpha_1$ and the second angle $\alpha_2$. Other configurations may include attaching each tow 1310a, 1320a, 1330a to a separate corresponding substrate and stacking the substrates to form a substrate stack such that the first tow 1310a is disposed between a bottom substrate and an intermediate substrate, the second tow 1320a is disposed between the intermediate substrate and a top substrate, and the third tow is disposed upon the top substrate.

FIGS. 56-59 provide an embroidered preform used to form any of the footwear plates 300-300i for incorporation into any of the articles of footwear 10-10h. FIG. 56 provides a top view of the preform including a first tow 1310b of fibers 1350 and a second tow 1320b of fibers disposed upon the top surface 1410 of the substrate 1400. Stitching may attach the tows 1310b, 1320b to the substrate 1400 at corresponding attachment locations that may penetrate the substrate 1400 through the top and bottom surfaces 1410, 1412. The first tow 1310b (i.e., first strand portion) may define a plurality of first segments 1312b that each extend between two different locations along the substrate 1400 to form a layer thereon and define a first void 1316b in the forefoot portion 12 and a second void 1318b in the heel portion 16 of the substrate 1400. The second tow 1320b is operative as an outer reinforcement area disposed along the perimeter edge 1402 of the substrate 1400 such that the fibers 1350 of the second tow 1320b surround the first segments 1312b associated with the first tow 1310b of fibers 1350. The preform plate may optionally include a third tow 1330b of fibers 1350 that operate as an inner reinforcement area surrounding the first void 1316b in the forefoot portion 12. Here, the outer and inner reinforcement areas defined by the second and third tows 1320b, 1330b may provide additional reinforcement or structural support for the first segments 1312b of the first tow 1310b in regions between the first void 1316b and the perimeter edge 1402 of the substrate 1400. The example shows the third tow 1330b forming a third void 1336b that is spaced apart from the second void 318b bit aligned with the first void 1316b to expose the substrate 1400. While not shown in FIG. 56, the preform plate may also include a fourth tow of fibers operative as a corresponding inner reinforcement area surrounding the second void 1318b in the heel portion 16 in the same manner as the third tow 1330b reinforces the first segments 1312b surrounding the first void 1316b.

Referring to FIG. 57, a cross-sectional view taken along line 57-57 of FIG. 56 shows the second tow 1320b of fibers 1350 disposed along the perimeter edge 1402 of the substrate 1400 to provide the outer reinforcement area for the first tow 1310b of fibers 1350. The tows 1310b, 1320b may have approximately the same length or may have different lengths. In some implementations, the tows 1310b, 1320b are formed from the same materials. For instance, the fibers 1350 associated with the tows 1310b, 1320b may include at least one of the non-polymer fibers 1352 (e.g., carbon fibers, glass fibers and/or aramid fibers, and/or boron fibers) and the polymer fibers 1354. As set forth above, the polymer fibers 1354 may include thermoplastic polymer fibers having a higher melting temperature than that of thermoplastic polymer materials (if any) used to form the substrate 1400. In other implementations, the tows 1310b, 1320b are formed from different materials.

FIG. 58 provides an alternate cross-sectional view taken along line 57-57 of FIG. 56 showing a polymeric material 1520 providing the outer reinforcement area for the first tow 1310b of fibers 1350. Here, the polymeric material 1520 may include a single strand of material (i.e., with a circular cross-section) that replaces the second tow 1320b of fibers 1350 by extending along the perimeter edge 1402 of the substrate 1400. The polymeric material 1520 may include a thermoplastic polymeric material or a thermoset polymeric material having a higher melting temperature than a melting temperature of polymeric materials forming the substrate 1400 so that the polymeric material 1520 reinforces the first tow 1310b of fibers 1350 along the perimeter edge 1402 of the substrate 1400 as the substrate 1400 begins to melt.

FIG. 59 provides another alternate cross-sectional view taken along line 57-57 of FIG. 56 showing the first tow 1310b of fibers 1350 attached to a substrate 1400a having the top surface 1410 opposing the first tow 1310b and the bottom surface 1412 disposed on an opposite side of the substrate 1400a than the top surface 1410. Whereas the second tow 1320b or the polymeric material 1520 attaches to the substrate 1400 of FIGS. 56-58 to provide the outer reinforcement area for the first tow 1310b of fibers 1350, the substrate 1400a includes a fold 1414 along a perimeter edge 1402a to double a thickness of the substrate 1400a for providing the outer reinforcement area for the first tow 1310b of fibers 1350.

Referring to FIGS. 60-62, a mold is provided and includes an upper mold portion 82 and a lower mold portion 84 that molds an embroidered preform 1300, 1400 including the one or more tows 1300 of fibers 1350 attached to one or more substrates 1400 to form any of the footwear plates 300-300i. As set forth above, the plate 300-300i (referring to plate 300) may define the curved/concave portion 310 and the substantially flat portion 312 for incorporation into any of the articles of footwear 10-10h of FIGS. 1-15 and FIGS. 31-39. Accordingly, the upper mold portion 82 may include a contact surface 86 having a surface profile that imparts a shape to the embroidered preform 1300, 1400 to provide the curved/concave portion 310 when the embroidered preform is compressed between the mold portions 82, 84. Likewise, the lower mold portion 84 may include a contact surface 88 having a surface profile that imparts a shape to the embroidered preform 1300, 1400 to provide the curved/concave portion 310 when the embroidered preform is compressed between the mold portions 82, 84. In some examples, the lower mold portion 84 is fixed and the upper mold portion 82 translates toward the lower mold portion 84 to close the mold 80 and thereby compress the embroidered preform 1300, 1400 therebetween. In other examples, the lower mold portion 84 and the upper mold portion 82 may each translate toward one another or only the lower mold portion 84 may translate toward the upper mold portion 82.

FIG. 60 shows the mold 80 open and the embroidered preform 1300, 1400 positioned between the upper mold portion 82 and the lower mold portion 82. The embroidered preform 1300, 1400 may include one or more tows 1300 of fibers 1350 attached to the substrate 1400. The substrate 1400 and the tows 1300 may be substantially flexible. For instance, the tows 1300 may attach to the substrate 1400 without penetrating the substrate 1400 to form one or more layers upon the top surface 1410 of the substrate 1400. For instance, the tows 300 may attach to the substrate 1400 via stitching 1304 that crosses over the tows 1300 and penetrates the substrate 1400 at attachment locations 1305 spaced apart from the tows 1300 and/or penetrating thru at least one of the tows 1300. In some examples, the stitching 1304 is formed from resin.

In some configurations, the one or more tows 1300 may include the first, second, and third tows 1310, 1320, 1330 of FIGS. 48 and 49 attached to the substrate 1400 to form corresponding first, second, and third layers upon the top surface 1410 of the substrate. In these examples, the tows 1310, 1320, 1330 may be formed from the same continuous strand of fibers 1350 or at least one of the tows 1310 may be formed from a different strand of fibers 1350. Accordingly, the one or more tows 1310, 1320, 1330 may be formed from the same or different materials, may include the approximately the same or a different number of fibers 1350, may include approximately the same or different lengths, may include the approximately the same or different thicknesses, and may include at least one of carbon fibers, boron fibers, glass fibers, and polymeric fibers. While FIGS. 48 and 49 depict the tows 1310, 1320, 1330 arranged in a layered configuration upon a single substrate 1400, other configurations include attaching each tow 1310, 1320, 1330 to a corresponding substrate 1400 to form a substrate stack. In these configurations, the substrate stack may be positioned between the upper and lower mold portions 82, 84 and subjected to heat and pressure (FIG. 61) to conform the stack to the shape of at least one of the corresponding contact surfaces 86, 88 and cured to provide the footwear plate 300-300i (FIG. 62) having the curved portion 310 and the substantially flat portion 312.

In some implementations, the embroidered preform 1300, 1400 is infused with a liquid material 1650 that coats/encapsulates exterior portions of the at least one tow 1300 and partially penetrates interior portions of the at least one tow 1300 to bind the least one tow 1300 to the substrate 1400 and/or other tows 1300. In these implementations, the liquid material 650 may include a thermoset material applied to the preform 1300, 1400 in a molten state. The thermoset material may include at least one of an epoxy, a polyurethane, a polymerizable composition, and a pre-polymer. Moreover, one or more polymers, such as rubber and/or block copolymer, may be added to the liquid material 1650 to increase ductility when the liquid material 1650 cures. Additionally or alternatively, a resin material 1652 may be incorporated into the at least one tow 1300 to assist with binding/affixing the at least one tow 1300 to the substrate 1400.

The mold 80 may close by transitioning at least one of the upper mold portion 82 and the lower mold portion 84 toward the other one of the upper mold portion 82 and the lower mold portion 84. FIG. 61 shows the mold 80 closed and pressure applied to the embroidered preform 300, 400 by subjecting the preform 1300, 1400 to at least one of compression molding and vacuum molding while enclosed between the mold portions 82, 84. Moreover, the mold 80 may simultaneously apply heat to assist with conforming the embroidered preform 1300, 1400 to the shape of at least one of the corresponding contact surfaces 86, 88 and curing the embroidered preform 1300, 1400 to provide the footwear plate 300-300i with the desired shape and structural rigidity. The upper and/or lower mold portions 82, 84 may include a plurality of conduits configured to channel a heated liquid, such as water, through the corresponding mold portion(s) 82, 84. Here, the heated liquid raises the overall temperature of the corresponding mold portion 82, 84 and the preform 1300, 1400 conducts the heat from the mold portion(s) 82, 84, thereby raising the temperature of the preform 1300, 1400 to a temperature suitable for melting and/or curing one or more materials associated therewith. In some implementations, the preform 1300, 1400 is heated prior to placement within the mold 80.

In some configurations, the substrate 1400 is formed from a thermoplastic film that attaches to the at least one tow 1300 via the stitching 1304 which penetrates the substrate 1400 at the attachment locations 1305. In examples where more than one substrates 1400 form a stack, at least one of the substrates 400 may be formed form the thermoplastic film. At least a portion of the stitching 1304 may be formed from the same material as the substrate 1400. Thus, at least a portion of the stitching 1304 may be formed the same thermoplastic material as the thermoplastic film forming the substrate 1400. In these configurations, applying heat to the embroidered preform 1300, 1400 while the mold 80 is closed is operative to thermoform the thermoplastic film and the thermoplastic stitching 1304 to join the at least one tow 1300 of fibers 1350 to the substrate. Additionally, the closed mold 80 may apply pressure to the embroidered preform 1300, 1400. In some configurations, the thermoplastic stitching 1304 includes a higher melting point than the thermoplastic film so that the stitching 1305 melts after the thermoplastic film, thereby permitting the stitching 1304 to hold the at least one tow 1300 in position upon the substrate 1400 as the thermoplastic film of the substrate 1400 begins to melt. Additionally, in configurations when the resin material 1652 is incorporated into the at least one tow 1300, the heat and pressure activates the resin material 1652 to bind the fibers 1350 associated with the at least one tow 1300 in addition to the stitching 1304 when at least the portion of the stitching is formed from resin.

In implementations when the liquid material 1650 (e.g., thermoset material with or without the addition of the ductility increasing polymers) infuses the at least one tow 1300 of fibers 1350, the closed mold 180 applying at least one of heat and pressure includes subjecting the embroidered preform to at least one of vacuum molding and compression molding to cure the liquid material 1650 (e.g., cure the thermoset material) such that the at least one tow 300 binds to the substrate 1400 and/or other tows 1300.

Referring to FIG. 62, the mold 80 opens by translating the upper mold portion 82 away from the lower mold portion 84 and/or the lower mold portion 84 away from upper mold portion 82. The liquid material 1650 (thermoset material) infused into the tows 300 and/or the thermoplastic material forming the substrate 1400 and/or the stitching are cured to form the footwear plate 300-300i with the desired shape. Thereafter, the footwear plate 300-300i may be incorporated into the article of footwear 10-10h.

The forgoing processes may be used to form footwear plates and cushioning elements that may be used to manufacture custom-made footwear. For instance, various measurements of the foot may be recorded to determine suitable dimensions of the footwear plate and the cushioning member(s) incorporated into the article of footwear. Additionally, data associated with the gate of the foot may be obtained to determine if the foot is indicative of toe striking or heel striking. The foot measurements and obtained data may be used to determine optimal angles and radii of curvature of the footwear plate, as well as the thickness of the one or more cushioning members positioned above, below, or encapsulating the footwear plate. Moreover, the length and width of the footwear plate may be determined based on the collected data and foot measurements. In some examples, the foot measurements and collected data are used to select the footwear plate and/or cushioning member(s) from a plurality of pre-fabricated footwear plates and/or cushioning member(s) of various sizes and dimensions that closely match the foot of the wearer.

Custom footwear plates may further allow for tailoring of the stiffness of the plate for a particular wearer of the footwear. For instance, the tendon stiffness and calf muscle strength of an athlete may be measured to determine a suitable stiffness of the plate for use by the athlete. Here, the stiffness of the footwear plate can vary with the strength of the athlete or for the size/condition of the athlete's tendons. Additionally or alternatively, the stiffness of the plate may be tailored based on biomechanics and running mechanics of a particular athlete, such as how the angles of the athlete's joints change during running movements. In some examples, force and motion measurements of the athlete are obtained before manufacturing a custom plate for the athlete. In other examples, plates are manufactured in particular ranges or increments of stiffness to provide semi-custom footwear such that individual athletes may select a suitable stiffness.

In some examples, a method of manufacturing the footwear plate 300 includes the steps of providing a plurality of stacked plies (or tows), fusing the plurality of stacked plies to form a monolithic layer, and thermally forming the monolithic layer to form the plate 300. The method may also include providing an upper 100 defining an interior void 102 and inserting the plate into the interior void 102. The method may also include providing a midsole 220 extending from a forefoot portion 12 to a heel portion 16, positioning the plate 300 on a superior portion of the midsole 220, securing the upper 100 to the midsole 220, and securing an outsole 210 to the midsole 220 to form an article of footwear.

The following Clauses provide exemplary configurations for a plate for an article of footwear described above and methods for manufacturing a plate for an article of footwear.

Clause 1: A sole structure for an article of footwear having an upper, the sole structure comprising an outsole and a plate disposed between the outsole and the upper. The plate comprising an anterior-most point disposed in a forefoot region of the sole structure, a posterior-most point disposed closer to a heel region of the sole structure than the anterior-most point, and a concave portion extending between the anterior-most point and the posterior-most point and including a constant radius of curvature from the anterior-most point to a metatarsophalangeal (MTP) point of the sole structure, the MTP point opposing the MTP joint of a foot during use. A first cushioning layer may be disposed between the concave portion and the upper. The plate may be formed by a first tow of fibers forming a first layer, a second tow of fibers forming a second layer, and third tow of fibers forming a third layer, whereby the first tow of fibers, the second tow of fibers, and the third tow of fibers are positioned at different angles relative to a longitudinal axis of the plate over the length of the plate.

Clause 2: The sole structure according to Clause 1, wherein the anterior-most point and the posterior-most point are co-planar.

Clause 3: The sole structure according to Clause 2, wherein the plate includes a substantially flat portion disposed within the heel region of the sole structure, the posterior-most point being located within the substantially flat portion.

Clause 4: The sole structure according to Clause 1, wherein the plate includes a substantially flat portion disposed within the heel region of the sole structure, the posterior-most point being located within the substantially flat portion.

Clause 5: The sole structure according to Clause 4, further comprising a blend portion disposed between and connecting the concave portion and the substantially flat portion.

Clause 6: The sole structure according to Clause 5, wherein the blend portion includes a substantially constant curvature.

Clause 7: The sole structure according to Clause 5, wherein the blend portion includes a radius of curvature equal to about 134 millimeters (mm) for a men's size ten (10) article of footwear.

Clause 8: The sole structure according to Clause 5, wherein the anterior-most point and the posterior-most point are co-planar at a junction of the blend portion and the substantially flat portion.

Clause 9: The sole structure according to any of Clauses 3-8, further comprising a second cushioning layer disposed between the substantially flat portion and the upper.

Clause 10: The sole structure according to Clause 9, further comprising a third cushioning layer disposed between the outsole and the plate.

Clause 11: The sole structure according to Clause 10, wherein the third cushioning layer is disposed within the heel region.

Clause 12: The sole structure according to Clause 10, wherein the third cushioning layer extends from the heel region to the forefoot region.

Clause 13: The sole structure according to Clause 12, wherein the second cushioning member includes a thickness from about 3.0 millimeters (mm) to about 13.0 mm at a location opposing the MTP point and the third cushioning member includes a thickness from about 0.5 mm to about 6.0 mm at the location opposing the MTP point.

Clause 14: The sole structure according to any of Clauses 9-12, wherein at least one of the first cushioning member, the second cushioning member, and the third cushioning member includes a density from about 0.05 grams per cubic centimeter ($g/cm^3$) to about 0.20 $g/cm^3$, a hardness from about eleven (11) Shore A to about fifty (50) Shore A, and an energy return of at least sixty percent (60%).

Clause 15: The sole structure according to any of Clauses 9-12, further comprising at least one fluid-filled chamber disposed between the plate and the upper and/or between the outsole and the plate.

Clause 16: The sole structure according to Clause 15, wherein the at least one fluid-filled chamber is disposed within at least one of the second cushioning layer and the third cushioning layer.

Clause 17: The sole structure according to any of the preceding clauses, wherein the MTP point is located approximately thirty percent (30%) of the total length of the plate from the anterior-most point and the posterior-most point is located approximately thirty percent (30%) of the total length of the plate from the MTP point.

Clause 18: The sole structure according to any of the preceding clauses, wherein the MTP point is located approximately 81 millimeters (mm) of the total length of the plate from the anterior-most point and the posterior-most point is located approximately 81 millimeters (mm) of the total length of the plate from the anterior-most point.

Clause 19: The sole structure according to any of the preceding clauses, wherein the MTP point is located from about twenty-five percent (25%) to about thirty-five percent (35%) of the total length of the plate from the anterior-most point and the posterior-most point is located from about twenty-five percent (25%) to about thirty-five percent (35%) of the total length of the plate from the MTP point.

Clause 20: The sole structure according to any of the preceding clauses, wherein a center of the radius of curvature is located at the MTP point.

Clause 21: The sole structure according to any of the preceding clauses, wherein the constant radius of curvature extends from the anterior-most point past the MTP point.

Clause 22: The sole structure according to Clause 1, wherein the constant radius of curvature extends from the anterior-most point past the MTP point at least forty percent (40%) of the total length of the plate from the anterior-most point.

Clause 23: The sole structure according to any of the preceding clauses, wherein the outsole includes a ground-contacting surface and an inner surface formed on an opposite side of the outsole than the ground-contact surface, the inner surface being directly attached to the plate.

Clause 24: The sole structure according to Clause 23, wherein the inner surface is attached to the plate proximate to the concave portion.

Clause 25: The sole structure according to any of the preceding clauses, wherein the plate includes a thickness from about 0.6 millimeters (mm) to about 3.0 mm.

Clause 26: The sole structure according to any of the preceding clauses, wherein the plate includes a Young's modulus equal to at least seventy (70) gigapascals (GPa).

Clause 27: The sole structure according to any of the preceding clauses, wherein the anterior-most point and the posterior-most point of the plate each include a position height from the MTP equal from about three (3) millimeters (mm) to about twenty-eight (28) mm.

Clause 28: The sole structure according to any of the preceding clauses, wherein the anterior-most point and the posterior-most point of the plate each include a position height from the MTP equal from about seventeen (17) millimeters (mm) to about fifty-seven (57) mm.

Clause 29: The sole structure according to any of the preceding clauses, wherein the anterior-most point extends from the MTP point at an angle from about twelve (12) degrees to about thirty-five (35) degrees relative to a horizontal reference plane.

Clause 30: The sole structure according to any of the preceding clauses wherein the posterior-most point extends from the MTP point at an angle from about twelve (12) degrees to about thirty-five (35) degrees relative to a horizontal reference plane.

Clause 31: A sole structure for an article of footwear having an upper, the sole structure comprising an outsole and a plate disposed between the outsole and the upper. The plate comprising an anterior-most point disposed in a forefoot region of the sole structure, a posterior-most point disposed closer to a heel region of the sole structure than the anterior-most point, and a curved portion extending between and connecting the anterior-most point and the posterior-most point and including a constant radius of curvature from the anterior-most point to a metatarsophalangeal (MTP) point of the sole structure, the MTP point opposing the MTP joint of a foot during use. A first cushioning layer may be disposed between the curved portion and the upper. The plate may be formed by a first tow of fibers forming a first layer, a second tow of fibers forming a second layer, and third tow of fibers forming a third layer, whereby the first tow of fibers, the second tow of fibers, and the third tow of fibers are positioned at different angles relative to a longitudinal axis of the plate over the length of the plate.

Clause 32: The sole structure according to Clause 31, wherein the anterior-most point and the posterior-most point are co-planar.

Clause 33: The sole structure according to Clause 32, wherein the plate includes a substantially flat portion disposed within the heel region of the sole structure, the posterior-most point being located within the substantially flat portion.

Clause 34: The sole structure according to Clause 31, wherein the plate includes a substantially flat portion disposed within the heel region of the sole structure, the posterior-most point being located within the substantially flat portion.

Clause 35: The sole structure according to Clause 34, further comprising a blend portion disposed between and connecting the curved portion and the substantially flat portion.

Clause 36: The sole structure according to Clause 35, wherein the blend portion includes a substantially constant curvature.

Clause 37: The sole structure according to Clause 24, wherein the blend portion includes a radius of curvature equal to about 134 millimeters (mm) for a men's size ten (10) article of footwear.

Clause 38: The sole structure according to Clause 35, wherein the anterior-most point and the posterior-most point are co-planar at a junction of the blend portion and the substantially flat portion.

Clause 39: The sole structure according to any of Clauses 33-38, further comprising a second cushioning layer disposed between the substantially flat portion and the upper.

Clause 40: The sole structure according to Clause 39, further comprising a third cushioning layer disposed between the outsole and the plate.

Clause 41: The sole structure according to Clause 40, wherein the third cushioning layer is disposed within the heel region.

Clause 42: The sole structure according to Clause 40, wherein the third cushioning layer extends from the heel region to the forefoot region.

Clause 43: The sole structure according to Clause 42, wherein the second cushioning member includes a thickness from about 3.0 millimeters (mm) to about 13.0 mm at a location opposing the MTP point and the third cushioning member includes a thickness from about 0.5 mm to about 6.0 mm at the location opposing the MTP point.

Clause 44: The sole structure according to any of Clauses 39-43, wherein at least one of the first cushioning member, the second cushioning member, and the third cushioning member includes a density from about 0.05 grams per cubic centimeter ($g/cm^3$) to about 0.20 $g/cm^3$, a hardness from about eleven (11) Shore A to about fifty (50) Shore A, and an energy return of at least sixty percent (60%).

Clause 45: The sole structure according to any of Clauses 39-42, further comprising at least one fluid-filled chamber disposed between the plate and the upper and/or between the outsole and the plate.

Clause 46: The sole structure according to Clause 45, wherein the at least one fluid-filled chamber is disposed within at least one of the second cushioning layer and the third cushioning layer.

Clause 47: The sole structure according to any of the preceding clauses, wherein the MTP point is located approximately thirty percent (30%) of the total length of the plate from the anterior-most point and the posterior-most point is located approximately thirty percent (30%) of the total length of the plate from the MTP point.

Clause 48: The sole structure according to any of the preceding clauses, wherein the MTP point is located approximately 81 millimeters (mm) of the total length of the plate from the anterior-most point and the posterior-most point is located approximately 81 millimeters (mm) of the total length of the plate from the anterior-most point.

Clause 49: The sole structure according to any of the preceding clauses, wherein the MTP point is located from about twenty-five percent (25%) to about thirty-five percent (35%) of the total length of the plate from the anterior-most point and the posterior-most point is located from about twenty-five percent (25%) to about thirty-five percent (35%) of the total length of the plate from the MTP point.

Clause 50: The sole structure according to any of the preceding clauses, wherein a center of the radius of curvature is located at the MTP point.

Clause 51: The sole structure according to any of the preceding clauses, wherein the constant radius of curvature extends from the anterior-most point past the MTP point.

Clause 52: The sole structure according to Clause 31, wherein the constant radius of curvature extends from the anterior-most point past the MTP point at least forty percent (40%) of the total length of the plate from the anterior-most point.

Clause 53: The sole structure according to any of the preceding clauses, wherein the outsole includes a ground-contacting surface and an inner surface formed on an opposite side of the outsole than the ground-contact surface, the inner surface being directly attached to the plate.

Clause 54: The sole structure according to Clause 53, wherein the inner surface is attached to the plate proximate to the curved portion.

Clause 55: The sole structure according to any of the preceding clauses, wherein the plate includes a thickness from about 0.6 millimeters (mm) to about 3.0 mm.

Clause 56: The sole structure according to any of the preceding clauses, wherein the plate includes a Young's modulus equal to at least seventy (70) gigapascals (GPa).

Clause 57: The sole structure according to any of the preceding clauses, wherein the anterior-most point and the posterior-most point of the plate each include a position height from the MTP equal from about three (3) millimeters (mm) to about twenty-eight (28) mm.

Clause 58: The sole structure according to any of the preceding clauses, wherein the anterior-most point and the posterior-most point of the plate each include a position height from the MTP equal from about seventeen (17) millimeters (mm) to about fifty-seven (57) mm.

Clause 59: The sole structure according to any of the preceding clauses, wherein the anterior-most point extends from the MTP point at an angle from about twelve (12) degrees to about thirty-five (35) degrees relative to a horizontal reference plane.

Clause 60: The sole structure according to any of the preceding clauses wherein the posterior-most point extends from the MTP point at an angle from about twelve (12) degrees to about thirty-five (35) degrees relative to a horizontal reference plane.

Clause 61: A sole structure for an article of footwear having an upper, the sole structure comprising an outsole, a plate disposed between the outsole and the upper. The plate comprising an anterior-most point disposed in a forefoot region of the sole structure, a posterior-most point disposed closer to a heel region of the sole structure than the anterior-most point, and a curved portion extending between and connecting the anterior-most point and the posterior-most point and including a circular curvature from the anterior-most point to a metatarsophalangeal (MTP) point of the sole structure, the MTP point opposing the MTP joint of a foot during use. A first cushioning layer may be disposed between the curved portion and the upper. The plate may be formed by a first tow of fibers forming a first layer, a second tow of fibers forming a second layer, and third tow of fibers forming a third layer, whereby the first tow of fibers, the second tow of fibers, and the third tow of fibers are positioned at different angles relative to a longitudinal axis of the plate over the length of the plate.

Clause 62: The sole structure according to Clause 61, wherein the anterior-most point and the posterior-most point are co-planar.

Clause 63: The sole structure according to Clause 62, wherein the plate includes a substantially flat portion disposed within the heel region of the sole structure, the posterior-most point being located within the substantially flat portion.

Clause 64: The sole structure according to Clause 61, wherein the plate includes a substantially flat portion disposed within the heel region of the sole structure, the posterior-most point being located within the substantially flat portion.

Clause 65: The sole structure according to Clause 64, further comprising a blend portion disposed between and connecting the curved portion and the substantially flat portion.

Clause 66: The sole structure according to Clause 65, wherein the blend portion includes a substantially constant curvature.

Clause 67: The sole structure according to Clause 65, wherein the blend portion includes a radius of curvature equal to about 134 millimeters (mm) for a men's size ten (10) article of footwear.

Clause 68: The sole structure according to Clause 65, wherein the anterior-most point and the posterior-most point are co-planar at a junction of the blend portion and the substantially flat portion.

Clause 69: The sole structure according to any of Clauses 63-68, further comprising a second cushioning layer disposed between the substantially flat portion and the upper.

Clause 70: The sole structure according to Clause 69, further comprising a third cushioning layer disposed between the outsole and the plate.

Clause 71: The sole structure according to Clause 70, wherein the third cushioning layer is disposed within the heel region.

Clause 72: The sole structure according to Clause 70, wherein the third cushioning layer extends from the heel region to the forefoot region.

Clause 73: The sole structure according to Clause 72, wherein the second cushioning member includes a thickness from about 3.0 millimeters (mm) to about 13.0 mm at a location opposing the MTP point and the third cushioning member includes a thickness from about 0.5 mm to about 6.0 mm at the location opposing the MTP point.

Clause 74: The sole structure according to any of Clauses 69-73, wherein at least one of the first cushioning member, the second cushioning member, and the third cushioning member includes a density from about 0.05 grams per cubic centimeter ($g/cm^3$) to about 0.20 $g/cm^3$, a hardness from about eleven (11) Shore A to about fifty (50) Shore A, and an energy return of at least sixty percent (60%).

Clause 75: The sole structure according to any of Clauses 69-72, further comprising at least one fluid-filled chamber disposed between the plate and the upper and/or between the outsole and the plate.

Clause 76: The sole structure according to Clause 75, wherein the at least one fluid-filled chamber is disposed within at least one of the second cushioning layer and the third cushioning layer.

Clause 77: The sole structure according to any of the preceding clauses, wherein the MTP point is located approximately thirty percent (30%) of the total length of the plate from the anterior-most point and the posterior-most point is located approximately thirty percent (30%) of the total length of the plate from the MTP point.

Clause 78: The sole structure according to any of the preceding clauses, wherein the MTP point is located approximately 81 millimeters (mm) of the total length of the plate from the anterior-most point and the posterior-most point is located approximately 81 millimeters (mm) of the total length of the plate from the anterior-most point.

Clause 79: The sole structure according to any of the preceding clauses, wherein the MTP point is located from about twenty-five percent (25%) to about thirty-five percent (35%) of the total length of the plate from the anterior-most point and the posterior-most point is located from about twenty-five percent (25%) to about thirty-five percent (35%) of the total length of the plate from the MTP point.

Clause 80: The sole structure according to any of the preceding clauses, wherein a center of the circular curvature is located at the MTP point.

Clause 81: The sole structure according to any of the preceding clauses, wherein the circular curvature extends from the anterior-most point past the MTP point.

Clause 82: The sole structure according to Clause 61, wherein the circular curvature extends from the anterior-most point past the MTP point at least forty percent (40%) of the total length of the plate from the anterior-most point.

Clause 83: The sole structure according to any of the preceding clauses, wherein the outsole includes a ground-contacting surface and an inner surface formed on an opposite side of the outsole than the ground-contact surface, the inner surface being directly attached to the plate.

Clause 84: The sole structure according to Clause 83, wherein the inner surface is attached to the plate proximate to the curved portion.

Clause 85: The sole structure according to Clause 83, further comprising a second cushioning layer disposed on an opposite side of the plate than the first cushioning layer, the second cushioning layer forming at least a portion of the outsole.

Clause 86: The sole structure according to any of the preceding clauses, wherein the plate includes a thickness from about 0.6 millimeters (mm) to about 3.0 mm.

Clause 87: The sole structure according to any of the preceding clauses, wherein the plate includes a Young's modulus equal to at least seventy (70) gigapascals (GPa).

Clause 88: The sole structure according to any of the preceding clauses, wherein the anterior-most point and the posterior-most point of the plate each include a position height from the MTP equal from about three (3) millimeters (mm) to about twenty-eight (28) mm.

Clause 89: The sole structure according to any of the preceding clauses, wherein the anterior-most point and the posterior-most point of the plate each include a position height from the MTP equal from about seventeen (17) millimeters (mm) to about fifty-seven (57) mm.

Clause 90: The sole structure according to any of the preceding clauses, wherein the anterior-most point extends from the MTP point at an angle from about twelve (12) degrees to about thirty-five (35) degrees relative to a horizontal reference plane.

Clause 91: The sole structure according to any of the preceding clauses wherein the posterior-most point extends from the MTP point at an angle from about twelve (12) degrees to about thirty-five (35) degrees relative to a horizontal reference plane.

Clause 92: A plate for an article of footwear having a sole structure, the plate comprising an anterior-most point disposed in a forefoot region of the sole structure, a posterior-most point disposed closer to a heel region of the sole structure than the anterior-most point, and a concave portion extending between the anterior-most point and the posterior-most point and including a constant radius of curvature from the anterior-most point to a metatarsophalangeal (MTP) point of the sole structure, the MTP point opposing the MTP joint of a foot during use. The plate may be formed by a first tow of fibers forming a first layer, a second tow of fibers forming a second layer, and third tow of fibers forming a third layer, whereby the first tow of fibers, the second tow of fibers, and the third tow of fibers are positioned at different angles relative to a longitudinal axis of the plate over the length of the plate.

Clause 93: The plate according to Clause 92, wherein the anterior-most point and the posterior-most point are co-planar.

Clause 94: The plate according to Clause 93, wherein the plate includes a substantially flat portion disposed within the heel region of the sole structure, the posterior-most point being located within the substantially flat portion.

Clause 95: The plate according to Clause 92, wherein the plate includes a substantially flat portion disposed within the heel region of the sole structure, the posterior-most point being located within the substantially flat portion.

Clause 96: The plate according to Clause 95, further comprising a blend portion disposed between and connecting the concave portion and the substantially flat portion.

Clause 97: The plate according to Clause 96, wherein the blend portion includes a substantially constant curvature.

Clause 98: The plate according to Clause 96, wherein the blend portion includes a radius of curvature equal to about 134 millimeters (mm) for a men's size ten (10) article of footwear.

Clause 99: The plate according to Clause 96, wherein the anterior-most point and the posterior-most point are co-planar at a junction of the blend portion and the substantially flat portion.

Clause 100: The plate according to any of the preceding clauses, wherein the MTP point is located approximately thirty percent (30%) of the total length of the plate from the anterior-most point and the posterior-most point is located approximately thirty percent (30%) of the total length of the plate from the MTP point.

Clause 101: The plate according to any of the preceding clauses, wherein the MTP point is located approximately 81 millimeters (mm) of the total length of the plate from the anterior-most point and the posterior-most point is located approximately 81 millimeters (mm) of the total length of the plate from the anterior-most point.

Clause 102: The plate according to any of the preceding clauses, wherein the MTP point is located from about twenty-five percent (25%) to about thirty-five percent (35%) of the total length of the plate from the anterior-most point and the posterior-most point is located from about twenty-five percent (25%) to about thirty-five percent (35%) of the total length of the plate from the MTP point.

Clause 103: The plate according to any of the preceding clauses, wherein a center of the radius of curvature is located at the MTP point.

Clause 104: The plate according to any of the preceding clauses, wherein the constant radius of curvature extends from the anterior-most point past the MTP point.

Clause 105: The plate according to Clause 104, wherein the constant radius of curvature extends from the anterior-most point past the MTP point at least forty percent (40%) of the total length of the plate from the anterior-most point.

Clause 106: The plate according to any of the preceding clauses, wherein the plate includes a thickness from about 0.6 millimeters (mm) to about 3.0 mm.

Clause 107: The plate according to any of the preceding clauses, wherein the plate includes a Young's modulus equal to at least seventy (70) gigapascals (GPa).

Clause 108: The sole structure according to any of the preceding clauses, wherein the anterior-most point and the posterior-most point of the plate each include a position height from the MTP equal from about three (3) millimeters (mm) to about twenty-eight (28) mm.

Clause 109: The sole structure according to any of the preceding clauses, wherein the anterior-most point and the posterior-most point of the plate each include a position height from the MTP equal from about seventeen (17) millimeters (mm) to about fifty-seven (57) mm.

Clause 110: The sole structure according to any of the preceding clauses, wherein the anterior-most point extends from the MTP point at an angle from about twelve (12) degrees to about thirty-five (35) degrees relative to a horizontal reference plane.

Clause 111: The sole structure according to any of the preceding clauses wherein the posterior-most point extends from the MTP point at an angle from about twelve (12) degrees to about thirty-five (35) degrees relative to a horizontal reference plane.

Clause 112: A plate for an article of footwear having a sole structure, the plate comprising an anterior-most point disposed in a forefoot region of the sole structure, a posterior-most point disposed closer to a heel region of the sole structure than the anterior-most point, and a curved portion extending between and connecting the anterior-most point and the posterior-most point and including a constant radius of curvature from the anterior-most point to a metatarsophalangeal (MTP) point of the sole structure, the MTP point opposing the MTP joint of a foot during use. The plate may be formed by a first tow of fibers forming a first layer, a second tow of fibers forming a second layer, and third tow of fibers forming a third layer, whereby the first tow of fibers, the second tow of fibers, and the third tow of fibers are positioned at different angles relative to a longitudinal axis of the plate over the length of the plate.

Clause 113: The plate according to Clause 112, wherein the anterior-most point and the posterior-most point are co-planar.

Clause 114: The plate according to Clause 113, wherein the plate includes a substantially flat portion disposed within the heel region of the sole structure, the posterior-most point being located within the substantially flat portion.

Clause 115: The plate according to Clause 112, wherein the plate includes a substantially flat portion disposed within the heel region of the sole structure, the posterior-most point being located within the substantially flat portion.

Clause 116: The plate according to Clause 115, wherein the curved portion includes a blend portion disposed between and connecting the constant radius of curvature and the substantially flat portion.

Clause 117: The plate according to Clause 107, wherein the blend portion includes a substantially constant curvature.

Clause 118: The plate according to Clause 116, wherein the blend portion includes a radius of curvature equal to about 134 millimeters (mm) for a men's size ten (10) article of footwear.

Clause 119: The plate according to Clause 107, wherein the anterior-most point and the posterior-most point are co-planar at a junction of the blend portion and the substantially flat portion.

Clause 120: The plate according to any of the preceding clauses, wherein the MTP point is located approximately thirty percent (30%) of the total length of the plate from the anterior-most point.

Clause 121: The plate according to any of the preceding clauses, wherein the MTP point is located approximately 81 millimeters (mm) of the total length of the plate from the anterior-most point and the posterior-most point is located approximately 81 millimeters (mm) of the total length of the plate from the anterior-most point.

Clause 122: The plate according to any of the preceding clauses, wherein the MTP point is located from about twenty-five percent (25%) to about thirty-five percent (35%) of the total length of the plate from the anterior-most point and the posterior-most point is located from about twenty-five percent (25%) to about thirty-five percent (35%) of the total length of the plate from the MTP point.

Clause 123: The plate according to any of the preceding clauses, wherein a center of the radius of curvature is located at the MTP point.

Clause 124: The plate according to any of the preceding clauses, wherein the constant radius of curvature extends from the anterior-most point past the MTP point.

Clause 125: The plate according to Clause 124, wherein the constant radius of curvature extends from the anterior-most point past the MTP point at least forty percent (40%) of the total length of the plate from the anterior-most point.

Clause 126: The plate according to any of the preceding clauses, wherein the plate includes a thickness from about 0.6 millimeters (mm) to about 3.0 mm.

Clause 127: The plate according to any of the preceding clauses, wherein the plate includes a Young's modulus equal to at least seventy (70) gigapascals (GPa).

Clause 128: The plate according to any of the preceding clauses, wherein the anterior-most point and the posterior-most point of the plate each include a position height from the MTP equal from about three (3) millimeters (mm) to about twenty-eight (28) mm.

Clause 129: The plate according to any of the preceding clauses, wherein the anterior-most point and the posterior-most point of the plate each include a position height from the MTP equal from about seventeen (17) millimeters (mm) to about fifty-seven (57) mm.

Clause 130: The plate according to any of the preceding clauses, wherein the anterior-most point extends from the MTP point at an angle from about twelve (12) degrees to about thirty-five (35) degrees relative to a horizontal reference plane.

Clause 131: The plate according to any of the preceding clauses wherein the posterior-most point extends from the MTP point at an angle from about twelve (12) degrees to about thirty-five (35) degrees relative to a horizontal reference plane.

Clause 132: A plate for an article of footwear having a sole structure, the plate comprising an anterior-most point disposed in a forefoot region of the sole structure, a posterior-most point disposed closer to a heel region of the sole structure than the anterior-most point, and a curved portion extending between and connecting the anterior-most point and the posterior-most point and including a circular curvature from the anterior-most point to a metatarsophalangeal (MTP) point of the sole structure, the MTP point opposing the MTP joint of a foot during use. The plate may be formed by a first tow of fibers forming a first layer, a second tow of fibers forming a second layer, and third tow of fibers forming a third layer, whereby the first tow of fibers, the second tow of fibers, and the third tow of fibers are positioned at different angles relative to a longitudinal axis of the plate over the length of the plate.

Clause 133: The plate according to Clause 114, wherein the anterior-most point and the posterior-most point are co-planar.

Clause 134: The plate according to Clause 133, wherein the plate includes a substantially flat portion disposed within the heel region of the sole structure, the posterior-most point being located within the substantially flat portion.

Clause 135: The plate according to Clause 114, wherein the plate includes a substantially flat portion disposed within the heel region of the sole structure, the posterior-most point being located within the substantially flat portion.

Clause 136: The plate according to Clause 133, wherein the curved portion includes a blend portion disposed between and connecting the circular curvature and the substantially flat portion.

Clause 137: The plate according to Clause 136, wherein the blend portion includes a substantially constant curvature.

Clause 138: The plate according to Clause 136, wherein the blend portion includes a radius of curvature equal to about 134 millimeters (mm) for a men's size ten (10) article of footwear.

Clause 139: The plate according to Clause 136, wherein the anterior-most point and the posterior-most point are co-planar at a junction of the blend portion and the substantially flat portion.

Clause 140: The plate according to any of the preceding clauses, wherein the MTP point is located approximately thirty percent (30%) of the total length of the plate from the anterior-most point.

Clause 141: The plate according to any of the preceding clauses, wherein the MTP point is located approximately 81 millimeters (mm) of the total length of the plate from the anterior-most point and the posterior-most point is located approximately 81 millimeters (mm) of the total length of the plate from the anterior-most point.

Clause 142: The plate according to any of the preceding clauses, wherein the MTP point is located from about twenty-five percent (25%) to about thirty-five percent (35%) of the total length of the plate from the anterior-most point and the posterior-most point is located from about twenty-five percent (25%) to about thirty-five percent (35%) of the total length of the plate from the MTP point.

Clause 143: The plate according to any of the preceding clauses, wherein a center of the circular curvature is located at the MTP point.

Clause 144: The plate according to any of the preceding clauses, wherein the circular curvature extends from the anterior-most point past the MTP point.

Clause 145: The plate according to Clause 144, wherein the circular curvature extends from the anterior-most point past the MTP point at least forty percent (40%) of the total length of the plate from the anterior-most point.

Clause 146: The plate according to any of the preceding clauses, wherein the plate includes a thickness from about 0.6 millimeters (mm) to about 3.0 mm.

Clause 147: The plate according to any of the preceding clauses, wherein the plate includes a Young's modulus equal to at least seventy (70) gigapascals (GPa).

Clause 148: The sole structure according to any of the preceding clauses, wherein the anterior-most point and the posterior-most point of the plate each include a position height from the MTP equal from about three (3) millimeters (mm) to about twenty-eight (28) mm.

Clause 149: The plate according to any of the preceding clauses, wherein the anterior-most point and the posterior-most point of the plate each include a position height from the MTP equal from about seventeen (17) millimeters (mm) to about fifty-seven (57) mm.

Clause 150: The plate according to any of the preceding clauses, wherein the anterior-most point extends from the MTP point at an angle from about twelve (12) degrees to about thirty-five (35) degrees relative to a horizontal reference plane.

Clause 151: The plate according to any of the preceding clauses wherein the posterior-most point extends from the MTP point at an angle from about twelve (12) degrees to about thirty-five (35) degrees relative to a horizontal reference plane.

Clause 152: A plate for an article of footwear, the plate comprising: i. a substrate; ii. a first strand portion attached to the substrate and forming a first layer on the substrate, the first strand portion attached to the substrate via first stitching that crosses over the first strand portion and penetrates the substrate at first attachment locations that are spaced apart from the first strand portion; and iii. a second strand portion disposed on the first layer and forming a second layer, the second strand portion attached to the substrate via second stitching that crosses over the second strand portion, extends through the first strand portion, and penetrates the substrate at second attachment locations. The plate including an anterior-most point disposed in a forefoot region of the article of footwear, a posterior-most point disposed closer to a heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 153: The plate of Clause 152, wherein the first strand portion is disposed between the second attachment locations and the second strand portion.

Clause 154: The plate of any of the preceding clauses, wherein the first strand portion and the second strand portion are portions of the same, continuous strand.

Clause 155: The plate of any of the preceding clauses, wherein the first strand portion and the second strand portion are formed from the same material.

Clause 156: The plate of any of the preceding clauses, wherein the first strand portion and the second strand portion are formed from different materials.

Clause 157: The plate of any of the preceding clauses, wherein the first strand portion is formed from a first tow of fibers.

Clause 158: The plate of Clause 157, wherein the first tow of fibers includes at least one of carbon fibers, boron fibers, glass fibers, and polymeric fibers.

Clause 159: The plate of any of the preceding clauses, wherein the second strand portion is formed from a second tow of fibers.

Clause 160: The plate of Clause 159, wherein the second tow of fibers includes at least one of carbon fibers, boron fibers, glass fibers, and polymeric fibers.

Clause 161: The plate of Clause 160, wherein the second tow of fibers includes approximately the same number of fibers as the first tow of fibers.

Clause 162: The plate of Clause 160, wherein the second tow of fibers includes a different number of fibers than the first tow of fibers.

Clause 163: The plate of any of the preceding clauses, wherein the first strand portion and the second strand portion have different lengths.

Clause 164: The plate of any of the preceding clauses, wherein the first strand portion and the second strand portion have approximately the same length.

Clause 165: The plate of any of the preceding clauses, wherein the first strand portion forms a first void in the first layer.

Clause 166: The plate of Clause 165, wherein the substrate is exposed within the first void.

Clause 167: The plate of Clause 165, wherein the second strand portion forms a second void in the second layer.

Clause 168: The plate of Clause 167, wherein the second void is aligned with the first void to expose the substrate at the second layer.

Clause 169: The plate of Clause 167, wherein the second void is spaced apart from the first void.

Clause 170: The plate of any of the preceding clauses, wherein the first strand portion is applied to the substrate in a first shape and the second strand portion is applied to the first layer in a second shape.

Clause 171: The plate of Clause 170, wherein the first shape is approximately the same as the second shape.

Clause 172: The plate of Clause 170, wherein the first shape is different than the second shape.

Clause 173: The plate of any of the preceding clauses, wherein at least one of the first stitching and the second stitching is formed from resin.

Clause 174: The plate of any of the preceding clauses, wherein at least one of the first stitching and the second stitching is formed from the same material as the substrate.

Clause 175: The plate of any of the preceding clauses, wherein at least one of the first stitching and the second stitching has a higher melting point than the substrate.

Clause 176: The plate of any of the preceding clauses, wherein the first stitching zigzags across the first strand portion between the first attachment locations.

Clause 177: The plate of any of the preceding clauses, wherein the second stitching zigzags across the second strand portion between the second attachment locations.

Clause 178: A plate for an article of footwear, the plate comprising: i. a substrate defining a peripheral edge; ii. a first strand portion attached to the substrate and including first segments that each extend between two different locations along the peripheral edge of the substrate to form a first layer on the substrate, the first segments being disposed adjacent and substantially parallel to one another; and iii. a second strand portion disposed on the first layer and including second segments that each extend between two different locations along the peripheral edge of the substrate to form a second layer on the first layer, the second segments being convergent with the first segments and disposed adjacent and substantially parallel to one another. The plate including an anterior-most point disposed in a forefoot region of the article of footwear, a posterior-most point disposed closer to a heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 179: The plate of Clause 178, wherein at least one of the first strand portion and the second strand portion is a continuous strand.

Clause 180: The plate of any of the preceding clauses, wherein the first strand portion and the second strand portion are portions of the same, continuous strand.

Clause 181: The plate of any of the preceding clauses, wherein the first strand portion and the second strand portion are formed from the same material.

Clause 182: The plate of any of the preceding clauses, wherein the first strand portion and the second strand portion are formed from different materials.

Clause 183: The plate of any of the preceding clauses, wherein the first strand portion is formed from a first tow of fibers.

Clause 184: The plate of Clause 183, wherein the first tow of fibers includes at least one of carbon fibers, boron fibers, glass fibers, and polymeric fibers.

Clause 185: The plate of any of the preceding clauses, wherein the second strand portion is formed from a second tow of fibers.

Clause 186: The plate of Clause 185, wherein the second tow of fibers includes at least one of carbon fibers, boron fibers, glass fibers, and polymeric fibers.

Clause 187: The plate of Clause 186, wherein the second tow of fibers includes approximately the same number of fibers as the first tow of fibers.

Clause 188: The plate of Clause 186, wherein the second tow of fibers includes a different number of fibers than the first tow of fibers.

Clause 189: The plate of any of the preceding clauses, wherein the first strand portion includes first looped portions disposed proximate to the peripheral edge of the substrate, the first looped portions connecting adjacent first segments.

Clause 190: The plate of any of the preceding clauses, wherein the second strand portion includes second looped portions disposed proximate to the peripheral edge of the substrate, the second looped portions connecting adjacent second segments.

Clause 191: The plate of any of the preceding clauses, wherein the first strand portion forms a first void in the first layer.

Clause 192: The plate of Clause 191, wherein the substrate is exposed within the first void.

Clause 193: The plate of Clause 191, wherein the second strand portion forms a second void in the second layer.

Clause 194: The plate of Clause 193, wherein the second void is aligned with the first void to expose the substrate at the second layer.

Clause 195: The plate of Clause 193, wherein the second void is spaced apart from the first void.

Clause 196: The plate of any of the preceding clauses, wherein the first segments are applied to the substrate at a first angle relative to a longitudinal axis of the substrate and the second segments are applied to the first layer at a second angle relative to the longitudinal axis of the substrate that is different than the first angle.

Clause 197: The plate of Clause 196, further comprising a third strand portion disposed on the second layer and including third segments that each extend between two different locations along the peripheral edge of the substrate to form a third layer on the second layer, the third segments being convergent with the first segments and the second segments and disposed adjacent and substantially parallel to one another.

Clause 198: The plate of Clause 197, wherein the third segments are applied to the second layer at a third angle relative to the longitudinal axis of the substrate that is different than the first angle and the second angle.

Clause 199: The plate of any of the preceding clauses, wherein the first strand portion is attached to the substrate via first stitching and the second strand portion is attached to the substrate via second stitching.

Clause 200: The plate of Clause 199, wherein at least one of the first stitching and the second stitching is formed from the same material as the substrate.

Clause 201: The plate of Clause 200, wherein at least one of the first stitching and the second stitching has a higher melting point than the substrate.

Clause 202: The plate of Clause 199, wherein at least one of the first stitching and the second stitching is formed from resin.

Clause 203: The plate of Clause 199, wherein the first stitching zigzags across the first strand portion and penetrates the substrate at first attachment locations.

Clause 204: The plate of Clause 203, wherein the first attachment locations are spaced apart from the first strand portion.

Clause 205: The plate of Clause 203, wherein the second stitching zigzags across the second strand portion and penetrates the substrate at second attachment locations.

Clause 206: The plate of Clause 205, wherein the first strand portions are disposed between the second layer and the second attachment locations.

Clause 207: The plate of Clause 205, wherein the second stitching extends though the first strand portion.

Clause 208: The plate of any of the preceding clauses, wherein the first layer and the second layer are anisotropic.

Clause 209: A plate for an article of footwear, the plate comprising: i. a substrate; and ii. a first strand portion attached to the substrate and forming a first layer on the substrate, the first strand portion forming a first void in the first layer to expose the substrate within the first void. The plate including an anterior-most point disposed in a forefoot region of the article of footwear, a posterior-most point disposed closer to a heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 210: The plate of Clause 209, further comprising a second strand portion disposed on the first layer and forming a second layer.

Clause 211: The plate of Clause 210, wherein the first strand portion and the second strand portion are portions of the same, continuous strand.

Clause 212: The plate of Clause 210, wherein the first strand portion and the second strand portion are formed from the same material.

Clause 213: The plate of Clause 210, wherein the first strand portion and the second strand portion are formed from different materials.

Clause 214: The plate of any of Clause 210, wherein the first strand portion and the second strand portion have different lengths.

Clause 215: The plate of Clause 210, wherein the first strand portion and the second strand portion have approximately the same length.

Clause 216: The plate of Clause 210, wherein the second strand portion forms a second void in the second layer.

Clause 217: The plate of Clause 216, wherein the second void is aligned with the first void to expose the substrate at the second layer.

Clause 218: The plate of Clause 216, wherein the second void is spaced apart from the first void.

Clause 219: The plate of Clause 210, wherein the first strand portion is applied to the substrate in a first shape and the second strand portion is applied to the first layer in a second shape.

Clause 220: The plate of Clause 219, wherein the first shape is approximately the same as the second shape.

Clause 221: The plate of Clause 219, wherein the first shape is different than the second shape.

Clause 222: The plate of any of the preceding clauses, wherein the first strand portion is attached to the substrate by stitching.

Clause 223: The plate of Clause 222, wherein the stitching is formed from resin.

Clause 224: The plate of Clause 222, wherein the stitching is formed from the same material as the substrate.

Clause 225: The plate of Clause 222, wherein the stitching has a higher melting point than the substrate.

Clause 226: The plate of any of Clause 222, wherein the stitching zigzags across the first strand portion between attachment locations located on the substrate.

Clause 227: The plate of any of the preceding clauses, wherein the first strand portion is formed from a first tow of fibers.

Clause 228: The plate of Clause 227, wherein the first tow of fibers includes at least one of carbon fibers, boron fibers, glass fibers, and polymeric fibers.

Clause 229: The plate of any of the preceding clauses, further comprising a second strand portion disposed on the first layer and forming a second layer, the second strand portion being formed from a second tow of fibers.

Clause 230: The plate of Clause 229, wherein the second tow of fibers includes at least one of carbon fibers, boron fibers, glass fibers, and polymeric fibers.

Clause 231: The plate of Clause 229, wherein the second tow of fibers includes approximately the same number of fibers as the first tow of fibers.

Clause 232: The plate of Clause 229, wherein the second tow of fibers includes a different number of fibers than the first tow of fibers.

Clause 233: A plate for an article of footwear, the plate comprising: i. a substrate defining a first region and a second region; ii. a first strand portion attached to and opposing the substrate in one of the first region and the second region and including a first pattern providing the one of the first region and the second region with first performance characteristics; and iii. a second strand portion attached to and opposing the substrate in the other of the first region and the second region and including a second pattern different than the first pattern and providing the other of the first region and the second region with second performance characteristics different than the first performance characteristics. The plate including an anterior-most point disposed in a forefoot region of the article of footwear, a posterior-most point disposed closer to a heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 234: The plate of Clause 233, wherein the first strand portion forms a first edge to define a shape of the one of the first region and the second region.

Clause 235: The plate of any of the preceding clauses, wherein the second strand portion forms a second edge to define a shape of the other of the first region and the second region.

Clause 236: The plate of Clause 235, wherein the first edge is spaced apart and separated from the second edge.

Clause 237: The plate of Clause 235, wherein the first edge abuts the second edge.

Clause 238: The plate of and of the preceding clauses, wherein the first strand portion and the second strand portion are portions of the same, continuous strand.

Clause 239: The plate of any of the preceding clauses, wherein the first strand portion and the second strand portion are formed from the same material.

Clause 240: The plate of any of the preceding clauses, wherein the first strand portion and the second strand portion are formed from different materials.

Clause 241: The plate of any of the preceding clauses, wherein the first strand portion is formed from a first tow of fibers.

Clause 242: The plate of Clause 241, wherein the first tow of fibers includes at least one of carbon fibers, boron fibers, glass fibers, and polymeric fibers.

Clause 243: The plate of any of the preceding clauses, wherein the second strand portion is formed from a second tow of fibers.

Clause 244: The plate of Clause 233, wherein the second tow of fibers includes at least one of carbon fibers, boron fibers, glass fibers, and polymeric fibers.

Clause 245: The plate of Clause 244, wherein the second tow of fibers includes approximately the same number of fibers as the first tow of fibers.

Clause 246: The plate of Clause 244, wherein the second tow of fibers includes a different number of fibers than the first tow of fibers.

Clause 247: The plate of any of the preceding clauses, wherein the first strand portion and the second strand portion have different lengths.

Clause 248: The plate of any of the preceding clauses, wherein the first strand portion and the second strand portion have approximately the same length.

Clause 249: The plate of any of the preceding clauses, wherein at least one of the first strand portion and the second strand portion forms a void in at least one of the first region and the second region.

Clause 250: The plate of Clause 249, wherein the substrate is exposed within the void.

Clause 251: The plate of any of the preceding clauses, wherein the first strand portion and the second strand portion have different thicknesses.

Clause 252: The plate of any of the preceding clauses, wherein the first strand portion and the second strand portion have approximately the same thickness.

Clause 253: The plate of any of the preceding clauses, wherein the first region and the second region have different thicknesses.

Clause 254: The plate of any of the preceding clauses, wherein the first region and the second region have approximately the same thickness.

Clause 255: The plate of any of the preceding clauses, wherein one of the first region and the second region is located in one of a forefoot portion, a midfoot portion, and a heel portion of the article of footwear and the other of the first region and the second region is located in another of the forefoot portion, the midfoot portion, and the heel portion of the article of footwear.

Clause 256: The plate of any of the preceding clauses, wherein the first strand portion is attached to the substrate via first stitching and the second strand portion is attached to the substrate via second stitching.

Clause 257: The plate of Clause 256, wherein at least one of the first stitching and the second stitching is formed from resin.

Clause 258: The plate of any of Clause 256, wherein at least one of the first stitching and the second stitching is formed from the same material as the substrate.

Clause 259: The plate of any of Clause 256, wherein at least one of the first stitching and the second stitching has a higher melting point than the substrate.

Clause 260: The plate of any of Clause 256, wherein the first stitching zigzags across the first strand portion and penetrates the substrate at first attachment locations that are spaced apart from the first strand portion.

Clause 261: The plate of Clause 260, wherein the second stitching zigzags across the second strand portion and penetrates the substrate at second attachment locations that are spaced apart from the second strand portion.

Clause 262: The plate of Clause 256, wherein the second stitching zigzags across the second strand portion and penetrates the substrate at second attachment locations that are spaced apart from the second strand portion.

Clause 263: A plate for an article of footwear, the plate comprising: a substrate having a forefoot region and a heel region; and ii. a first strand portion attached to the substrate and including a plurality of segments that extend between a first end disposed in the forefoot region and a second end disposed in the heel region, the plurality of segments crossing one another in a midfoot region disposed between the forefoot region and the heel region. The plate including an anterior-most point disposed in the forefoot region of the article of footwear, a posterior-most point disposed closer to the heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 264: The plate of Clause 263, wherein the first strand portion is formed from a continuous strand.

Clause 265: The plate of Clause 264, wherein the first strand portion includes first looped portions joining respective first ends of the plurality of segments and second looped portions joining respective second ends of the plurality of segments, the plurality of segments, the first looped portions, and the second looped portions cooperating to provide the first strand portion with a continuous construction.

Clause 266: The plate of any of the preceding clauses, wherein the first strand portion extends onto an upper of the article of footwear.

Clause 267: The plate of any of the preceding clauses, further comprising tensile strands extending between and connecting the first strand portion to an upper of the article of footwear.

Clause 268: The plate of Clause 267, wherein the tensile strands are attached to the first strand portion along at least one of the plurality of segments between the first end and the second end of the at least one of the plurality of segments.

Clause 269: The plate of Clause 268, further comprising a lace operable to move the upper between a tightened state and a relaxed state, the tensile strands extending between and joining the lace and the at least one of the plurality of segments.

Clause 270: The plate of Clause 263, wherein the substrate includes cleat members extending from a surface thereof.

Clause 271: The plate of Clause 270, wherein the first strand portion is attached to the surface of the substrate and extends around a portion of the cleat members.

Clause 272: The plate of Clause 270, wherein the first strand portion is attached to the surface of the substrate and surrounds at least one of the cleat members.

Clause 273: The plate of Clause 270, wherein the first strand portion is attached to the surface of the substrate and at least one of the plurality of segments surrounds at least one of the cleat members.

Clause 274: The plate of any of the preceding clauses, wherein the plurality of segments are woven together at the midfoot region.

Clause 275: The plate of any of the preceding clauses, wherein the first strand portion is formed from a first tow of fibers.

Clause 276: The plate of Clause 275, wherein the first tow of fibers includes at least one of carbon fibers, boron fibers, glass fibers, and polymeric fibers.

Clause 277: The plate of any of the preceding clauses, wherein the first strand portion forms at least one void between at least two of the segments.

Clause 278: The plate of Clause 277, wherein the substrate is exposed within the at least one void.

Clause 279: The plate of Clause 277, wherein a first bundle of the plurality of segments and a second bundle of the plurality of segments cooperate to define the at least one void.

Clause 280: The plate of Clause 277, wherein the at least one void is disposed between the first bundle and the second bundle.

Clause 281: A method of forming a plate for an article of footwear, the method comprising: stitching a first strand portion to a substrate to form a first layer on the substrate including applying first stitching that crosses over the first strand portion and penetrates the substrate at first attachment locations that are spaced apart from the first strand portion; and stitching a second strand portion on the first layer to form a second layer including applying second stitching that crosses over the second strand portion, extends through the first strand portion, and penetrates the substrate at second attachment locations. The plate including an anterior-most point disposed in a forefoot region of the article of footwear, a posterior-most point disposed closer to a heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 282: The method of Clause 281, wherein stitching the second strand portion on the first layer includes positioning the first strand portion between the second attachment locations and the second strand portion.

Clause 283: The method of any of the preceding clauses, further comprising forming the first strand portion and the second strand portion of the same, continuous strand.

Clause 284: The method of any of the preceding clauses, further comprising forming the first strand portion and the second strand portion from the same material.

Clause 285: The method of any of the preceding clauses, further comprising forming the first strand portion and the second strand portion from different materials.

Clause 286: The method of any of the preceding clauses, further comprising forming the first strand portion from a first tow of fibers.

Clause 287: The method of Clause 286, wherein forming the first strand portion from the first tow of fibers includes forming the first strand portion from at least one of carbon fibers, boron fibers, glass fibers, and polymeric fibers.

Clause 288: The method of any of the preceding clauses, further comprising forming the second strand portion from a second tow of fibers.

Clause 289: The method of Clause 288, wherein forming the second strand portion from the second tow of fibers includes forming the second strand portion from at least one of carbon fibers, boron fibers, glass fibers, and polymeric fibers.

Clause 290: The method of Clause 289, wherein forming the second strand from the second tow of fibers includes providing approximately the same number of fibers as the first tow of fibers.

Clause 291: The method of Clause 289, wherein forming the second strand from the second tow of fibers includes providing a different number of fibers than the first tow of fibers.

Clause 292: The method of any of the preceding clauses, further comprising providing the first strand portion and the second strand portion with different lengths.

Clause 293: The method of any of the preceding clauses, further comprising providing the first strand portion and the second strand portion with approximately the same length.

Clause 294: The method of any of the preceding clauses, wherein stitching the first strand portion to the substrate includes forming a first void in the first layer.

Clause 295: The method of Clause 294, further comprising exposing the substrate within the first void.

Clause 296: The method of Clause 294, wherein stitching the second strand portion on the first layer includes forming a second void in the second layer.

Clause 297: The method of Clause 296, wherein forming the second void includes aligning the second void with the first void to expose the substrate at the second layer.

Clause 298: The method of Clause 296, wherein forming the second void includes spacing apart the second void from the first void.

Clause 299: The method of any of the preceding clauses, wherein stitching the first strand portion to the substrate includes applying the first strand portion to the substrate in a first shape and stitching the second strand portion on the first layer includes applying the second strand portion to the first layer in a second shape.

Clause 300: The method of Clause 299, wherein applying the first strand portion in the first shape and applying the second strand portion in the second shape includes applying the first strand portion and the second strand portion in approximately the same shape.

Clause 301: The method of Clause 299, wherein applying the first strand portion in the first shape and applying the second strand portion in the second shape includes applying the first strand portion and the second strand portion in different shapes.

Clause 302: The method of any of the preceding clauses, wherein at least one of applying the first stitching and applying the second stitching includes applying stitching formed from resin.

Clause 303: The method of any of the preceding clauses, wherein at least one of applying the first stitching and applying the second stitching includes applying stitching that is formed from the same material as the substrate.

Clause 304: The method of any of the preceding clauses, wherein at least one of applying the first stitching and applying the second stitching includes applying stitching that has a higher melting point than the substrate.

Clause 305: The method of any of the preceding clauses, wherein applying the first stitching includes zigzagging the first stitching across the first strand portion between first attachment locations.

Clause 306: The method of any of the preceding clauses, wherein applying the second stitching includes zigzagging the second stitching across the second strand portion between the second attachment locations.

Clause 307: The method of Clause 281, further comprising applying at least one of heat and pressure to the first strand portion and the second strand portion to bind the first strand portion to both the substrate and the second strand portion.

Clause 308: The method of Clause 307, wherein applying at least one of heat and pressure includes forming the substrate, the first strand portion, and the second strand portion into a desired shape.

Clause 309: A method of forming a plate for an article of footwear, the method comprising: attaching a first strand portion to a substrate including positioning first segments of the first strand portion on the substrate with each first segment extending between two different locations along a peripheral edge of the substrate to form a first layer on the substrate, the first segments being disposed adjacent and substantially parallel to one another; and positioning a second strand portion on the first layer including positioning second segments of the second strand portion on the first layer with each second segment extending between two different locations along the peripheral edge of the substrate to form a second layer on the first layer, the second segments being convergent with the first segments and disposed adjacent and substantially parallel to one another. The plate including an anterior-most point disposed in a forefoot region of the article of footwear, a posterior-most point disposed closer to a heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 310: The method of Clause 309, wherein at least one of attaching the first strand portion to the substrate and positioning the second strand portion on the first layer includes positioning a continuous strand.

Clause 311: The method of any of the preceding clauses, wherein attaching the first strand portion to the substrate and positioning the second strand portion on the first layer includes positioning a single, continuous strand.

Clause 312: The method of any of the preceding clauses, further comprising forming the first strand portion and the second strand portion from the same material.

Clause 313: The method of any of the preceding clauses, further comprising forming the first strand portion and the second strand portion from different materials.

Clause 314: The method of any of the preceding clauses, further comprising forming the first strand portion from a first tow of fibers.

Clause 315: The method of Clause 314, wherein forming the first strand portion from the first tow of fibers includes forming the first strand portion from at least one of carbon fibers, boron fibers, glass fibers, and polymeric fibers.

Clause 316: The method of any of the preceding clauses, further comprising forming the second strand portion from a second tow of fibers.

Clause 317: The method of Clause 316, wherein forming the second strand portion from the second tow of fibers includes forming the second strand portion from at least one of carbon fibers, boron fibers, glass fibers, and polymeric fibers.

Clause 318: The method of Clause 317, wherein forming the second strand from the second tow of fibers includes providing approximately the same number of fibers as the first tow of fibers.

Clause 319: The method of Clause 317, wherein forming the second strand from the second tow of fibers includes providing a different number of fibers than the first tow of fibers.

Clause 320: The method of any of the preceding clauses, further comprising providing the first strand portion with first looped portions disposed proximate to the peripheral edge of the substrate, the first looped portions connecting adjacent first segments.

Clause 321: The method of any of the preceding clauses, further comprising providing the second strand portion with second looped portions disposed proximate to the peripheral edge of the substrate, the second looped portions connecting adjacent second segments.

Clause 322: The method of any of the preceding clauses, wherein attaching the first strand portion to the substrate includes forming a first void in the first layer.

Clause 323: The method of Clause 322, further comprising exposing the substrate within the first void.

Clause 324: The method of Clause 322, wherein positioning the second strand portion on the first layer includes forming a second void in the second layer.

Clause 325: The method of Clause 324, wherein forming the second void includes aligning the second void with the first void to expose the substrate at the second layer.

Clause 326: The method of Clause 324, wherein forming the second void includes spacing apart the second void from the first void.

Clause 327: The method of any of the preceding clauses, wherein positioning the first segments of the first strand portion on the substrate includes applying the first segments at a first angle relative to a longitudinal axis of the substrate and positioning the second segments of the second strand portion on the first layer includes applying the second segments at a second angle relative to the longitudinal axis of the substrate that is different than the first angle.

Clause 328: The method of Clause 327, further comprising positioning a third strand portion on the second layer including positioning third segments of the third strand portion on the second layer with each third segment extending between two different locations along the peripheral edge of the substrate to form a third layer on the second layer, the third segments being convergent with the first segments and the second segments and disposed adjacent and substantially parallel to one another.

Clause 329: The method of Clause 328, wherein positioning the third segments on the second layer includes applying the third segments at a third angle relative to the longitudinal axis of the substrate that is different than the first angle and the second angle.

Clause 330: The method of any of the preceding clauses, wherein attaching the first strand portion to the substrate includes applying first stitching and positioning the second strand portion on the first layer includes applying second stitching.

Clause 331: The method of Clause 330, wherein at least one of applying the first stitching and applying the second stitching includes applying stitching that is formed from the same material as the substrate.

Clause 332: The method of Clause 330, wherein at least one of applying the first stitching and applying the second stitching includes applying stitching that has a higher melting point than the substrate.

Clause 333: The method of Clause 330, wherein applying the first stitching includes zigzagging the first stitching across the first strand portion between first attachment locations.

Clause 334: The method of Clause 330, wherein applying the second stitching includes zigzagging the second stitching across the second strand portion between second attachment locations.

Clause 335: The method of Clause 330, wherein applying the second stitching includes extending the second stitching through the first strand portion.

Clause 336: The method of any of the preceding clauses, further comprising applying at least one of heat and pressure to the first strand portion and the second strand portion to bind the first strand portion to both the substrate and the second strand portion.

Clause 337: The method of Clause 336, wherein applying at least one of heat and pressure includes forming the substrate, the first strand portion, and the second strand portion into a desired shape.

Clause 338: A method of forming a plate for an article of footwear, the method comprising: a. attaching a first strand portion to a substrate to form a first layer on the substrate, the first strand portion forming a first void in the first layer to expose the substrate within the first void. The plate including an anterior-most point disposed in a forefoot region of the article of footwear, a posterior-most point disposed closer to a heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 339: The method of Clause 338, further comprising positioning a second strand portion on the first layer to form a second layer.

Clause 340: The method of Clause 339, further comprising forming the first strand portion and the second strand portion of the same, continuous strand.

Clause 341: The method of Clause 339, further comprising forming the first strand portion and the second strand portion from the same material.

Clause 342: The method of Clause 339, further comprising forming the first strand portion and the second strand portion from different materials.

Clause 343: The method of Clause 339, further comprising providing the first strand portion and the second strand portion with different lengths.

Clause 344: The method of Clause 339, further comprising providing the first strand portion and the second strand portion with approximately the same length.

Clause 345: The method of Clause 339, wherein positioning the second strand portion includes forming a second void in the second layer.

Clause 346: The method of Clause 345, further comprising aligning the second void with the first void to expose the substrate at the second layer.

Clause 347: The method of Clause 345, further comprising spacing the second void apart from the first void.

Clause 348: The method of Clause 339, wherein attaching the first strand portion includes applying the first strand portion to the substrate in a first shape and positioning the second strand portion includes applying the second strand portion on the first layer in a second shape.

Clause 349: The method of Clause 348, wherein applying the first strand portion in the first shape and applying the second strand portion in the second shape includes applying the first strand portion and the second strand portion in approximately the same shape.

Clause 350: The method of Clause 348, wherein applying the first strand portion in the first shape and applying the second strand portion in the second shape includes applying the first strand portion and the second strand portion in different shapes.

Clause 351: The method of any of the preceding clauses, wherein attaching the first strand portion to the substrate includes applying stitching.

Clause 352: The method of Clause 351, wherein applying stitching includes applying stitching formed from resin.

Clause 353: The method of Clause 351, wherein applying stitching includes applying stitching formed from the same material as the substrate.

Clause 354: The method of Clause 351, wherein applying stitching includes applying stitching having a higher melting point than the substrate.

Clause 355: The method of Clause 351, wherein applying stitching includes zigzagging the stitching across the first strand portion between first attachment locations located on the substrate.

Clause 356: The method of any of the preceding clauses, further comprising forming the first strand portion from a first tow of fibers.

Clause 357: The method of Clause 356, wherein forming the first strand portion from the first tow of fibers includes forming the first strand portion from at least one of carbon fibers, boron fibers, glass fibers, and polymeric fibers.

Clause 358: The method of any of the preceding clauses, further comprising positioning a second strand portion on the first layer to form a second layer, the second strand portion being formed from a second tow of fibers.

Clause 359: The method of Clause 358, wherein forming the second strand portion from the second tow of fibers includes forming the second strand portion from at least one of carbon fibers, boron fibers, glass fibers, and polymeric fibers.

Clause 360: The method of Clause 358, wherein forming the second strand portion from the second tow of fibers includes providing approximately the same number of fibers as the first tow of fibers.

Clause 361: The method of Clause 358, wherein forming the second strand portion from the second tow of fibers includes providing a different number of fibers than the first tow of fibers.

Clause 362: A method of forming an article of footwear, the method comprising: defining a first region and a second region on a substrate; attaching a first strand portion to the substrate in one of the first region and the second region including forming the first strand into a first pattern that opposes the substrate and provides the one of the first region and the second region with first performance characteristics; and attaching a second strand portion to the substrate in the other of the first region and the second region including forming the second strand portion into a second pattern different than the first pattern that opposes the substrate and provides the other of the first region and the second region with second performance characteristics different than the first performance characteristics.

Clause 363: The method of Clause 362, wherein forming the first strand portion includes forming a first edge to define a shape of the one of the first region and the second region.

Clause 364: The method of any of the preceding clauses, wherein forming the second strand portion includes forming a second edge to define a shape of the other of the first region and the second region.

Clause 365: The method of Clause 364, further comprising spacing the first edge apart from the second edge.

Clause 366: The method of Clause 364, further comprising abutting the first edge against the second edge.

Clause 367: The method of and of the preceding clauses, further comprising forming the first strand portion and the second strand portion of the same, continuous strand.

Clause 368: The method of any of the preceding clauses, further comprising forming the first strand portion and the second strand portion from the same material.

Clause 369: The method of any of the preceding clauses, further comprising forming the first strand portion and the second strand portion from different materials.

Clause 370: The method of any of the preceding clauses, further comprising forming the first strand portion from a first tow of fibers.

Clause 371: The method of Clause 370, wherein forming the first strand portion from the first tow of fibers includes forming the first strand portion from at least one of carbon fibers, boron fibers, glass fibers, and polymeric fibers.

Clause 372: The method of any of the preceding clauses, further comprising forming the second strand portion from a second tow of fibers.

Clause 373: The method of Clause 372, wherein forming the second strand portion from the second tow of fibers includes forming the second strand portion from at least one of carbon fibers, boron fibers, glass fibers, and polymeric fibers.

Clause 374: The method of Clause 373, wherein forming the second strand from the second tow of fibers includes providing approximately the same number of fibers as the first tow of fibers.

Clause 375: The method of Clause 373, wherein forming the second strand from the second tow of fibers includes providing a different number of fibers than the first tow of fibers.

Clause 376: The method of any of the preceding clauses, further comprising providing the first strand portion and the second strand portion with different lengths.

Clause 377: The method of any of the preceding clauses, further comprising providing the first strand portion and the second strand portion with approximately the same length.

Clause 378: The method of any of the preceding clauses, wherein at least one of attaching the first strand portion to the substrate and attaching the second strand portion to the substrate includes forming a void in at least one of the first region and the second region.

Clause 379: The method of Clause 378, further comprising exposing the substrate within the void.

Clause 380: The method of any of the preceding clauses, further comprising providing the first strand portion and the second strand portion with different thicknesses.

Clause 381: The method of any of the preceding clauses, further comprising providing the first strand portion and the second strand portion with approximately the same thickness.

Clause 382: The method of any of the preceding clauses, further comprising providing the first region and the second region with different thicknesses.

Clause 383: The method of any of the preceding clauses, further comprising providing the first region and the second region with approximately the same thickness.

Clause 384: The method of any of the preceding clauses, further comprising locating one of the first region and the second region in one of a forefoot portion, a midfoot portion, and a heel portion of the article of footwear and locating the other of the first region and the second region in another of the forefoot portion, the midfoot portion, and the heel portion of the article of footwear.

Clause 385: The method of any of the preceding clauses, further comprising attaching the first strand portion to the substrate via first stitching and attaching the second strand portion to the substrate via second stitching.

Clause 386: The method of Clause 385, wherein attaching the first strand portion to the substrate via first stitching and attaching the second strand portion to the substrate via second stitching includes using stitching formed from resin.

Clause 387: The method of Clause 385, wherein attaching the first strand portion to the substrate via first stitching and attaching the second strand portion to the substrate via second stitching includes using stitching formed from the same material as the substrate.

Clause 388: The method of Clause 385, wherein attaching the first strand portion to the substrate via first stitching and attaching the second strand portion to the substrate via second stitching includes using stitching having a higher melting point than the substrate.

Clause 389: The method of Clause 385, further comprising zigzagging the first stitching across the first strand portion and penetrating the substrate at first attachment locations that are spaced apart from the first strand portion.

Clause 390: The method of Clause 389, further comprising zigzagging the second stitching across the second strand portion and penetrating the substrate at second attachment locations that are spaced apart from the second strand portion.

Clause 391: The method of Clause 385, further comprising zigzagging the second stitching across the second strand portion and penetrating the substrate at second attachment locations that are spaced apart from the second strand portion.

Clause 392: A method of forming an article of footwear, the method comprising: attaching a first strand portion to a flexible substrate to form a first layer on the substrate; positioning the substrate on a first mold surface to change a shape of the substrate; applying at least one of heat and pressure to the first strand portion and the substrate to conform the substrate to the shape of the first mold surface; and incorporating the substrate into an article of footwear. The substrate including an anterior-most point disposed in a forefoot region, a posterior-most point disposed closer to a heel region than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 393: The method of Clause 392, further comprising attaching a second strand portion to the substrate to form a second layer on the substrate;

Clause 394: The method of Clause 393, wherein attaching the second strand portion to the substrate includes attaching the second strand portion adjacent to the first strand portion.

Clause 395: The method of any of the preceding clauses, wherein attaching the second strand portion to the substrate includes overlapping a least a portion of the second strand portion on the first strand portion.

Clause 396: The method of any of the preceding clauses, further comprising forming the first strand portion and the second strand portion of the same, continuous strand.

Clause 397: The method of any of the preceding clauses, further comprising forming the first strand portion and the second strand portion from the same material.

Clause 398: The method of any of the preceding clauses, further comprising forming the first strand portion and the second strand portion from different materials.

Clause 399: The method of any of the preceding clauses, further comprising forming the first strand portion from a first tow of fibers.

Clause 400: The method of Clause 399, wherein forming the first strand portion from the first tow of fibers includes forming the first strand portion from at least one of carbon fibers, boron fibers, glass fibers, and polymeric fibers.

Clause 401: The method of any of the preceding clauses, further comprising forming the second strand portion from a second tow of fibers.

Clause 402: The method of Clause 401, wherein forming the second strand portion from the second tow of fibers includes forming the second strand portion from at least one of carbon fibers, boron fibers, glass fibers, and polymeric fibers.

Clause 403: The method of Clause 402, wherein forming the second strand from the second tow of fibers includes providing approximately the same number of fibers as the first tow of fibers.

Clause 404: The method of Clause 402, wherein forming the second strand from the second tow of fibers includes providing a different number of fibers than the first tow of fibers.

Clause 405: The method of any of the preceding clauses, further comprising providing the first strand portion and the second strand portion with different lengths.

Clause 406: The method of any of the preceding clauses, further comprising providing the first strand portion and the second strand portion with approximately the same length.

Clause 407: The method of any of the preceding clauses, wherein at least one of attaching the first strand portion to the substrate and attaching the second strand portion to the substrate includes forming a void in at least one of the first layer and the second layer.

Clause 408: The method of Clause 407, further comprising exposing the substrate within the void.

Clause 409: The method of any of the preceding clauses, further comprising providing the first strand portion and the second strand portion with different thicknesses.

Clause 410: The method of any of the preceding clauses, further comprising providing the first strand portion and the second strand portion with approximately the same thickness.

Clause 411: The method of any of the preceding clauses, further comprising providing the first layer and the second layer with different thicknesses.

Clause 412: The method of any of the preceding clauses, further comprising providing the first layer and the second layer with approximately the same thickness.

Clause 413: The method of Clause 392, wherein conforming the substrate to the shape of the first mold surface includes providing the substrate with a forefoot portion, a midfoot portion, and a heel portion.

Clause 414: The method of any of the preceding clauses, further comprising attaching the first strand portion to the substrate via first stitching and attaching the second strand portion to the substrate via second stitching.

Clause 415: The method of Clause 414, wherein attaching the first strand portion to the substrate via first stitching and attaching the second strand portion to the substrate via second stitching includes using stitching formed from resin.

Clause 416: The method of any of Clause 414, wherein attaching the first strand portion to the substrate via first stitching and attaching the second strand portion to the substrate via second stitching includes using stitching formed from the same material as the substrate.

Clause 417: The method of any of Clause 414, wherein attaching the first strand portion to the substrate via first stitching and attaching the second strand portion to the substrate via second stitching includes using stitching having a higher melting point than the substrate.

Clause 418: The method of Clause 392, wherein applying at least one of heat and pressure includes activating a resin material incorporated into the first strand portion.

Clause 419: The method of Clause 392, further comprising infusing the first strand portion with a liquid material.

Clause 420: The method of Clause 419, wherein applying at least one of heat and pressure includes subjecting the substrate and the first strand portion to at least one of vacuum molding and compression molding to cure the liquid material.

Clause 421: The method of Clause 420, wherein curing the liquid material includes curing a thermoset material.

Clause 422: The method of Clause 421, wherein curing a thermoset material includes curing at least one of an epoxy, a polyurethane, a polymerizable composition, and a pre-polymer.

Clause 423: The method of Clause 419, wherein infusing the first strand portion with a liquid material includes adding a polymer to the liquid material to increase the ductility of the liquid material once cured.

Clause 424: The method of Clause 423, wherein adding a polymer to the liquid material includes adding at least one of rubber and a block copolymer.

Clause 425: The method of Clause 392, further comprising forming the substrate from a thermoplastic film.

Clause 426: The method of Clause 425, further comprising attaching the first strand portion to the thermoplastic film via stitching.

Clause 427: The method of Clause 426, wherein attaching the first strand portion to the thermoplastic film via stitching includes using stitching formed from a thermoplastic material.

Clause 428: The method of Clause 427, wherein applying at least one of heat and pressure to the first strand portion and the substrate includes thermoforming the thermoplastic film and the thermoplastic stitching to join the first strand portion to the substrate.

Clause 429: The method of any of the preceding clauses, wherein applying at least one of heat and pressure includes subjecting the substrate and the first strand portion to at least one of vacuum molding and compression molding.

Clause 430: A method of forming an article of footwear, the method comprising: attaching a first strand portion to a first substrate to form a first layer on the first substrate; attaching a second strand portion to a second substrate to form a second layer on the second substrate; positioning the second substrate on the first substrate to form a substrate stack; positioning the substrate stack on a first mold surface; applying at least one of heat and pressure to the substrate stack to conform the substrate stack to the shape of the first mold surface; and incorporating the substrate stack into an article of footwear. The substrate stack including an anterior-most point disposed in a forefoot region, a posterior-most point disposed closer to a heel region than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 431: The method of Clause 430, wherein applying at least one of heat and pressure includes activating a resin material incorporated into the first strand portion and the second strand portion.

Clause 432: The method of any of the preceding clauses, further comprising infusing the first strand portion and the second strand portion with a liquid material.

Clause 433: The method of any of the preceding clauses, wherein applying at least one of heat and pressure includes subjecting the substrate stack to at least one of vacuum molding and compression molding to cure the liquid material.

Clause 434: The method of Clause 433, wherein curing the liquid material includes curing a thermoset material.

Clause 435: The method of Clause 434, wherein curing a thermoset material includes curing at least one of an epoxy, a polyurethane, a polymerizable composition, and a pre-polymer.

Clause 436: The method of Clause 432, wherein infusing the first strand portion and the second strand portion with a liquid material includes adding a polymer to the liquid material to increase the ductility of the liquid material once cured.

Clause 437: The method of Clause 436, wherein adding a polymer to the liquid material includes adding at least one of rubber and a block copolymer.

Clause 438: The method of any of the preceding clauses, further comprising forming at least one of the first substrate and the second substrate from a thermoplastic film.

Clause 439: The method of Clause 438, further comprising attaching the first strand portion to the first substrate via first stitching and attaching the second strand portion to the second substrate via second stitching.

Clause 440: The method of Clause 439, wherein attaching the first strand portion to the first substrate via first stitching and attaching the second strand portion to the second substrate via second stitching includes using stitching formed from a thermoplastic material.

Clause 441: The method of Clause 440, wherein applying at least one of heat and pressure to the substrate stack includes thermoforming the thermoplastic film of the first substrate and the first stitching to join the first strand portion and the first substrate and thermoforming the thermoplastic film of the second substrate and the second stitching to join the second strand portion and the second substrate.

Clause 442: The method of any of the preceding clauses, further comprising attaching the first strand portion to the first substrate via first stitching and attaching the second strand portion to the second substrate via second stitching.

Clause 443: The method of Clause 442, wherein attaching the first strand portion to the substrate via first stitching and attaching the second strand portion to the substrate via second stitching includes using stitching formed from resin.

Clause 444: The method of any of Clause 442, wherein attaching the first strand portion to the substrate via first stitching and attaching the second strand portion to the substrate via second stitching includes using stitching formed from the same material as the substrate.

Clause 445: The method of any of Clause 442, wherein attaching the first strand portion to the substrate via first stitching and attaching the second strand portion to the substrate via second stitching includes using stitching having a higher melting point than the substrate.

Clause 446: The method of any of the preceding clauses, wherein applying at least one of heat and pressure includes activating a resin material incorporated into at least one of the first strand portion and the second stand portion.

Clause 447: The method of any of the preceding clauses, wherein applying at least one of heat and pressure includes subjecting the substrate stack to at least one of vacuum molding and compression molding.

Clause 448: The method of any of the preceding clauses, further comprising forming the first strand portion and the second strand portion from the same material.

Clause 449: The method of any of the preceding clauses, further comprising forming the first strand portion and the second strand portion from different materials.

Clause 450: The method of any of the preceding clauses, further comprising forming the first strand portion from a first tow of fibers.

Clause 451: The method of Clause 450, wherein forming the first strand portion from the first tow of fibers includes forming the first strand portion from at least one of carbon fibers, boron fibers, glass fibers, and polymeric fibers.

Clause 452: The method of any of the preceding clauses, further comprising forming the second strand portion from a second tow of fibers.

Clause 453: The method of Clause 452, wherein forming the second strand portion from the second tow of fibers includes forming the second strand portion from at least one of carbon fibers, boron fibers, glass fibers, and polymeric fibers.

Clause 454: The method of Clause 453, wherein forming the second strand from the second tow of fibers includes providing approximately the same number of fibers as the first tow of fibers.

Clause 455: The method of Clause 453, wherein forming the second strand from the second tow of fibers includes providing a different number of fibers than the first tow of fibers.

Clause 456: The method of any of the preceding clauses, further comprising providing the first strand portion and the second strand portion with different lengths.

Clause 457: The method of any of the preceding clauses, further comprising providing the first strand portion and the second strand portion with approximately the same length.

Clause 458: The method of any of the preceding clauses, wherein at least one of attaching the first strand portion to the first substrate and attaching the second strand portion to the second substrate includes forming a void in at least one of the first layer and the second layer.

Clause 459: The method of Clause 458, further comprising exposing the substrate within the void.

Clause 460: The method of any of the preceding clauses, further comprising providing the first strand portion and the second strand portion with different thicknesses.

Clause 461: The method of any of the preceding clauses, further comprising providing the first strand portion and the second strand portion with approximately the same thickness.

Clause 462: The method of any of the preceding clauses, further comprising providing the first layer and the second layer with different thicknesses.

Clause 463: The method of any of the preceding clauses, further comprising providing the first layer and the second layer with approximately the same thickness.

Clause 464: The method of Clause 430, wherein conforming the substrate stack to the shape of the first mold surface includes providing the substrate stack with a forefoot portion, a midfoot portion, and a heel portion.

Clause 465: A method of forming a plate for an article of footwear, the method comprising: providing a substrate having a forefoot region and a heel region; attaching a first strand portion to the substrate having a plurality of segments that extend between a first end disposed in the forefoot region and a second end disposed in the heel region; and crossing the plurality of segments in a midfoot region disposed between the forefoot region and the heel region. The plate including an anterior-most point disposed in the forefoot region of the article of footwear, a posterior-most point disposed closer to the heel region of the article of footwear than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 466: The method of Clause 465, wherein attaching the first strand portion to the substrate includes attaching a continuous strand.

Clause 467: The method of Clause 466, wherein attaching the first strand portion to the substrate includes joining respective first ends of the plurality of segments via first looped portions and joining respective second ends of the plurality of segments via second looped portions to provide the first strand portion with a continuous construction.

Clause 468: The method of any of the preceding clauses, further comprising extending the first strand portion onto an upper of the article of footwear.

Clause 469: The method of any of the preceding clauses, further comprising extending tensile strands between the first strand portion and an upper of the article of footwear.

Clause 470: The method of Clause 469, wherein extending tensile strands between the first strand portion and the upper includes connecting the first strand portion and the upper via the tensile strands.

Clause 471: The method of Clause 469, further comprising attaching the tensile strands to the first strand portion along at least one of the plurality of segments between the first end and the second end of the at least one of the plurality of segments.

Clause 472: The method of Clause 471, further comprising extending the tensile strands between a lace operable to move the upper between a tightened state and a relaxed state and the at least one of the plurality of segments.

Clause 473: The method of Clause 472, wherein extending the tensile strands between the lace and the at least one of the plurality of segments includes connecting the tensile strands to the lace and the at least one of the plurality of segments.

Clause 474: The method of Clause 465, further comprising providing the substrate with cleat members that extend from a surface thereof.

Clause 475: The method of Clause 474, further comprising attaching the first strand portion to the surface of the substrate and extending the first strand portion around a portion of the cleat members.

Clause 476: The method of Clause 474, further comprising attaching the first strand portion to the surface of the substrate and surrounding at least one of the cleat members with the first strand portion.

Clause 477: The method of Clause 474, further comprising attaching the first strand portion to the surface of the substrate and surrounding at least one of the cleat members with at least one of the plurality of segments.

Clause 478: The method of any of the preceding clauses, further comprising weaving the plurality of segments together at the midfoot region.

Clause 479: The method of any of the preceding clauses, further comprising forming the first strand portion from a first tow of fibers.

Clause 480: The method of Clause 479, wherein forming the first strand portion from the first tow of fibers includes forming the first strand portion from at least one of carbon fibers, boron fibers, glass fibers, and polymeric fibers.

Clause 481: The method of any of the preceding clauses, wherein attaching the first strand portion to the substrate includes forming at least one void between at least two of the segments.

Clause 482: The method of Clause 481, further comprising exposing the substrate within the at least one void.

Clause 483: The method of Clause 481, further comprising defining the at least one void between a first bundle of the plurality of segments and a second bundle of the plurality of segments.

Clause 484: The method of Clause 483, further comprising exposing the substrate within the at least one void.

Clause 485: A plate for an article of footwear, the plate comprising: a substrate; a first strand portion attached to the substrate via first stitching and including first segments that each extend between two different locations along the substrate to form a first layer on the substrate; and a second strand portion disposed on the first layer and including second segments that each extend between two different locations along the substrate to form a second layer on the first layer.

Clause 486: The plate of Clause 485, wherein the first stitching crosses over the first strand portion and penetrates the substrate at first attachment locations that are spaced apart from the first strand portion.

Clause 487: The plate of any of the preceding clauses, wherein the second strand portion is attached to the substrate via second stitching that crosses over the second strand portion, extends through the first strand portion, and penetrates the substrate at second attachment locations.

Clause 488: The plate of Clause 487, wherein at least one of the first stitching and the second stitching has a higher melting point than the substrate.

Clause 489: The plate of any of the preceding clauses, wherein the first strand portion and the second strand portion are portions of the same, continuous strand.

Clause 490: The plate of any of the preceding clauses, wherein the first strand portion is formed from a first tow of fibers including at least one of carbon fibers, boron fibers, glass fibers, and polymeric fibers.

Clause 491: The plate of any of the preceding clauses, wherein the second strand portion is formed from a second tow of fibers including at least one of carbon fibers, boron fibers, glass fibers, and polymeric fibers.

Clause 492: The plate of Clause 491, wherein the second tow of fibers includes approximately the same number of fibers as the first tow of fibers.

Clause 493: The plate of Clause 491, wherein the second tow of fibers includes a different number of fibers than the first tow of fibers.

Clause 494: The plate of any of the preceding clauses, wherein the first strand portion and the second strand portion include looped portions disposed proximate to a peripheral edge of the substrate, the looped portions connecting adjacent first segments and adjacent second segments.

Clause 495: The plate of any of the preceding clauses, wherein at least two adjacent first segments and/or at least two adjacent second segments are disconnected at a peripheral edge of the substrate.

Clause 496: The plate of any of the preceding clauses, wherein the first layer has a first density of first segments applied to the substrate and the second layer has a second density of second segments applied to the first layer that is different than the first layer.

Clause 497: The plate of any of the preceding clauses, wherein the first segments are applied to the substrate at a first angle relative to a longitudinal axis of the substrate and the second segments are applied to the first layer at a second angle relative to the longitudinal axis of the substrate that is different than the first angle.

Clause 498: The plate of Clause 497, further comprising a third strand portion disposed on the second layer and including third segments that each extend between two different locations along the substrate to form a third layer on the second layer, the third segments being convergent with the first segments and the second segments and disposed adjacent and substantially parallel to one another.

Clause 499: The plate of any of the preceding clauses, further comprising a polymeric resin consolidating the first strand portion, the second strand portion, and the substrate to form a composite when heat and pressure is applied.

Clause 500: The plate of any of the preceding clauses, wherein the first strand portion forms a first void in the first layer.

Clause 501: The plate of Clause 500, wherein the second strand portion forms a second void in the second layer that is aligned with the first void or spaced apart from the first void.

Clause 502: The plate of Clause 500, wherein the substrate is exposed or absent within the first void.

Clause 503: The plate of any of the preceding clauses, wherein the plate includes: an anterior-most point disposed in a forefoot region of the article of footwear; a posterior-most point disposed closer to a heel region of the article of footwear than the anterior-most point; and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 504: The plate of Clause 503, wherein the plate includes a substantially flat portion disposed within the heel region of the article of footwear, the posterior-most point being located within the substantially flat portion.

Clause 505: The plate of Clause 503, wherein the MTP point is located approximately thirty percent (30%) of the total length of the plate from the anterior-most point.

Clause 506: The plate of Clause 503, further comprising a cushioning layer disposed at least partially within the concave portion.

Clause 507: The plate of Clause 506, wherein the cushioning layer defines a greatest thickness proximate to the MTP point.

Clause 508: A method of forming an article of footwear, the method comprising: attaching a first strand portion to a flexible substrate to form a first layer on the substrate; positioning a second strand portion on the first layer to form a second layer on the first layer; positioning the substrate on a first mold surface to change a shape of the substrate; applying at least one of heat and pressure to the first strand portion, the second strand portion and the substrate to conform the substrate to the shape of the first mold surface; and incorporating the substrate into an article of footwear. The substrate including an anterior-most point disposed in a forefoot region, a posterior-most point disposed closer to a heel region than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 509: The method of Clause 508, wherein attaching the first strand portion to the flexible substrate includes attaching the first strand portion to the flexible substrate via first stitching crosses over the first strand portion and penetrates the substrate at first attachment locations that are spaced apart from the first strand portion.

Clause 510: The method of any of the preceding clauses, wherein positioning the second portion on the first layer includes attaching the first strand portion to the flexible substrate via second stitching that crosses over the second strand portion, extends through the first strand portion, and penetrates the substrate at second attachment locations.

Clause 511: The method of Clause 508, further comprising attaching the second strand portion to a second substrate to form a second layer on the second substrate, wherein positioning the second strand portion on the first layer includes positioning the second substrate on the first layer.

Clause 512: The method of any of the preceding clauses, further comprising forming the first strand portion and the second strand portion of the same, continuous strand.

Clause 513: The method of any of the preceding clauses, further comprising forming the first strand portion from a first tow of fibers including at least one of carbon fibers, boron fibers, glass fibers, and polymeric fibers.

Clause 514: The method of any of the preceding clauses, further comprising forming the second strand portion from a second tow of fibers including at least one of carbon fibers, boron fibers, glass fibers, and polymeric fibers.

Clause 515: The method of Clause 514, wherein forming the second strand portion from the second tow of fibers includes providing approximately the same number of fibers as the first tow fibers.

Clause 516: The method of Clause 514, wherein forming the second strand portion from the second tow of fibers includes providing a different number of fibers than the first tow of fibers.

Clause 517: The method of any of the preceding clauses, further comprising providing the first strand portion and the second strand portion with looped portions disposed proximate to a peripheral edge of the substrate, the looped portions connecting adjacent first segments and adjacent second segments.

Clause 518: The method of Clause 517, further comprising removing at least one of the looped portions that extends outside the peripheral edge of the substrate to define an outer edge of the plate.

Clause 519: The method of any of the preceding clauses, further comprising providing the first layer and the second layer with segments having different densities.

Clause 520: The method of any of the preceding clauses, wherein attaching the first strand portion includes applying first segments of the first strand portion to the substrate at a first angle relative to a longitudinal axis of the substrate and positioning the second strand portion includes applying second segments of the second strand portion to the first layer at a second angle relative to the longitudinal axis of the substrate that is different than the first angle.

Clause 521: The method of Clause 520, further comprising positioning a third strand portion on the second layer including positioning third segments of the third strand portion on the second layer with each third segment extending between two different locations along the peripheral edge of the substrate to form a third layer on the second layer, the third segments being convergent with the first segments and the second segments and disposed adjacent and substantially parallel to one another.

Clause 522: The method of any of the preceding clauses, wherein applying at least one of heat and pressure includes activating a polymeric resin incorporated into the first strand portion and the second strand portion.

Clause 523: The method of any of the preceding clauses, further comprising infusing the first strand portion, the second strand portion and the substrate with a liquid material, the liquid material being a thermoset material.

Clause 524: The method of Clause 523, wherein applying at least one of heat and pressure includes subjecting the first strand portion, the second strand portion, and the substrate to at least one of vacuum molding and compression molding to cure the thermoset material.

Clause 525: The method of Clause 508, further comprising forming the substrate from a thermoplastic film.

Clause 526: The method of Clause 525, wherein attaching the first strand portion includes attaching the first strand portion to the thermoplastic film using stitching formed from a thermoplastic material.

Clause 527: The method of any of the preceding clauses, wherein applying at least one of heat and pressure to the first strand portion, the second strand portion, and the substrate includes subjecting the first strand portion, the second strand portion to at least one of vacuum molding and compression molding.

Clause 528: The method of any of the preceding clauses, wherein attaching the first strand portion to the substrate and positioning the second strand portion to the substrate includes forming a void in at least one of the first layer and the second layer.

Clause 529: The method of Clause 528, further comprising exposing the substrate within the void.

Clause 530: The method of Clause 528, further comprising removing the exposed portion of the substrate within the void.

Clause 531: A plate for an article of footwear, the plate comprising a substrate, a first strand portion attached to the substrate via first stitching and including first segments that each extend between two different locations along the substrate to form a first layer on the substrate, a second strand portion disposed on the first layer and including second segments that each extend between two different locations along the substrate to form a second layer on the first layer.

Clause 532: The plate of Clause 531, wherein the first stitching crosses over the first strand portion and penetrates the substrate at first attachment locations that are spaced apart from the first strand portion.

Clause 533: The plate of any of the preceding clauses, wherein the second strand portion is attached to the substrate via second stitching that crosses over the second strand portion, extends through the first strand portion, and penetrates the substrate at second attachment locations.

Clause 534: The plate of Clause 533, wherein at least one of the first stitching and the second stitching has a higher melting point than the substrate.

Clause 535: The plate of any of the preceding clauses, wherein the first strand portion and the second strand portion are portions of the same, continuous strand.

Clause 536: The plate of any of the preceding clauses, wherein the first strand portion is formed from a first tow of fibers including at least one of carbon fibers, boron fibers, glass fibers, and polymeric fibers.

Clause 537: The plate of any of the preceding clauses, wherein the second strand portion is formed from a second tow of fibers including at least one of carbon fibers, boron fibers, glass fibers, and polymeric fibers.

Clause 538: The plate of Clause 537, wherein the second tow of fibers includes approximately the same number of fibers as the first tow of fibers.

Clause 539: The plate of Clause 537, wherein the second tow of fibers includes a different number of fibers than the first tow of fibers.

Clause 540: The plate of any of the preceding clauses, wherein the first strand portion and the second strand portion include looped portions disposed proximate to a peripheral edge of the substrate, the looped portions connecting adjacent first segments and adjacent second segments.

Clause 541: The plate of any of the preceding clauses, wherein at least two adjacent first segments and/or at least two adjacent second segments are disconnected at a peripheral edge of the substrate.

Clause 542: The plate of any of the preceding clauses, wherein the first layer has a first density of first segments applied to the substrate and the second layer has a second density of second segments applied to the first layer that is different than the first layer.

Clause 543: The plate of any of the preceding clauses, wherein the first segments are applied to the substrate at a first angle relative to a longitudinal axis of the substrate and the second segments are applied to the first layer at a second angle relative to the longitudinal axis of the substrate that is different than the first angle.

Clause 544: The plate of Clause 543, further comprising a third strand portion disposed on the second layer and including third segments that each extend between two different locations along the substrate to form a third layer on the second layer, the third segments being convergent with the first segments and the second segments and disposed adjacent and substantially parallel to one another.

Clause 545: The plate of any of the preceding clauses, further comprising a polymeric resin consolidating the first strand portion, the second strand portion, and the substrate to form a composite when heat and pressure is applied.

Clause 546: The plate of any of the preceding clauses, wherein the first strand portion forms a first void in the first layer.

Clause 547: The plate of Clause 546, wherein the second strand portion forms a second void in the second layer that is aligned with the first void or spaced apart from the first void.

Clause 548: The plate of Clause 546, wherein the substrate is exposed or absent within the first void Clause 549: A method of forming an article of footwear, the method comprising attaching a first strand portion to a flexible substrate to form a first layer on the substrate, positioning a second strand portion on the first layer to form a second layer on the first layer, positioning the substrate on a first mold surface to change a shape of the substrate, applying at least one of heat and pressure to the first strand portion, the second strand portion and the substrate to conform the substrate to the shape of the first mold surface, and incorporating the substrate into an article of footwear. The substrate including an anterior-most point disposed in a forefoot region, a posterior-most point disposed closer to a heel region than the anterior-most point, and a concave portion extending between the anterior-most point and the posterior-most point and including a constant radius of curvature from the anterior-most point to a metatarsophalangeal (MTP) point of the article of footwear, the MTP point opposing the MTP joint of a foot during use.

Clause 550: The method of Clause 549, wherein attaching the first strand portion to the flexible substrate includes attaching the first strand portion to the flexible substrate via first stitching crosses over the first strand portion and penetrates the substrate at first attachment locations that are spaced apart from the first strand portion.

Clause 551: The method of any of the preceding clauses, wherein positioning the second portion on the first layer includes attaching the first strand portion to the flexible substrate via second stitching that crosses over the second strand portion, extends through the first strand portion, and penetrates the substrate at second attachment locations.

Clause 552: The method of Clause 549, further comprising attaching the second strand portion to a second substrate to form a second layer on the second substrate, wherein positioning the second strand portion on the first layer includes positioning the second substrate on the first layer.

Clause 553: The method of any of the preceding clauses, further comprising forming the first strand portion and the second strand portion of the same, continuous strand.

Clause 554: The method of any of the preceding clauses, further comprising forming the first strand portion from a first tow of fibers including at least one of carbon fibers, boron fibers, glass fibers, and polymeric fibers.

Clause 555: The method of any of the preceding clauses, further comprising forming the second strand portion from a second tow of fibers including at least one of carbon fibers, boron fibers, glass fibers, and polymeric fibers.

Clause 556: The method of Clause 555, wherein forming the second strand portion from the second tow of fibers includes providing approximately the same number of fibers as the first tow of fibers.

Clause 557: The method of Clause 555, wherein forming the second strand portion from the second tow of fibers includes providing a different number of fibers than the first tow of fibers.

Clause 558: The method of any of the preceding clauses, further comprising providing the first strand portion and the second strand portion with looped portions disposed proximate to a peripheral edge of the substrate, the looped portions connecting adjacent first segments and adjacent second segments.

Clause 559: The method of Clause 558, further comprising removing at least one of the looped portions that extends outside the peripheral edge of the substrate to define an outer edge of the plate.

Clause 560: The method of any of the preceding clauses, further comprising providing the first layer and the second layer with segments having different densities.

Clause 561: The method of any of the preceding clauses, wherein attaching the first strand portion includes applying first segments of the first strand portion to the substrate at a first angle relative to a longitudinal axis of the substrate and positioning the second strand portion includes applying second segments of the second strand portion to the first layer at a second angle relative to the longitudinal axis of the substrate that is different than the first angle.

Clause 562: The method of Clause 561, further comprising positioning a third strand portion on the second layer including positioning third segments of the third strand portion on the second layer with each third segment extending between two different locations along the peripheral edge of the substrate to form a third layer on the second layer, the third segments being convergent with the first segments and the second segments and disposed adjacent and substantially parallel to one another.

Clause 563: The method of any of the preceding clauses, wherein applying at least one of heat and pressure includes activating a polymeric resin incorporated into the first strand portion and the second strand portion.

Clause 564: The method of any of the preceding clauses, further comprising infusing the first strand portion, the second strand portion and the substrate with a liquid material, the liquid material being a thermoset material.

Clause 565: The method of Clause 564, wherein applying at least one of heat and pressure includes subjecting the first strand portion, the second strand portion, and the substrate to at least one of vacuum molding and compression molding to cure the thermoset material.

Clause 566: The method of Clause 549, further comprising forming the substrate from a thermoplastic film.

Clause 567: The method of Clause 566, wherein attaching the first strand portion includes attaching the first strand portion to the thermoplastic film using stitching formed from a thermoplastic material.

Clause 568: The method of any of the preceding clauses, wherein applying at least one of heat and pressure to the first strand portion, the second strand portion, and the substrate includes subjecting the first strand portion, the second strand portion to at least one of vacuum molding and compression molding.

Clause 569: The method of any of the preceding clauses, wherein attaching the first strand portion to the substrate and positioning the second strand portion to the substrate includes forming a void in at least one of the first layer and the second layer.

Clause 570: The method Clause 569 further comprising exposing the substrate within the void.

Clause 571: The method of Clause 569, further comprising removing the exposed portion of the substrate within the void.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A sole structure for an article of footwear having an upper, the sole structure comprising:
    a plate including a first surface facing the upper and a second surface disposed on an opposite side of the plate than the first surface and facing a ground-engaging surface of the sole structure, the plate extending continuously from a first end disposed in a forefoot region of the sole structure to a second end disposed in a heel region of the sole structure, the plate including an anterior-most point configured to be disposed in the forefoot region of the sole structure, a posterior-most point configured to be disposed within the heel region of the sole structure, an aft point disposed at a location ranging from 50% to 60% of a distance from the anterior-most point to the posterior-most point, and the plate including a concave portion extending from the anterior-most point to the aft point and a substantially flat portion extending from the aft point to the posterior-most point;
    a fluid-filled chamber including a first surface attached to the second surface of the plate between the posterior-most point and the aft point, a second surface disposed on an opposite side of the fluid-filled chamber than the first surface of the fluid-filled chamber, a first distal end, and a second distal end located on an opposite end of the fluid-filled chamber than the first distal end, one of the first distal end and the second distal end being aligned with the posterior-most point of the plate; and
    a midsole including:
        a first cushioning member having a first surface attached to the second surface of the fluid-filled chamber and defining a first recessed surface, and a second surface disposed on an opposite side of the first cushioning member than the first surface of the first cushioning member, the second surface of the first cushioning member facing the ground-engaging surface of the sole structure; and
        a second cushioning member having a third surface attached to the upper and a fourth surface disposed on an opposite side of the second cushioning member than the third surface and defining a second recessed surface, the first recessed surface and the second recessed surface cooperating to define a space that encloses the plate.

2. The sole structure of claim 1, wherein the midsole includes a variable thickness from the heel region to the forefoot region.

3. The sole structure of claim 1, wherein the fluid-filled chamber extends continuously from a medial side of the sole structure to a lateral side of the sole structure in at least one of the forefoot region and the heel region.

4. The sole structure of claim 1, further comprising an outsole defining the ground-engaging surface, the outsole being attached to the second surface of the first cushioning member.

5. The sole structure of claim 1, wherein the first surface of the plate defines the concave portion of the plate and the second surface of the plate defines a convex portion of the plate, the concave portion and the convex portion being disposed in the forefoot region of the sole structure.

6. An article of footwear incorporating the sole structure of claim 1.

7. The sole structure of claim 1, wherein the aft point, the anterior-most point, and the posterior-most point are co-planar with each other when the plate is in a relaxed configuration.

* * * * *